(12) United States Patent
Berger et al.

(10) Patent No.: US 10,850,386 B2
(45) Date of Patent: Dec. 1, 2020

(54) HUMANOID ROBOTICS SYSTEM AND METHODS

(71) Applicant: Willow Garage, LLC, San Francisco, CA (US)

(72) Inventors: Eric H. Berger, Palo Alto, CA (US); Keenan Wyrobek, Menlo Park, CA (US)

(73) Assignee: Willow Garage, LLC, San Francisco, CA (US)

( * ) Notice: Subject to any disclaimer, the term of this patent is extended or adjusted under 35 U.S.C. 154(b) by 0 days.

(21) Appl. No.: 16/596,946

(22) Filed: Oct. 9, 2019

(65) Prior Publication Data

US 2020/0047329 A1 Feb. 13, 2020

Related U.S. Application Data

(63) Continuation of application No. 15/699,849, filed on Sep. 8, 2017, now abandoned, which is a continuation of application No. 14/814,025, filed on Jul. 30, 2015, now abandoned, which is a continuation of application No. 14/285,527, filed on May 22, 2014, now abandoned, which is a continuation of application No. 13/084,380, filed on Apr. 11, 2011, now abandoned.

(60) Provisional application No. 61/322,556, filed on Apr. 9, 2010.

(51) Int. Cl.
*B25J 5/00* (2006.01)
*B25J 19/00* (2006.01)
*B25J 9/00* (2006.01)

(52) U.S. Cl.
CPC ............. *B25J 5/00* (2013.01); *B25J 5/007* (2013.01); *B25J 9/0006* (2013.01); *B25J 19/0016* (2013.01); *Y10S 901/01* (2013.01); *Y10S 901/19* (2013.01); *Y10S 901/27* (2013.01)

(58) Field of Classification Search
CPC ... B25J 5/00; B25J 5/007; B25J 9/0006; B25J 19/0016
USPC .......................... 74/490.01; 414/719; 901/48
See application file for complete search history.

(56) References Cited

U.S. PATENT DOCUMENTS

| | | | |
|---|---|---|---|
| 2,978,118 A | 4/1961 | Goertz et al. | |
| 4,762,455 A | 8/1988 | Coughlan et al. | |
| 5,100,138 A | 3/1992 | Wilde | |
| 5,402,690 A | 4/1995 | Sekiguchi et al. | |
| 6,298,569 B1 * | 10/2001 | Raab | G01B 5/0016 33/503 |
| 7,428,855 B2 * | 9/2008 | Duval | B25J 19/0016 248/123.11 |
| 2010/0204804 A1 | 8/2010 | Garrec | |
| 2010/0243344 A1 | 9/2010 | Wyrobek et al. | |

(Continued)

*Primary Examiner* — William C Joyce
(74) *Attorney, Agent, or Firm* — Stephen M. DeKlerk

(57) ABSTRACT

A system may include a mobile base, a spine structure, a body structure, and at least one robotic arm, each of which is movably configured to have significant human-scale capabilities in prescribed environments. The one or more robotic arms may be rotatably coupled to the body structure, which may be mechanically associated with the mobile base, which is preferably configured for holonomic or semi-holonomic motion through human scale travel pathways that are ADA compliant. Aspects of the one or more arms may be counterbalanced with one or more spring-based counterbalancing mechanisms which facilitate backdriveability and payload features.

11 Claims, 103 Drawing Sheets

(56) References Cited

U.S. PATENT DOCUMENTS

2010/0319164 A1    12/2010   Bax et al.
2012/0184880 A1     7/2012   Doyle
2012/0291582 A1    11/2012   Kang et al.

* cited by examiner

HUMANOID ROBOTICS SYSTEM AND METHODS

RELATED APPLICATION DATA

The present application is a continuation of U.S. application Ser. No. 15/699,849, filed on Sep. 8, 2017, which is a continuation of U.S. application Ser. No. 14/814,025, filed Jul. 30, 2015 now abandoned, which is a continuation of U.S. application Ser. No. 14/285,527, filed on May 22, 2014 now abandoned, which is a continuation of U.S. application Ser. No. 13/084,380, filed on Apr. 11, 2011 now abandoned, which claims the benefit under 35 U.S.C. § 119 to U.S. Provisional Application Ser. No. 61/322,556, filed Apr. 9, 2010. The foregoing applications are hereby incorporated by reference into the present application in their entirety.

FIELD OF THE INVENTION

The invention relates to electromechanical and robotic systems for accomplishing human-scale tasks, and specifically to humanoid and autonomous robotic systems for use in the human environment.

BACKGROUND

Scientists and researchers in countries such as Japan, Germany, and the United States have a long history of utilizing electromechanical devices to assist with tasks such as manufacturing. Most of these systems comprise a variation of an armlike work interface, and some of them may have a base structure which is mobile relative to the coordinate system of the floor or earth. More recently, a classification of robots often referred to as "humanoid robots" has evolved, with many designers trying to bring robotics and autonomy deeper into the human living environment. Humanoid robots derive their classification name from human-like qualities that they may imitate or possess. For example, a series of humanoid robots developed under the tradename "Asimo"® by Honda Corporation of Japan has demonstrated that small human-like robots can safely walk, or ambulate, around on two feet with two legs, interact with humans in the work or home environment, and handle some very light duty tasks, such as holding a lightweight tray.

Another ambulatory robot from Japan was built and distributed in limited numbers by Kawada Heavy Industries, Inc., under the name "HRP2". Indeed, much attention has been focused on solving the humanlike ambulatory problem, presumably because human environments are designed for ambulatory beings. Other humanoid robotics design efforts have focused less on ambulation and have developed robots with wheeled bases to facilitate movement of other important robotic features, such as electromechanically operated arms or variations of arms. For example, the "STAIR 1" and "STAIR 2" robots developed at Stanford University are representative of a relatively large class of robots wherein a research team builds or purchases, for example, from Segway Corporation, a relatively straightforward mobile base, and then mounts a robotic arm on the top of the base to build a robotics research platform.

A project from Deutches Zentrum fur Luft and Raumfahrt ("DLR", or the "German Aerospace Center") called the "Robutler" comprises a movable table style base with a robotic arm mounted to its top. This system was configured to have laser scanner localization, stereo video cameras, and other sensors to attempt to accomplish what was referred to by DLR as "scene analysis". A subsequent DLR robotics configuration, termed "Justin", was significantly more humanoid in its construction and appearance. The Justin humanoid robot has lightweight humanoid arms, a humanoid sensor head, and a pivotable torso structure. This robot is force controlled using a series elastic configuration and has expensive and powerful arms with distally mounted hands comprising fingerlike elements. Like many of the publicly displayed humanoid robots, it is not fully self contained, in that it has off-board computing and power systems assisting with its function. Indeed, many humanoid robots are displayed or operated with power and/or communications lines trailing behind due to the complexities of full integration. The University of Karlsruhe, Germany, has developed a series of humanoid robots called "ARMAR", which has been displayed with several variations of a nonambulatory mobile base, an integrated sensor head, a torso structure which may be pivoted to interact with aspects of the environment around it, and up to two robotic arms.

It would be desirable for robotics researchers, corporations, and people in general to have an integrated humanoid robotics platform for development and human environment operation that is robust, safe, predictable, fully-integrated, able to mechanically navigate typical human environments, highly programmable, and capable of certain human-scale tasks, such as lifting and manipulating objects that are commonly lifted and manipulated by humans. Such a system is described herein.

DETAILED DESCRIPTION

Figure 1A:
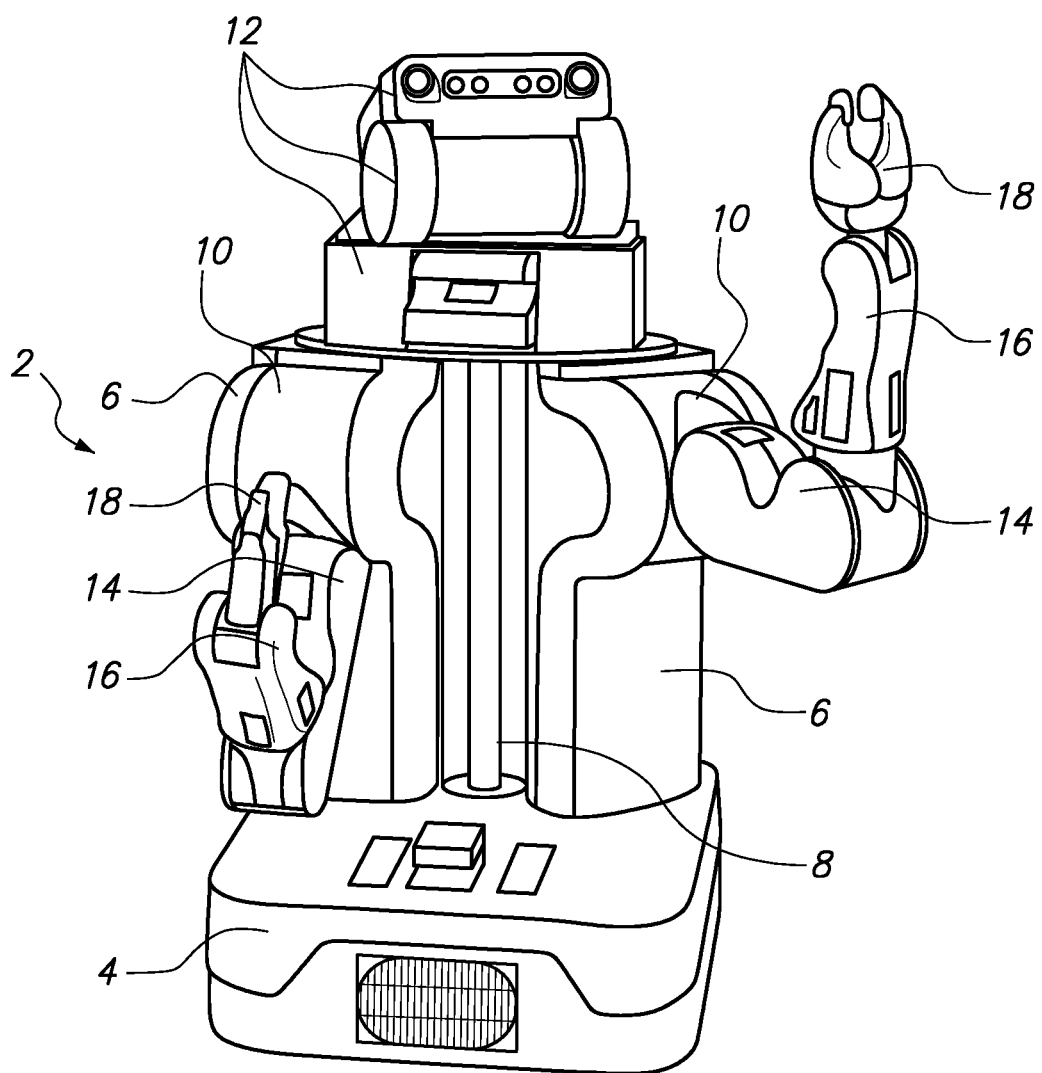
FIGS. 1A-1C illustrate orthogonal views of a fully assembled personal robotics system.
Figure 1B:
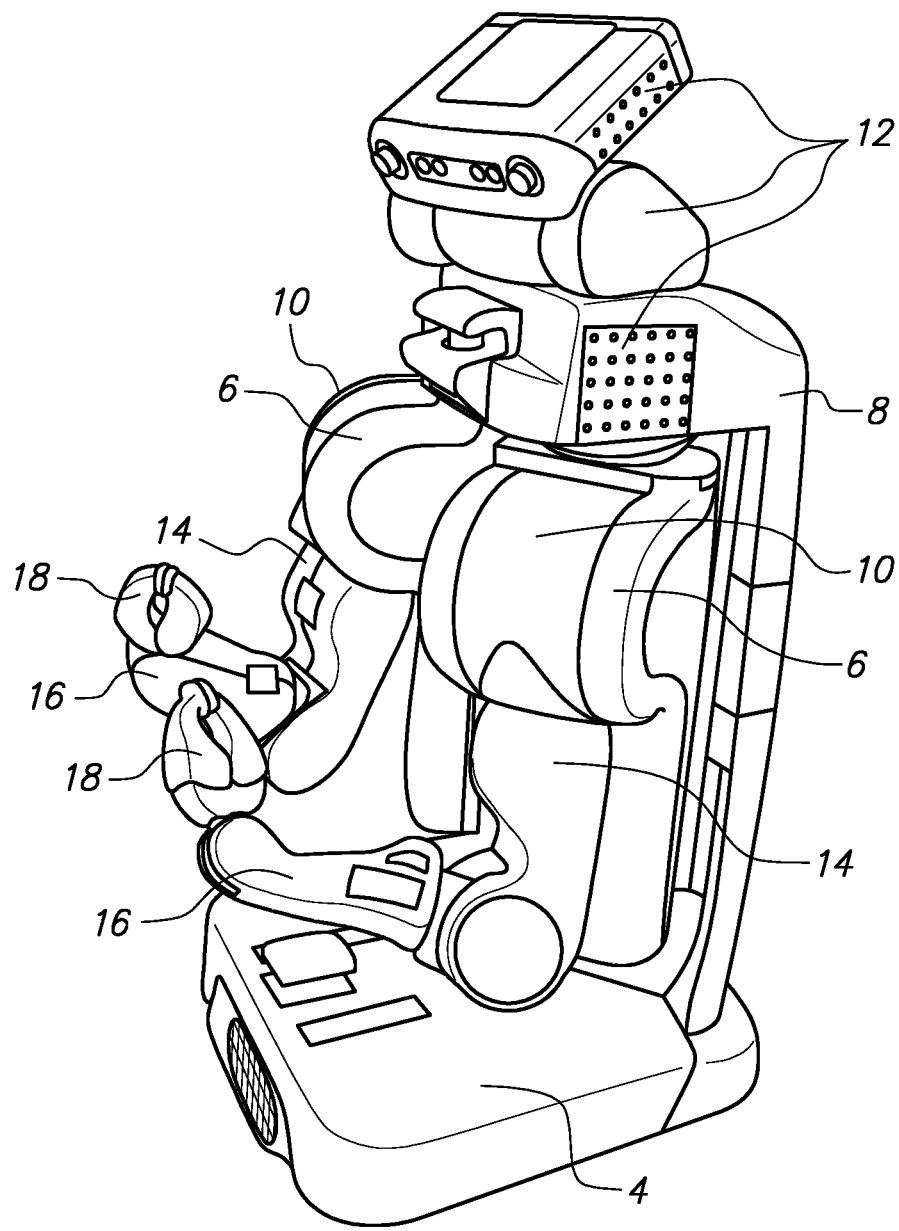
Figure 1C:
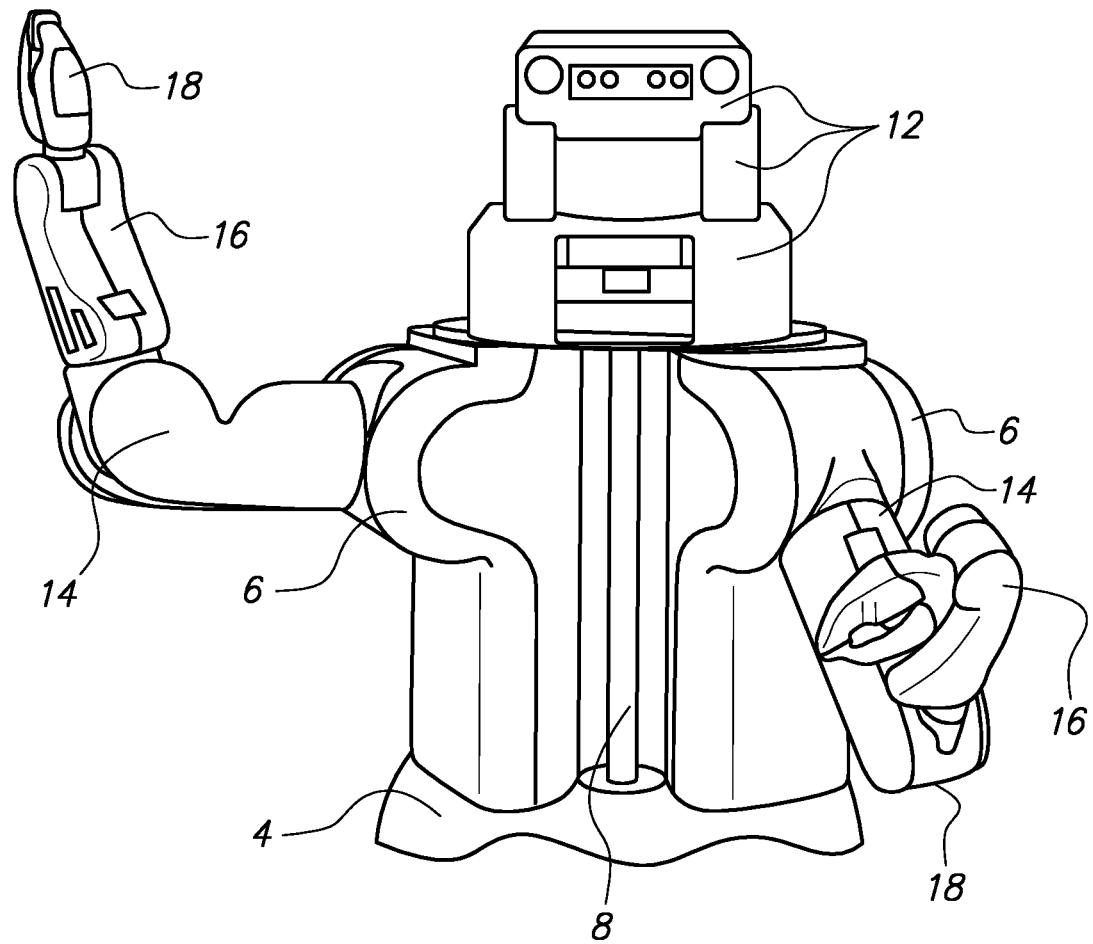

Referring to FIGS. 1A-1C, orthogonal views are shown to illustrate a fully assembled personal robotics system (2). As shown in FIG. 1A, a mobile base assembly (4) is fixedly coupled to a substantially vertical main body assembly (8), which is rotatably coupled to each of two proximal arm turrets (6) which are configured to assist with robotic arm counterbalancing, and also to provide pan rotation for each of the arms. Rotatably coupled to each of the arm turrets is a shoulder assembly (10) configured to facilitate counterbalancing of the arm, and also pitch rotation of the upper arm assembly (14) relative to the proximal arm turret (6). The upper arm assembly (14) proximal portion is rotatably coupled to the shoulder assembly (10), while the distal portion of the upper arm assembly (14) is rotatably coupled to a forearm assembly (16) in a manner that provides a pitch rotation akin to flexion of the human elbow. The proximal portion of the forearm assembly (16) is rotatably coupled to the distal portion of the upper arm assembly (14), while the distal portion of the forearm assembly (16) comprises a differential drive mechanism configured to rotate a distally coupled gripper assembly (18) in roll rotation relative to the forearm assembly (16), and/or pitch rotation relative to the forearm assembly (16). A multipart head assembly (12) is rotatably coupled to the superior portion of the body assembly (8) and is configured to allow pan rotation of the upper portions of the head assembly relative to the body assembly (8), and/or pitch (or "tilt") rotation of an uppermost portion of the head assembly relative to the body assembly (8). A pitch (or "tilt") platform at the base of the head assembly (12) facilitates tilting of a sensor which may be coupled to such platform, such as a laser scanner.

FIG. 1B depicts another view of the same assembly shown in FIG. 1A, but with different positioning of several of the components relative to each other, such as a more prominent tilt rotation of the uppermost portion of the head assembly (12) relative to the body assembly (8). The back side of the body assembly (8) is also shown behind the arm turret assemblies (6). FIG. 1C shows a partial front orthogonal view of the same assembly shown in FIGS. 1A and 1B with the upper arm (14), forearm (16), and gripper (18) assemblies repositioned to somewhat higher vertical positions of their ranges of motion.

What follows in FIGS. 2A-10D are partial orthogonal schematic views of various aspects of a robotic system such as that depicted in FIG. 1A (2), in various states of assembly and/or dis-assembly. For illustrative purposes, three dimensional wireframe or solid drawings are utilized to replicate or illustrate the various aspects of a system such as that depicted in FIG. 1A (2), to assist the reader in understanding how various parts or portions are configured to work together in a complex electromechanical configuration.

Figure 2A:
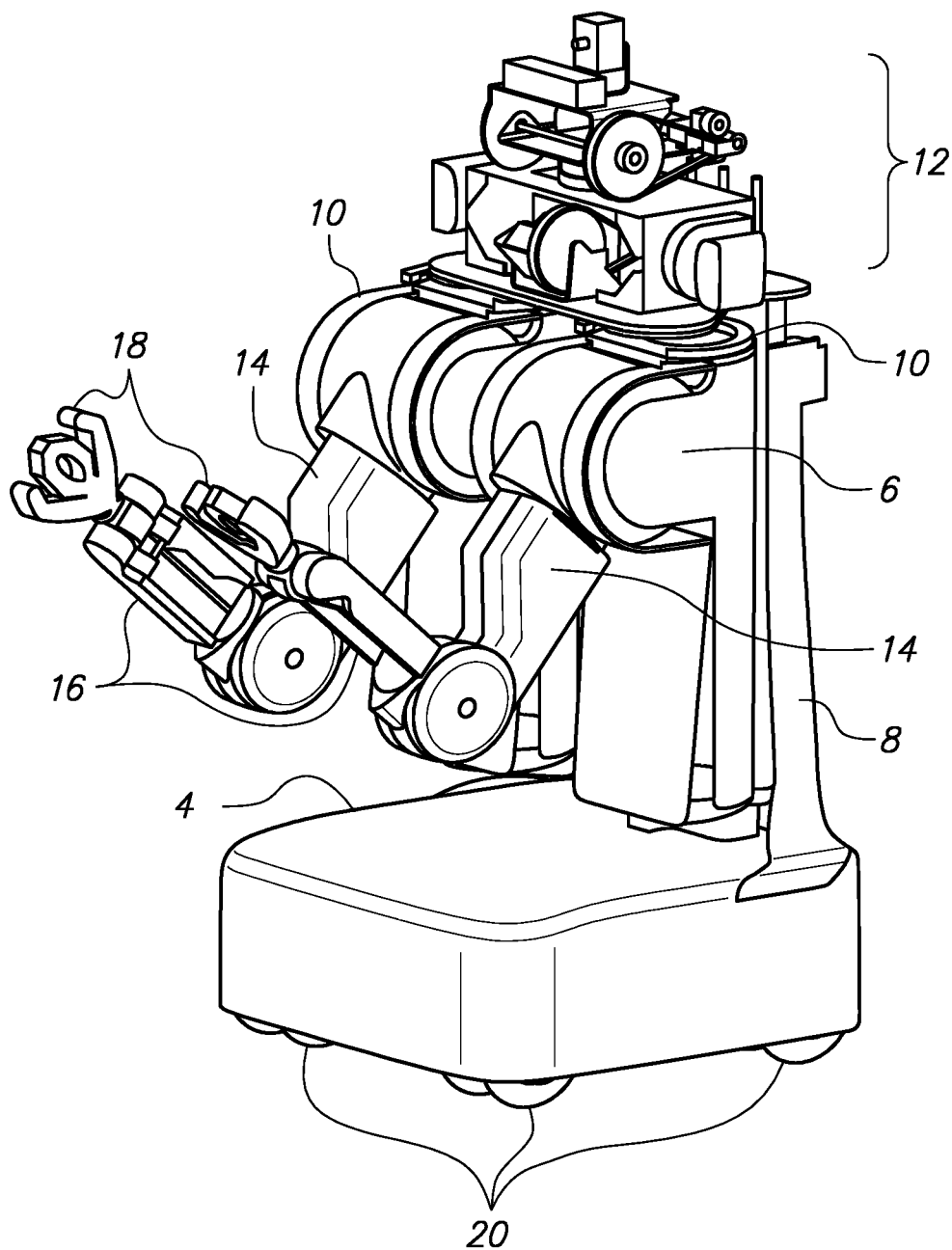
FIGS. 2A-2E illustrate orthogonal schematic views of various aspects of a personal robotics system at various levels of assembly.

Referring to FIGS. 2A-2E, various aspects of a mobile base assembly (4) and a body assembly (8) are depicted. FIG. 2A shows a mobile base assembly (4) rotatably coupled to four electromechanical caster assemblies (three of four shown in FIG. 2A—element 20) configured to be the system's sole contact with the terrain upon which it moves. Fixedly coupled to the substantially rectangular prismic shaped movable base assembly (4) is a body assembly (8). Partially assembled views of a head assembly (12) and two arm turret assemblies (6) are shown coupled to the body assembly (8), as in the embodiment of FIG. 1A. Shoulder (10), upper arm (14), and forearm (16) assemblies couple the gripper assemblies (18), shown here in schematic form, to the arm turret assemblies (6).

Figure 2B:
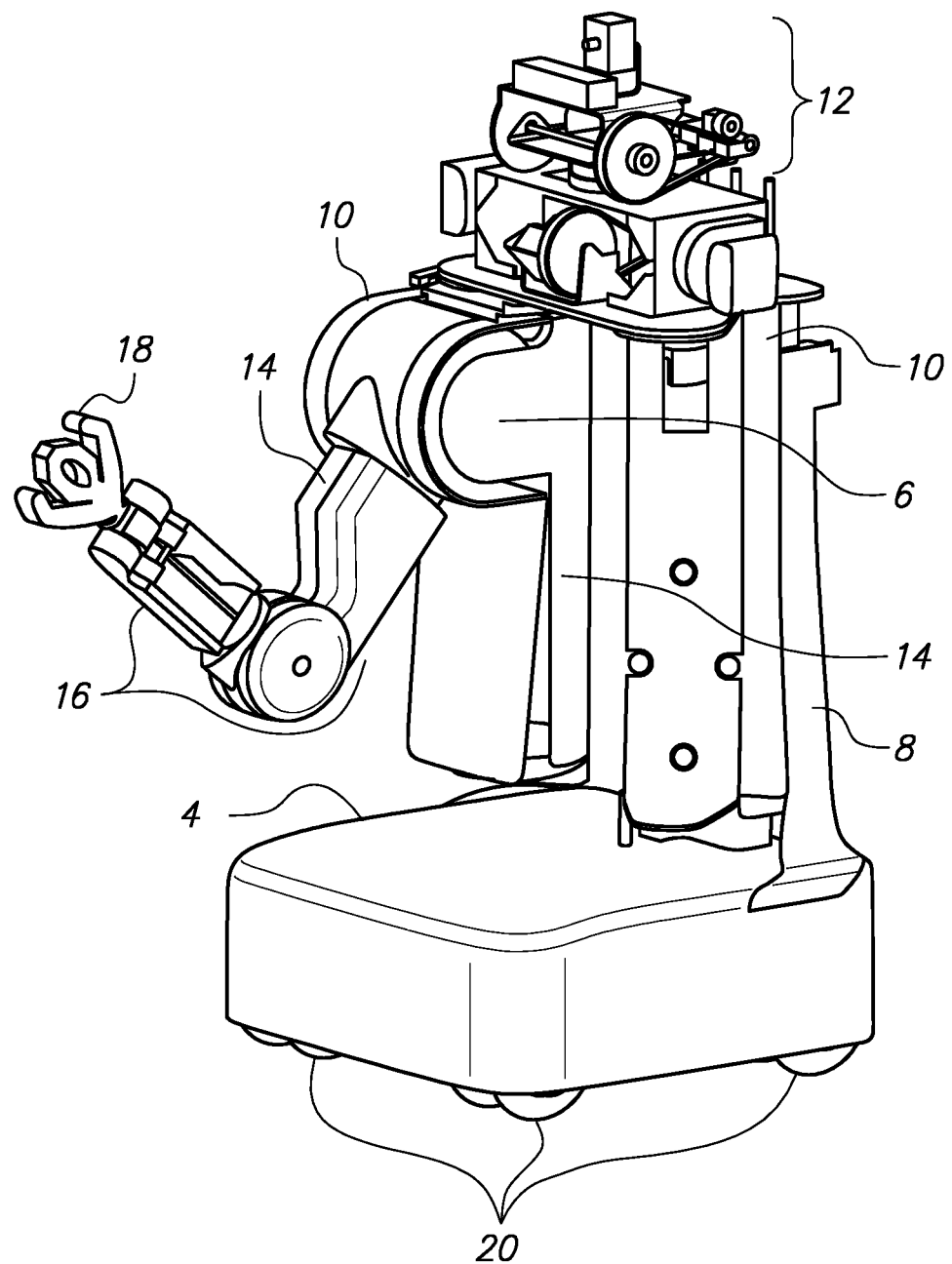
Figure 2C:
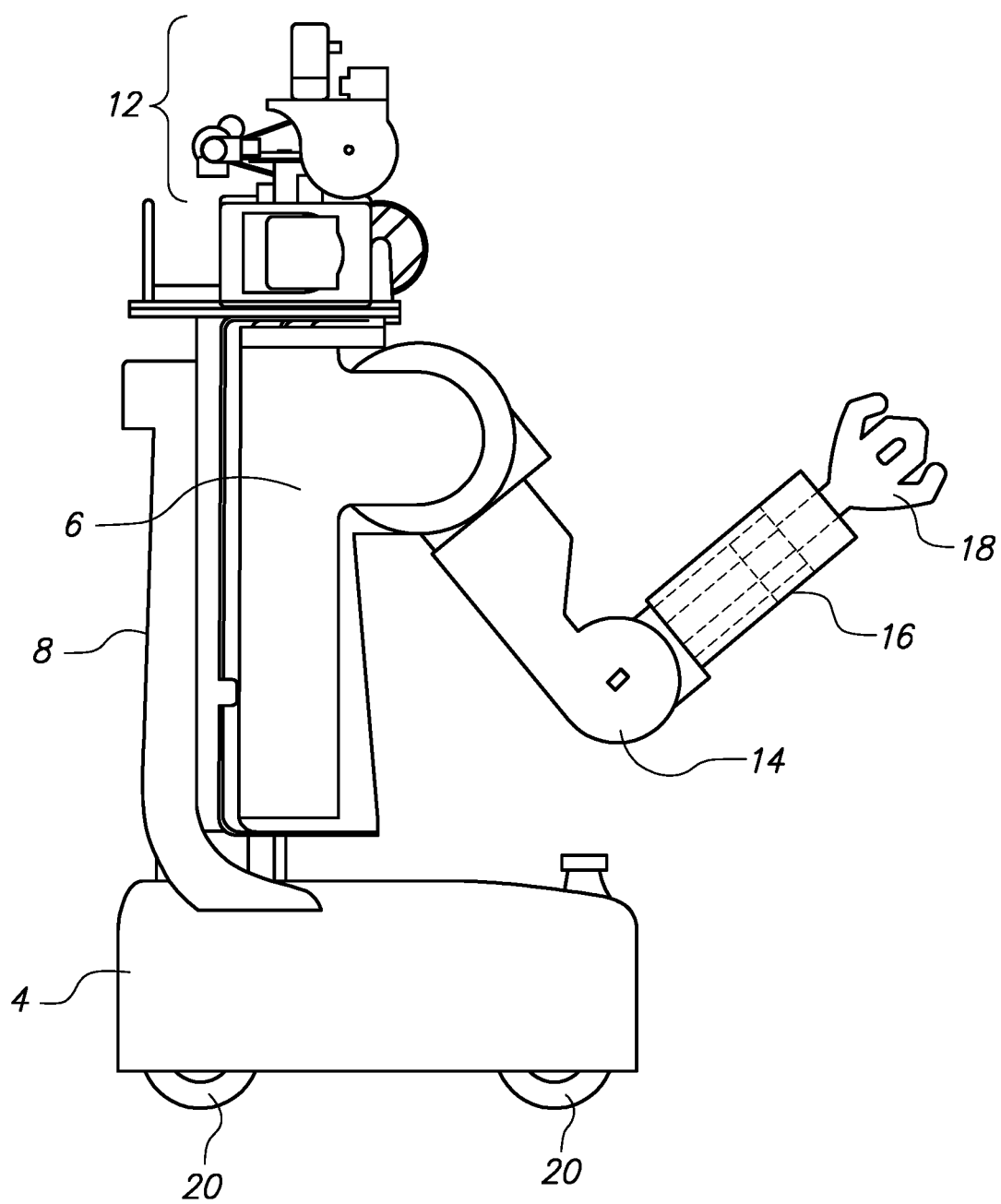
Figure 2D:
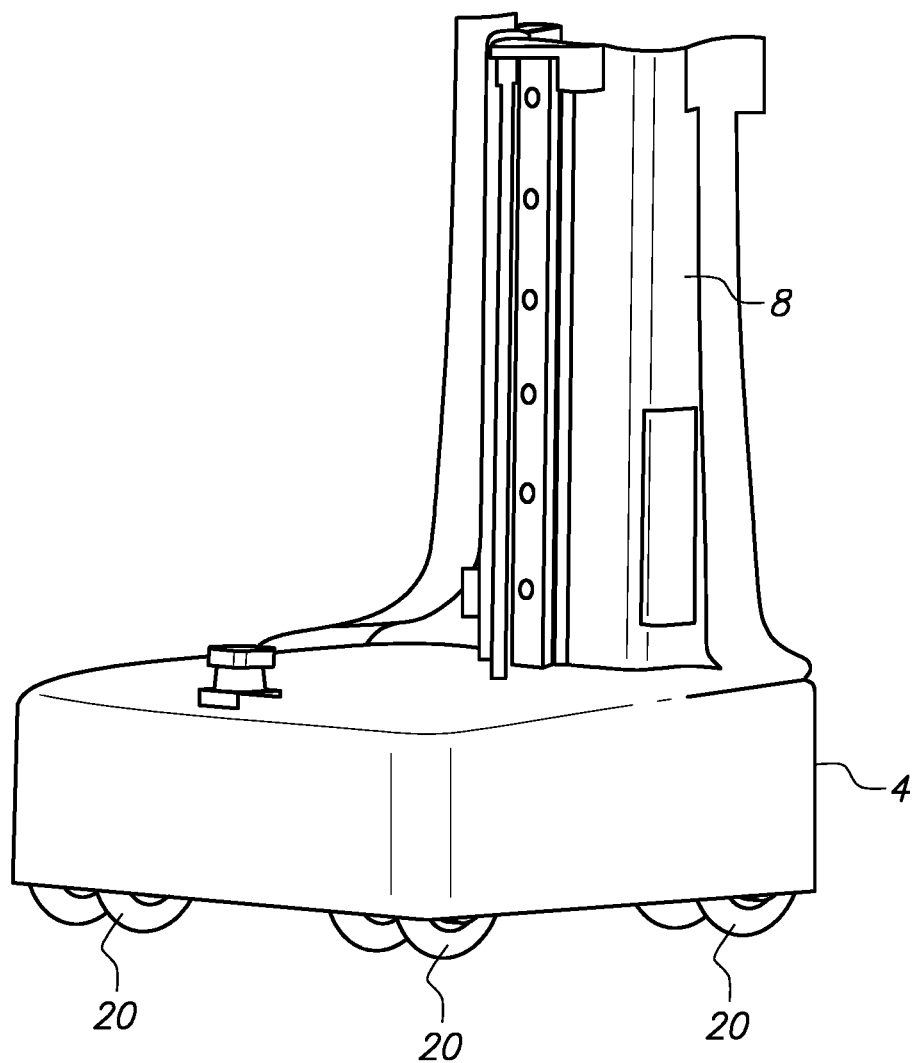
Figure 2E:
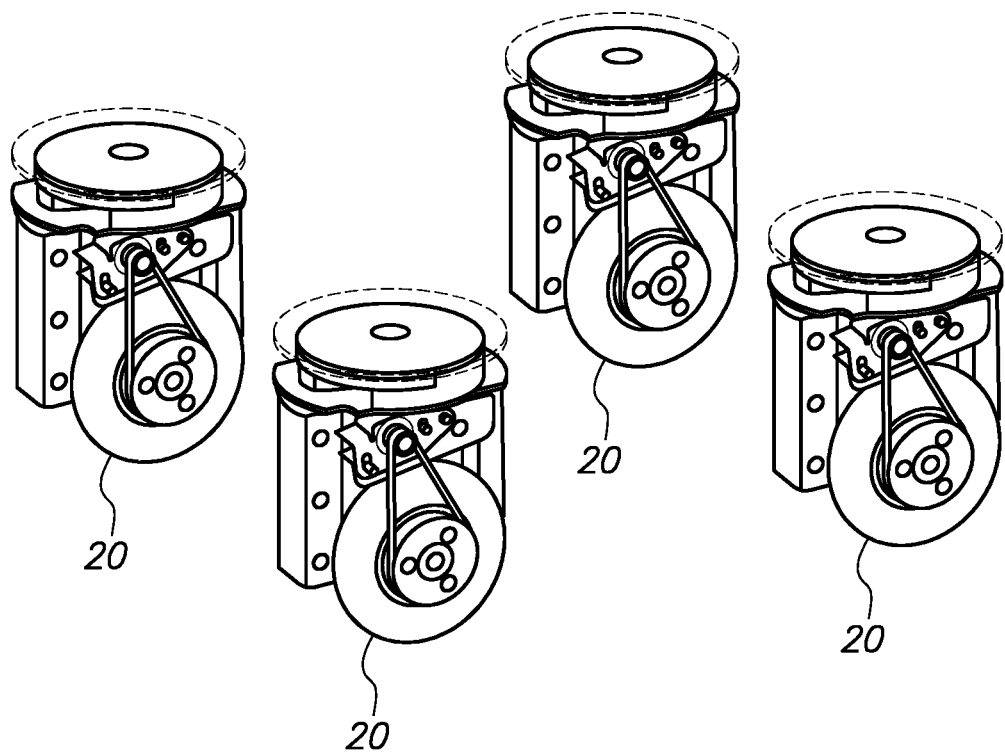

Referring to FIG. 2B, for illustrative purposes, one of the arm and turret assemblies has been removed, revealing additional portions of the body assembly (8). A similar assembly is shown in a side orthogonal view in FIG. 2C. Referring to FIG. 2D, all of the arm and arm turret assemblies have been removed, revealing the main structures of the body assembly and movable base assembly (4), and the position of the electromechanical caster assemblies (20) relative to the body (8) and movable base (4) assemblies. FIG. 2E illustrates the relative placement of the four electromechanical caster assemblies (20) in an assembly such as that depicted in FIG. 2E, but with the movable base (4) and body (8) assemblies removed.

Figure 3A:
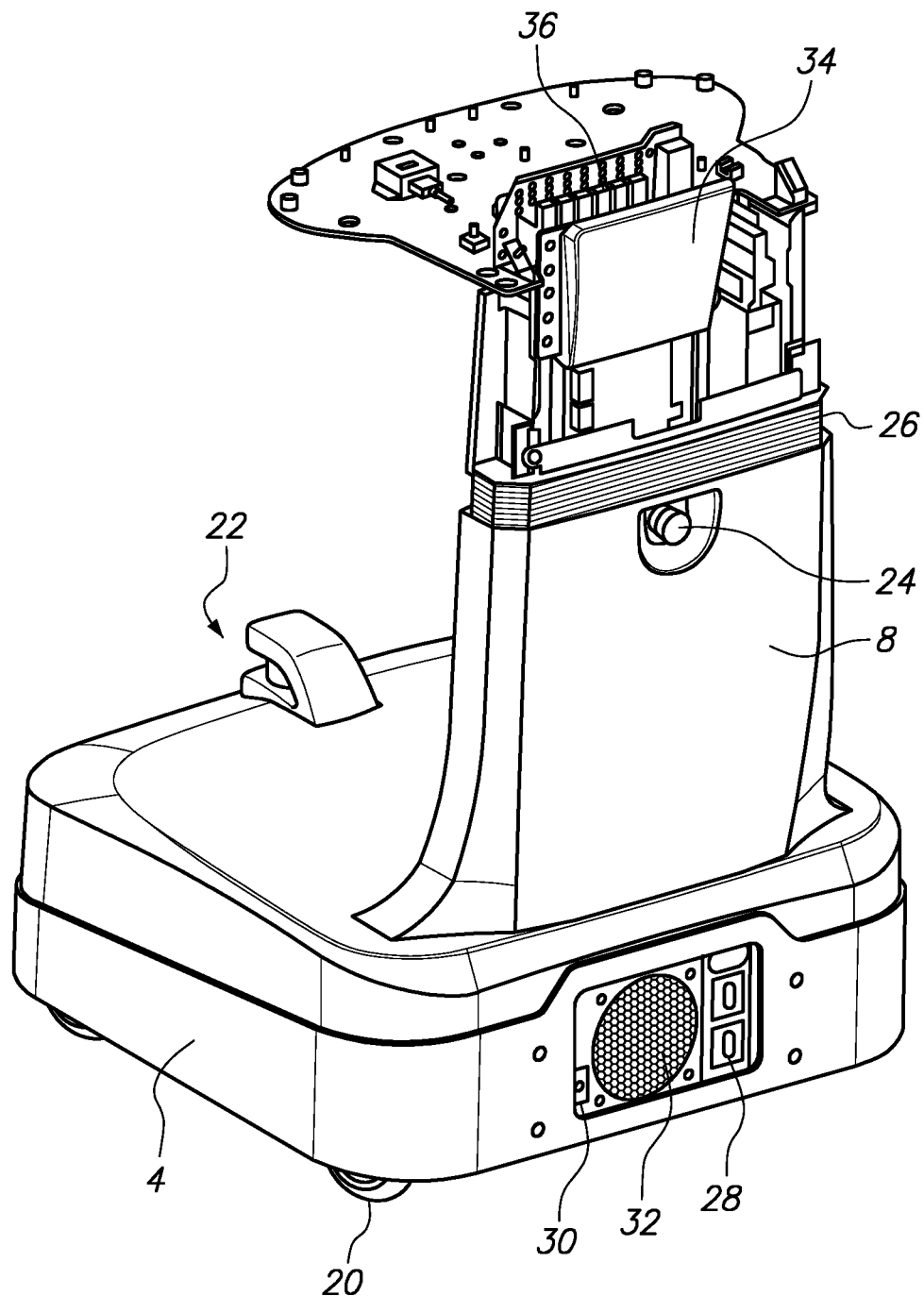
FIGS. 3A-3N illustrate various orthogonal schematic views of various aspects of a mobile base and body structure assembly for a personal robotics system at various levels of assembly.
Figure 3B:
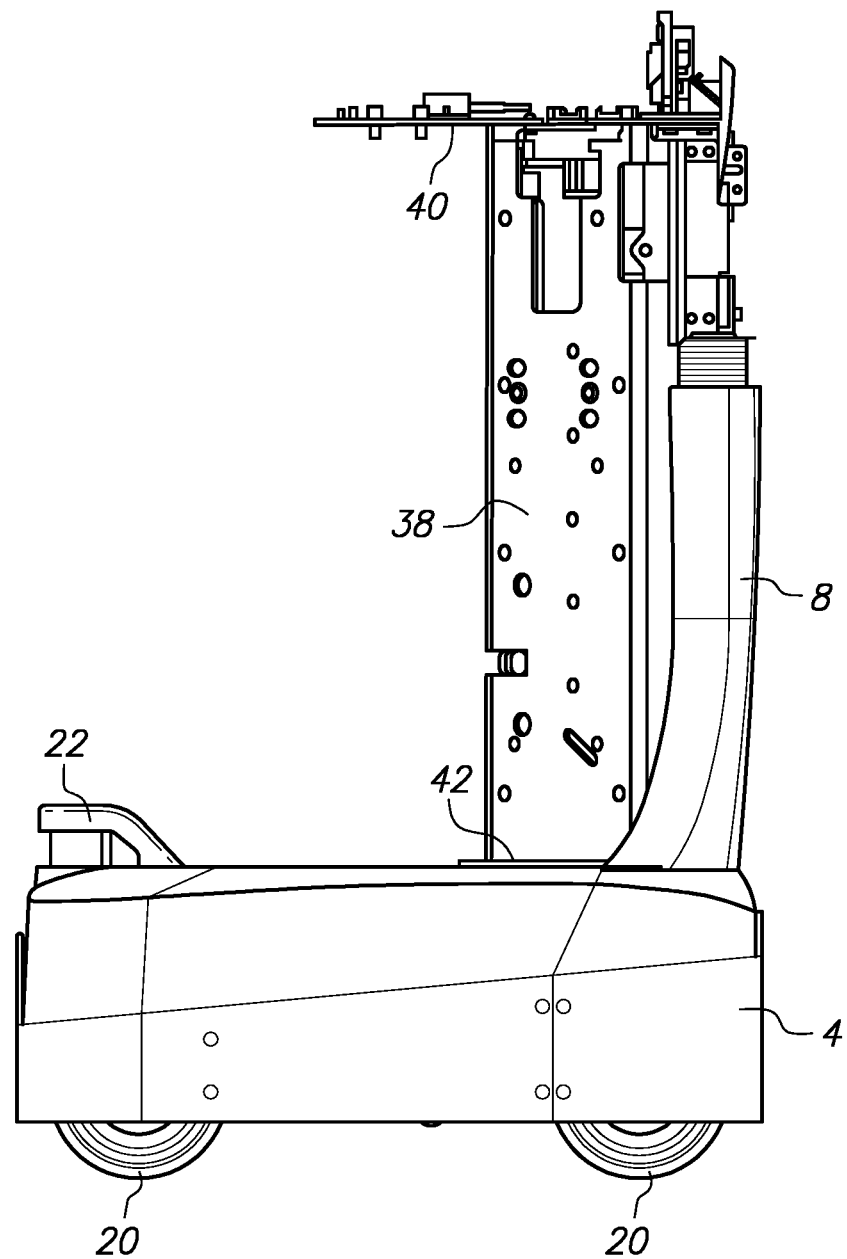
Figure 3C:
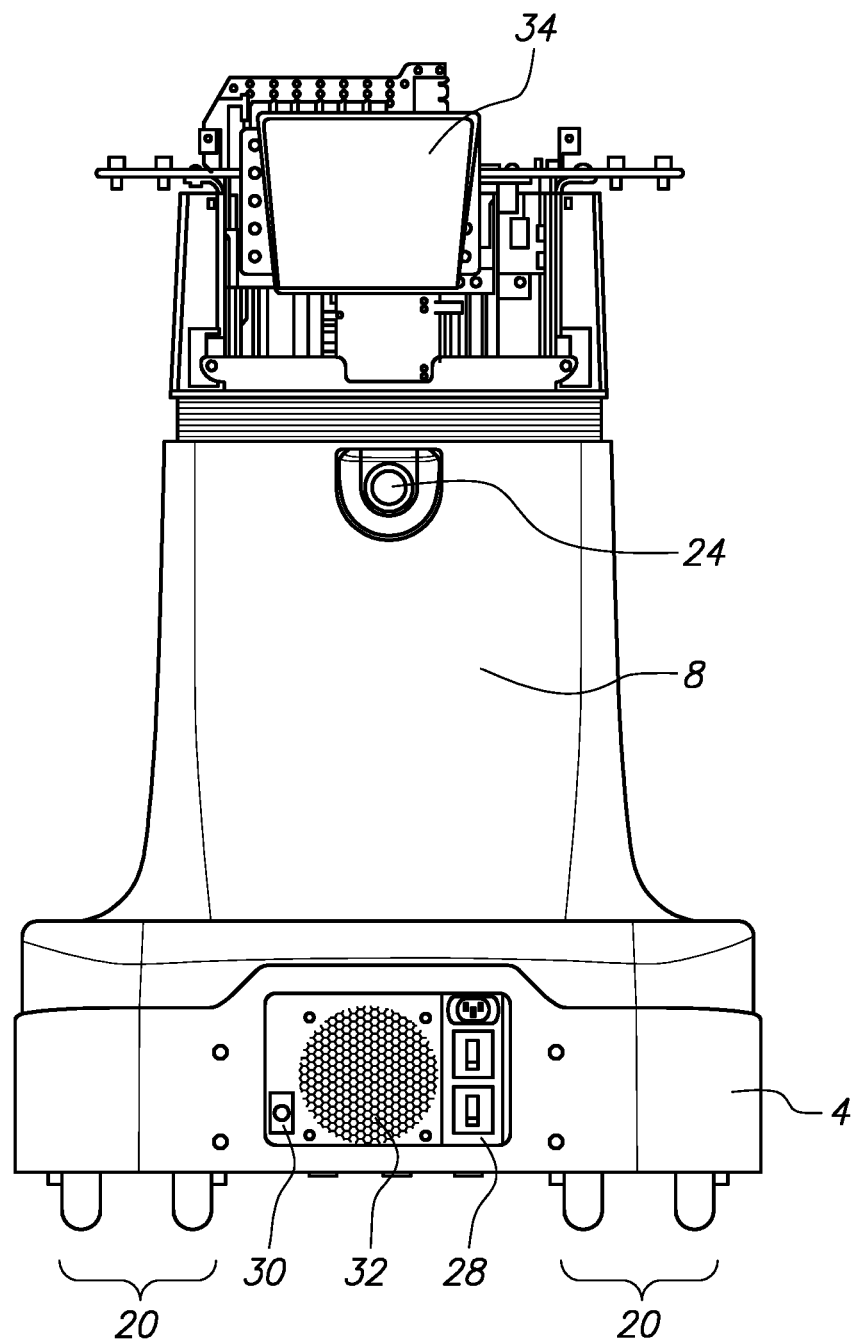
Figure 3D:
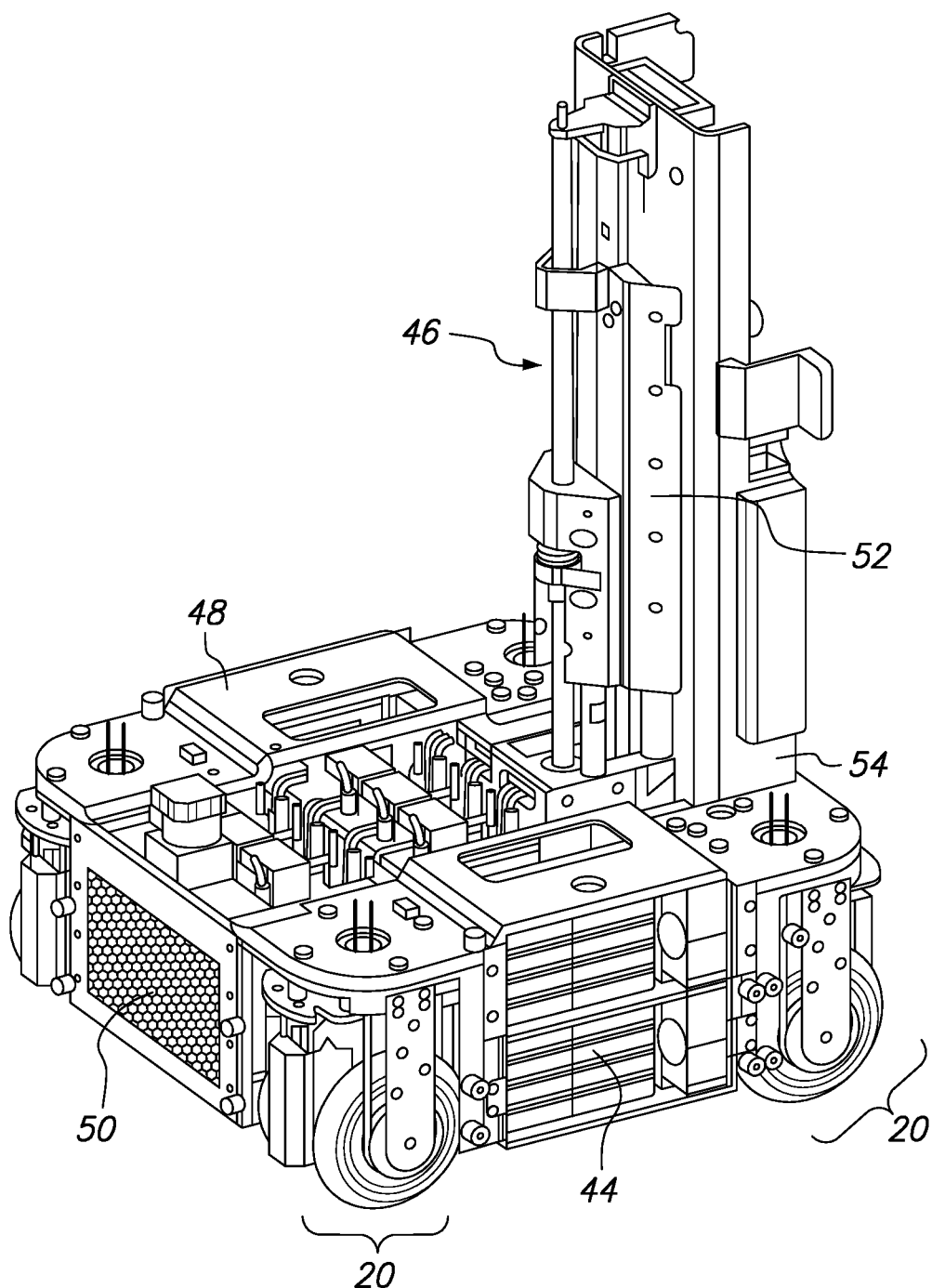
Figure 3E:
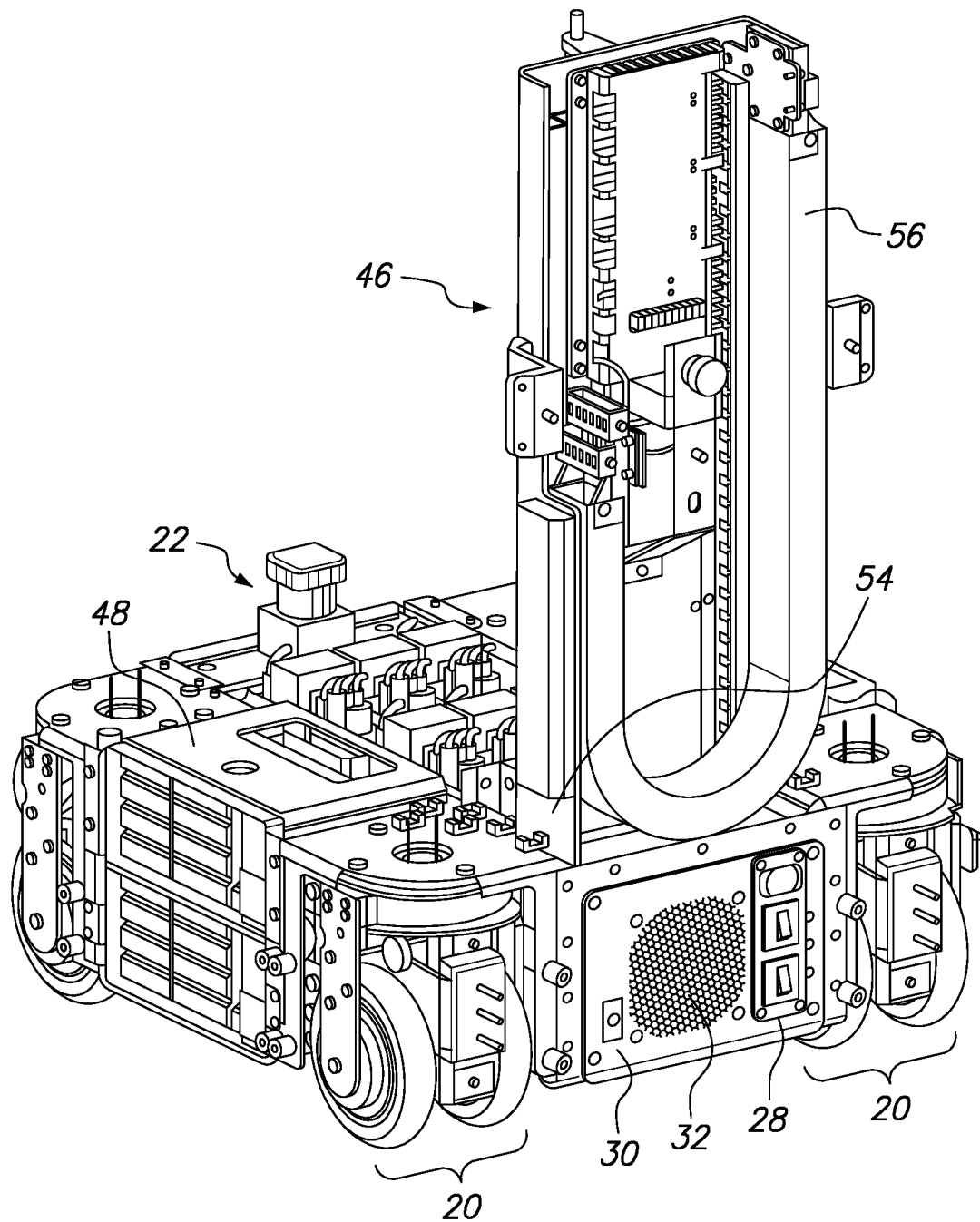
Figure 3F:
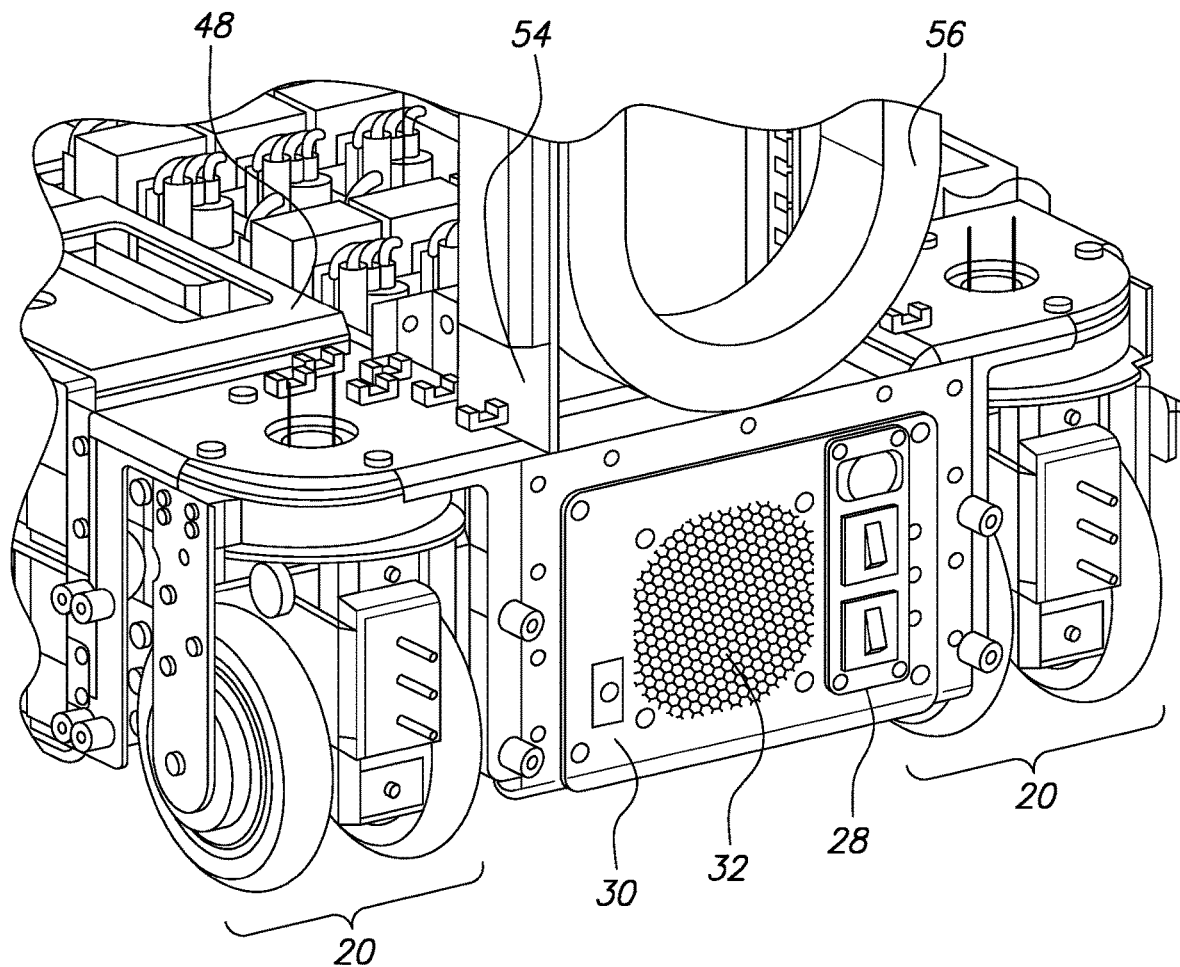
Figure 3G:
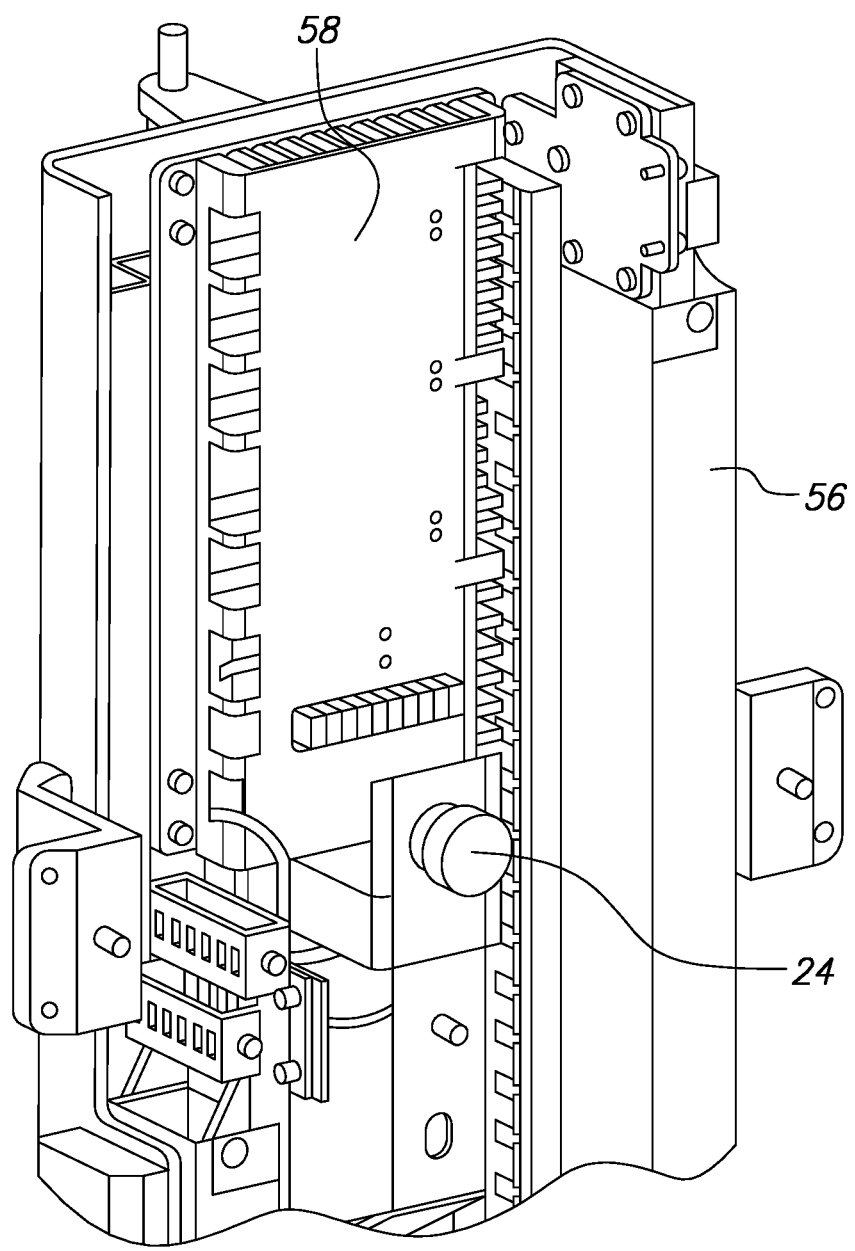
Figure 3H:
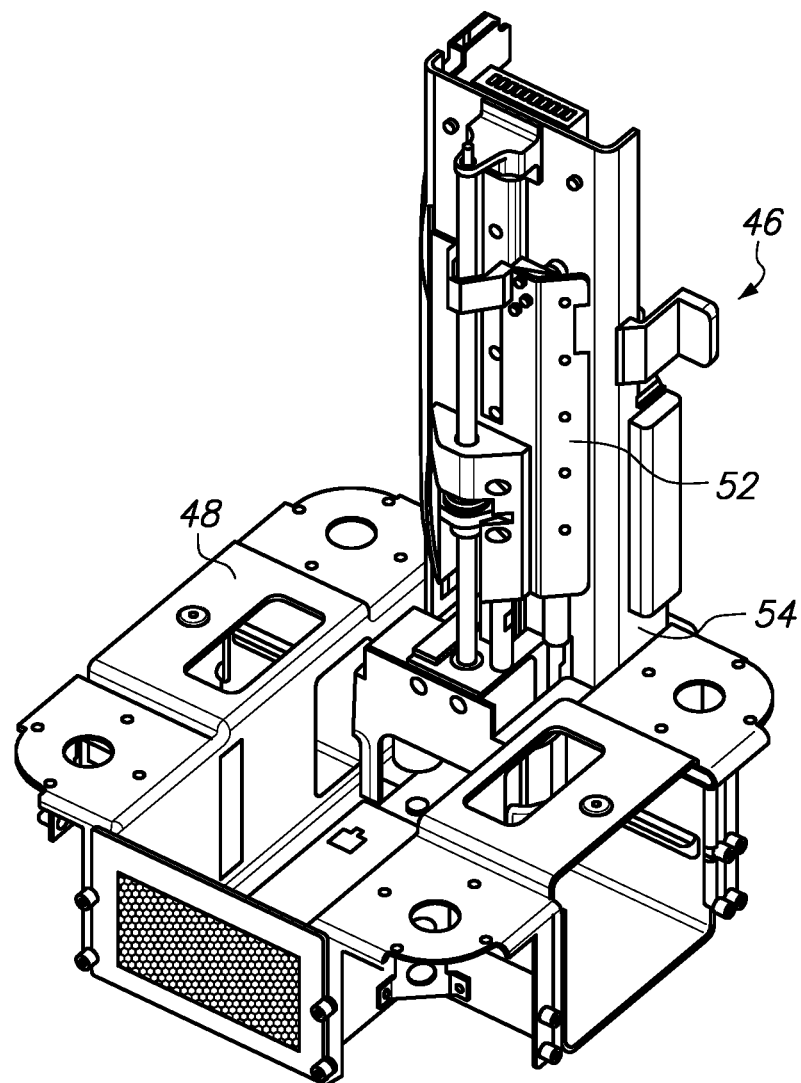
Figure 3I:
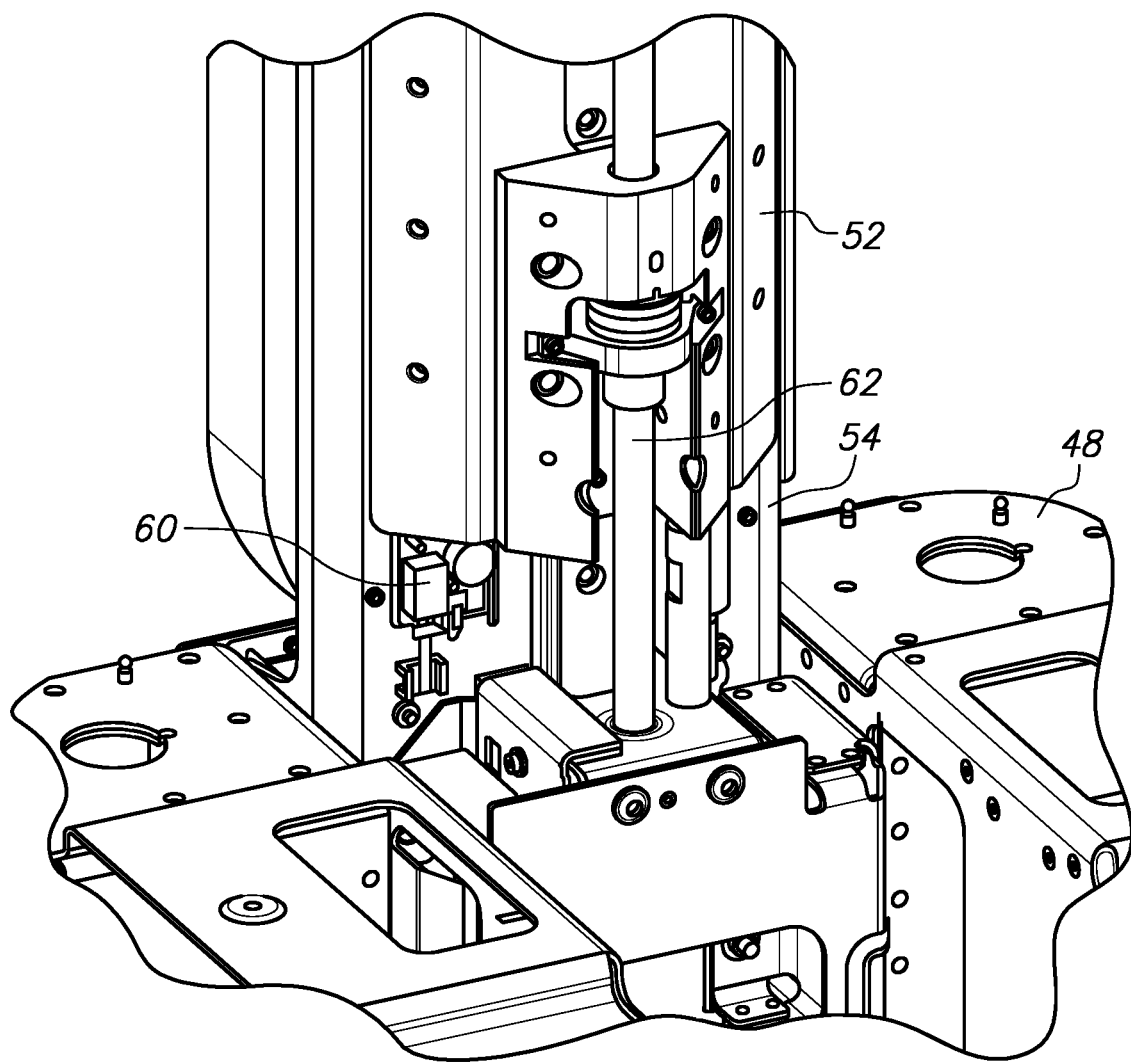
Figure 3J:
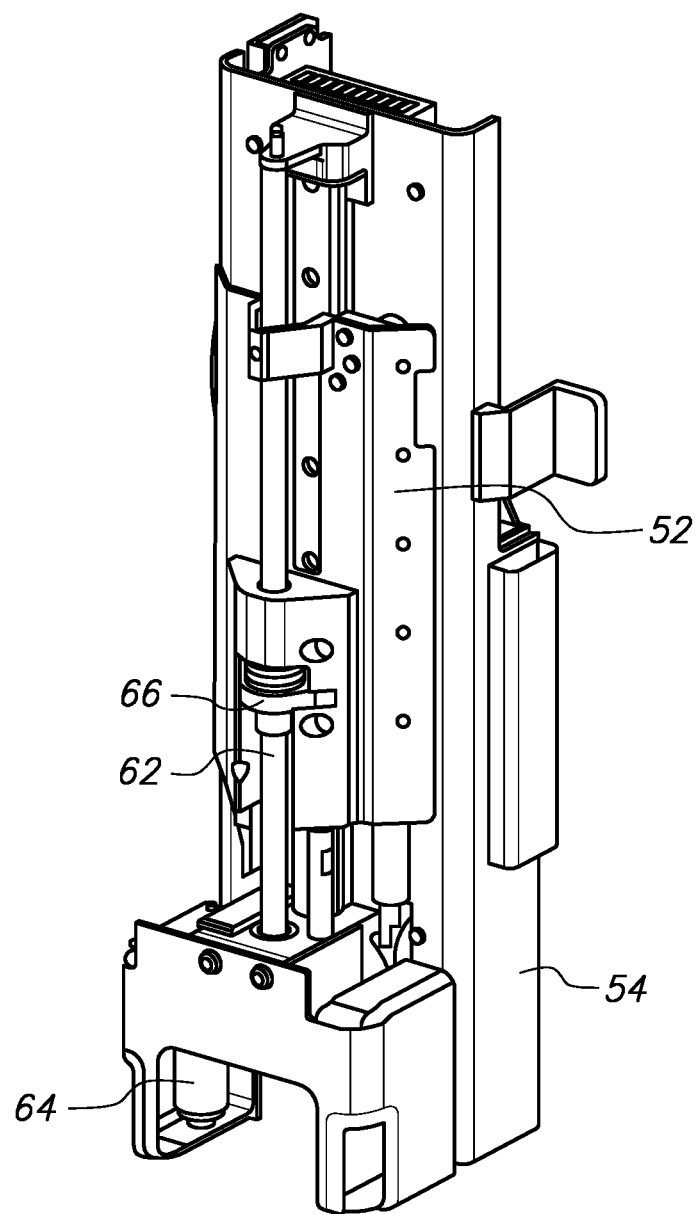
Figure 3K:
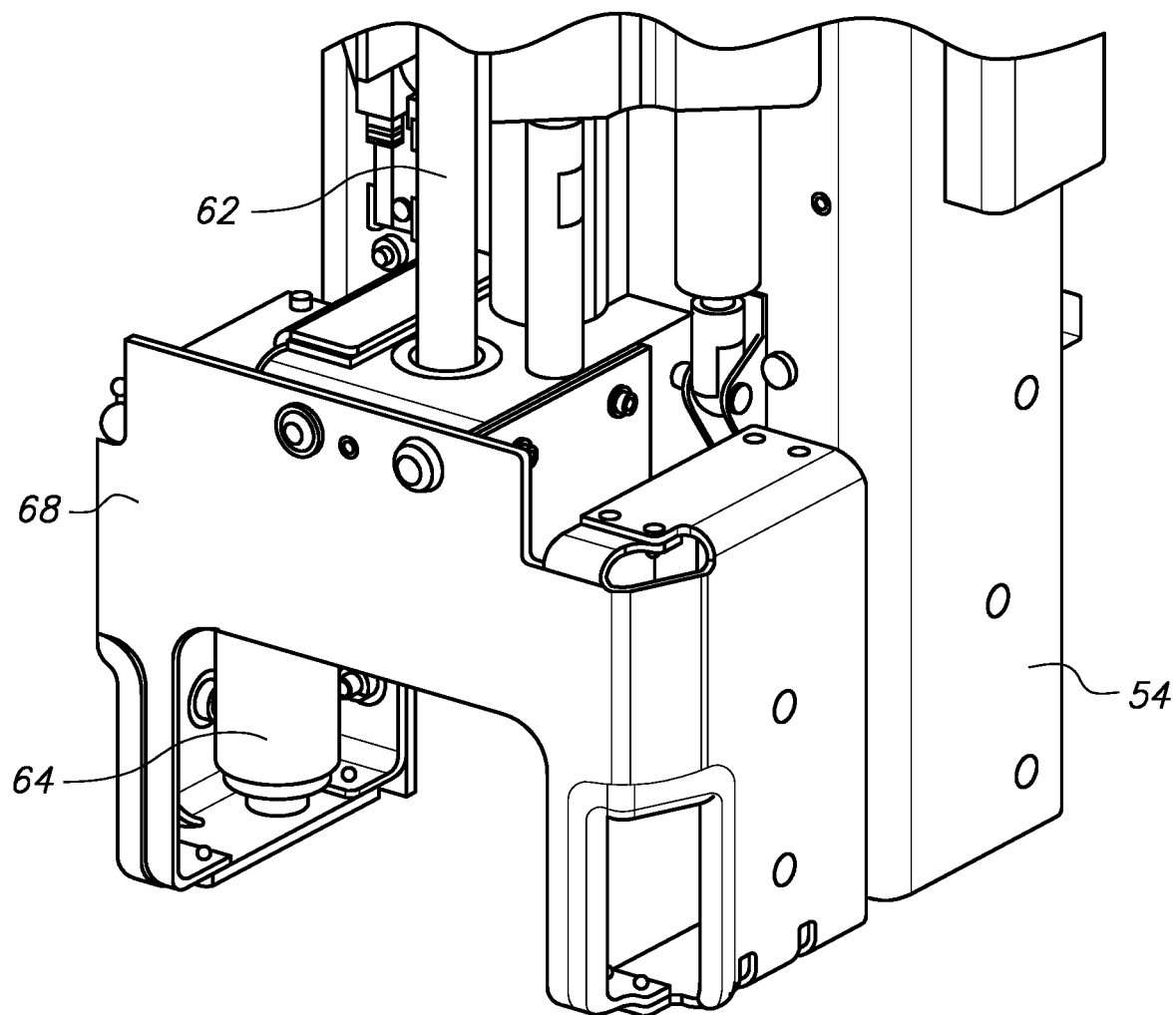
Figure 3L:
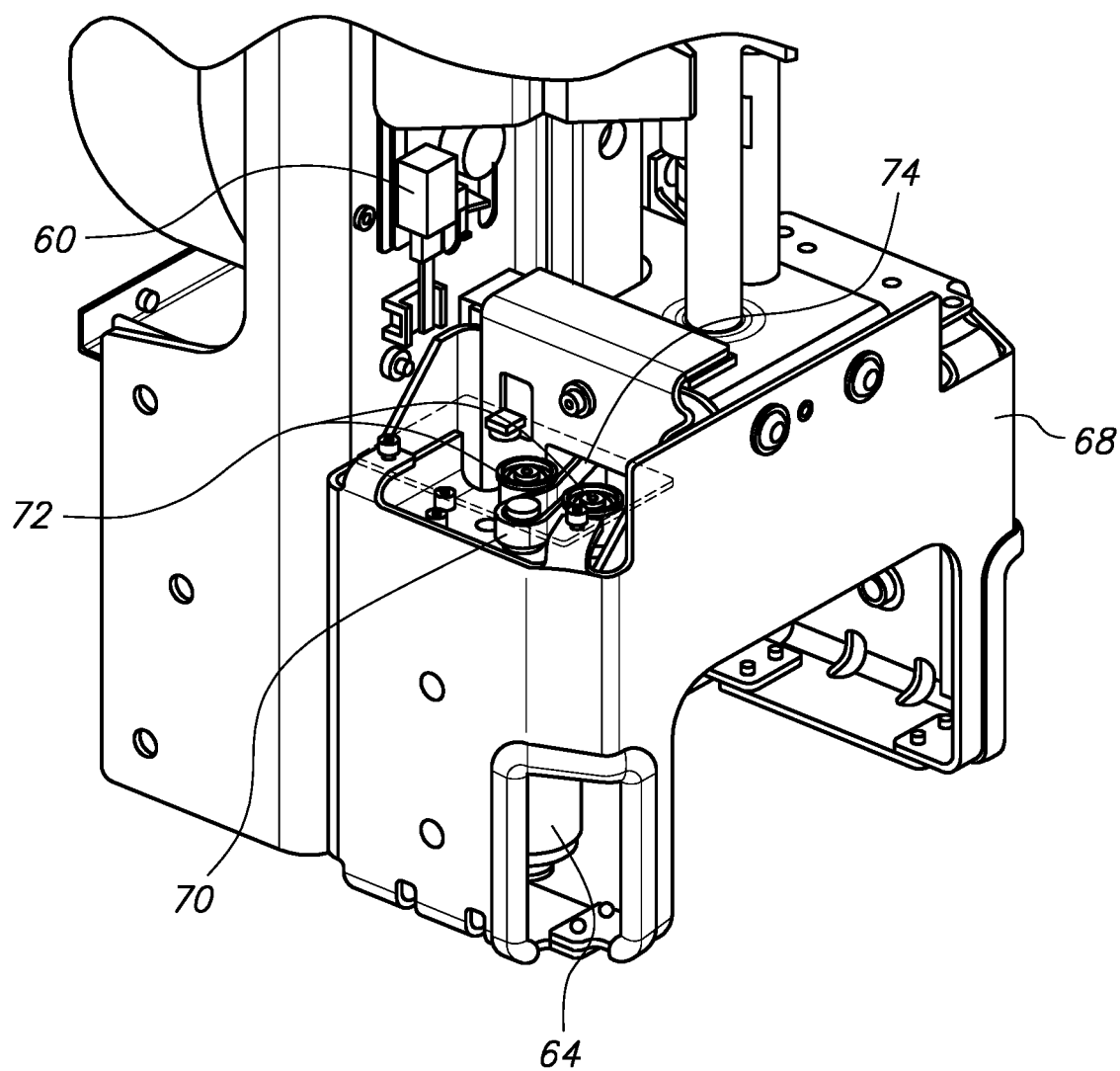
Figure 3M:
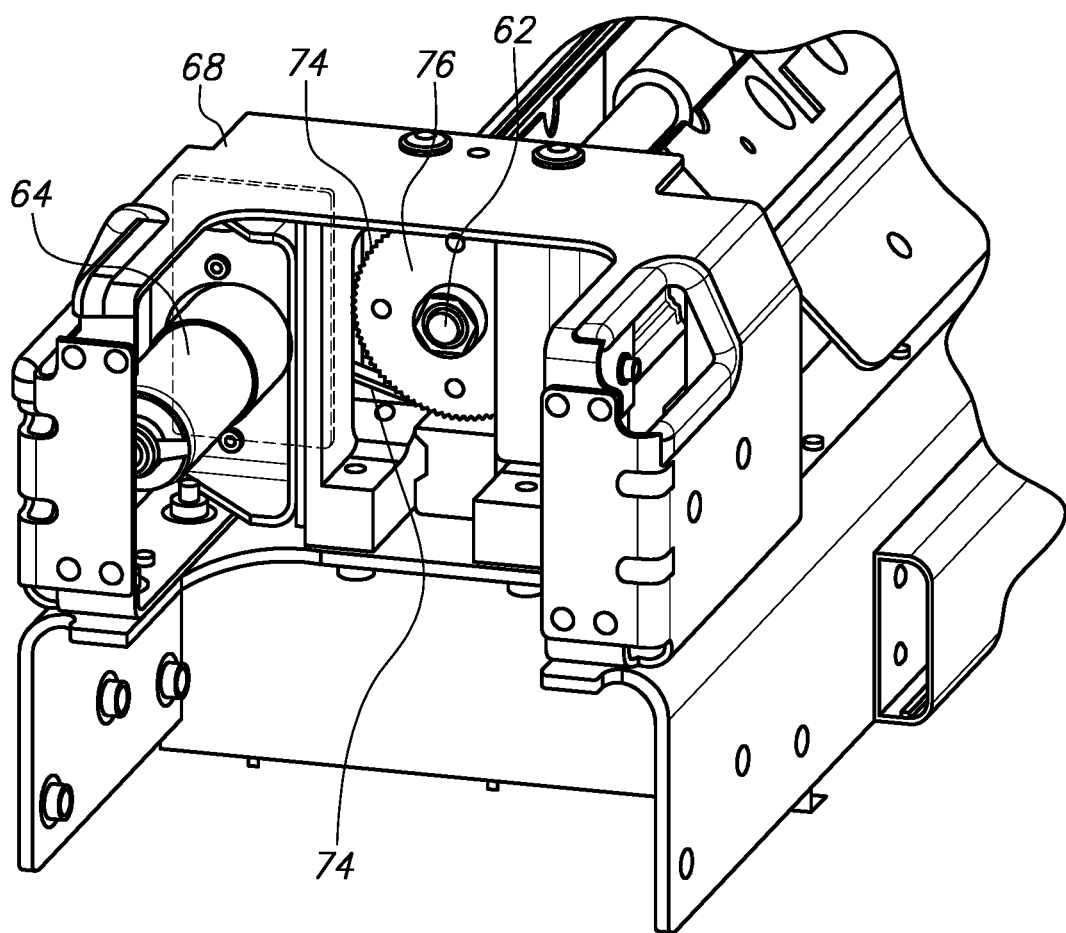
Figure 3N:
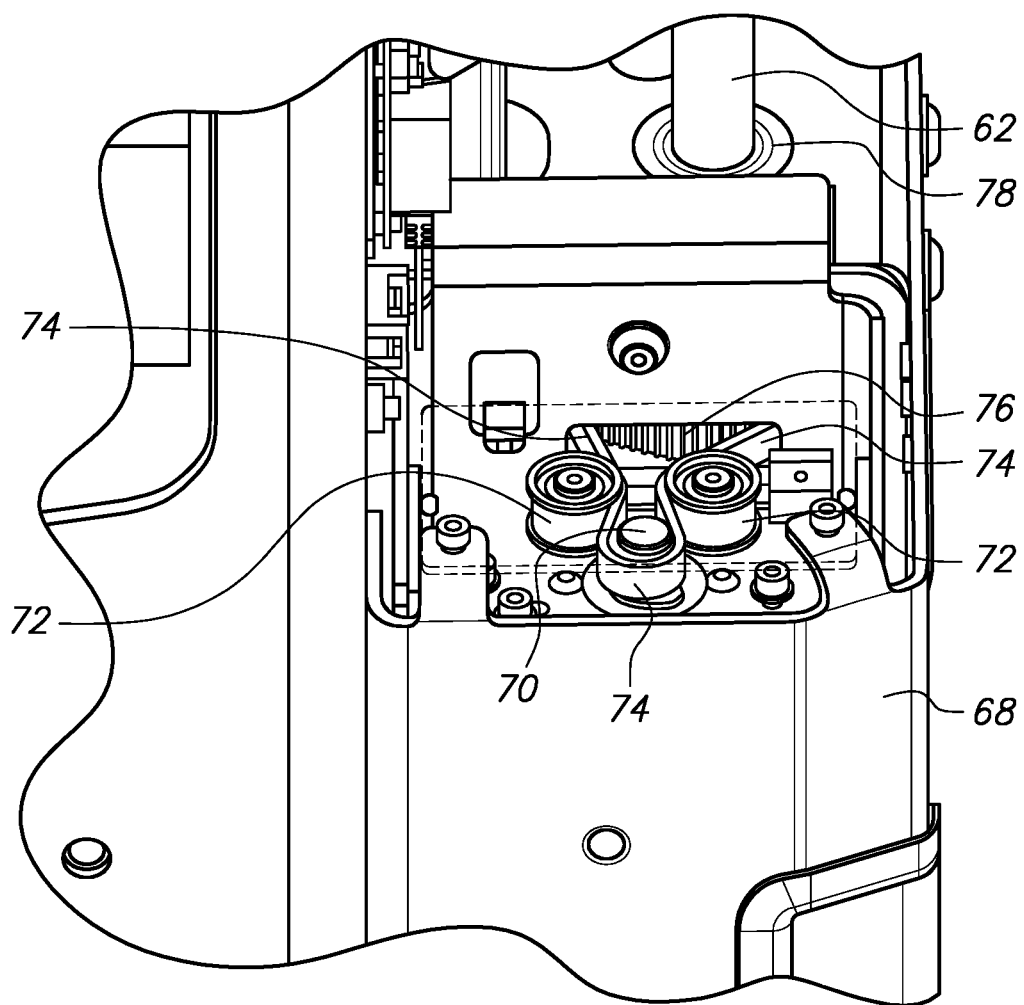

FIGS. 3A-3N depict further views of aspects of one embodiment of a movable base assembly (4) and body assembly (8). Referring to FIG. 3A, an assembly is depicted wherein the head has been decoupled from the upper portion of the body assembly (8), and portions of the exterior housing of such body assembly (8) have been removed. The depicted robotic system has power and processing systems substantially centralized in the mobile base, and communications throughout every other component to facilitate fine levels of control. One aspect of the communications infrastructure, an ethercat bus (36) is depicted at the upper portion of the body assembly (8). Also depicted is a WiFi router (34), an electronic stop ("estop") switch (24), and a body elevation bellows structure (26) configured to provide a flexible housing to upper portions of the body which may be configured to elevate vertically relative to the remaining lower portions. As shown in FIG. 3A, the rear portion of the mobile base (4) comprises an Ethernet interface (30), a cooling fan assembly (32), and a power switch panel (28). Fixedly coupled to the front of the mobile base assembly (4) is a laser scanner or range finder, such as those available from Hokuyo Automatic Co, Ltd of Osaka, Japan, which is housed by the mobile base assembly (4) to have a very broad field of view in front of the mobile base assembly (4).

Referring to FIG. 3B, a side view of a similar assembly is depicted, showing an arm turret support body (38), upper arm turret support member (40), and a lower arm turret support member (42), each of which is configured at least in part to support an arm turret assembly (6), such as those depicted in FIG. 1A, and therefore the remaining arm components which are supported by the arm turret assembly in such a configuration. FIG. 3C illustrates a view of the rear of the mobile base (4) and body (8) assemblies, and shows that each caster assembly (20) in the depicted embodiment comprises a set of two wheels configured to interface with the pertinent ground terrain.

Referring to FIG. 3D, an orthogonal view of mobile base (4) and body (8) assemblies is shown, in a further deconstructed state relative to FIG. 3C. With the external housing skins removed, a main mobile base frame assembly (48) is shown providing a unibody-like lower skeleton to which many components are coupled, including two banks of batteries (44)—one on each side of the mobile base (4). The front of the mobile base assembly (4) features a large cooling fan air movement passageway/grille (50) that allows heated air to escape after it has been driven in through the fan assembly (32) in the back of the mobile base assembly (4), past the middle portion of the mobile base assembly where one or more computing CPUs are contained, and toward the front cooling fan air movement passageway/grille (50). Without the exterior housing skins in place, various aspects of the body assembly (8) are visible, including several aspects of the body vertical support assembly (46), such as an essentially immovable (relative to the mobile base assembly 4) vertical spine assembly (54) which is fixedly coupled to the mobile base frame (48), and a vertically movable spine assembly (52) which is configured to electromechanically elevated up and down relative to the rest of the body vertical support assembly (46). Such elevation range of motion allows everything coupled to the vertically movable spine assembly (52) to move vertically with it—including the arm assemblies. Referring to FIG. 3E, to accommodate such vertical motion of one portion of the body vertical support assembly (46) relative to another, wiring is passed through a flexible wire housing, such as the articulated conduit (56) shown in FIG. 3E to couple wires from the vertical spine assembly (54) to the vertically movable spine assembly (52) and allow for a service loop for each wire or conductor that stays neatly in place. Suitable articulated conduits (56) are available under the tradename "Energy Chain"® from Igus, Inc. of East Providence, R.I., and known as "eChain". A close up view is shown in FIG. 3F to illustrate the positions of the Ethernet port (30), cooling fan assembly (32), and power switch panel (28) at the rear portion of the mobile base assembly (4). Another, more superior, close up view is shown in FIG. 3G to illustrate the positioning of a power distribution board (58) as operably coupled to the estop button (24), and mechanically coupled to the upper portion of the body assembly (8) adjacent the head. FIG. 3H depicts a further disassembled mobile base, essentially comprising the mobile base frame (48), which may comprise sheet metal material subcomponents held together with fasteners to form a unibody-like frame capable of supporting relatively large loads. FIGS. 3I through 3N illustrate various aspects of the electromechanical system configured to controllably elevate the vertically movable spine assembly (52) relative to the vertical spine assembly (54). Referring to FIG. 3I, a body elevation drive shaft (62) is shown rotatably coupled, via a lead screw mechanism to the vertically movable spine assembly (52). When a motor (not shown) is activated by a motor controller board (60) mounted to the vertical spine assembly (54), the drive shaft (62) is rotated, causing the lead screw mechanism to elevate (up or down) relative to the vertical spine assembly (54) and mobile base frame (48). FIG. 3J depicts portions of the body assembly (8) with the body elevation motor, gearbox, and encoder assembly (64) partially visible. FIG. 3K shows a close up view of the body elevation motor, gearbox, and encoder assembly (64) relative to the drive shaft (62) and body elevation drive frame assembly (68) that houses the body elevation motor, gearbox, and encoder assembly (64) relative to the drive shaft (62). Referring to FIG. 3L, the body elevation motor, gearbox, and encoder assembly (64) is operatively coupled to a motor pulley (70), which is configured to drive a glass fiber reinforced, flexible timing belt, such as those available from Gates Corporation of Denver, Colo., through a pair of pinch idlers (72) and around a larger driven pulley (not shown in FIG. 1; element 76 in FIG. 3M) which is coupled to the body elevation drive shaft (62). FIG. 3M shows such structures from a partial bottom assembly view. FIG. 3N shows the motor pulley (70), belt (74), idlers (72), and driven pulley (76) in a close up side view. A bearing assembly (78) supports the drive shaft (62) with minimal rotational friction.

Figure 4A:
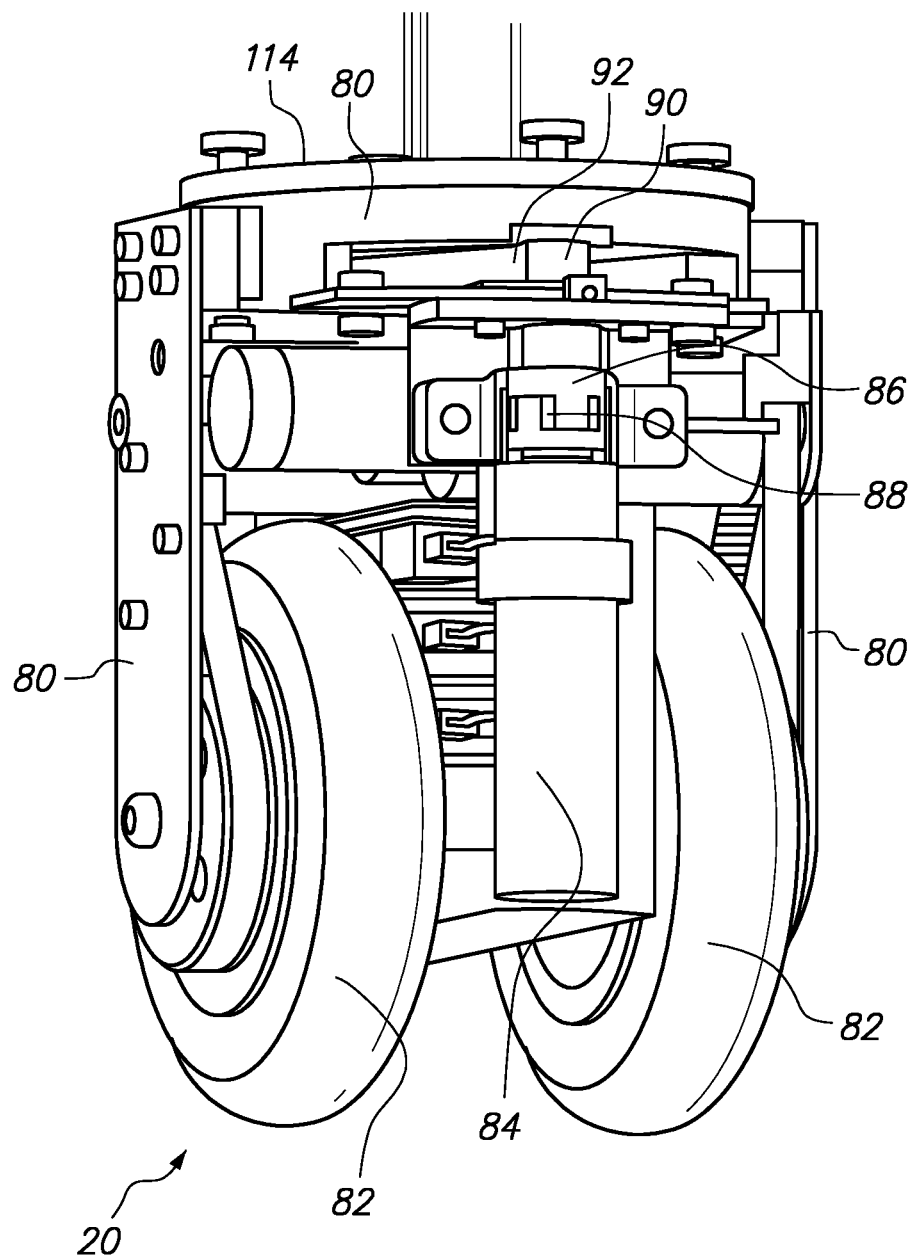
FIGS. 4A-4I illustrate various orthogonal schematic views of various aspects of an electromechanical caster assembly for a personal robotics system at various levels of assembly.
Figure 4B:
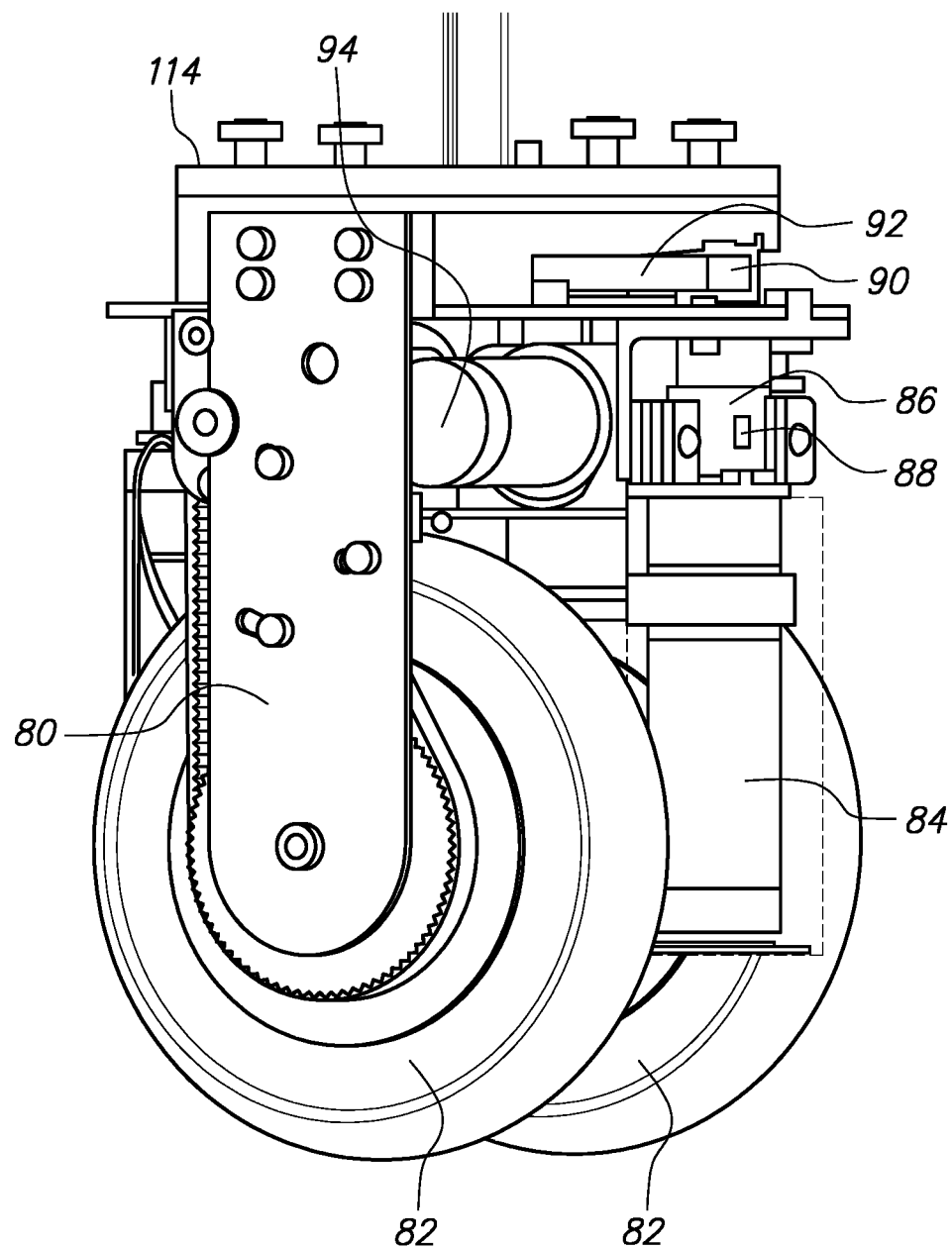
Figure 4C:
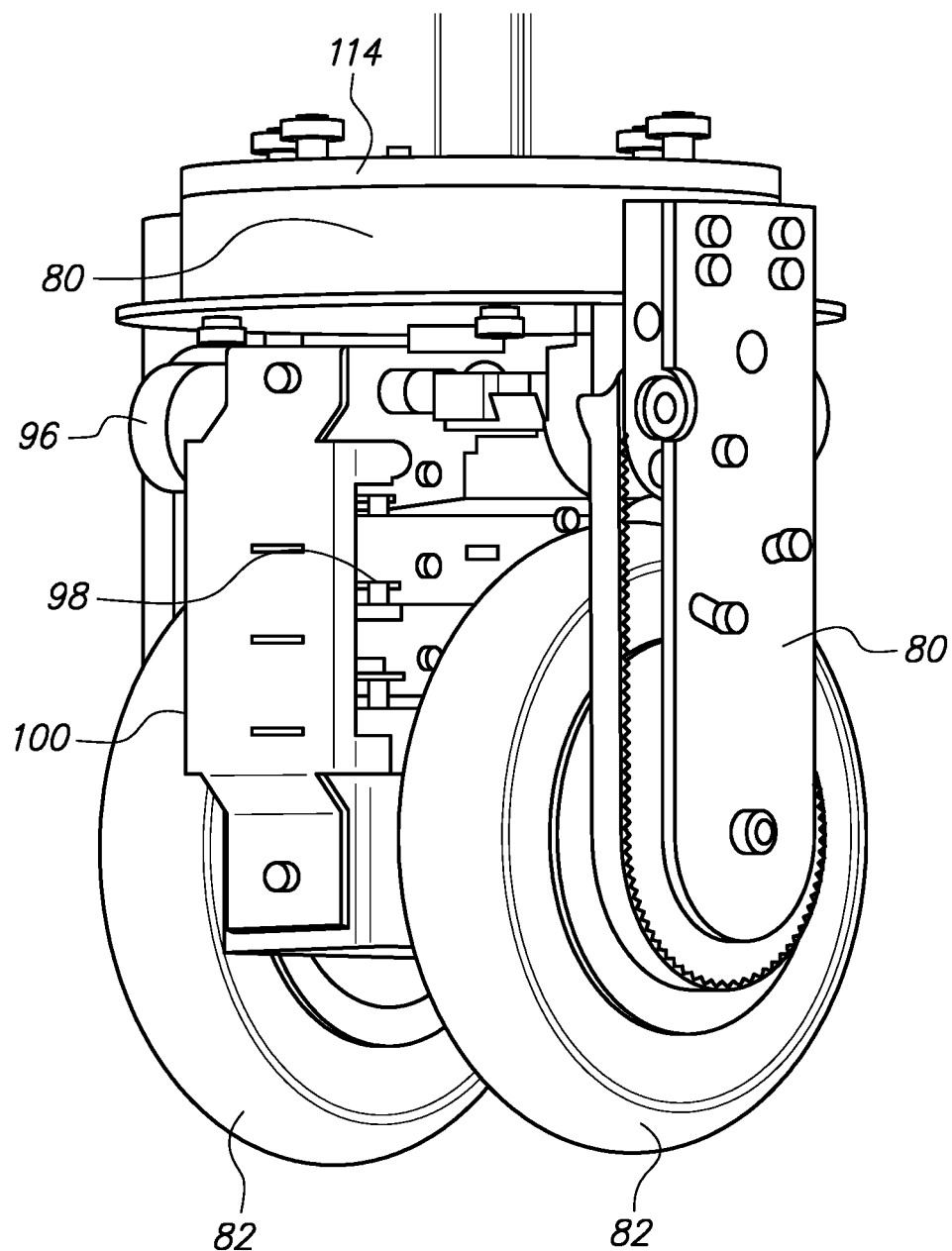
Figure 4D:
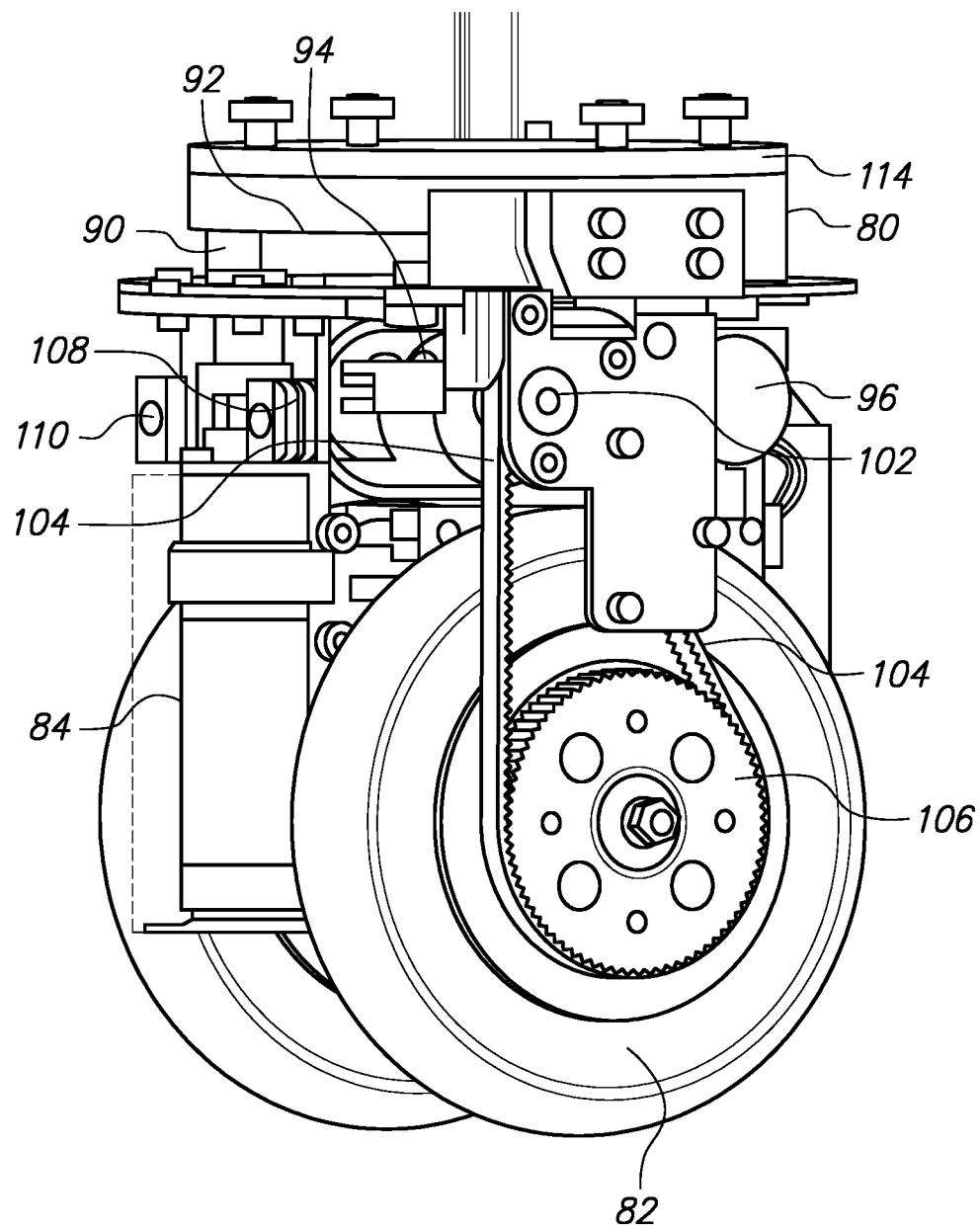
Figure 4E:
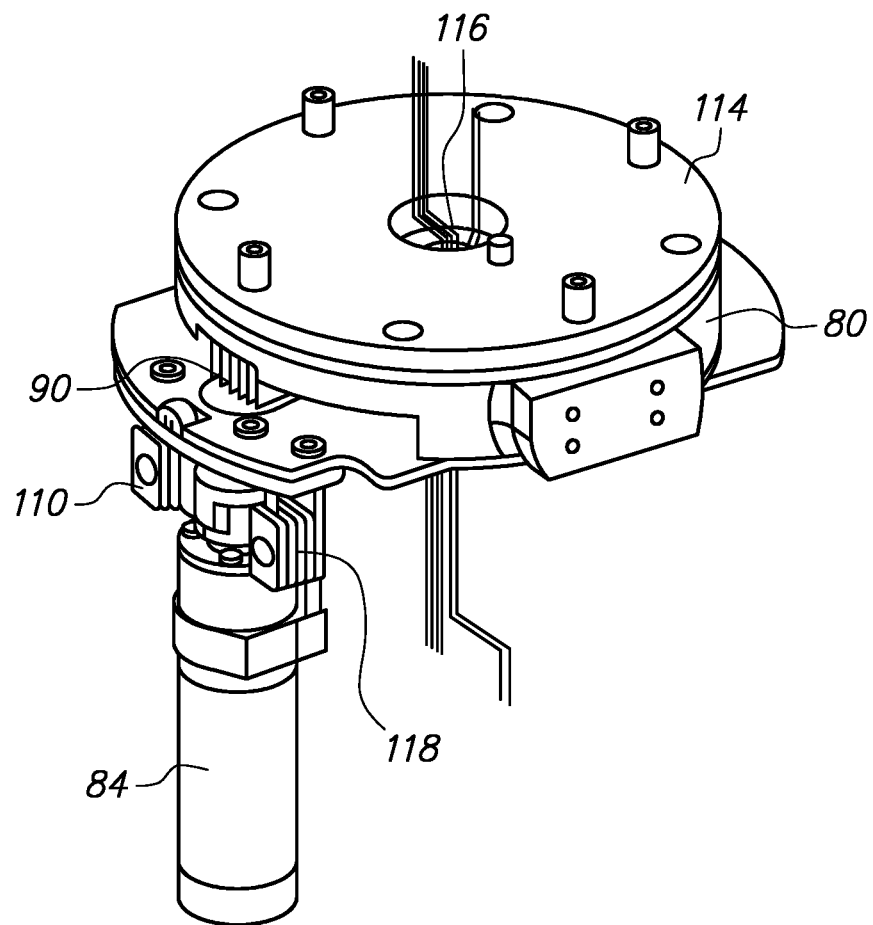
Figure 4F:
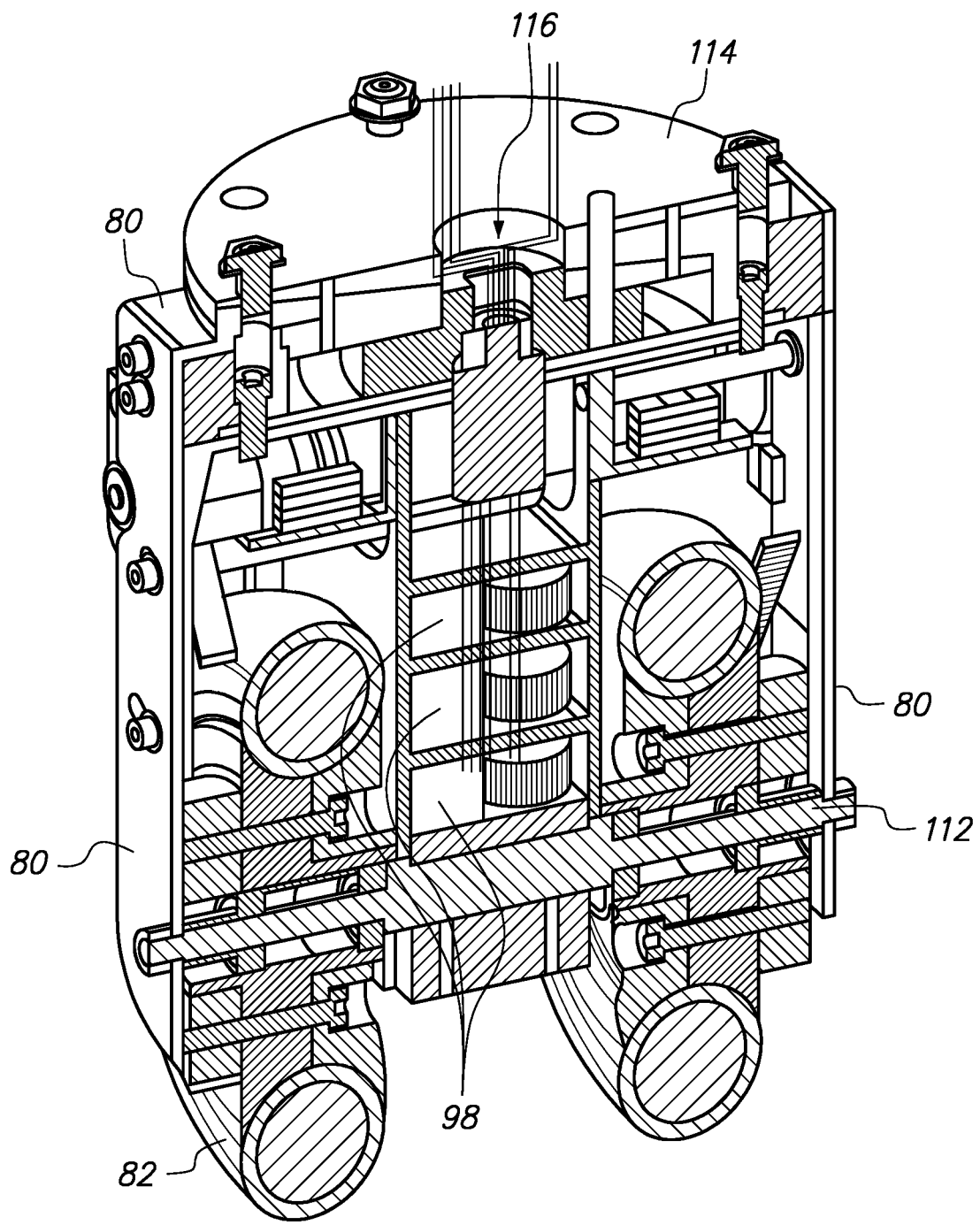
Figure 4G:
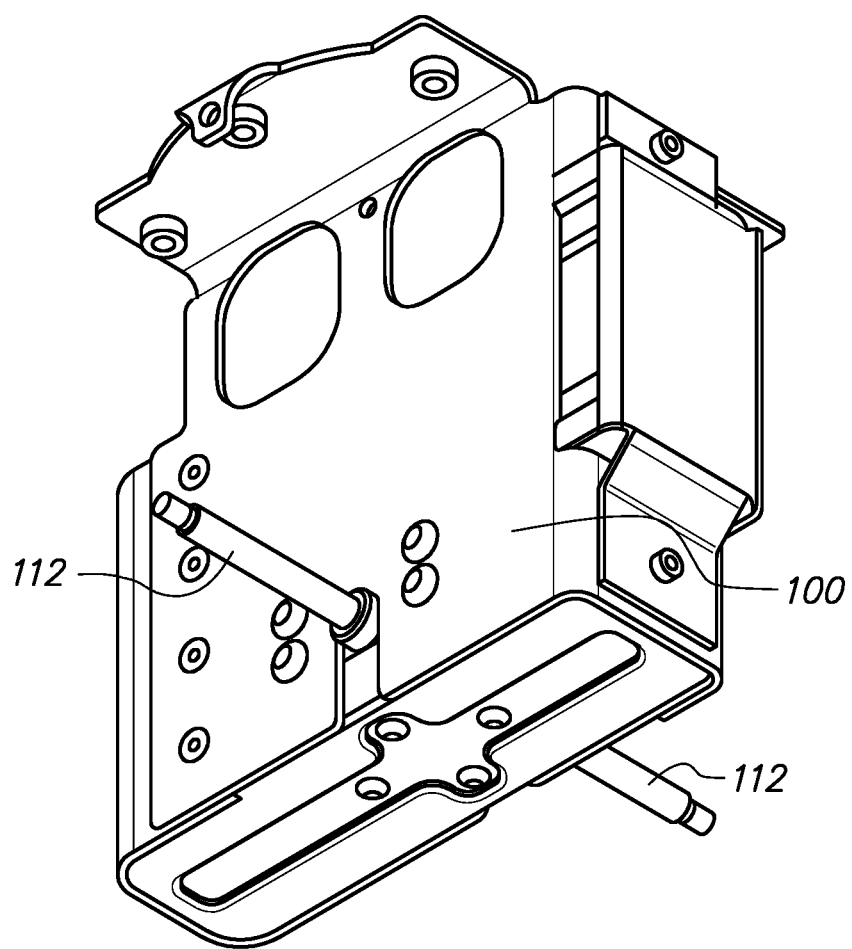
Figure 4H:
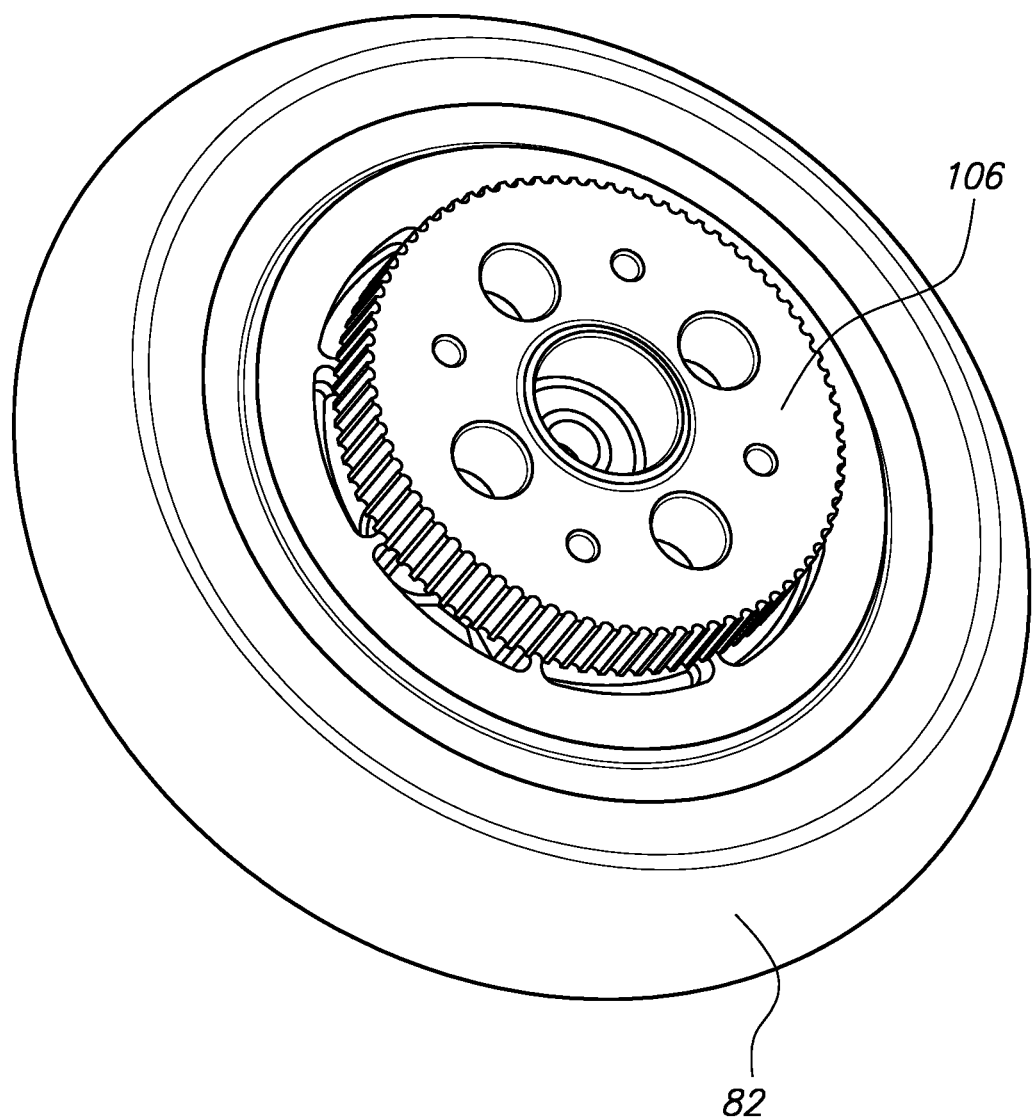
Figure 4I:
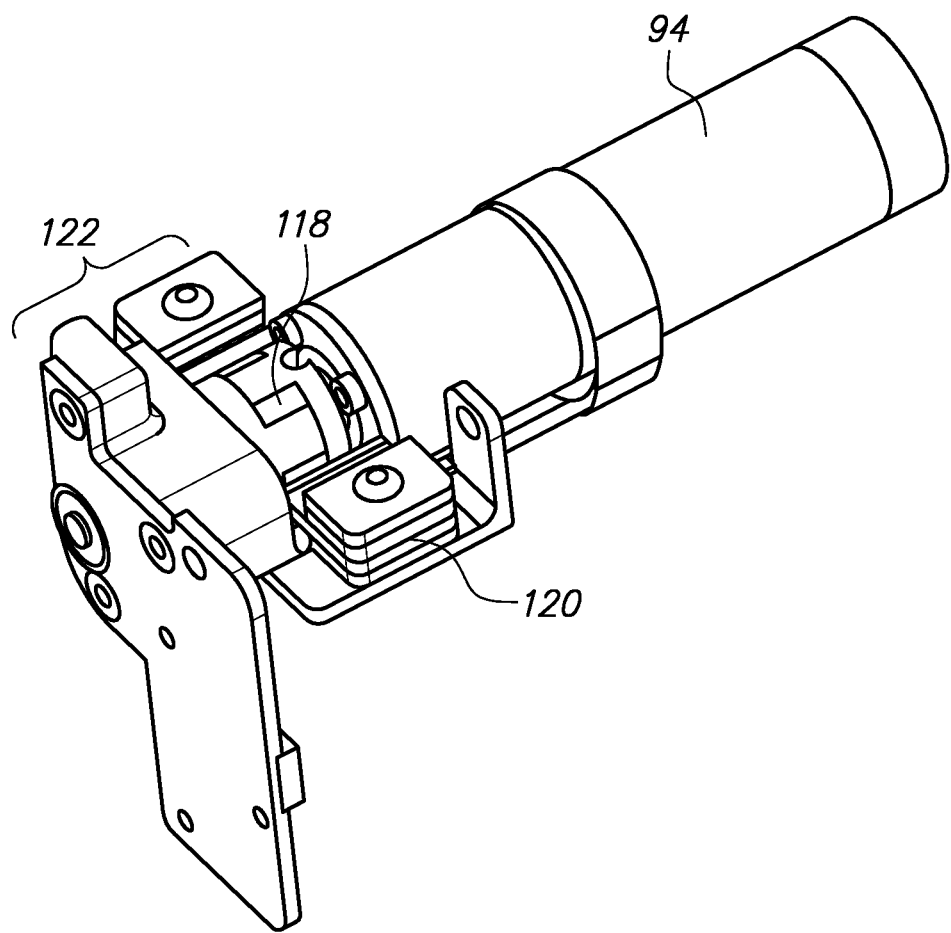

Referring to FIGS. 4A-4I, various aspects of an electromechanical drive caster assembly are illustrated. FIG. 4A shows one embodiment of a fully assembled caster assembly, comprising two wheels (82) coupled to a caster turret frame (80). The caster turret frame itself is rotatably coupled to a caster mounting plate (114) which is configured to be bolted to the main mobile base frame (not shown—element 48 in FIG. 3F, for example). A turret roll orientation motor, gearbox, and encoder assembly (84) is fixedly coupled to the caster turret frame (80) and driveably attached to dampened drive assembly (86) comprising one or more elastomer interface pieces (88) to dampen vibrations in the drivetrain and decrease impulse load peaks. Actuation of the motor assembly (86) causes rotation of the drive assembly (86) and rotation of a motor pulley (90) coupled to the drive assembly (86). This motor pulley (90) is coupled to a glass fiber reinforced timing belt (92), such as those available from Gates Corporation of Denver Colo., which is routed around a pulley shaped portion of the caster mounting plate (114). Rotation of the motor causes rotation of the caster mounting plate (114) relative to the caster turret frame (80) and thus roll of the entire caster assembly (20) with the exception of the caster mounting plate (114) and associated main mobile base frame. FIG. 4B depicts a similar assembly from a different perspective. FIG. 4C depicts another different perspective, which illustrates that a central frame assembly (100) houses three motor controller boards (98)—one for the turret roll orientation motor, gearbox, and encoder assembly (84), and one for each of the individual wheel drive motors. FIG. 4D is an orthogonal view oriented to show a first wheel drive motor, gearbox, and encoder assembly (94) and a second wheel drive motor, gearbox, and encoder assembly (96), each of which is operatively coupled to a driven pulley (106) comprising one of the wheels (82) using a glass fiber reinforced timing belt (104), such as those available from Gates Corporation of Denver, Colo. Each of the drive motor assemblies (94, 96) is mounted horizontally in the depicted embodiment relative to the wheels (82), with driven pulleys (not shown) coupled to drive axles (not shown) that are mechanically reinforced by bearing assemblies (102) coupled to the caster turret frame (80). FIG. 4E depicts certain elements of the caster turret frame (80) roll (i.e., versus the caster mounting plate (114) configuration, along with a schematic diagram of wires crossing this rotational joint. The caster assembly is configured to facilitate infinite roll in either direction (clockwise or counterclockwise) at this roll interface, and this is facilitated by using slip rings to pass control and power signals across the rotatable interface between the caster turret frame (80) and caster mounting plate (114). Such slip ring interfaces (116) are used in many rotatable electromechanical configurations, such as automotive steering wheels. FIG. 4E also illustrates that the motors preferably are mounted to other structures using motor mounting assemblies (110) featuring elastomeric damping elements (118) configured to reduce vibration and decrease impulse load peaks. FIG. 4F illustrates a cross sectional view through a caster assembly such as that depicted in FIG. 4A, showing the central positioning of the wheel axle (112) and motor controller board assembly (98). FIG. 4G shows a partial orthogonal view of the central frame assembly (100) as related to the wheel axle (112). FIG. 4H shows an orthogonal view of a wheel (82) and driven pulley (106) assembly which may be held together by four small bolts (not shown). FIG. 4I shows a close up orthogonal view of a wheel drive motor, gearbox, and encoder assembly (94) coupled to a driven motor pulley (not shown), which is coupled to a driven wheel pulley (not shown) using a timing belt (not shown). An elastomer-damped driving interface assembly (118) reduces vibrations and peak impulse loads as rotational drive energy is transferred to the motor pulley and wheel; this also decreases the amount of vibrational energy transferred to the mounting assembly (122) and other nearby assemblies generally.

Figure 5A:
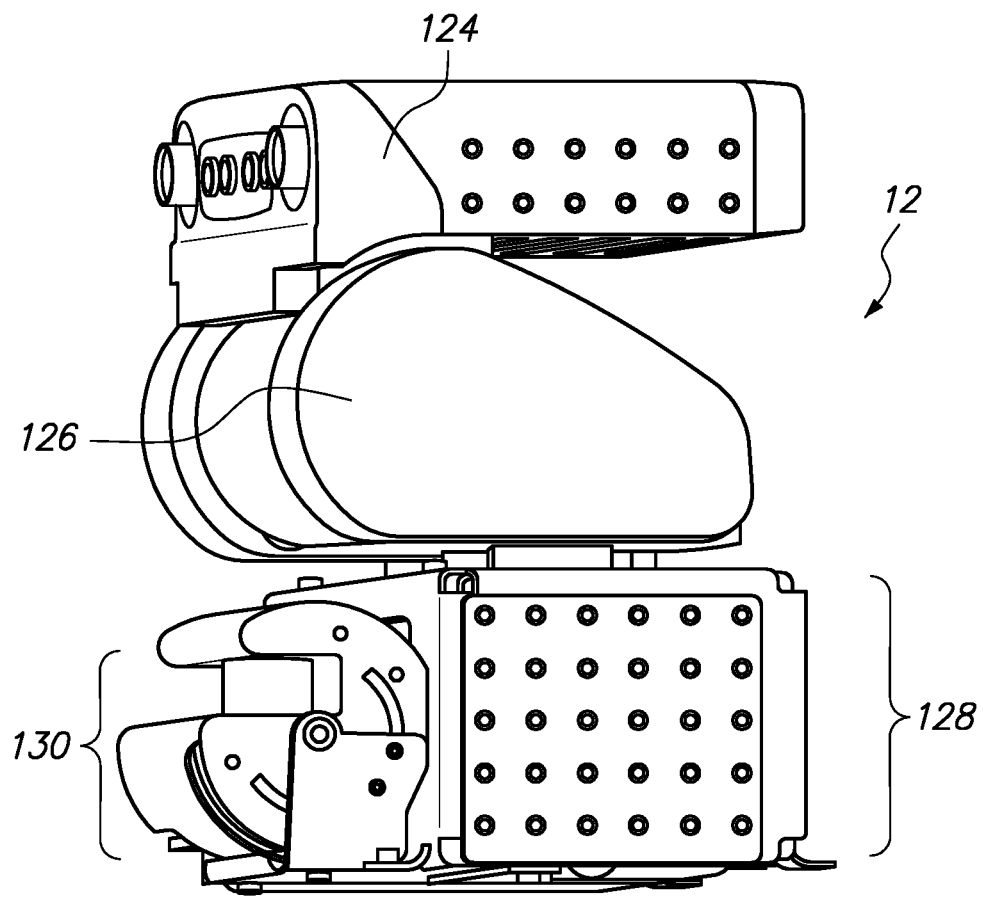
FIGS. 5A-5K illustrate various orthogonal schematic views of various aspects of an electromechanically mobile head assembly for a personal robotics system at various levels of assembly.
Figure 5B:
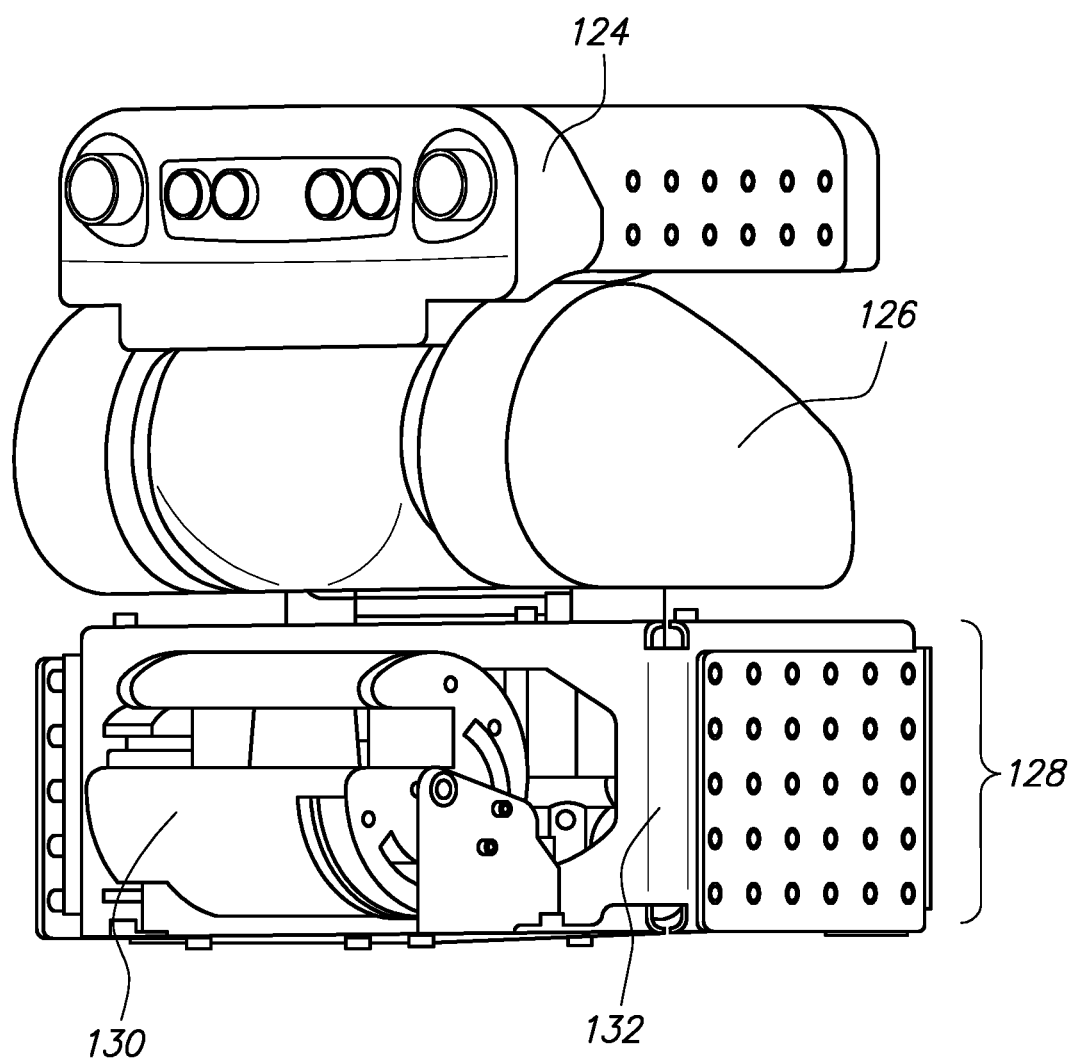

Referring to FIGS. 5A-5K, aspects of one embodiment of a head assembly (12) are depicted. Referring to FIG. 5A, the depicted head assembly (12) comprises a lower assembly (128) that is fixedly coupled to the top of the body assembly (element 8 in FIG. 1A), a head scanner assembly (130) that is rotatably coupled to the lower assembly (128) and fixedly coupled to a scanner sensor (138), such as a laser range finder available from Hokuyo Corporation of Osaka, Japan, a middle assembly that is rotatably coupled to the lower assembly (128) to allow for pan rotation of the middle assembly (126) (and upper assembly 124) relative to the lower assembly, and an upper assembly that is rotatably coupled to the middle assembly (126) to allow for pitch rotation of the upper head assembly (124) relative to the middle assembly (126). FIG. 5B shows a different orthogonal view of the assembly of FIG. 5A.

Figure 5C:
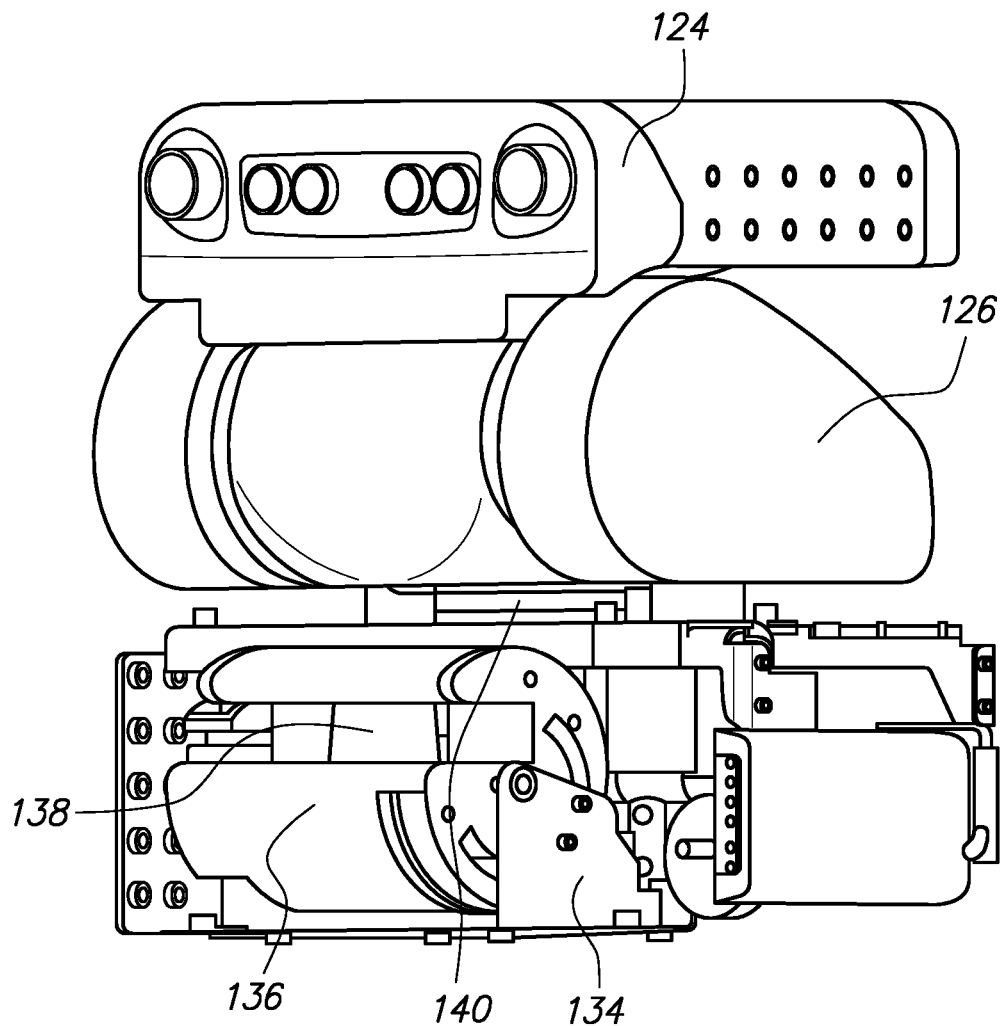
Figure 5D:
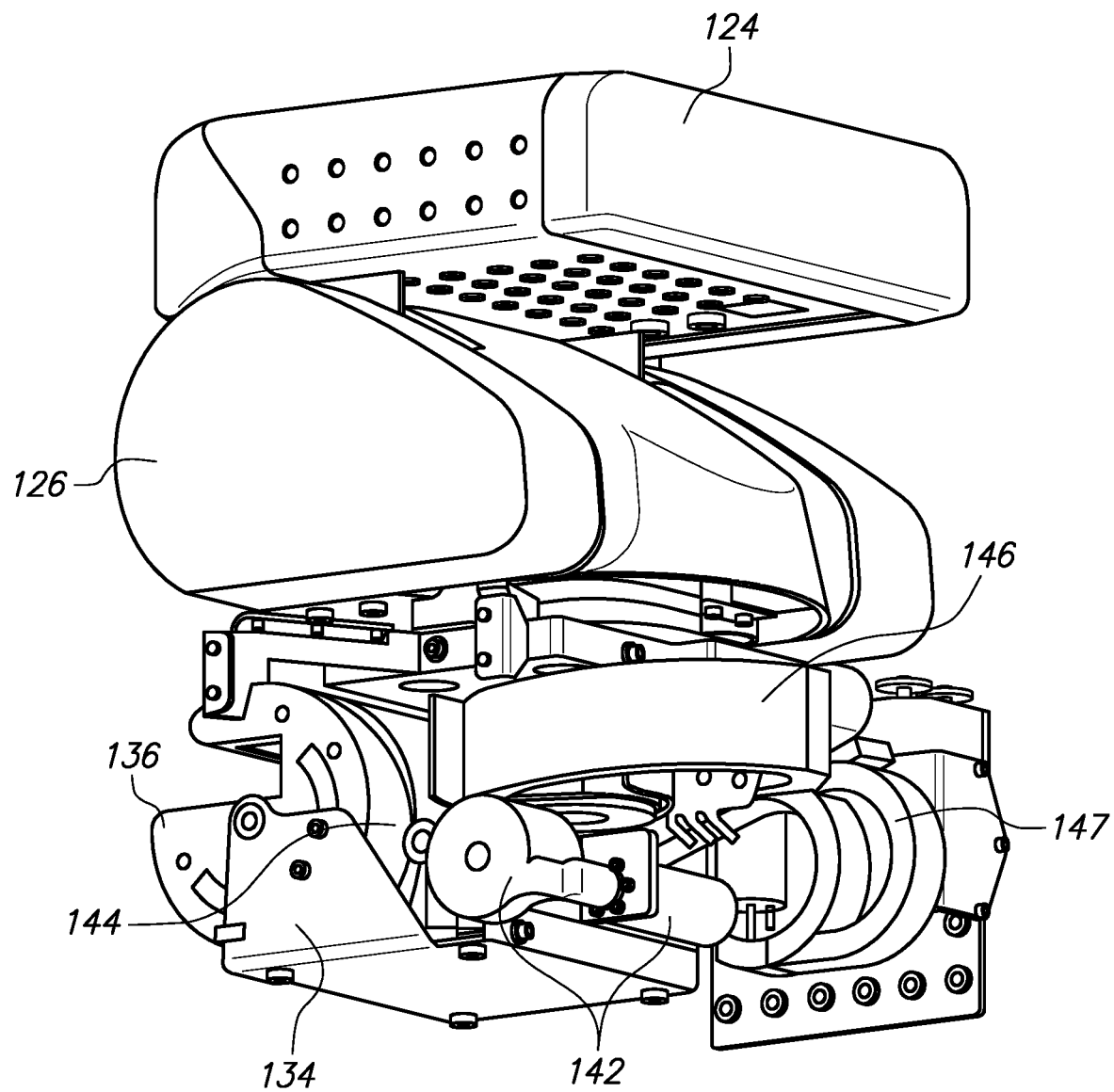
Figure 5E:
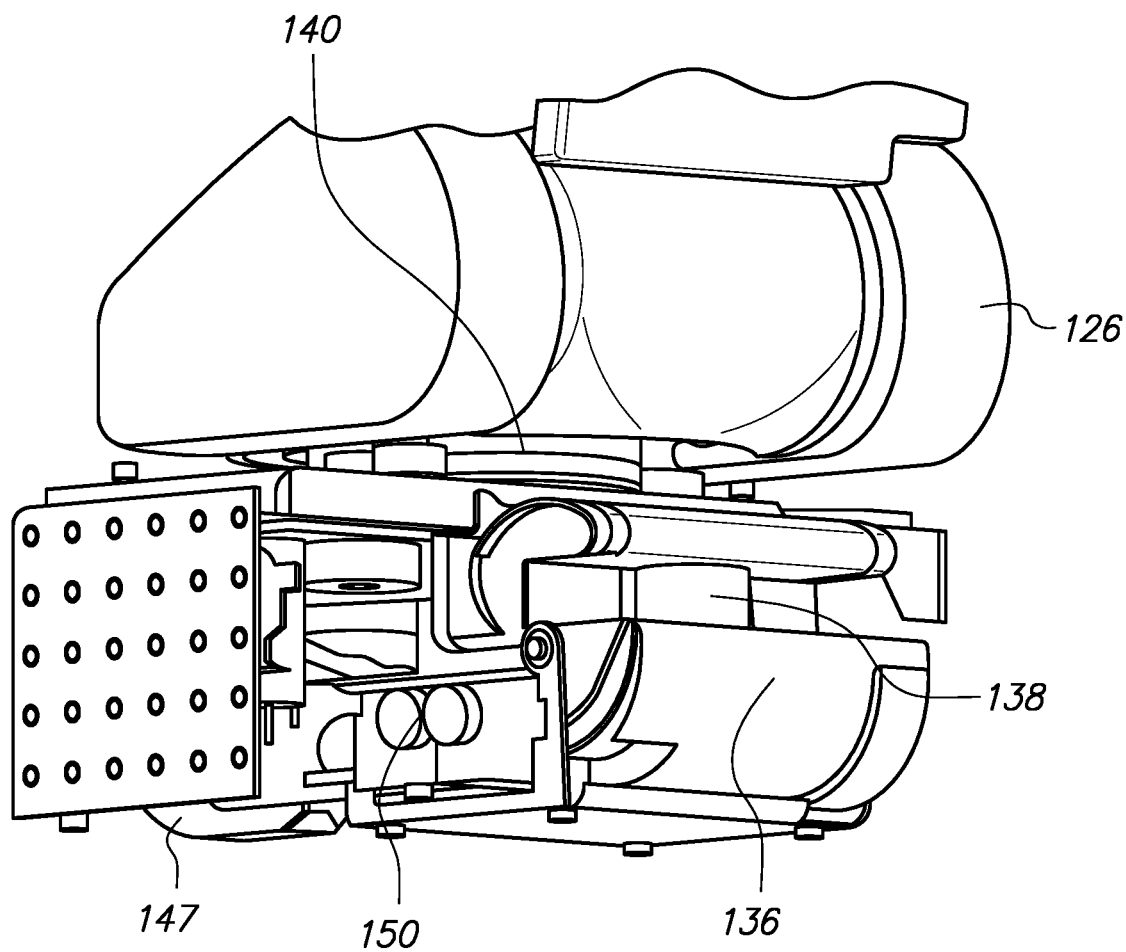

Referring to FIG. 5C, portions of the housing have been removed from the lower assembly (128) to reveal further views of the scanner sensor (138), the sensor rotatable member (136) to which the scanner sensor (138) is fixedly coupled, and the sensor mounting base to which the sensor rotatable member (136) is rotatably coupled. Also depicted is a middle assembly (126) pan actuation drive belt (140). With additional lower assembly housing removed, FIG. 5D illustrates a sensor rotation motor, gearbox, and encoder assembly (142) which is drivably coupled to a pulley-shaped portion of the sensor rotatable member (136) using a fiber reinforced timing belt (144) such as those available from Gates Corporation of Denver, Colo. An eChain articulatable conduit (147) is configured to carry wiring to power and control the sensor rotation motor, gearbox, and encoder assembly (142). Also shown is an eChain articulatable conduit (146) configured to carry wiring to power and control the motors and sensors above the lower assembly of the head, which are free to pan rotate relative to the lower assembly. With further lower assembly housing removed, a motor controller board for the motor of the sensor rotation motor, gearbox, and encoder assembly (142) is depicted coupled nearby.

Figure 5F:
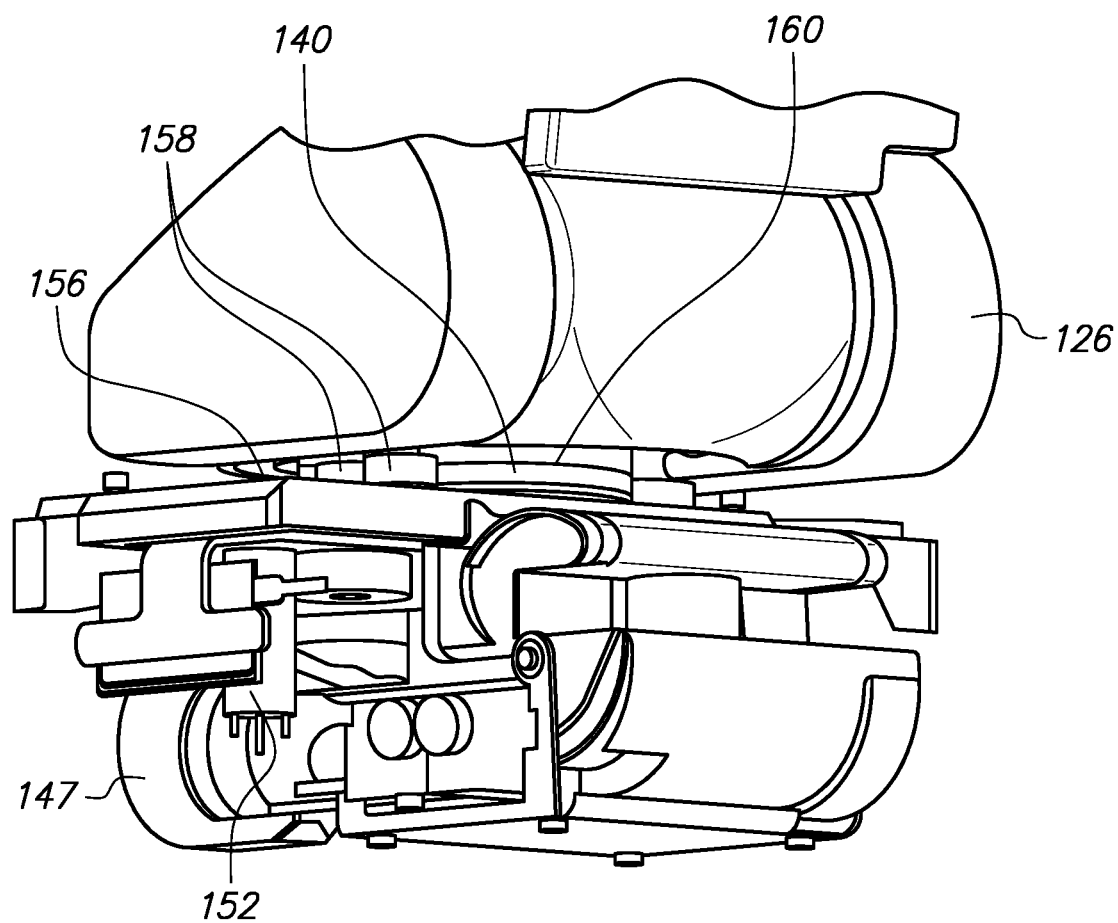

With additional lower assembly housing removed, FIG. 5F illustrates the head pan rotation motor, gearbox, and encoder assembly (152) which is coupled to a motor pulley (156) that drives a fiber reinforced timing belt (140), such as those available from Gates Corporation of Denver, Colo., through a set of idlers (158) and around a relatively large driven pulley (160) which causes the middle and upper assemblies of the head assembly to pan rotate relative to the lower assembly and body assembly.

Figure 5G:
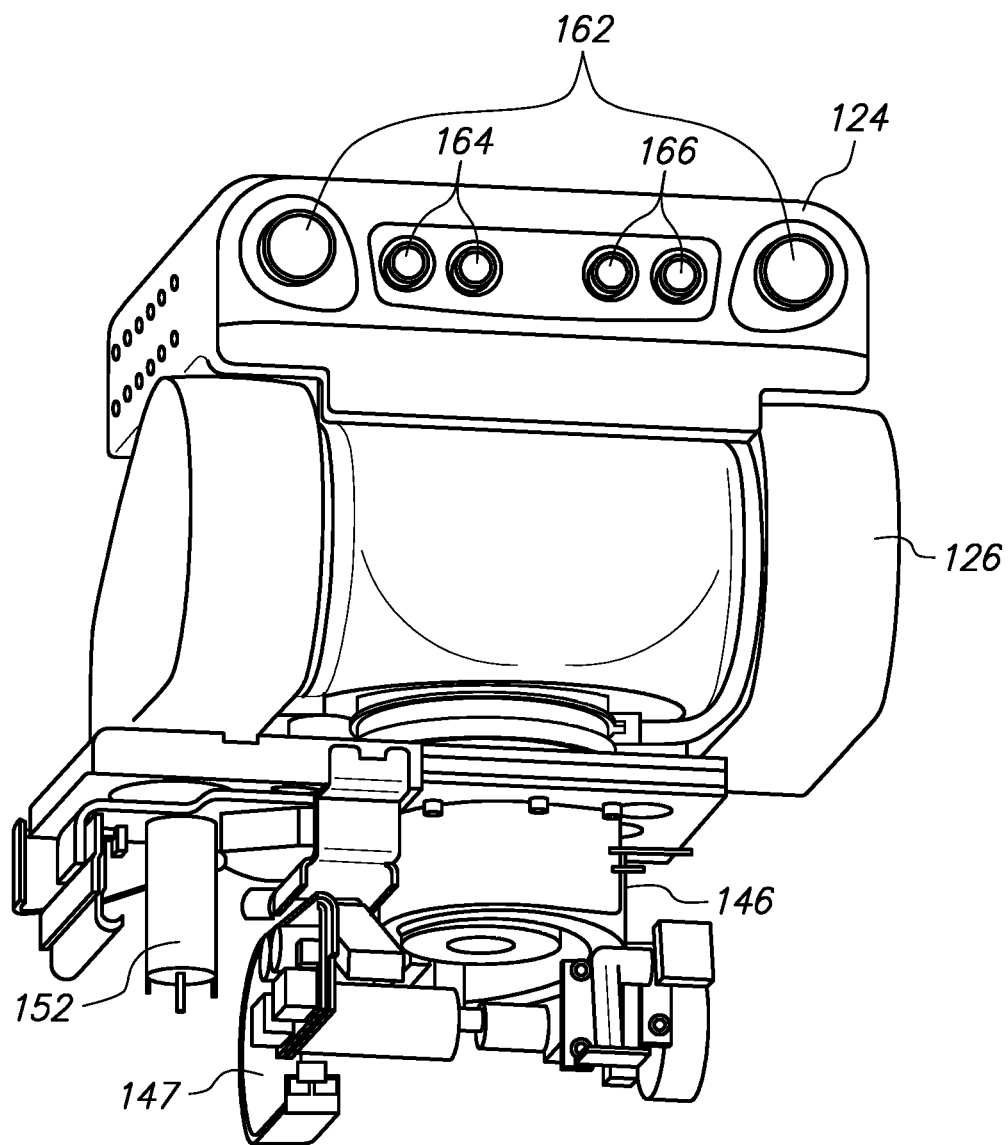

With additional portions of the lower assembly removed, FIG. 5G depicts a front view of the upper head assembly, which, in this embodiment, features a set of stereo cameras (162), one or more projectors (164), and one or more other imaging cameras or other sensors (166). The projectors (164) may be structured light projectors or unstructured light projectors—either type may be used to project some texture against items in the field of view of the stereo cameras (162) to facilitate enhanced object and three dimensional image capture analysis. Multiple pairs of stereo cameras (162) may be utilized, which may combine wide fields of view, narrow fields of view, relatively high resolution, relatively low resolution, structured or unstructured light analysis, etc. Cameras may reside not only coupled to aspects of the head assembly (12), but also coupled to other assemblies, such as forearm or gripper assemblies (16, 18). For example, in one embodiment, a gripper assembly may comprise a simple camera or laser reflection configuration to assist with grasping small elements such as wires in the fingers of such gripper, which conventionally is a challenging task.

Figure 5H:
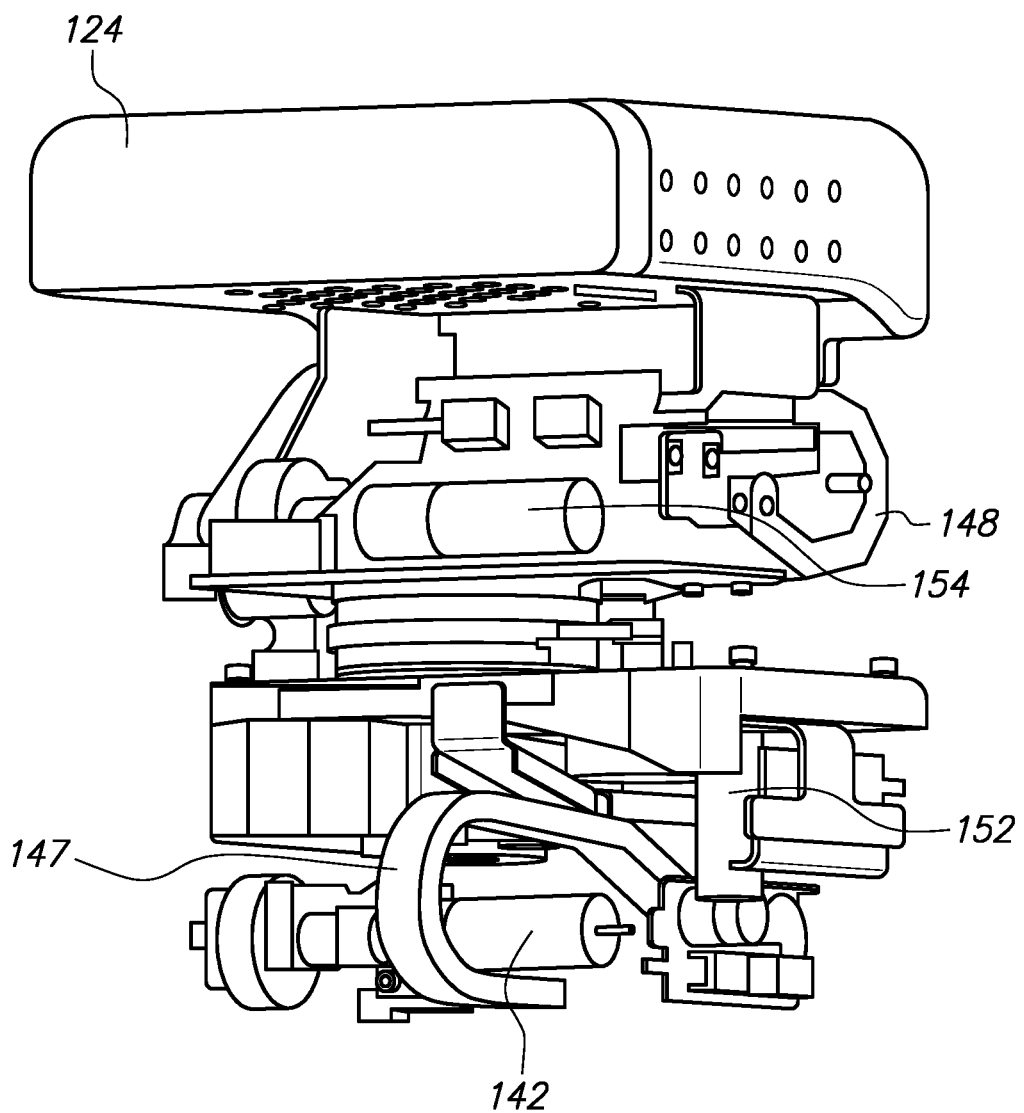
Figure 5I:
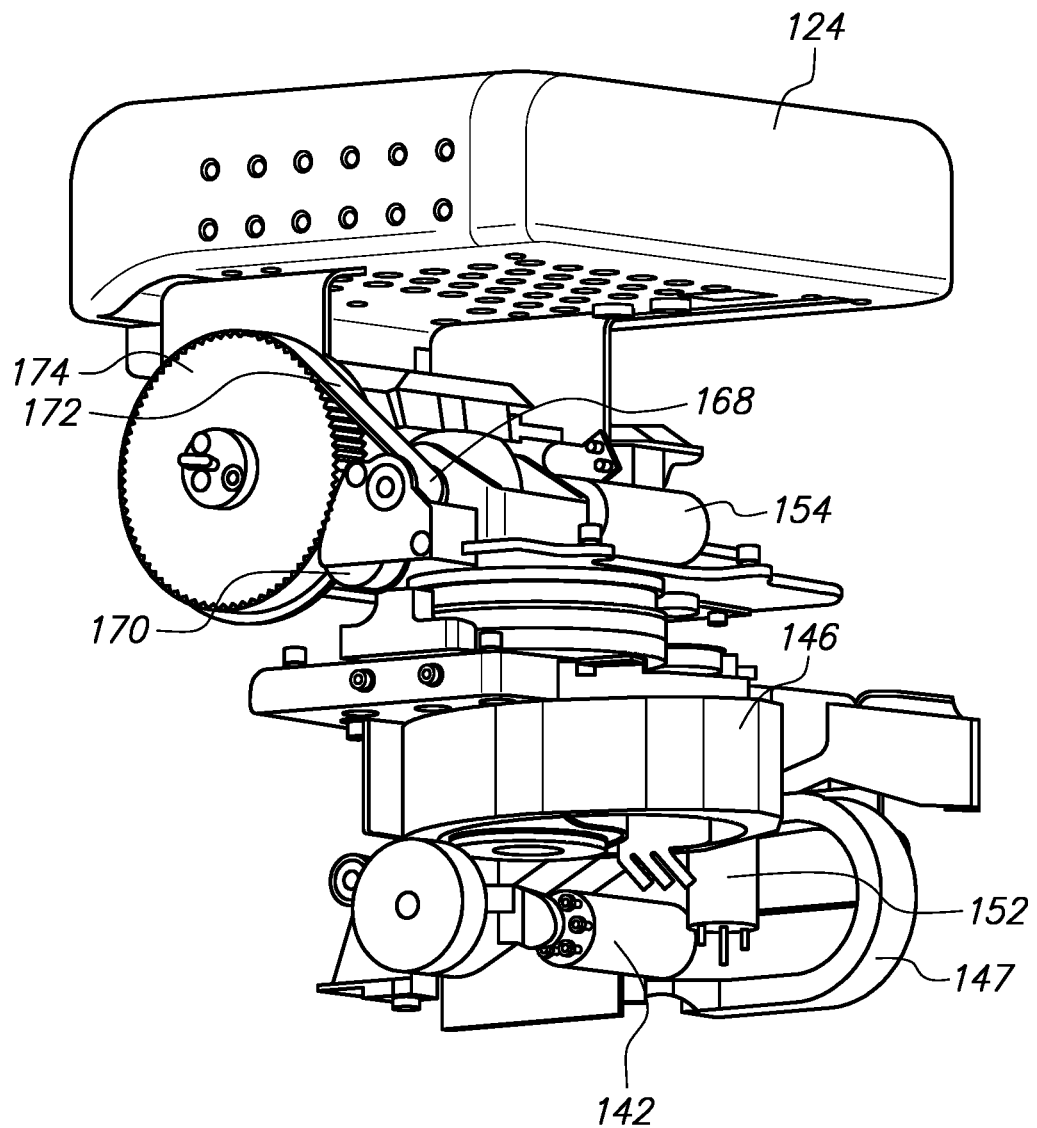
Figure 5J:
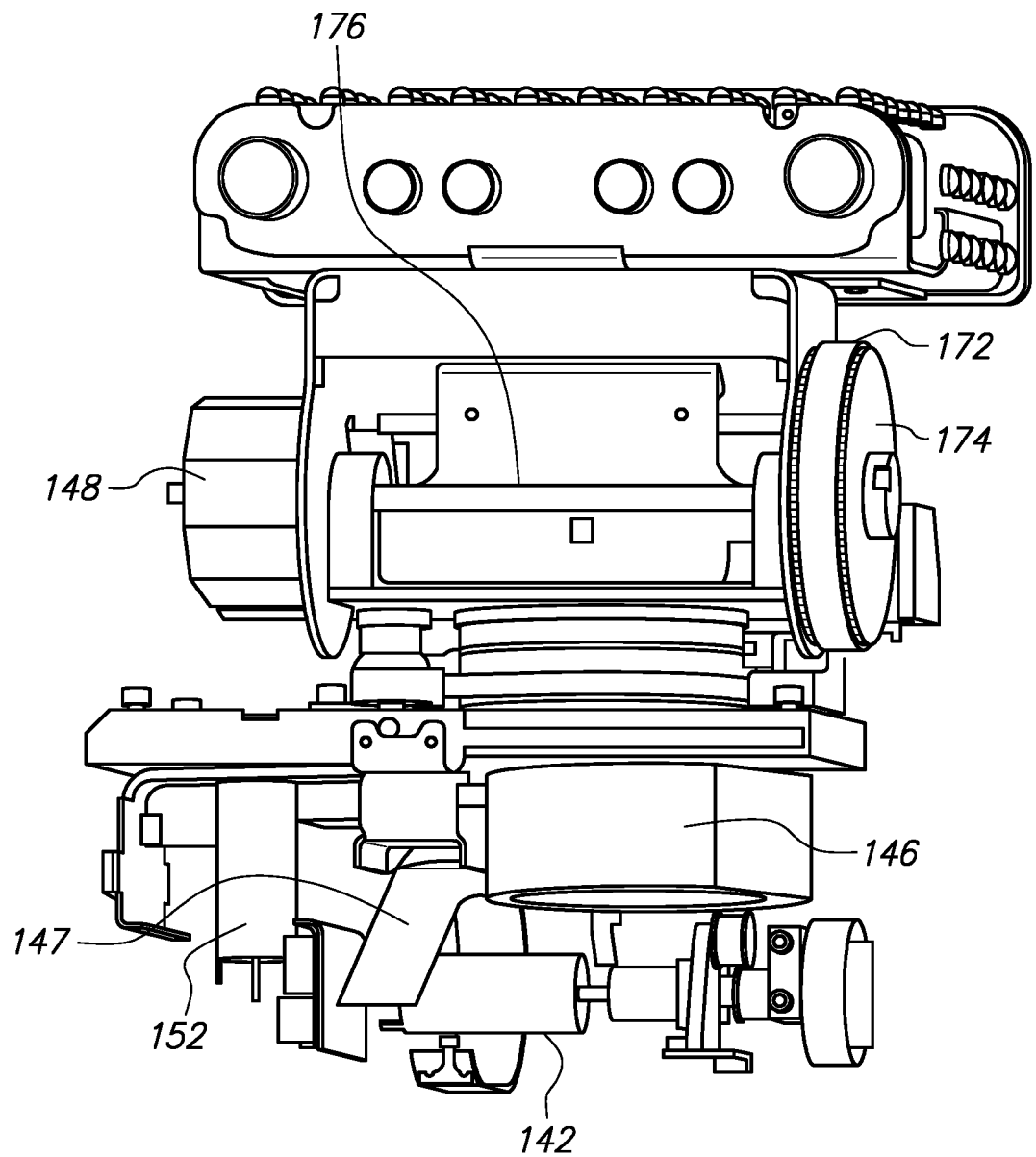
Figure 5K:
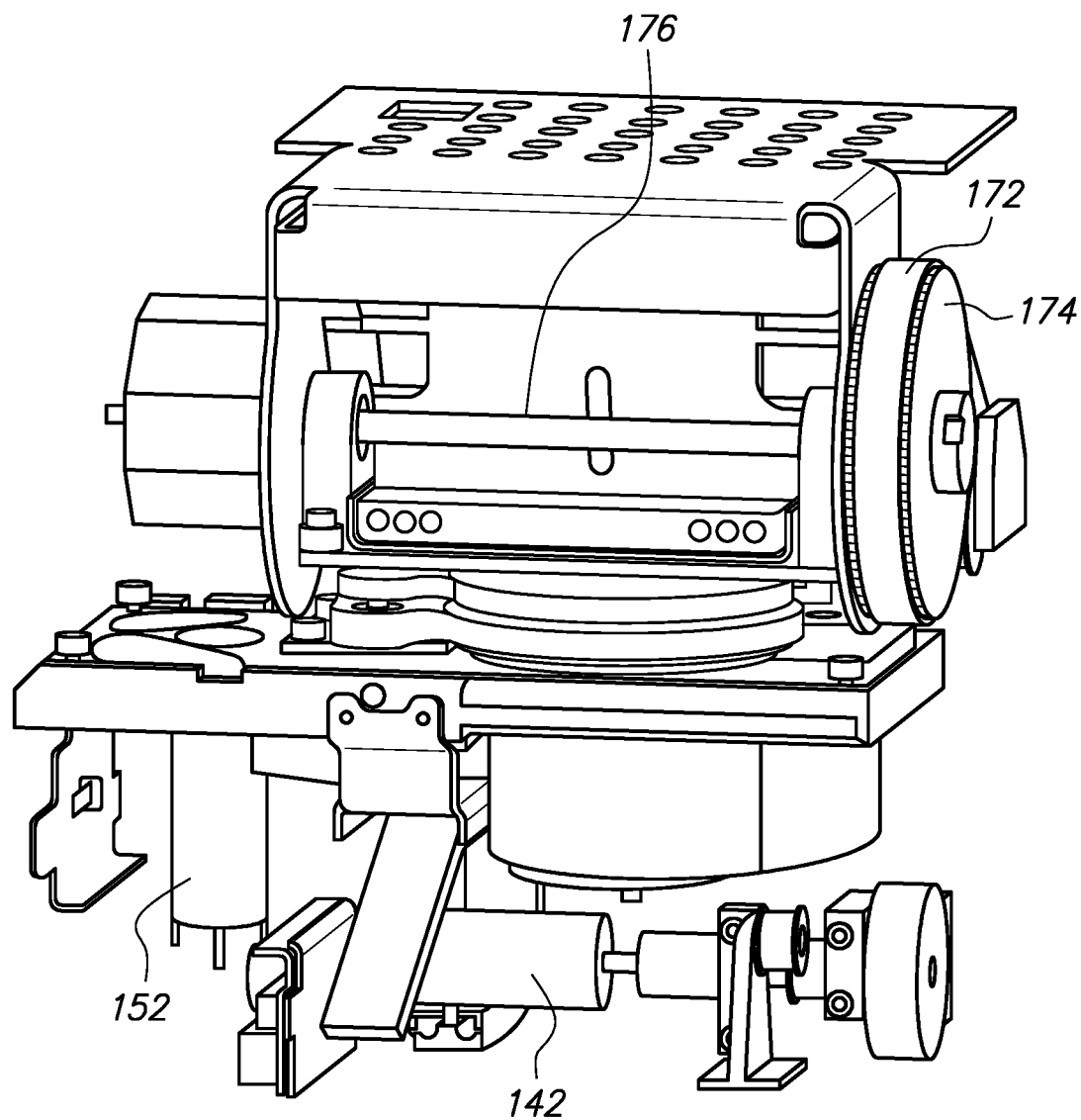

FIG. 5H shows a further disassembled head assembly wherein the upper head assembly (124) pitch actuation motor, gearbox, encoder assembly (154) is visible, along with an eChain (148) to safely channel power, control, and sensor wiring from the pitch rotating portions of the upper head assembly (124) to other portions of the robotic system. FIG. 5I shows a further disassembled head assembly wherein a motor pulley (168) coupled to the motor of the head assembly (124) pitch actuation motor, gearbox, encoder assembly (154) is coupled to a relatively large driven pulley (174) with a fiber reinforced timing belt (172), such as those available from Gates Corporation of Denver, Colo., in a configuration wherein the motor of the head assembly (124) pitch actuation motor, gearbox, encoder assembly (154) may electromechanically pitch rotate the upper head assembly (124) about a pitch rotation axle (176), as shown in FIGS. 5J and 5K.

Figure 6A:
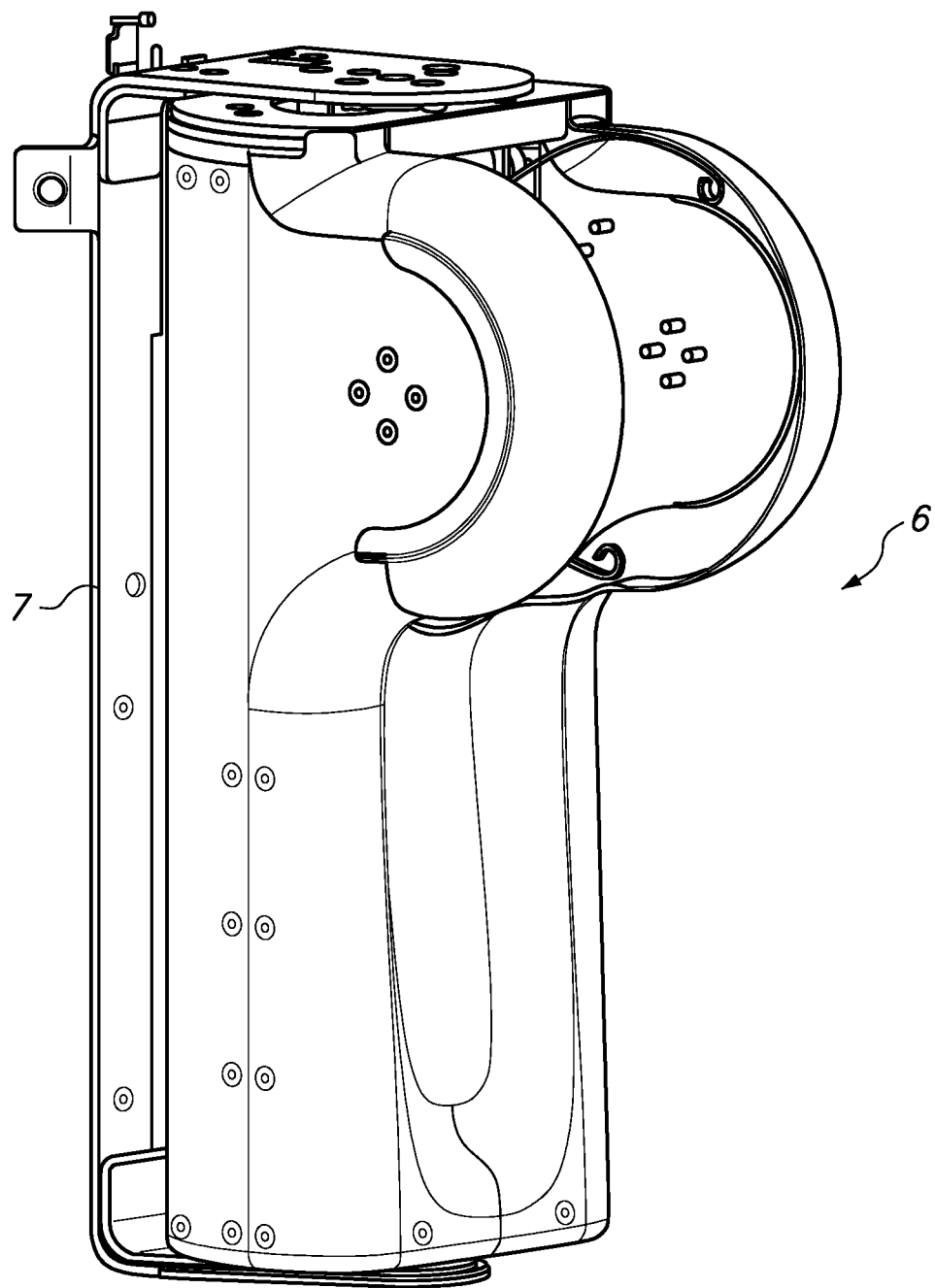
FIGS. 6A-6M illustrate various orthogonal schematic views of various aspects of an electromechanical arm pan and counterbalance "turret" assembly for a personal robotics system at various levels of assembly.
Figure 6B:
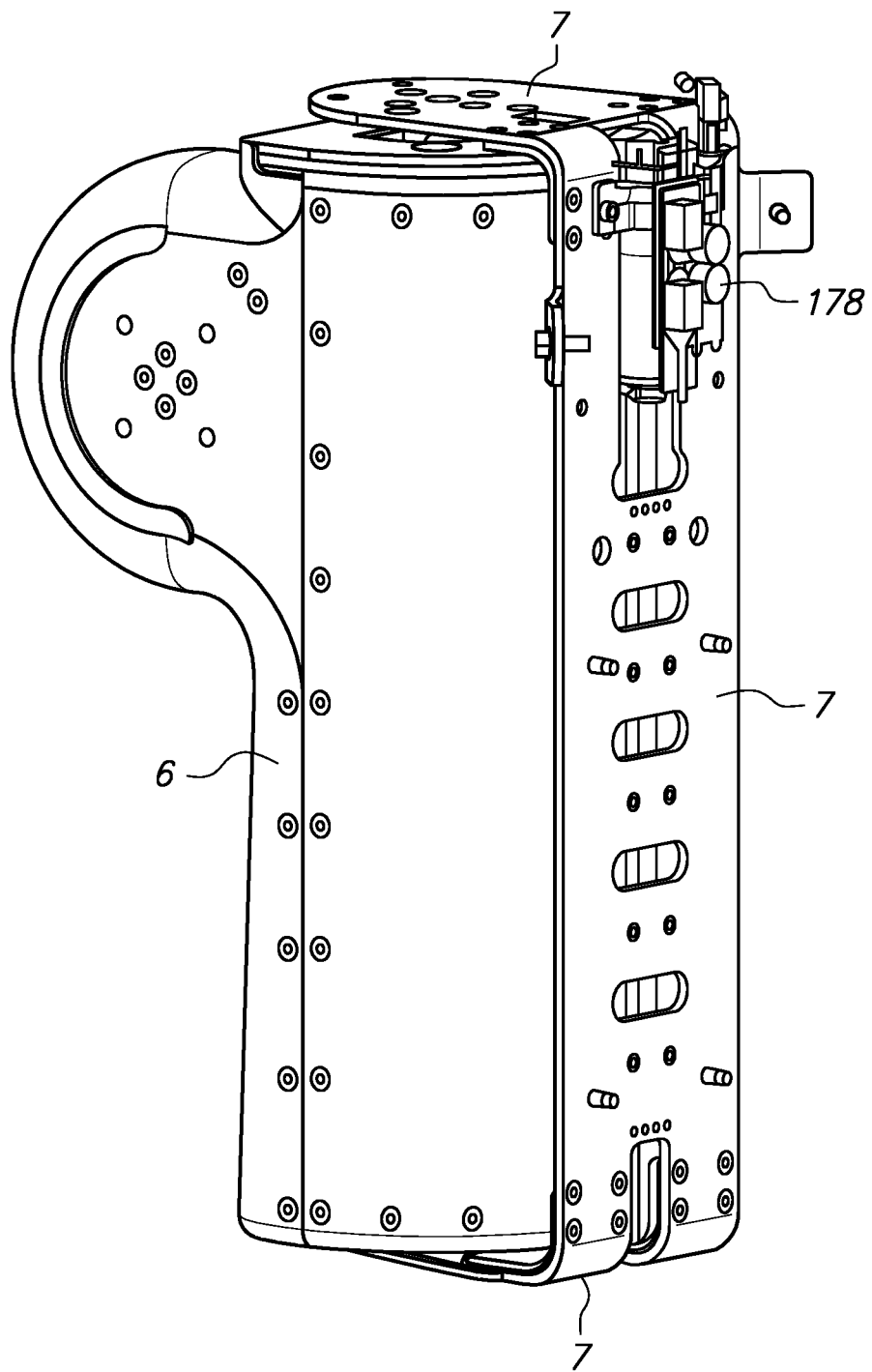
Figure 6C:
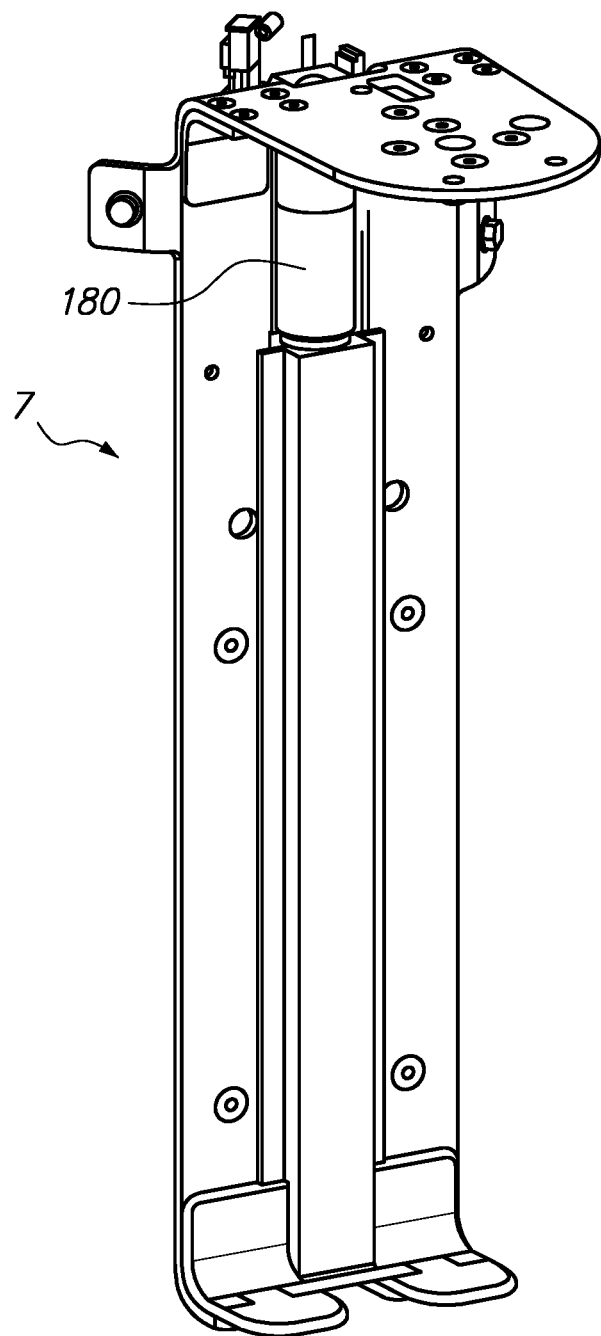
Figure 6D:
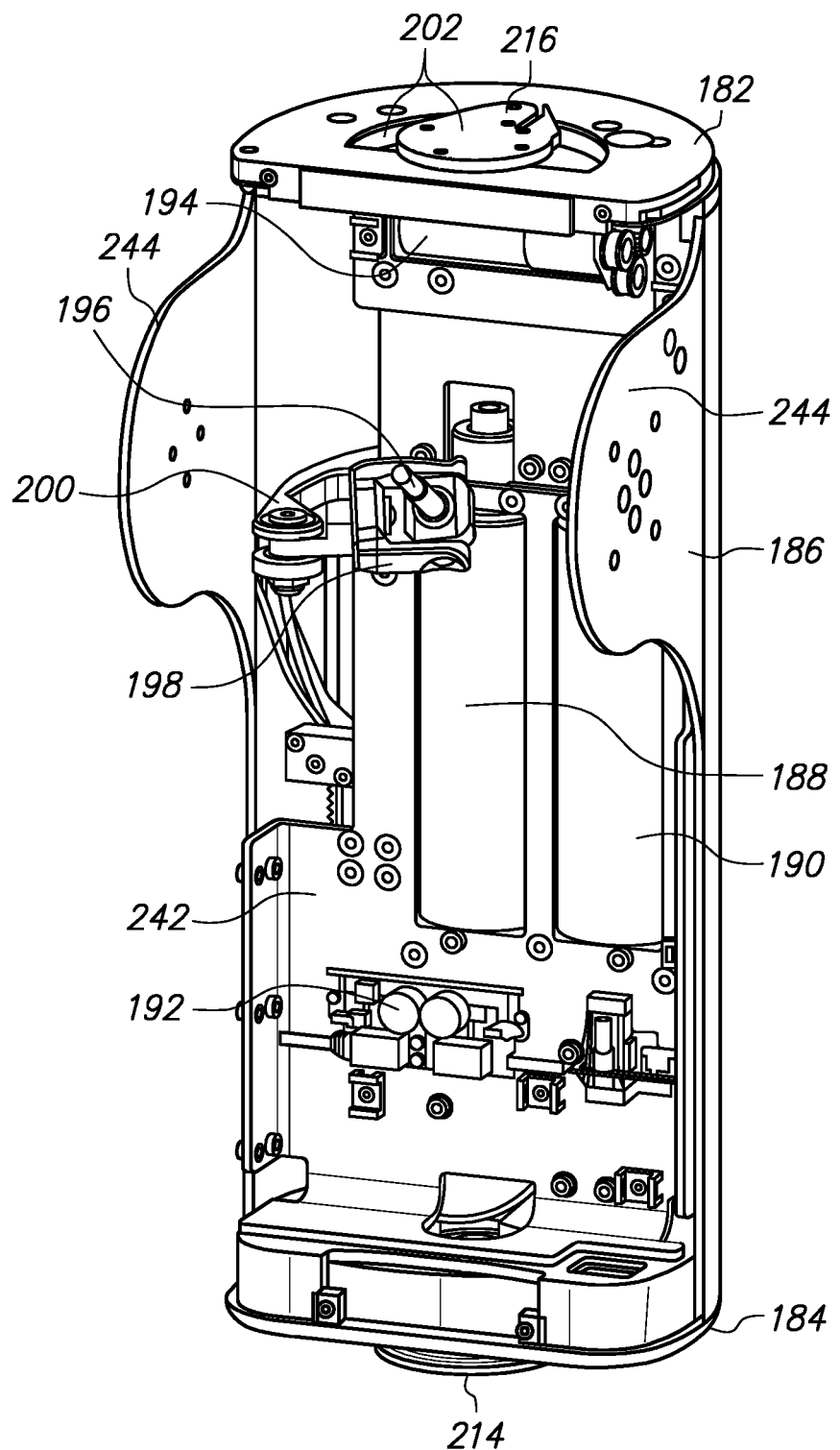
Figure 6E:
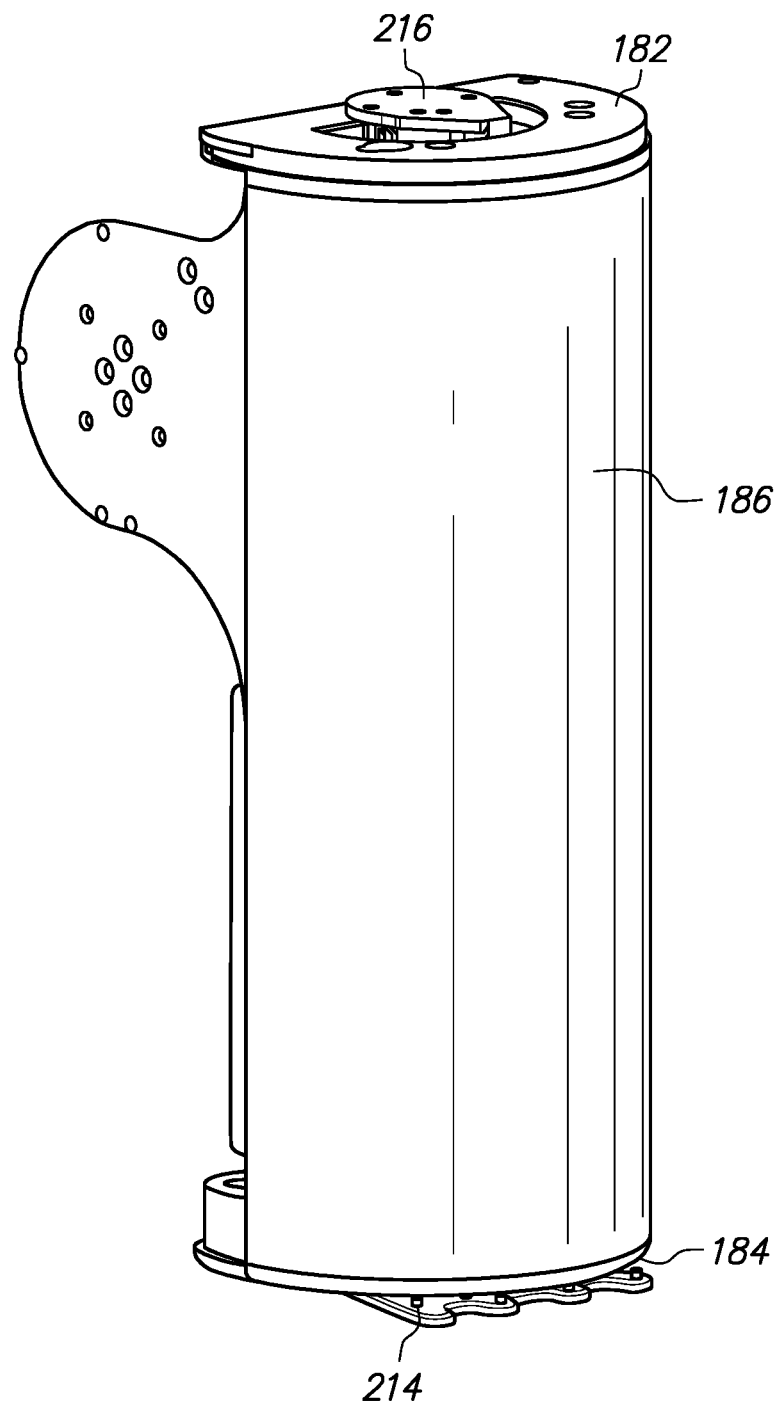
Figure 6F:
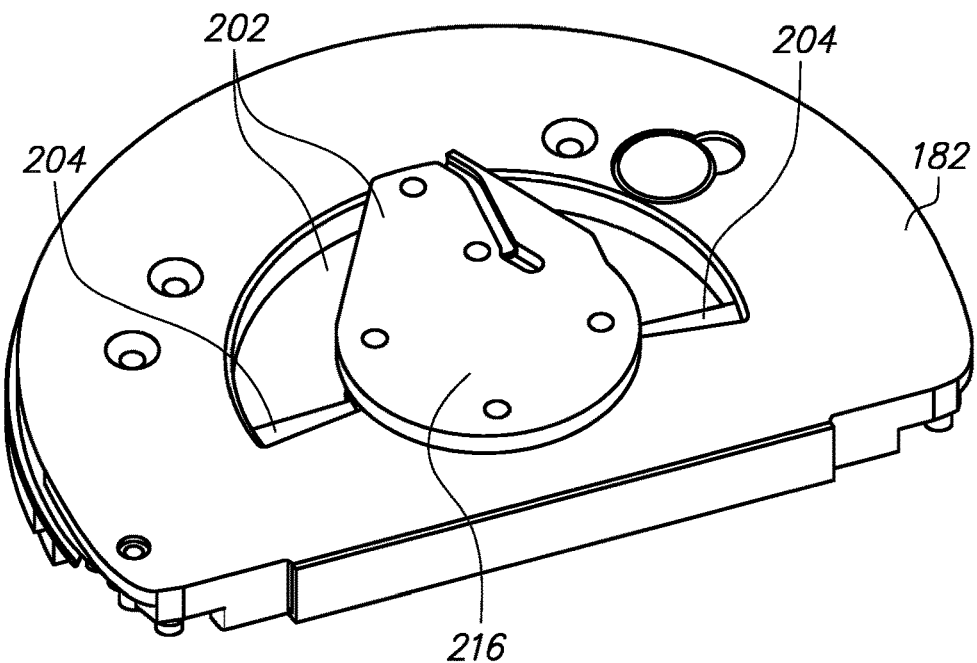
Figure 6G:
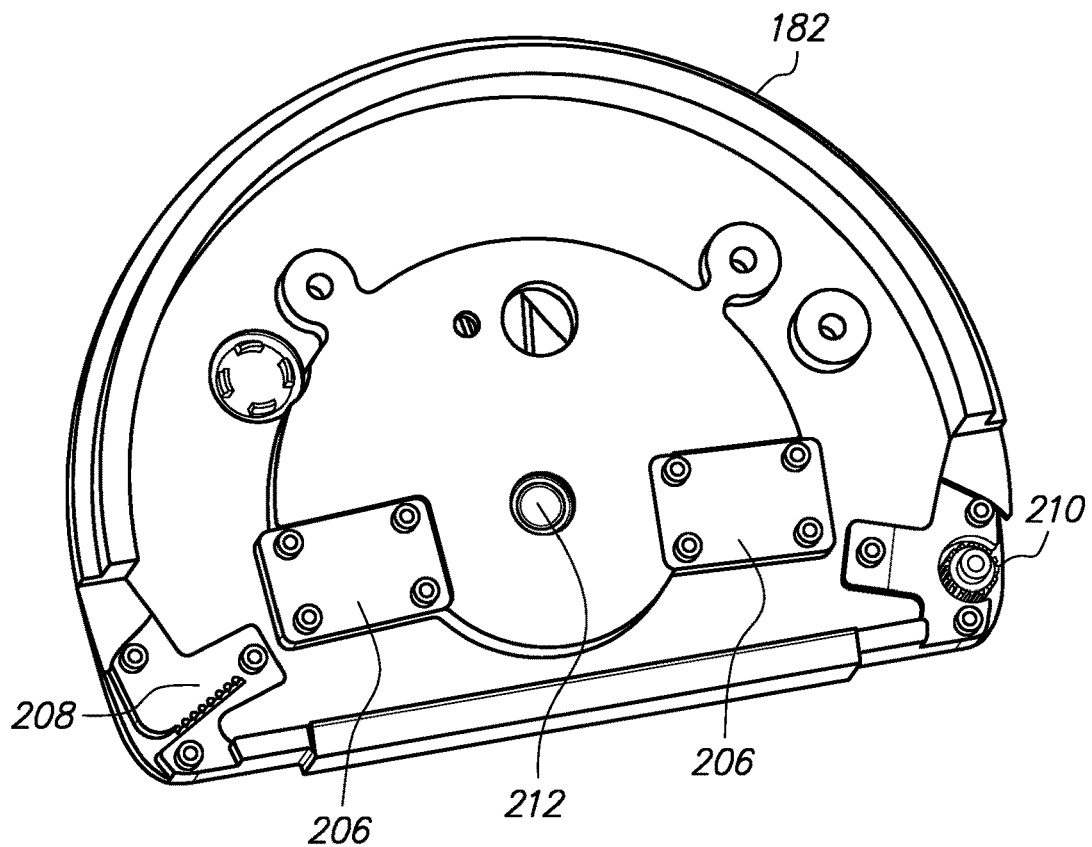
Figure 6H:
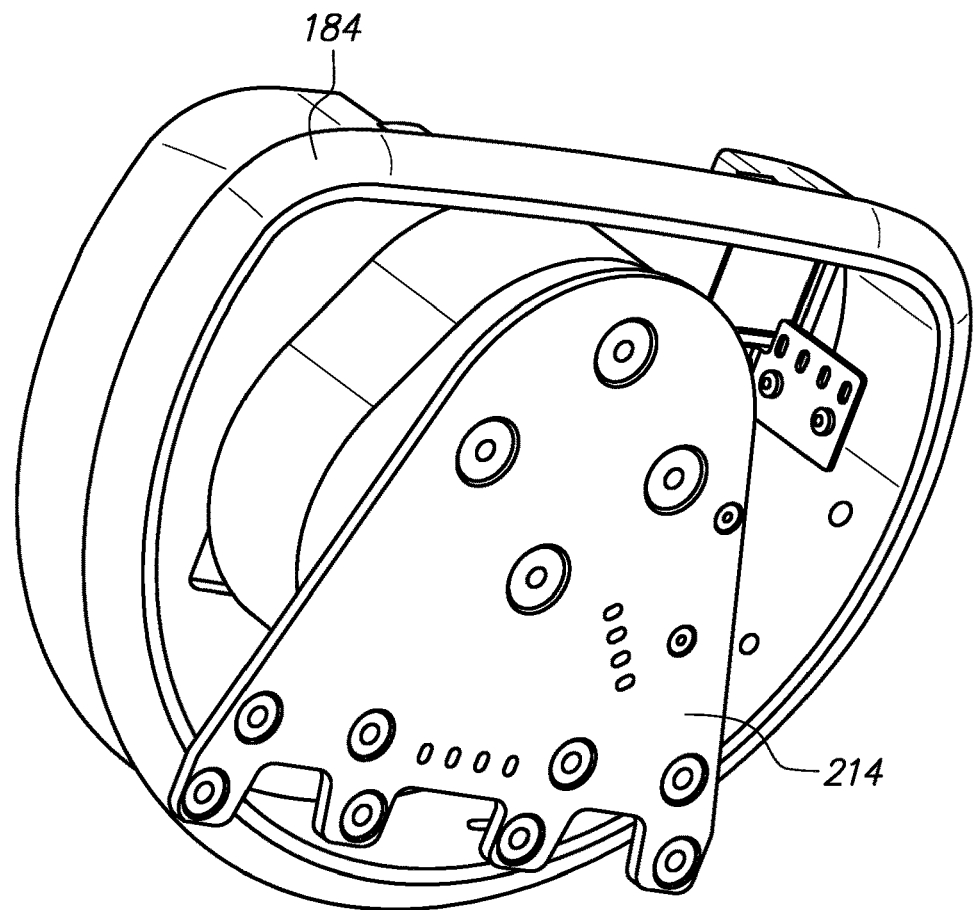
Figure 6I:
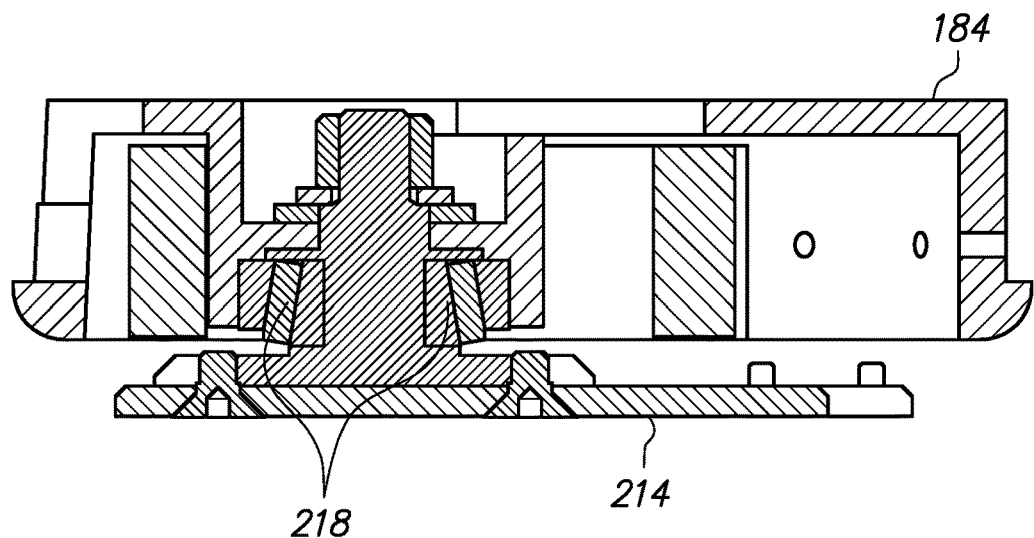
Figure 6J:
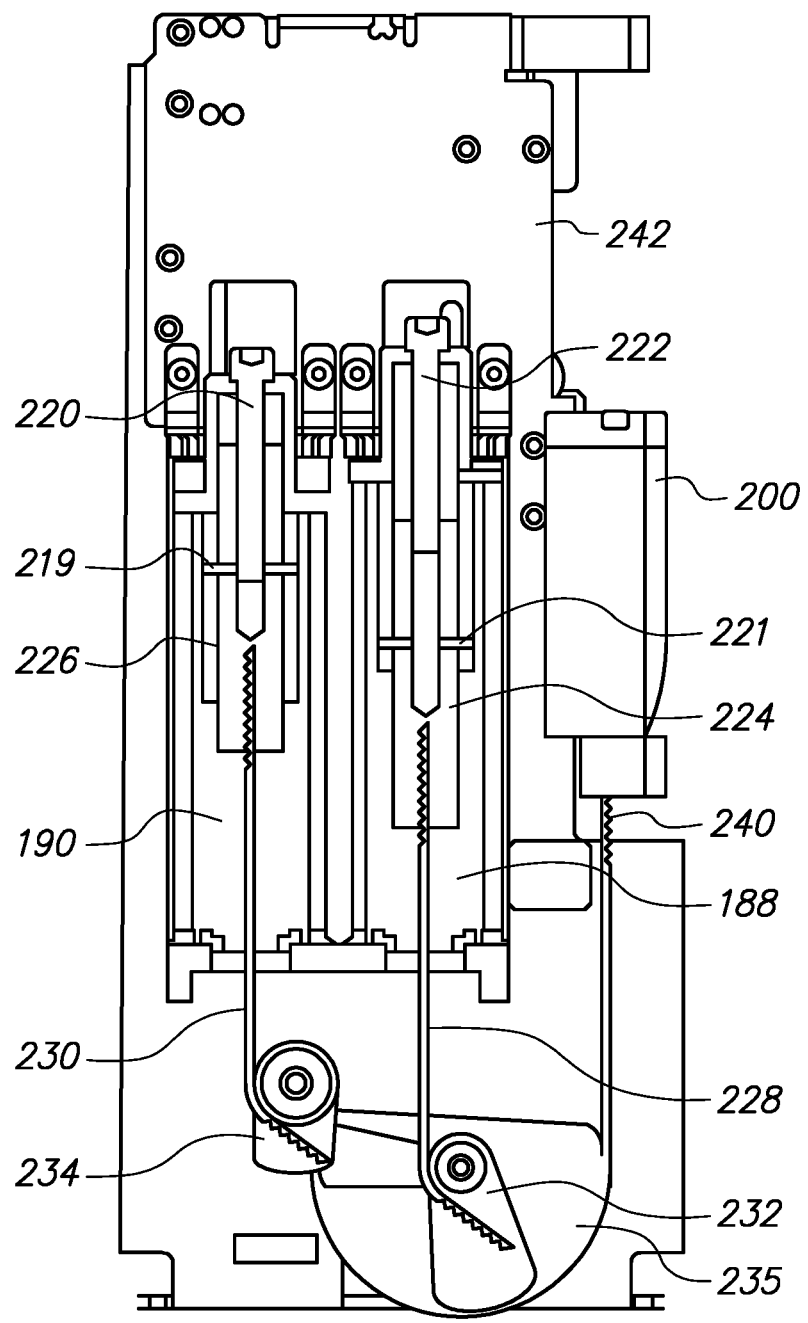
Figure 6K:
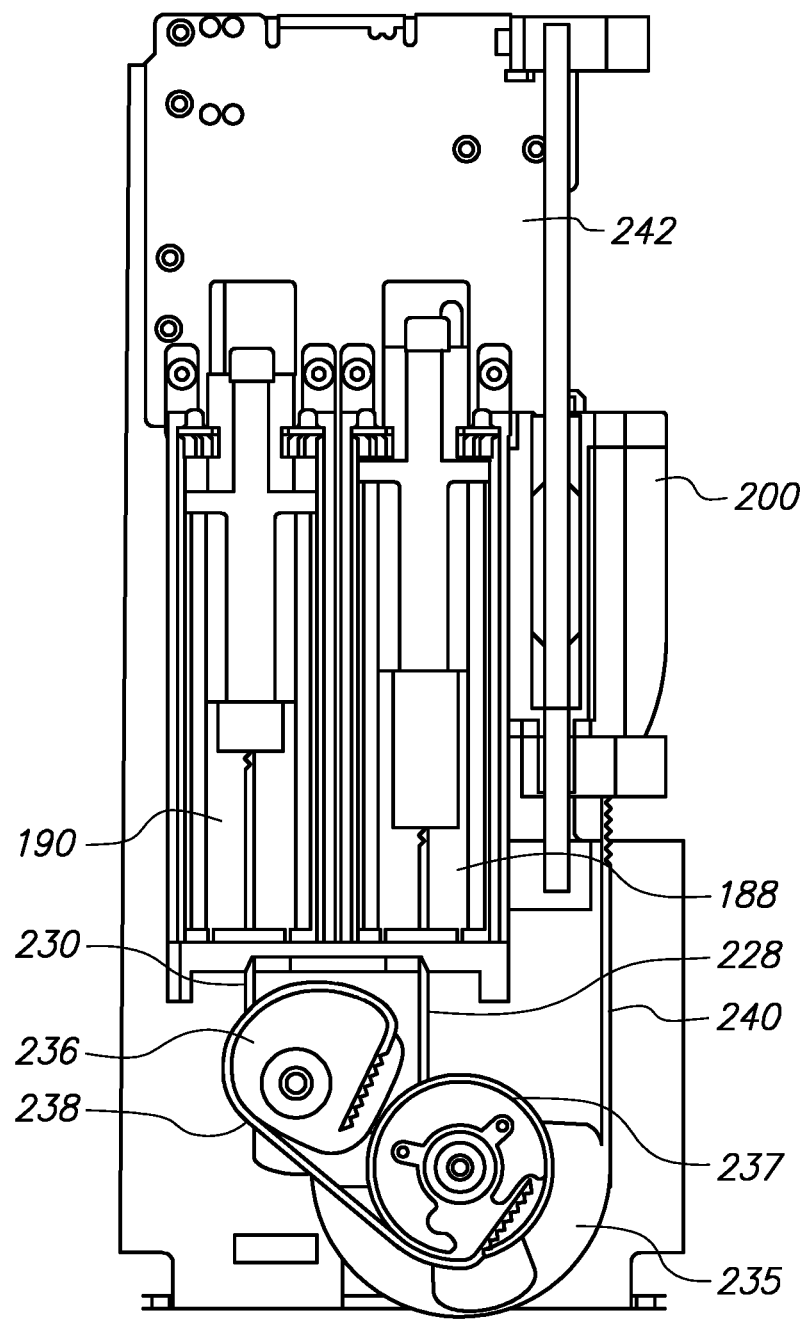

FIGS. 6A-6M depict aspects of the proximal arm pan and counterbalancing turret assembly (6). Referring to FIG. 6A, a turret mounting assembly (7) fixedly coupled to the body assembly (element 8 of FIG. 1A) facilitates rotation of the turret assembly (6) relative to the body assembly. The same assembly of FIG. 6A is shown from a different orthogonal view in FIG. 6B to illustrate the "U" type shape of the turret mounting assembly (7), and the placement of the turret pan motor control board (178) as coupled to the turret mounting assembly (7). FIG. 6C shows a turret mounting assembly (7) without a turret assembly, to illustrate the position of the turret pan motor, gearset, and encoder assembly (180) as fixedly coupled to the turret mounting assembly (7). Referring to FIG. 6D, a partially disassembled turret assembly (8) is depicted, illustrating the three main outer structures—the top cap member (182), bottom cap member (184), and middle turret structural assembly (186) including two shoulder interface tabs geometrically configured to support a shoulder assembly, as described below. A mounting foot (214) and an upper mounting member are configured to be fixedly coupled to the turret mounting assembly (7), and are rotatably coupled to the bottom cap member (184) and top cap member (182), respectively. The interface (202) between the top cap member (182) and upper mounting member (216) comprises a rotational range of motion limiting groove into which a toe of the upper mounting member fits. The groove terminates with elastomeric cushions (204) to limit such rotational range of motion (i.e., the foot of the upper mounting member hits the cushions and this interference prevents further pan rotation of the turret assembly (6). The shoulder pitch motor, gearbox, and encoder assembly (194) is depicted coupled to the upper aspect of the middle turret assembly (186) on the turret main frame structural member (242). For spatial efficiency reasons, the motor controller board (192) for this shoulder pitch motor, gearbox, and encoder assembly (194) is coupled to the inferior aspect of the middle turret assembly (186) on the turret main frame structural member (242). As described below, first (188) and second (190) spring cans are coupled to the turret main frame structural member (242). Springs within these spring cans (188, 190) are coupled to an output belt which is coupled to an elevator assembly (200). The elevator assembly is free to elevate up and down vertically, and to rotate about a vertical elevator rod (248 in FIG. 6L, for example); it is also coupled to a gimbal assembly which terminates in an upper arm counterbalancing interface rod (196), through which the spring cans (188, 190) may ultimately serve to counterbalance gravitational loads on the upper arm and forearm assemblies (14, 16). FIG. 6E depicts a rear view of a partial arm turret assembly, including the upper mounting member (216), top cap member (182), middle turret assembly (186), bottom cap member (184), and mounting foot (214) member. FIG. 6F illustrates a close up orthogonal view of a top cap member (182), upper mounting member (216), and the groove/toe rotation-limiting interface (202) with elastomeric cushions (204) to decrease vibrations and peak impulse loads. FIG. 6G depicts an underside view of the assembly in FIG. 6F, with the center of turret pan rotation (212) identified, as well as elastomeric cushion cap members (206) and a pan drive belt termination interface (208) and pan drive belt termination/adjustment interface (210). FIG. 6H illustrates a close up orthogonal bottom view of a bottom cap member (184) rotatably coupled to a mounting foot (214). FIG. 6I illustrates in cross section a heavy duty bearing interface (218) between the bottom cap member (184) and mounting foot (214). A similarly heavy duty bearing interface is interposed between the rotatably coupled top cap member (182) and upper mounting member (216).

Figure 6L:
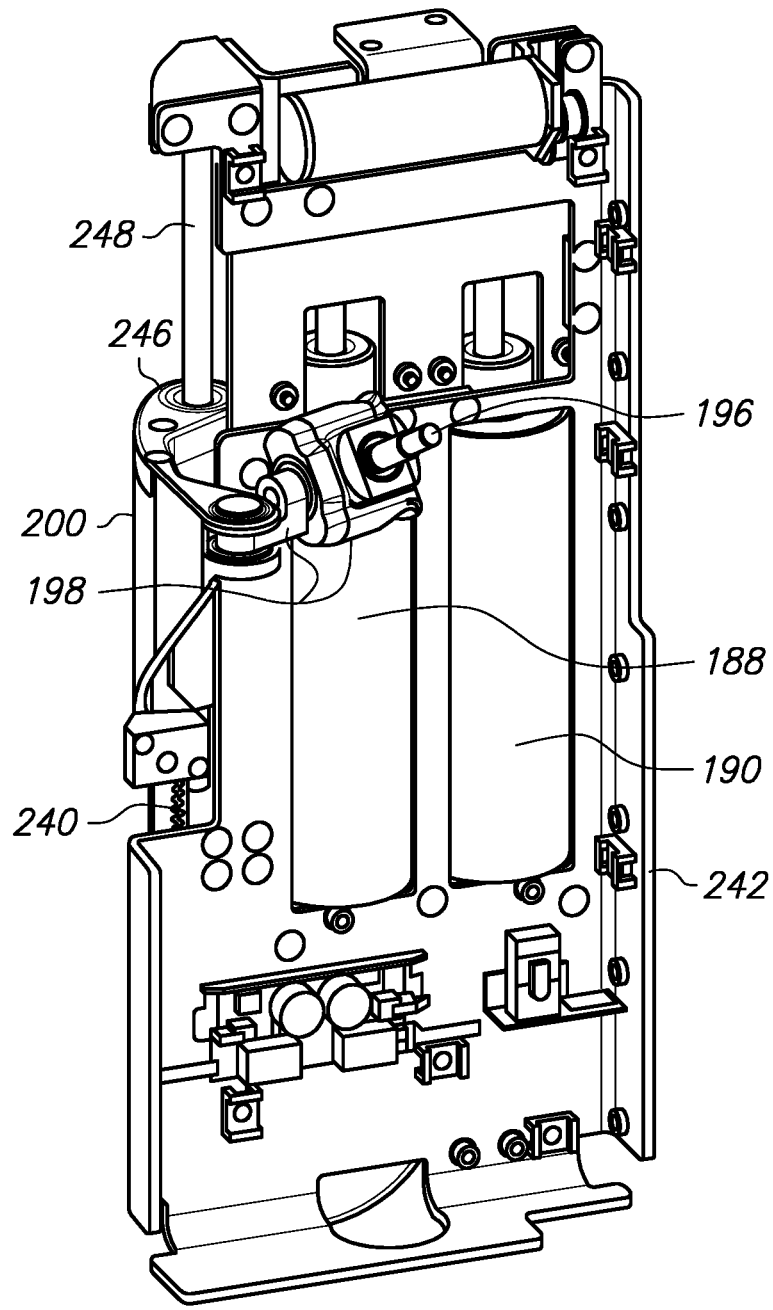
Figure 6M:
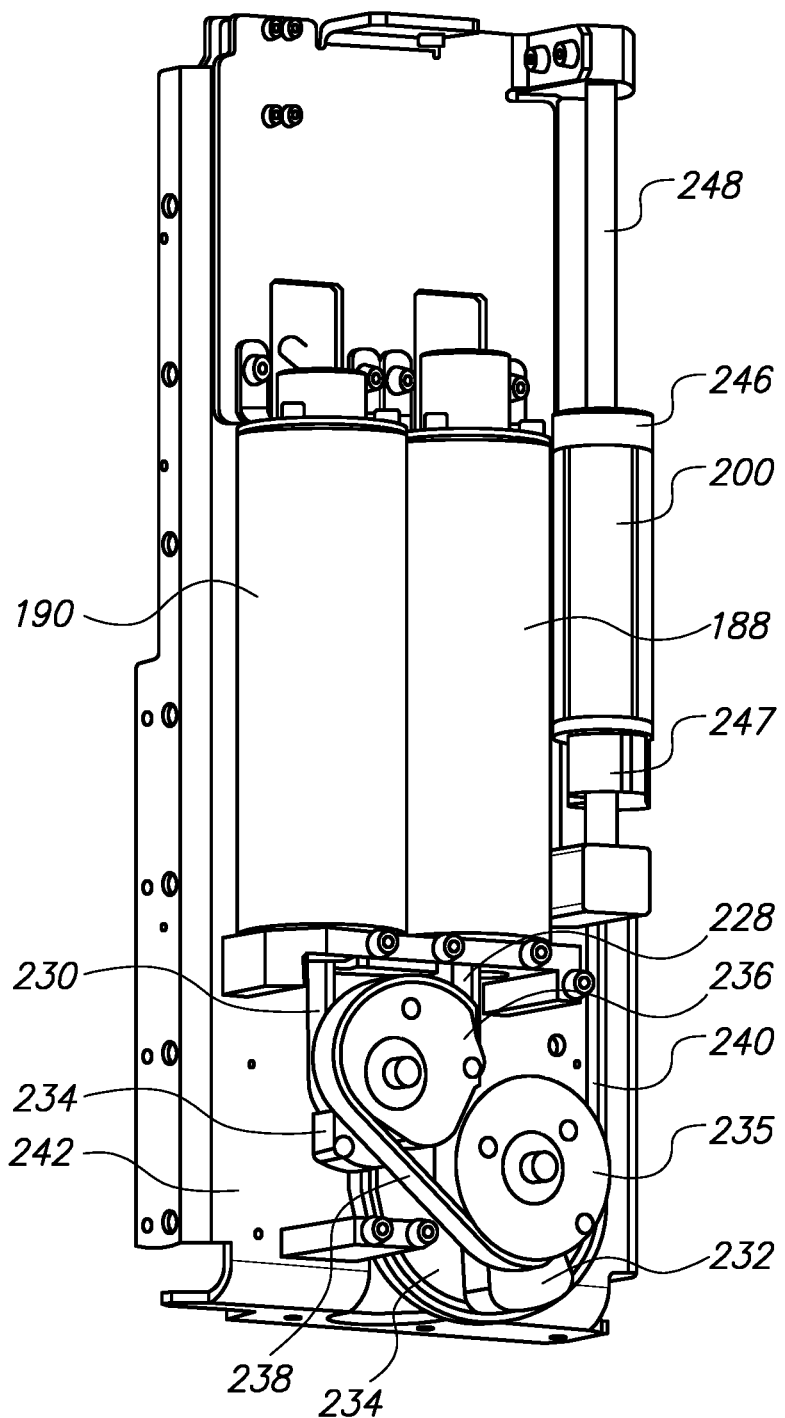

FIGS. 6J-6M illustrate aspects of one embodiment of a spring-balanced (i.e., actuated using a mechanical spring assembly as opposed to an electromechanical actuator—so that the gravity compensation is operational regardless of the power state of the associated robotic system) gravity compensation mechanism. Referring to the cross sectional view of FIG. 6J, the first spring can (188) contains a compressed compression spring which may be adjusted using a spring adjustment bolt (222). Similarly, the second spring can (190) contains a compressed compression spring which may be adjusted using a spring adjustment bolt (220). Compressive loads from the springs are applied against the depicted pistons (219, 220) to cause tensile loads in the spring can output belts (228, 230). These output belts (228, 230) wrap around and are terminated upon belt/pulley interface members (232,234). The first belt/pulley interface member (232) is fixedly coupled to a pulley (235) which operates the final output belt (240), which is coupled to the elevator assembly (200). Referring to the less-deep cross-sectional view of FIG. 6K, the second belt/pulley interface member (234) is coupled to a pulley (236) which is coupled by a timing belt (238), such as the fiber-reinforced timing belts available from Gates Corporation of Denver Colo., to an additional pulley (238) which is coupled to the pulley (235) described above which is coupled to the first spring can (188) and final output belt (240). Thus, both spring cans (188, 190) work together through the depicted mechanism to apply a layered counterbalance loading schema (i.e., "layered" in that two different load versus deflection curves are being overlaid—one from the first spring can, one from the second spring can) to the elevator assembly (200) through the final output belt (240), and this layered counterbalance loading schema is directed to a counterbalancing member (310) residing within the upper arm assembly, as described below, through the elevator assembly (200), gimbal assembly (198), and interface rod (196). The gimbal assembly (198) provides freedom of motion as the elevator and counterbalancing rod are moved relative to each other, while remaining coupled through the gimbal assembly (198). The spring cans (188, 190) are designed to provide gravity counterbalancing for the upper arm and forearm assemblies—to assist in making these assemblies "float" or function as though they have less gravity, even when the power to the robotic system has been turned off. As opposed to the spring based counterbalancing mechanism disclosed in U.S. patent application Ser. No. 12/626,187 (U.S. Publication No. 2010-0243344), incorporated hereby by reference in its entirety, the spring cans in the subject embodiment are not actively adjusted using takeup drums during counterbalancing. A similar four bar linkage arrangement is utilized as in the aforementioned incorporated application, but in the subject embodiment, the spring cans are adjusted to counterbalance the forearm assembly (16) and make it substantially "float" relative to gravity. Then an adjustment between the upper arm counterbalance interface rod (196) and the counterbalancing member (310) to lengthen or shorten the dimension of this interface is made to get the upper arm assembly (14) to substantially "float" relative to gravity. With such a configuration, both the upper arm (14) and forearm (16) assemblies may be gravity compensated. In one embodiment, the nominal load in each of the spring cans is about 130 lbs, and this may be adjusted up to about 40% by modifying the relationship between the the upper arm counterbalance interface rod (196) and the counterbalancing member (310). The cam geometry of one of the pulleys (236) is configured to make the system of two spring cans operate like one constant force acting to counterbalance the arm assemblies. FIGS. 6L and 6M illustrate non-cross sectional views of similar assemblies to show the pertinent mechanism portions three-dimensionally relative to each other.

Figure 7A:
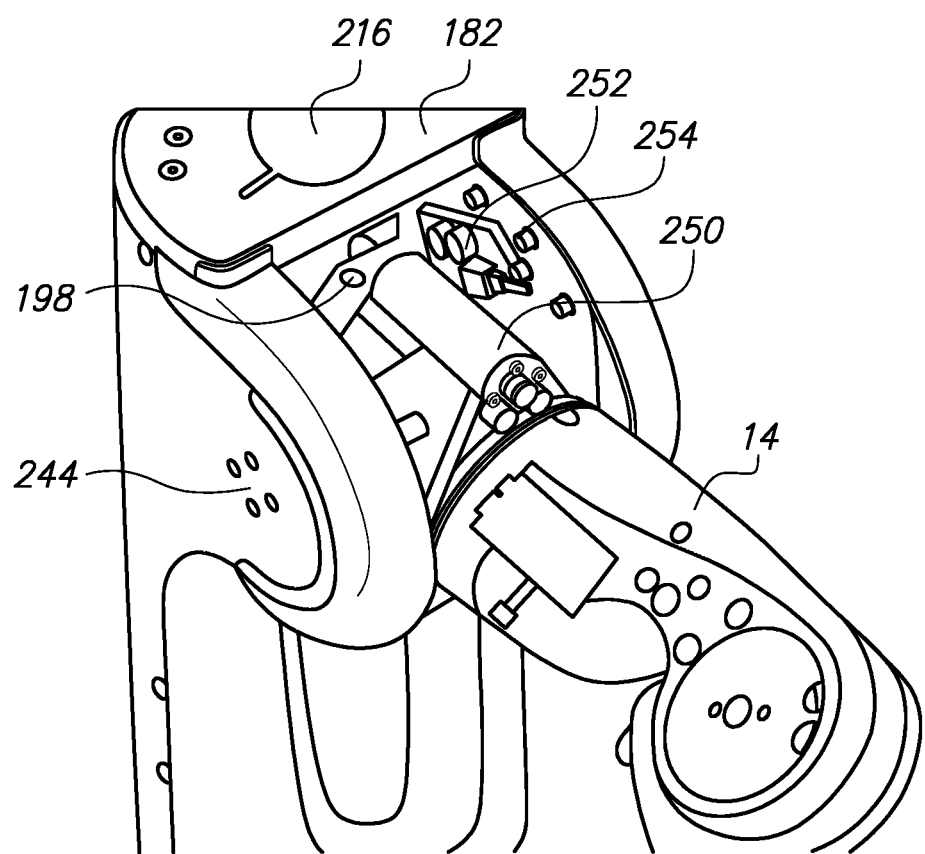
FIGS. 7A-7Z illustrate various orthogonal schematic views of various aspects of an electromechanical shoulder assembly for a personal robotics system at various levels of assembly.
Figure 7B:
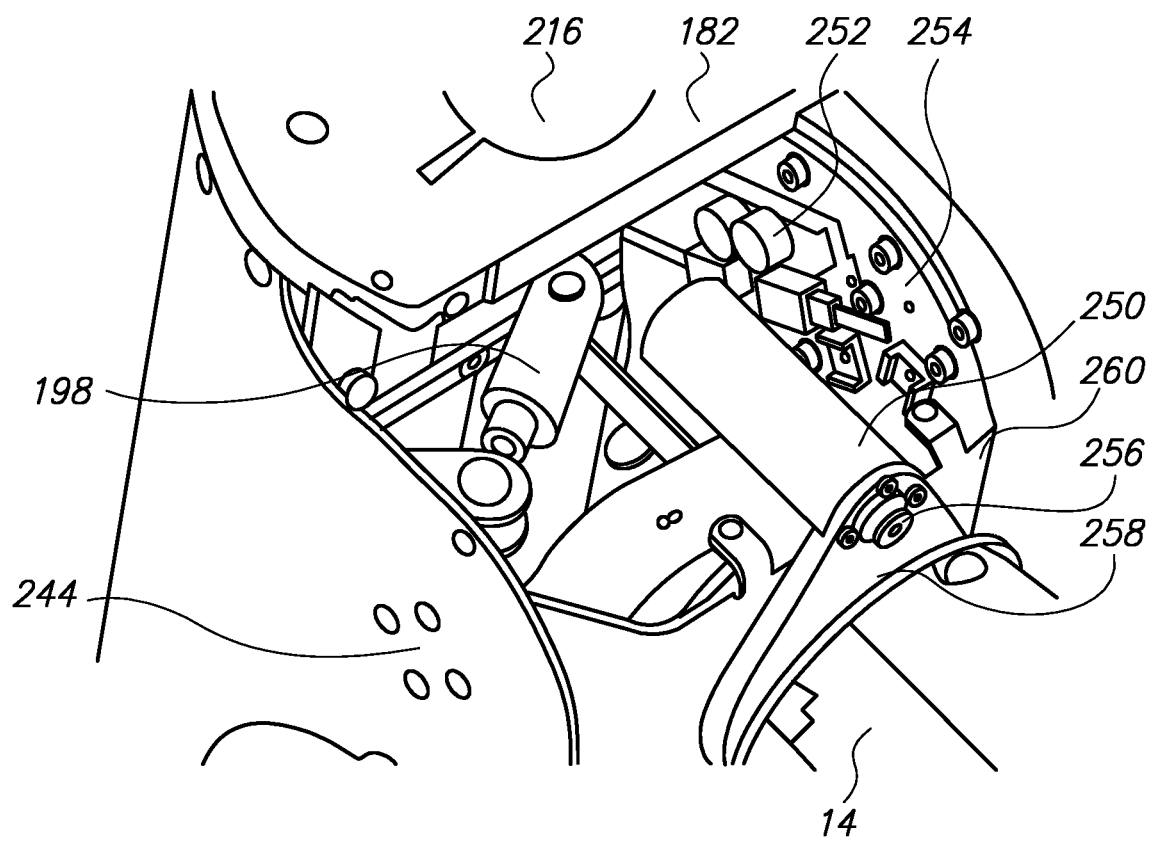
Figure 7C:
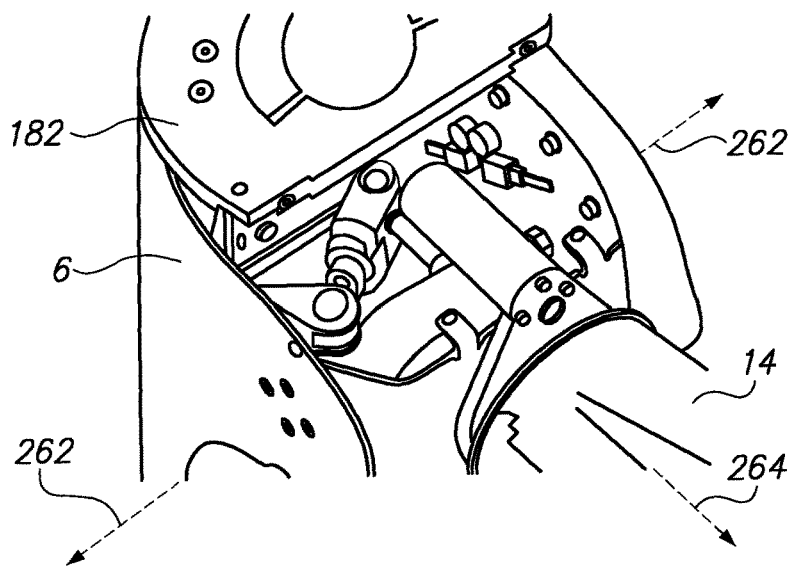
Figure 7D:
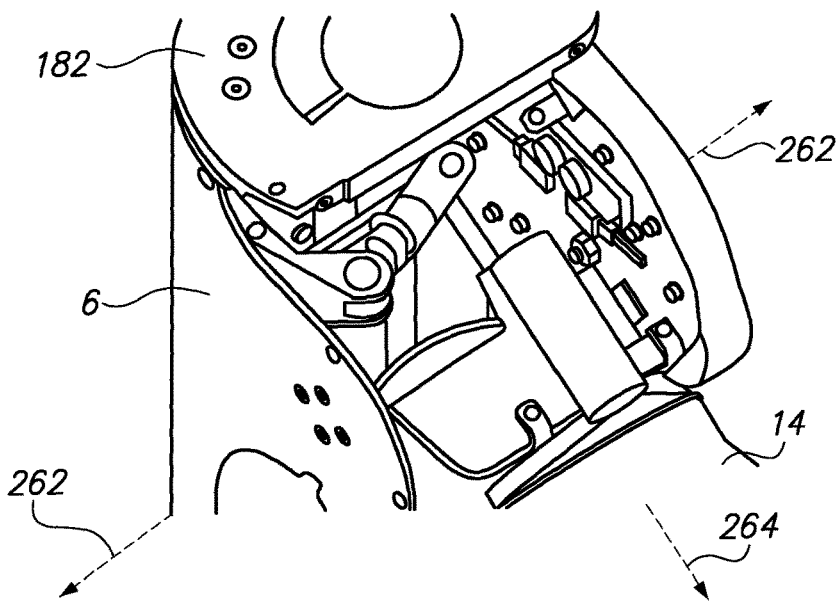
Figure 7E:
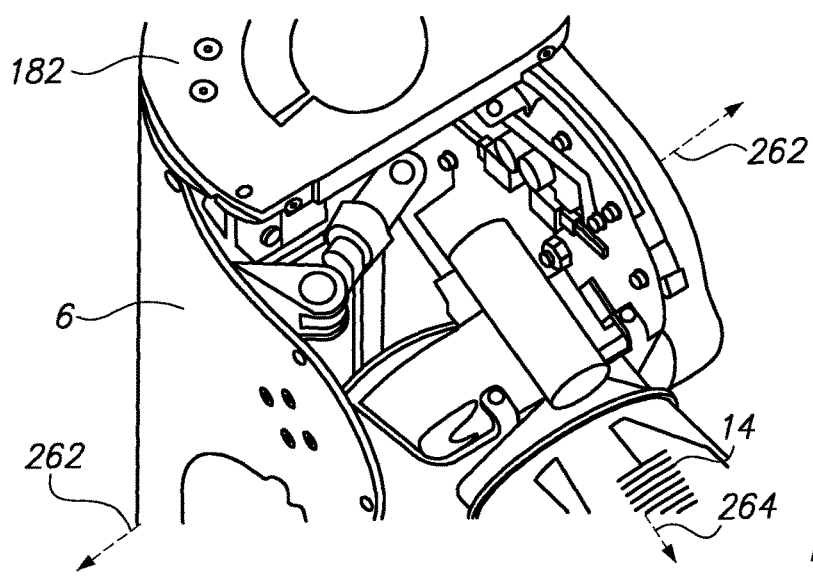
Figure 7F:
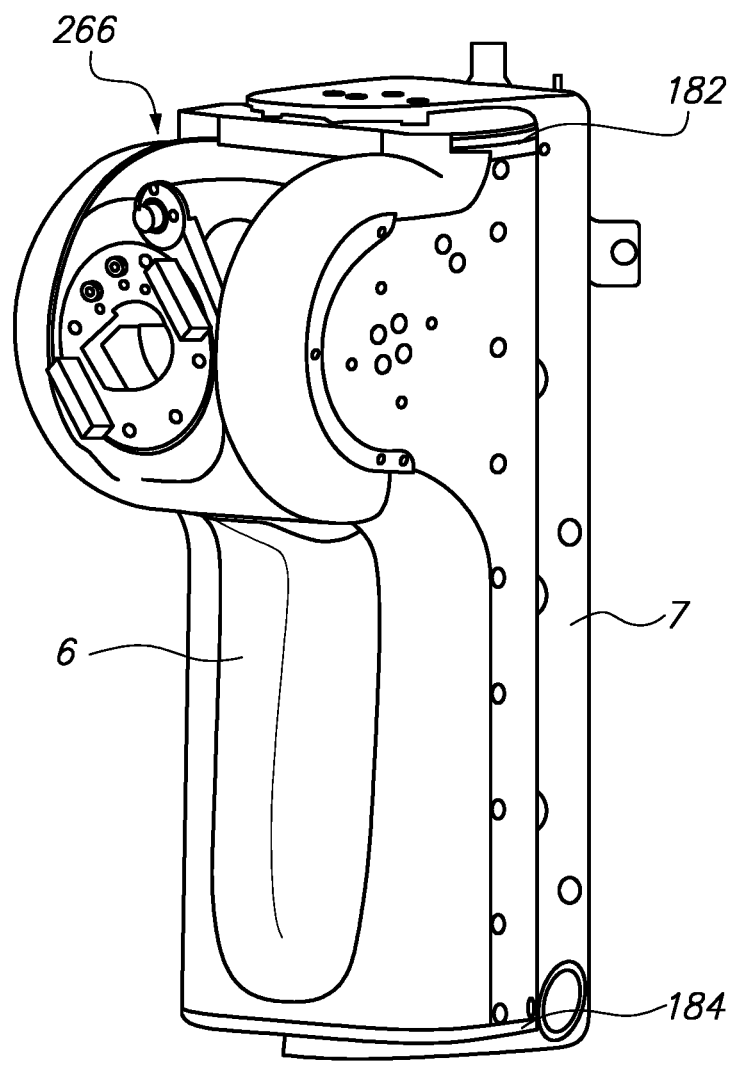
Figure 7G:
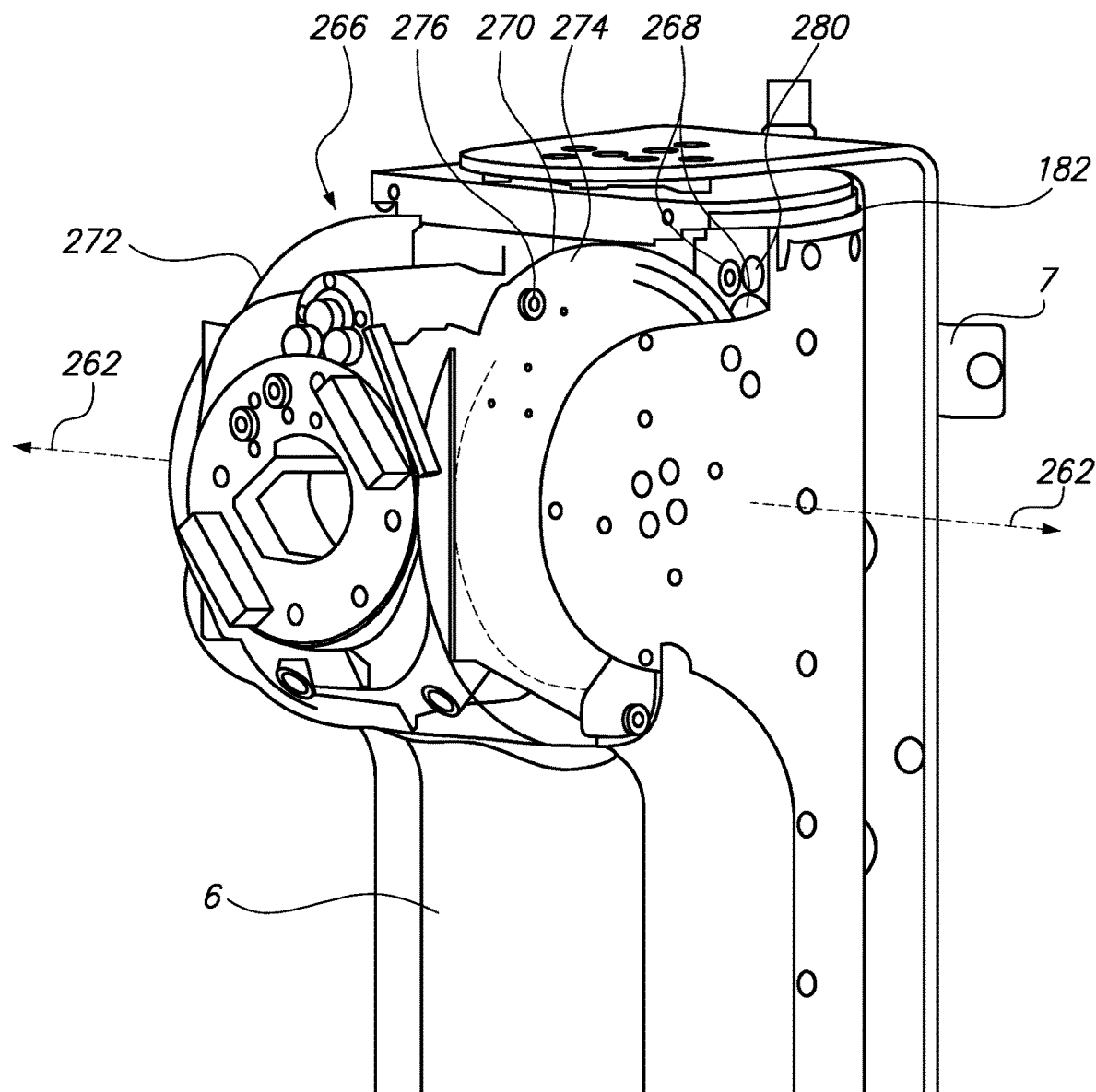
Figure 7H:
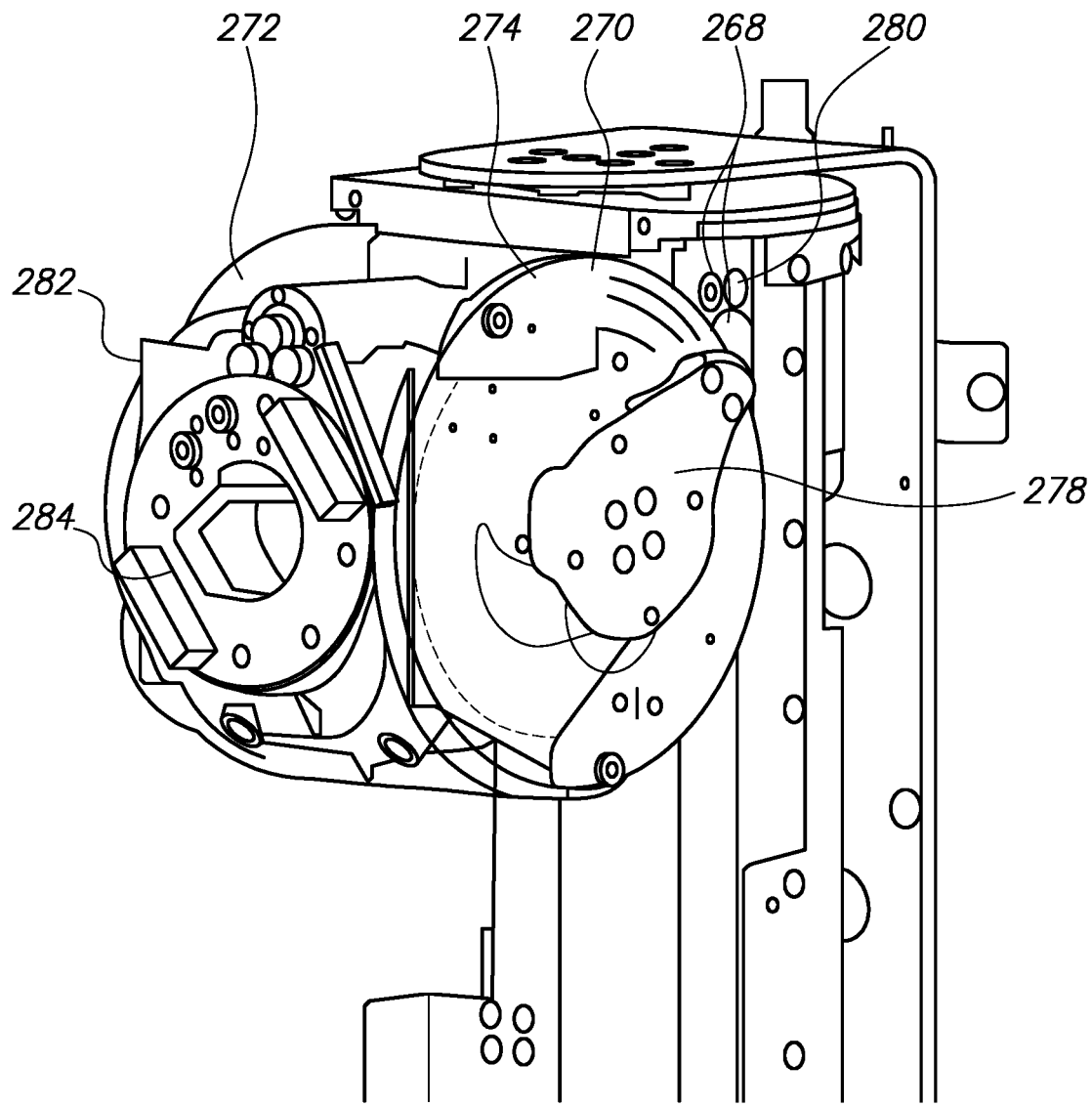
Figure 71:
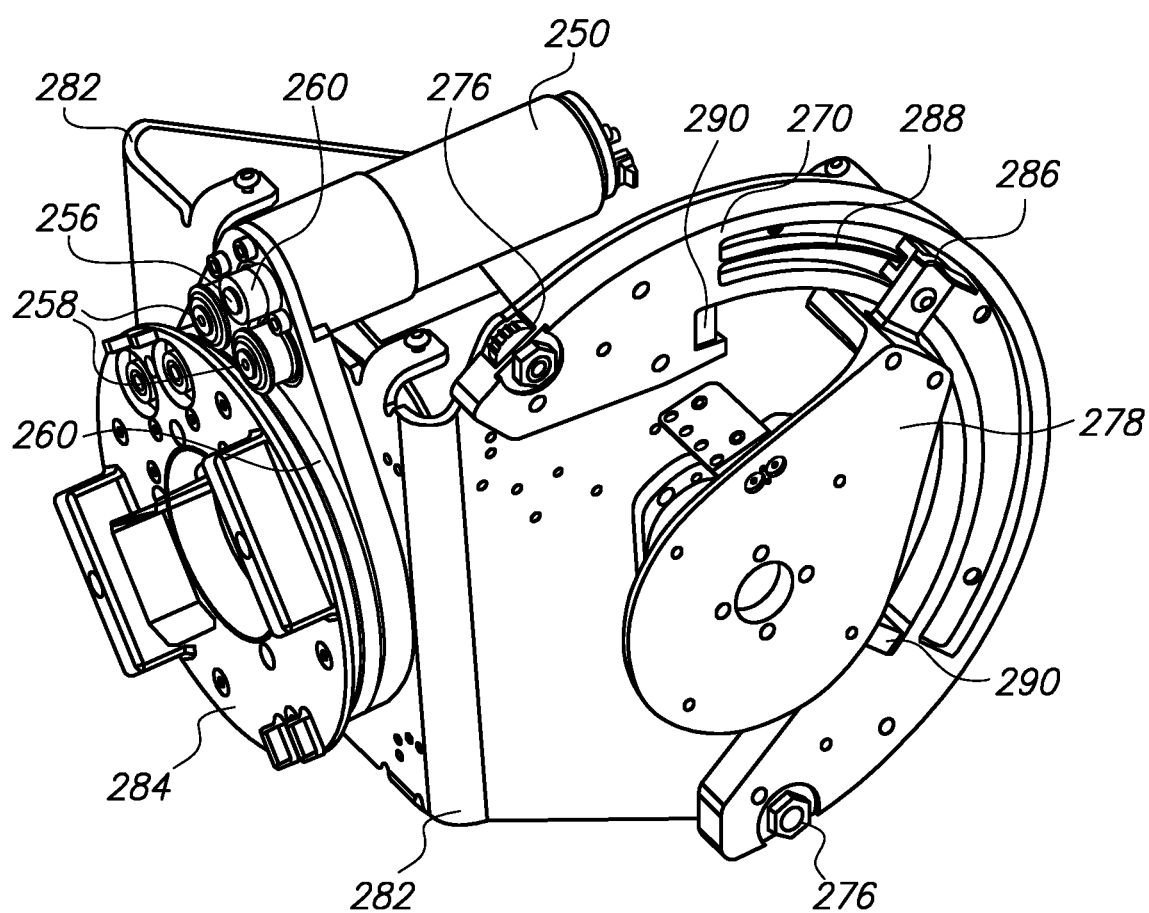
Figure 7J:
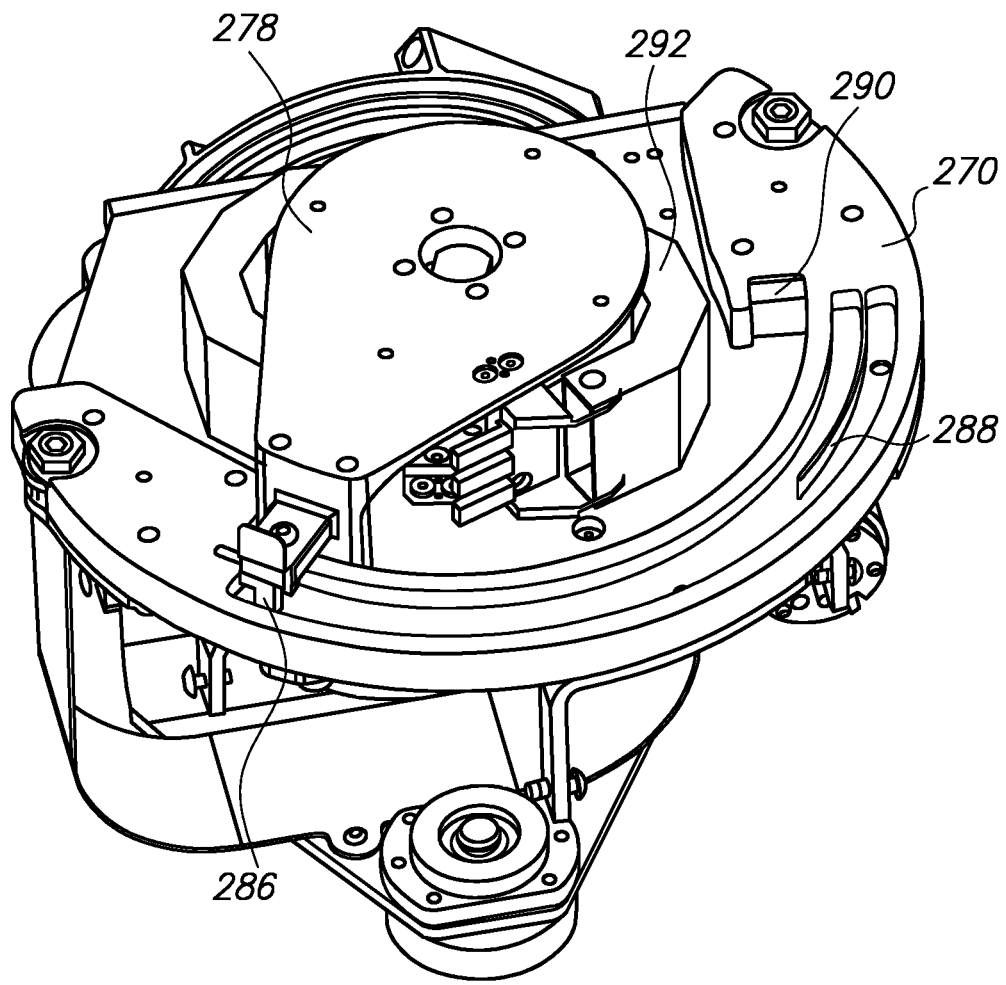
Figure 7K:
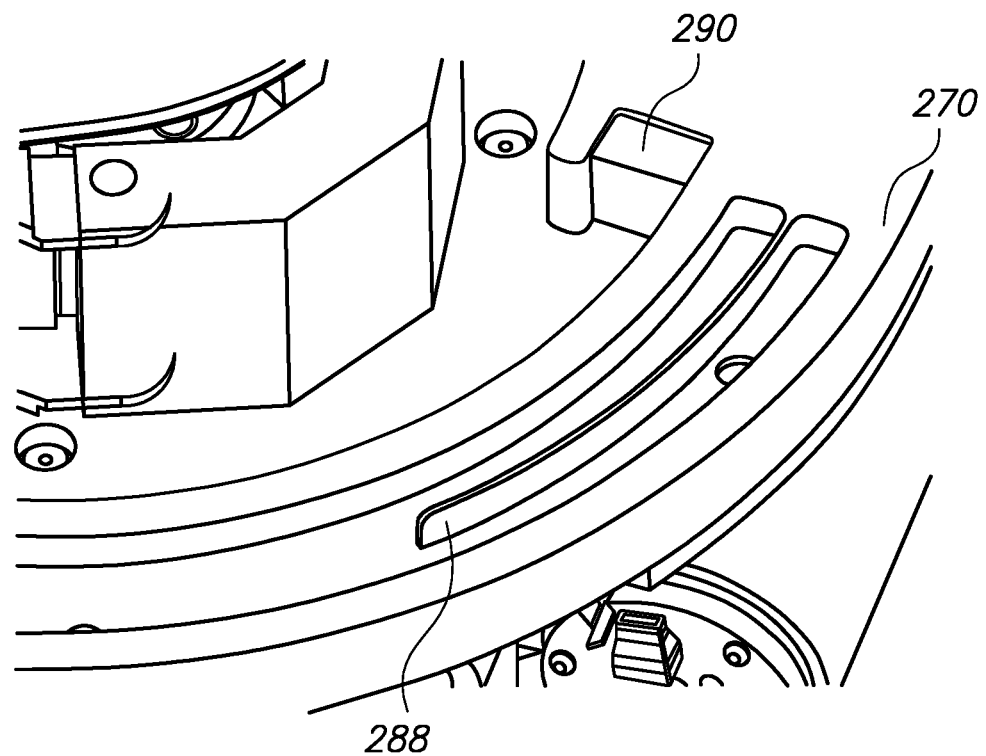
Figure 7L:
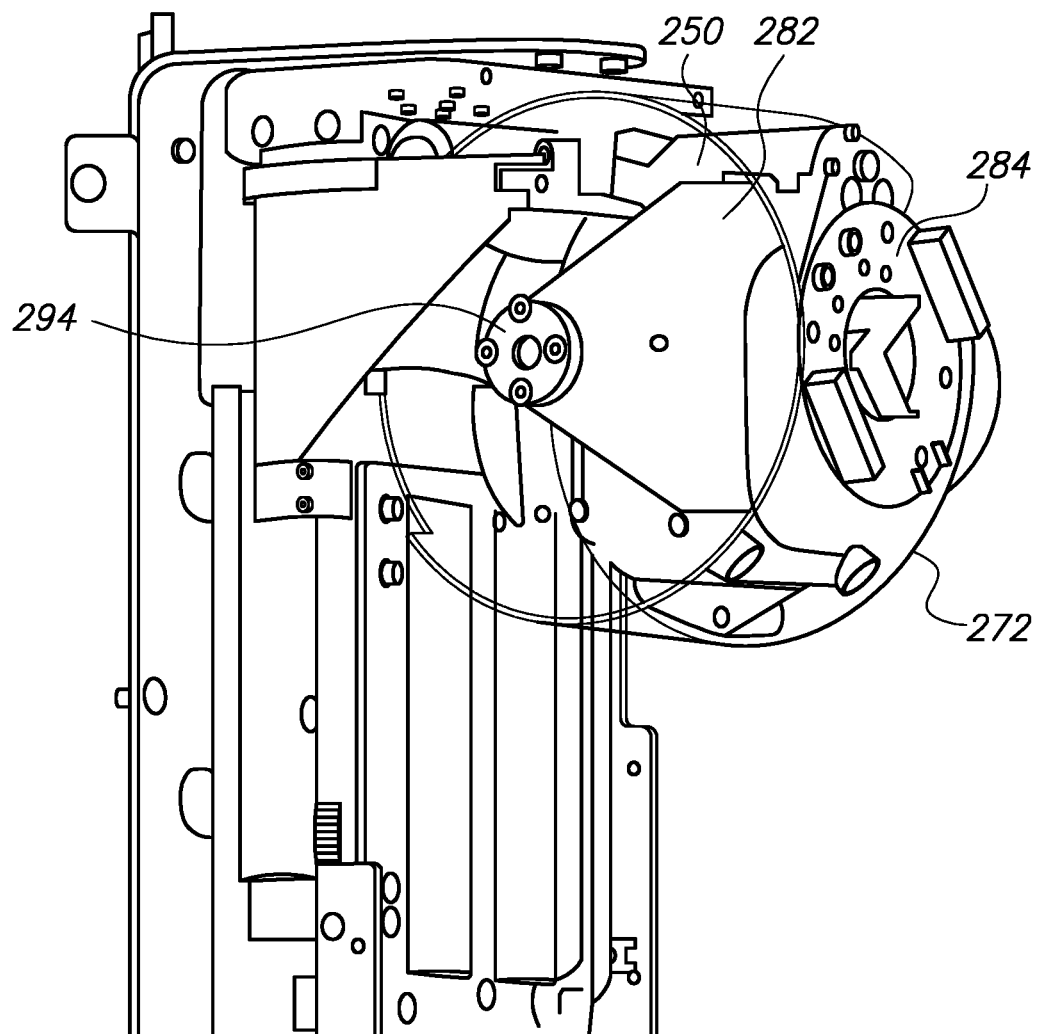
Figure 7M:
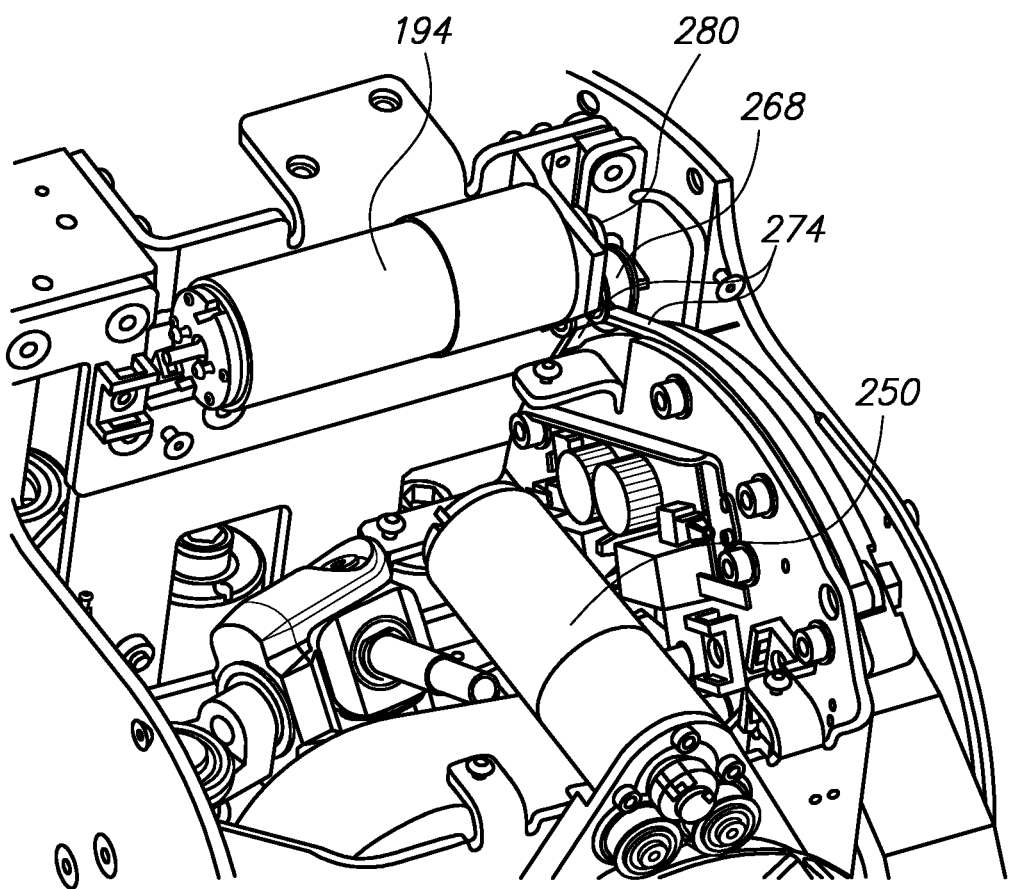
Figure 7N:
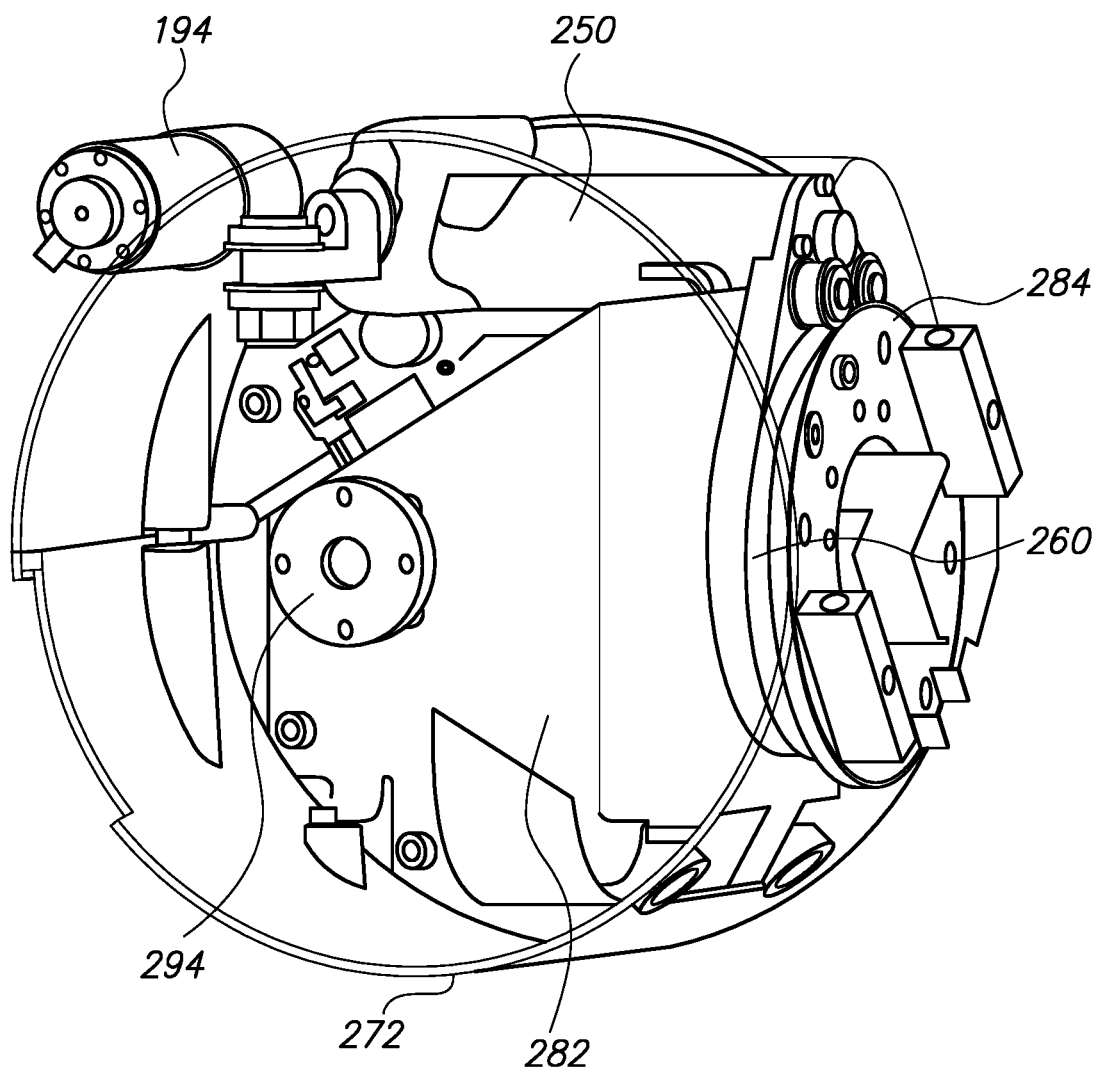
Figure 70:
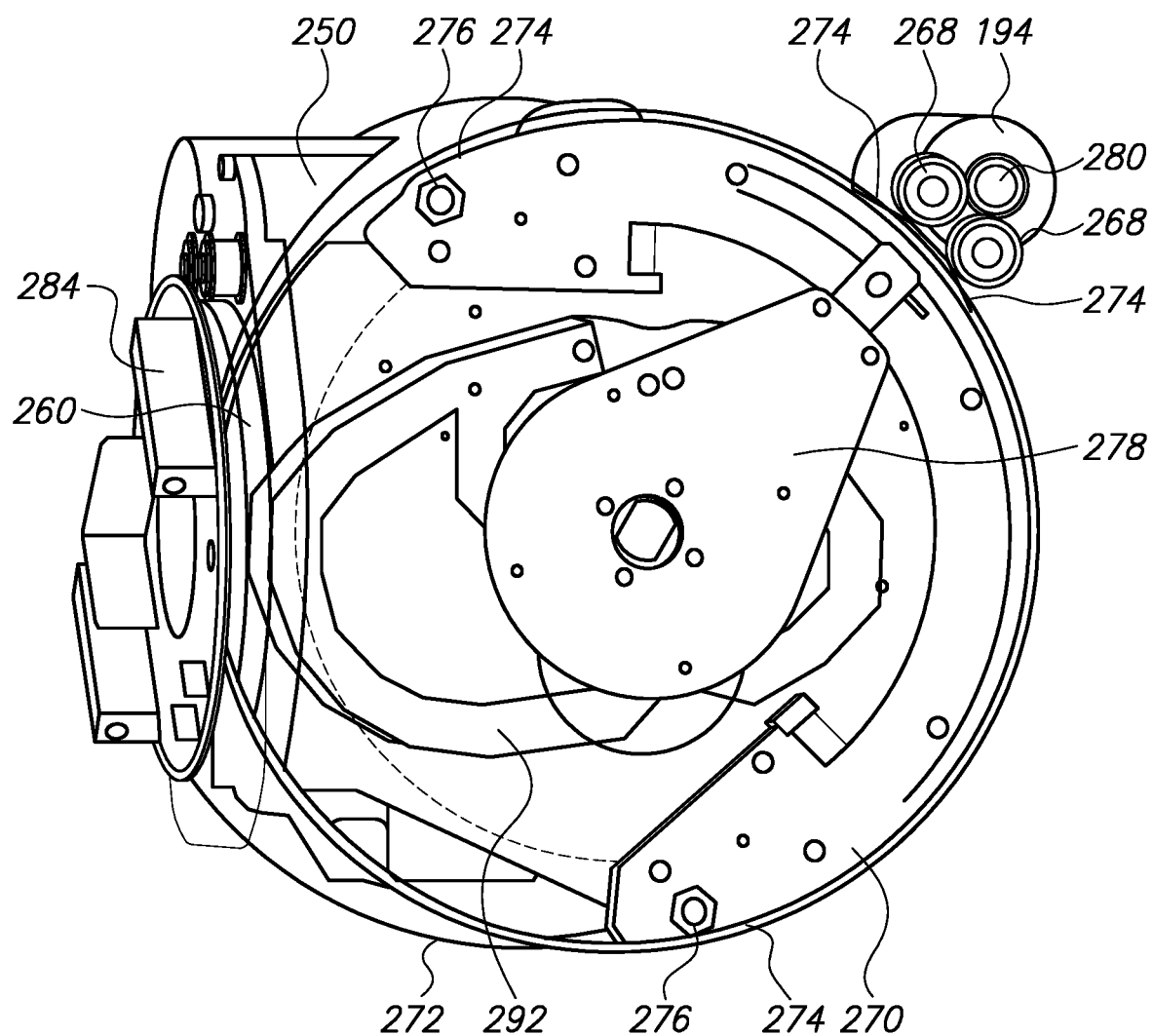
Figure 7P:
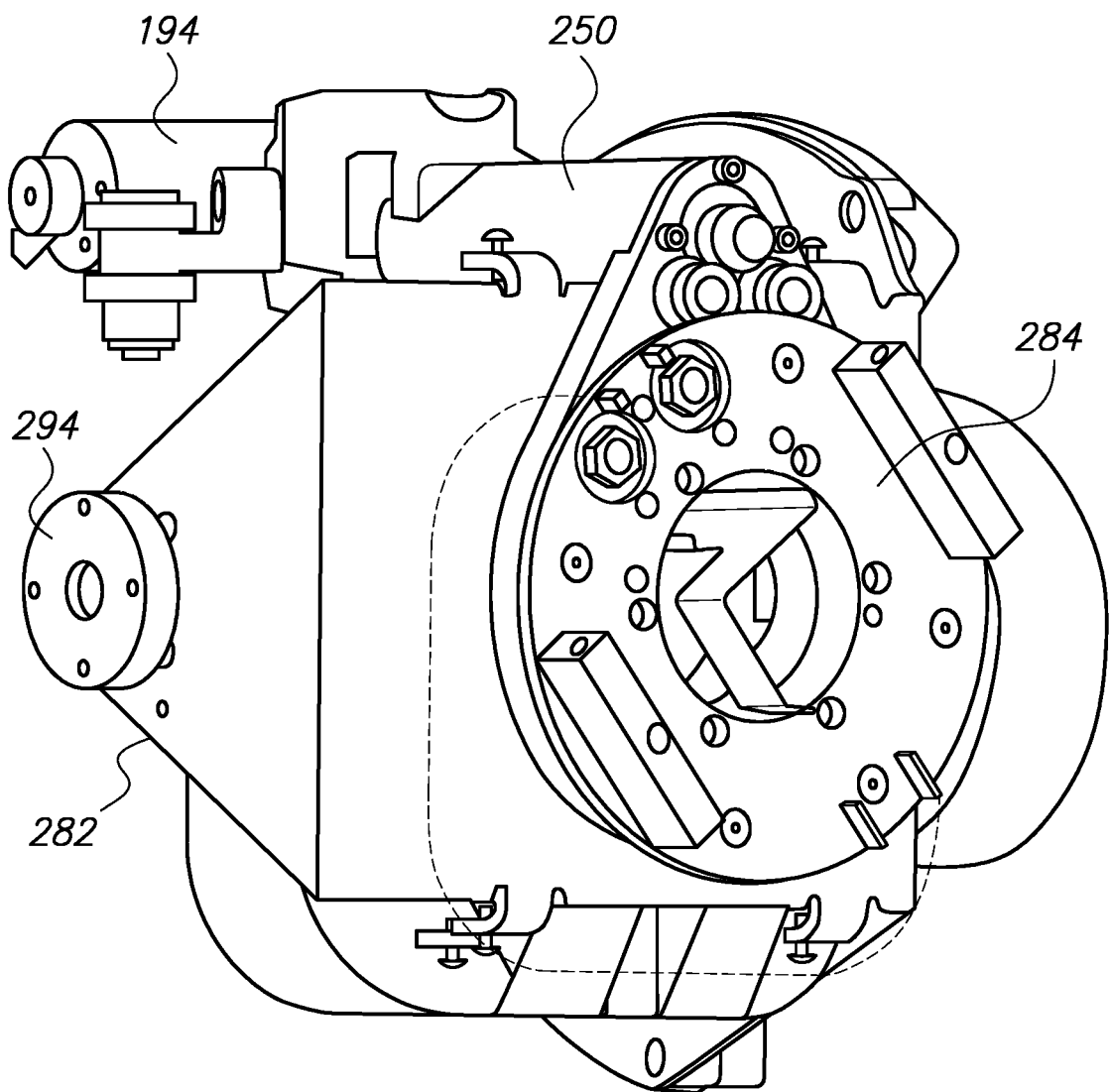
Figure 7Q:
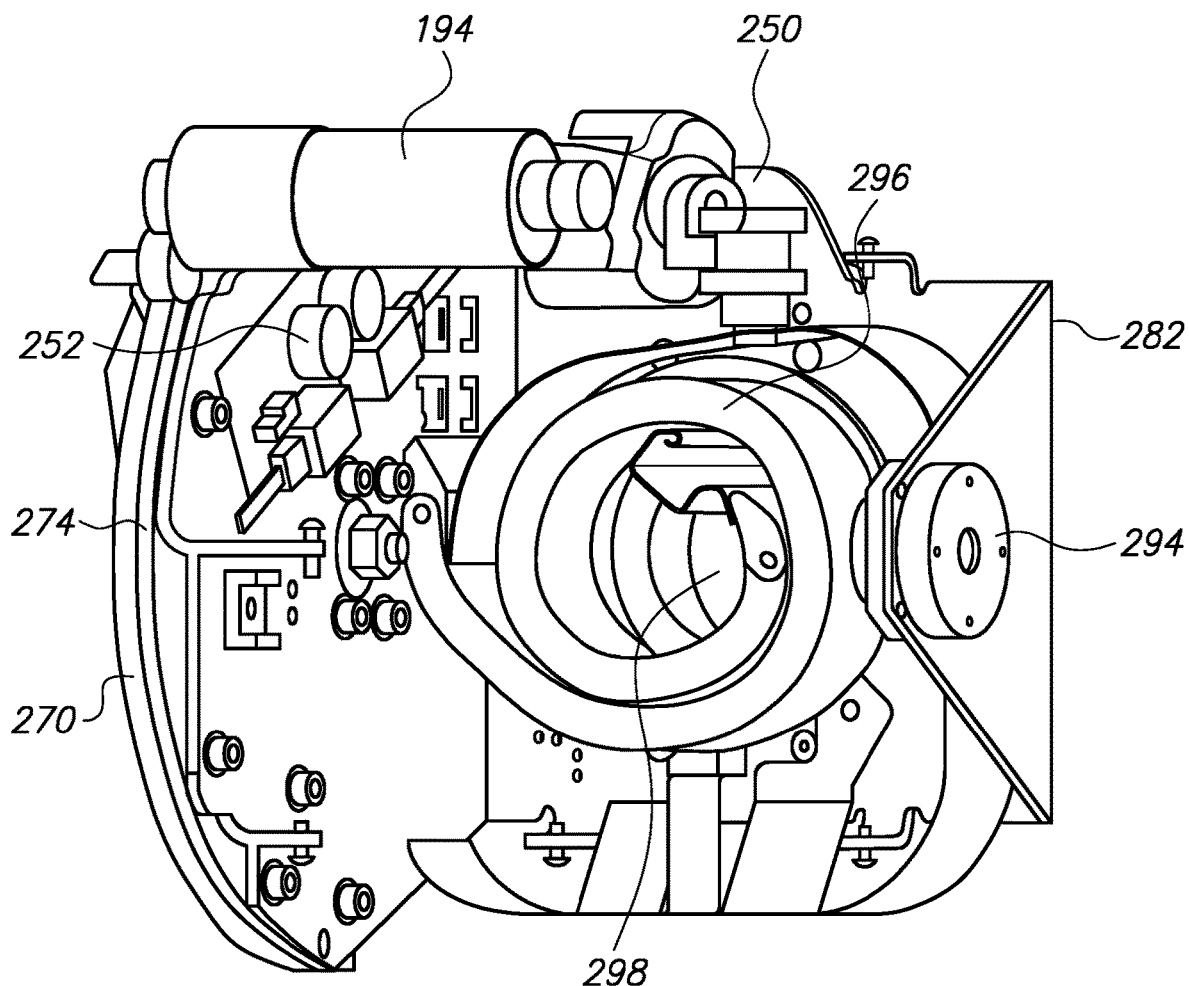
Figure 7R:
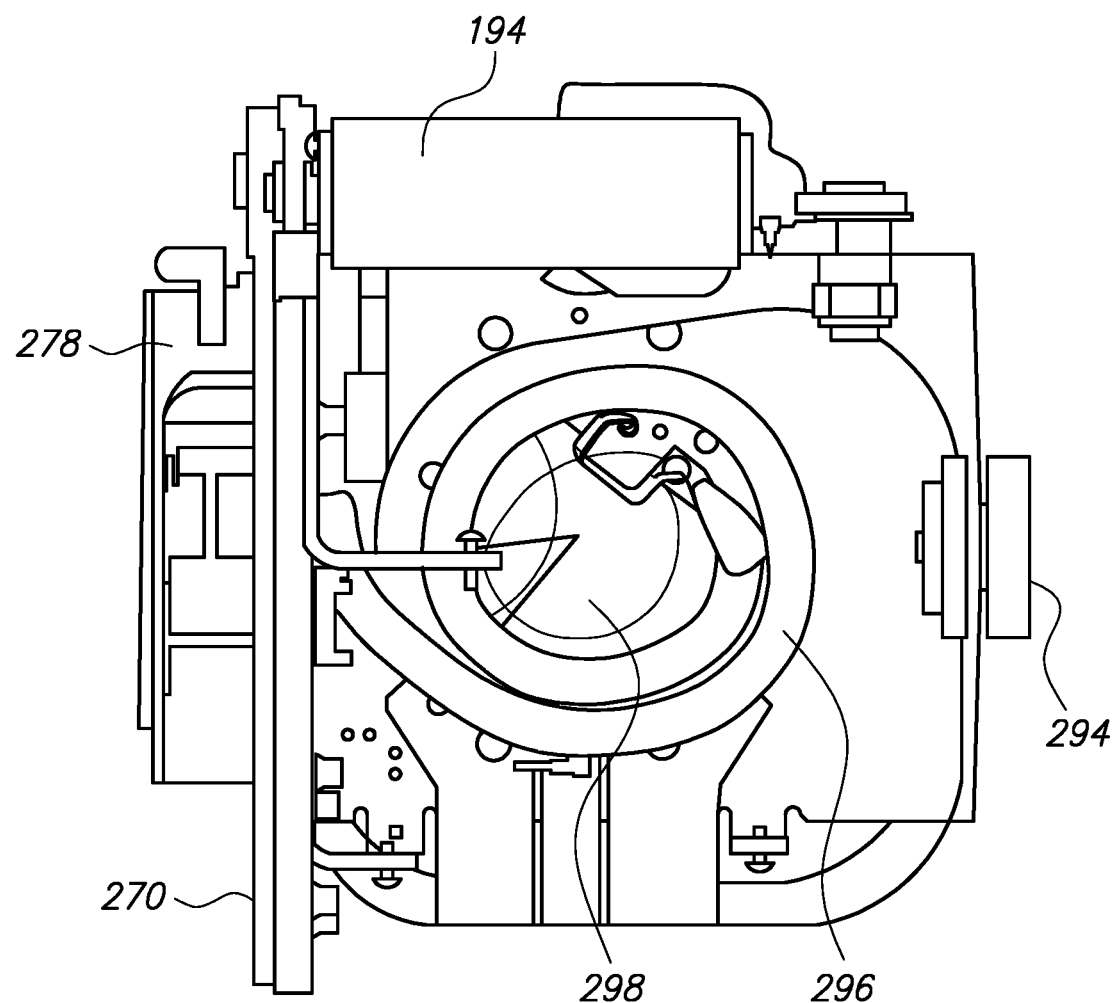
Figure 7S:
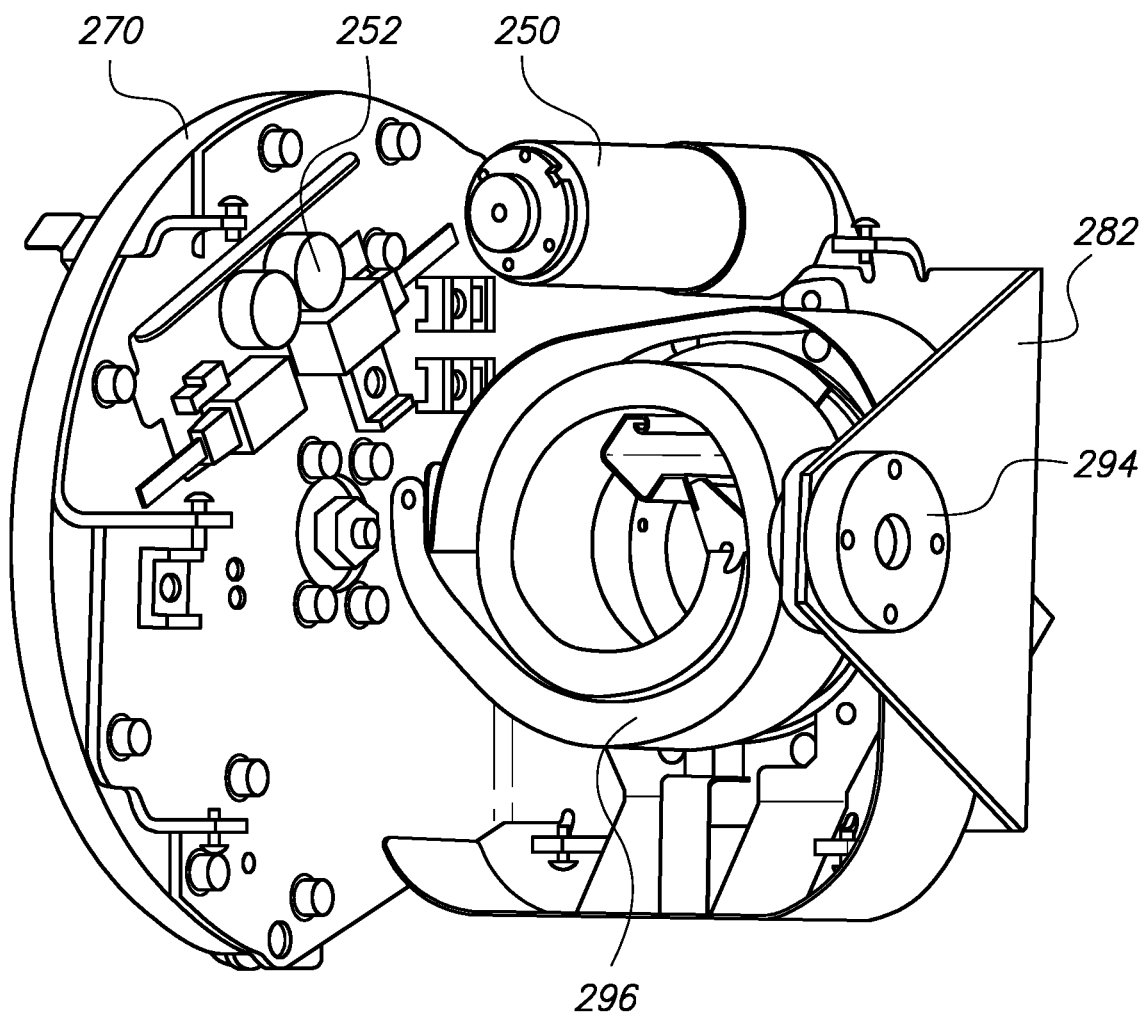
Figure 7T:
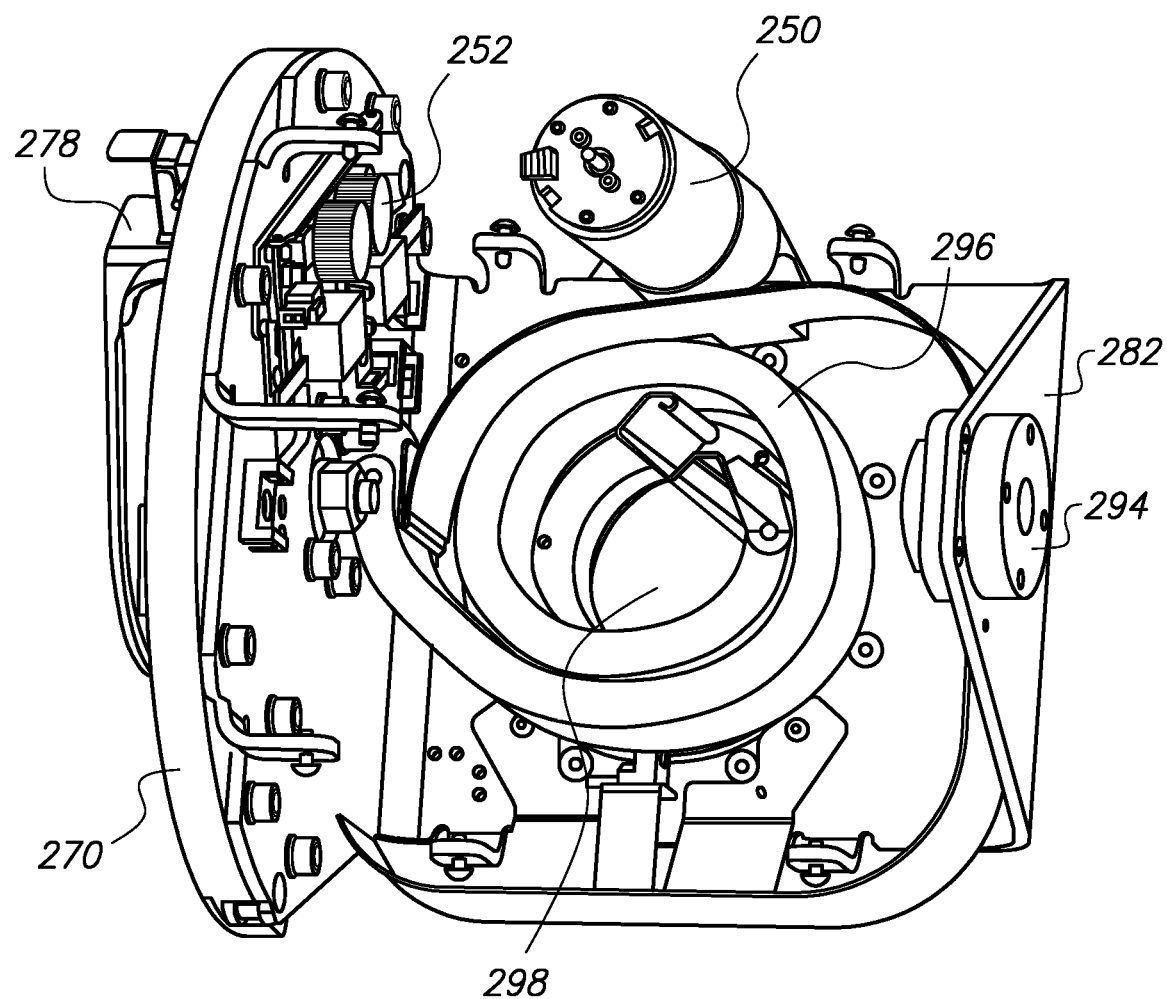
Figure 7U:
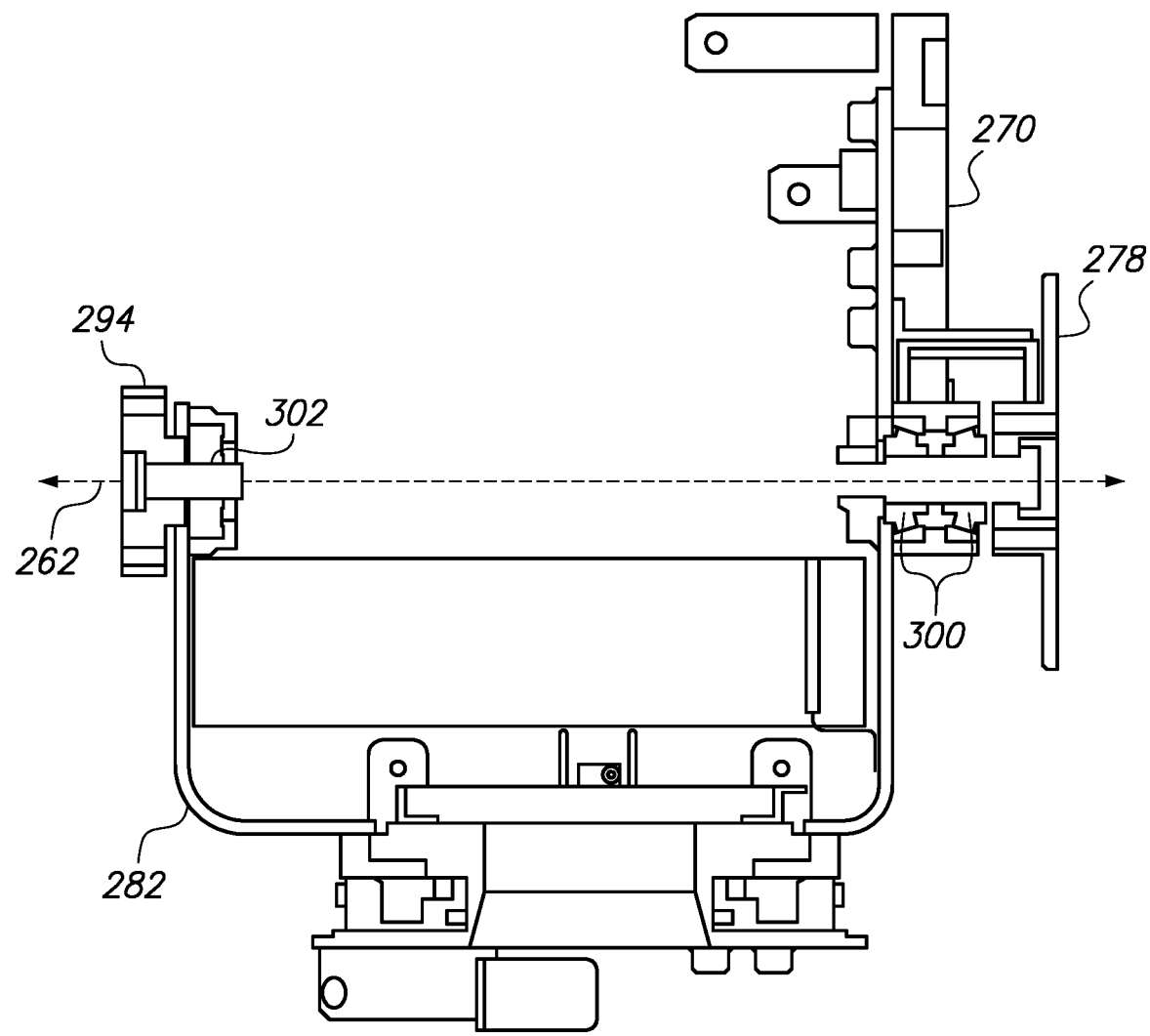
Figure 7V:
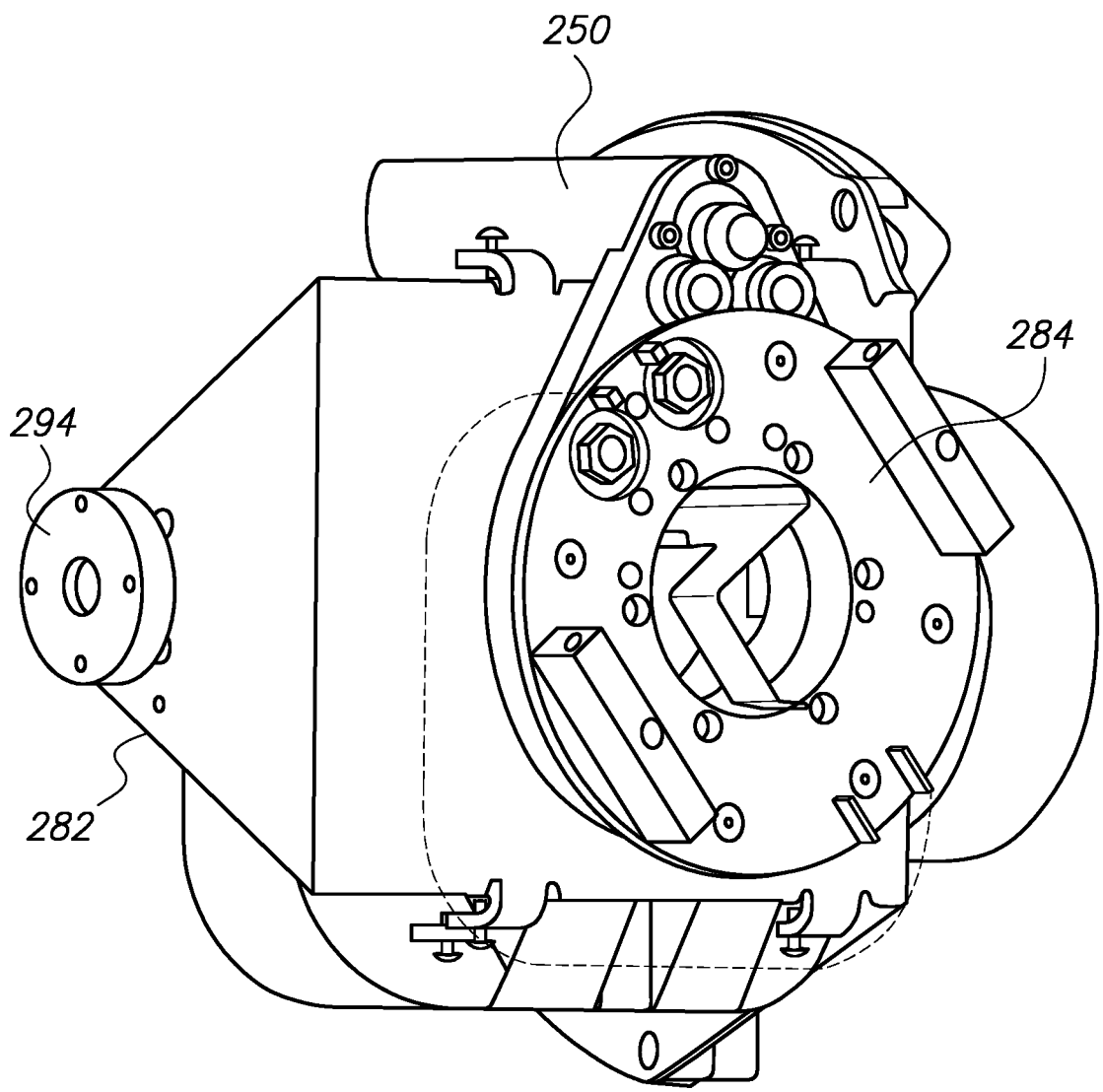
Figure 7W:
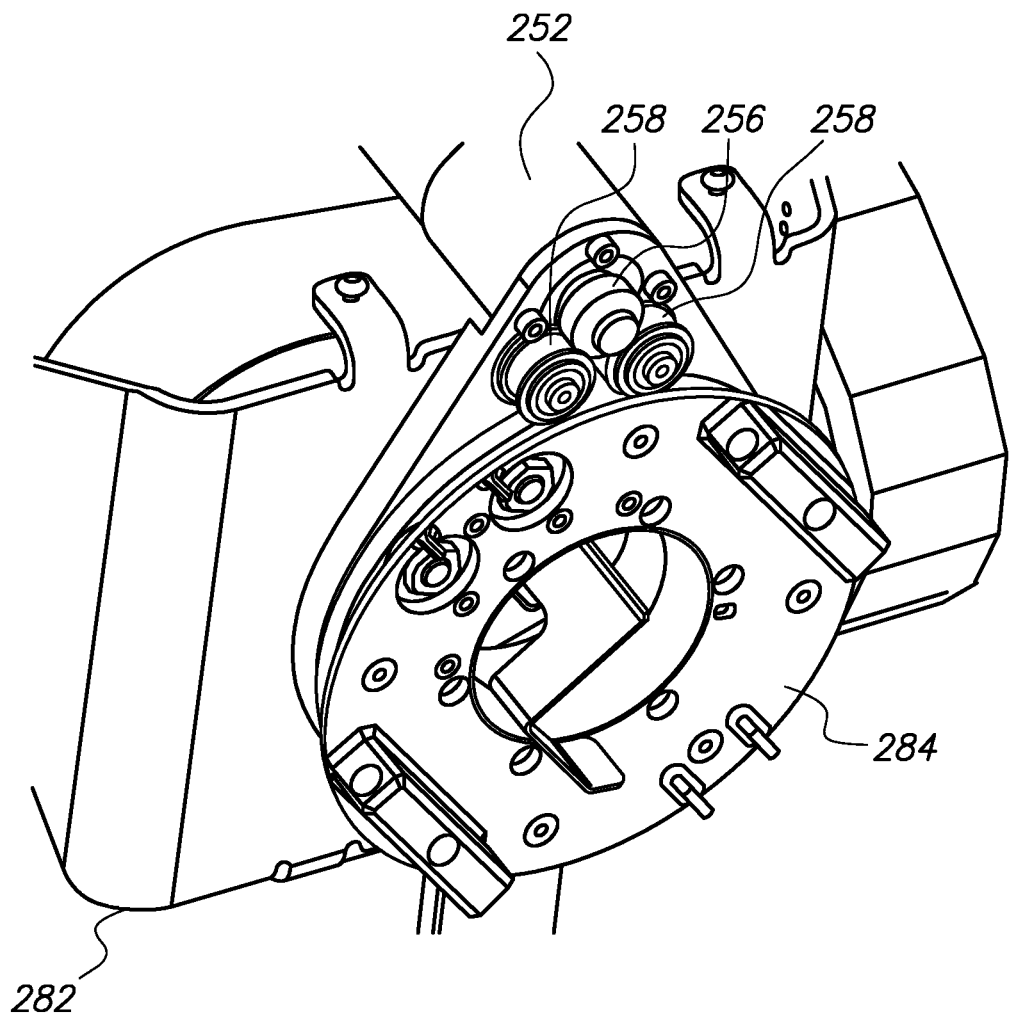
Figure 7X:
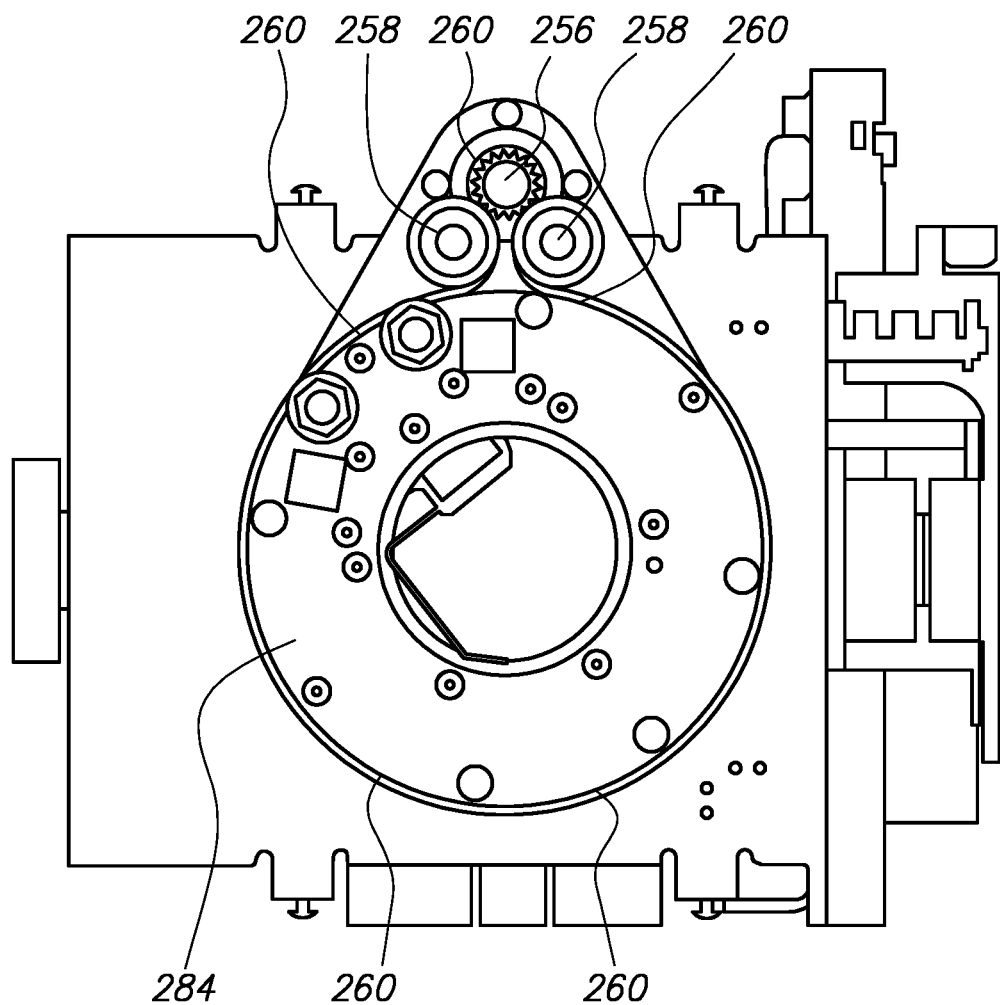
Figure 7Y:
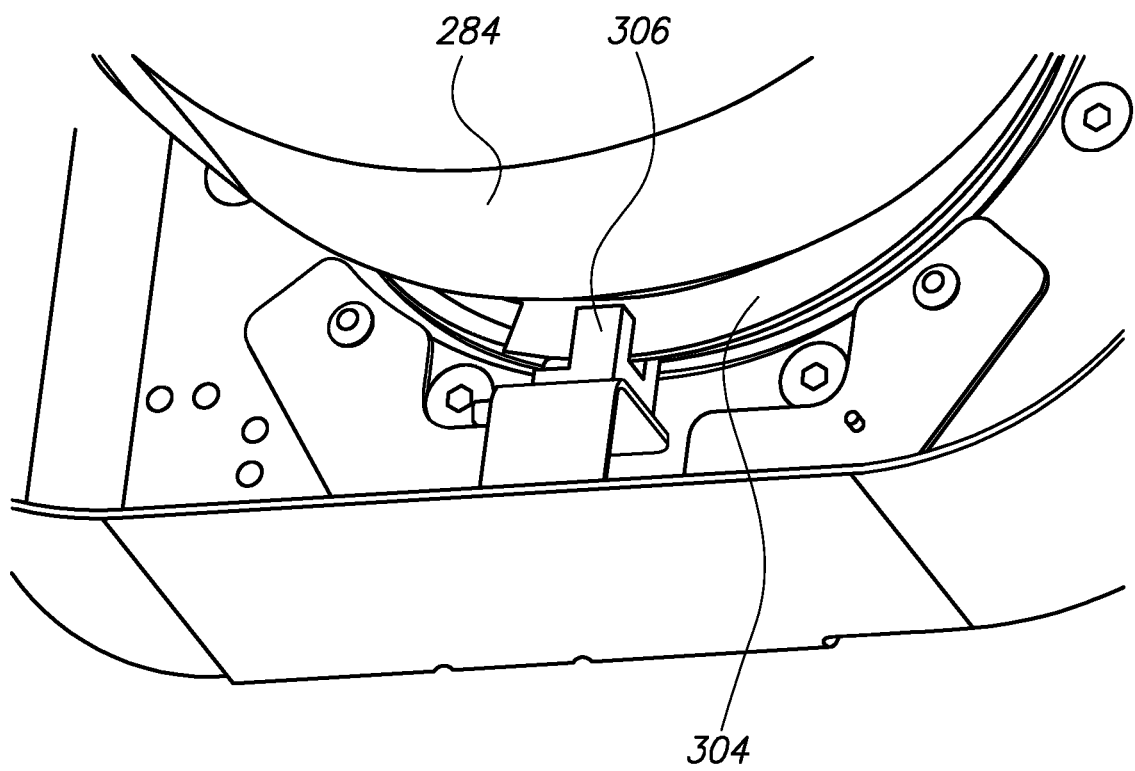
Figure 7Z:
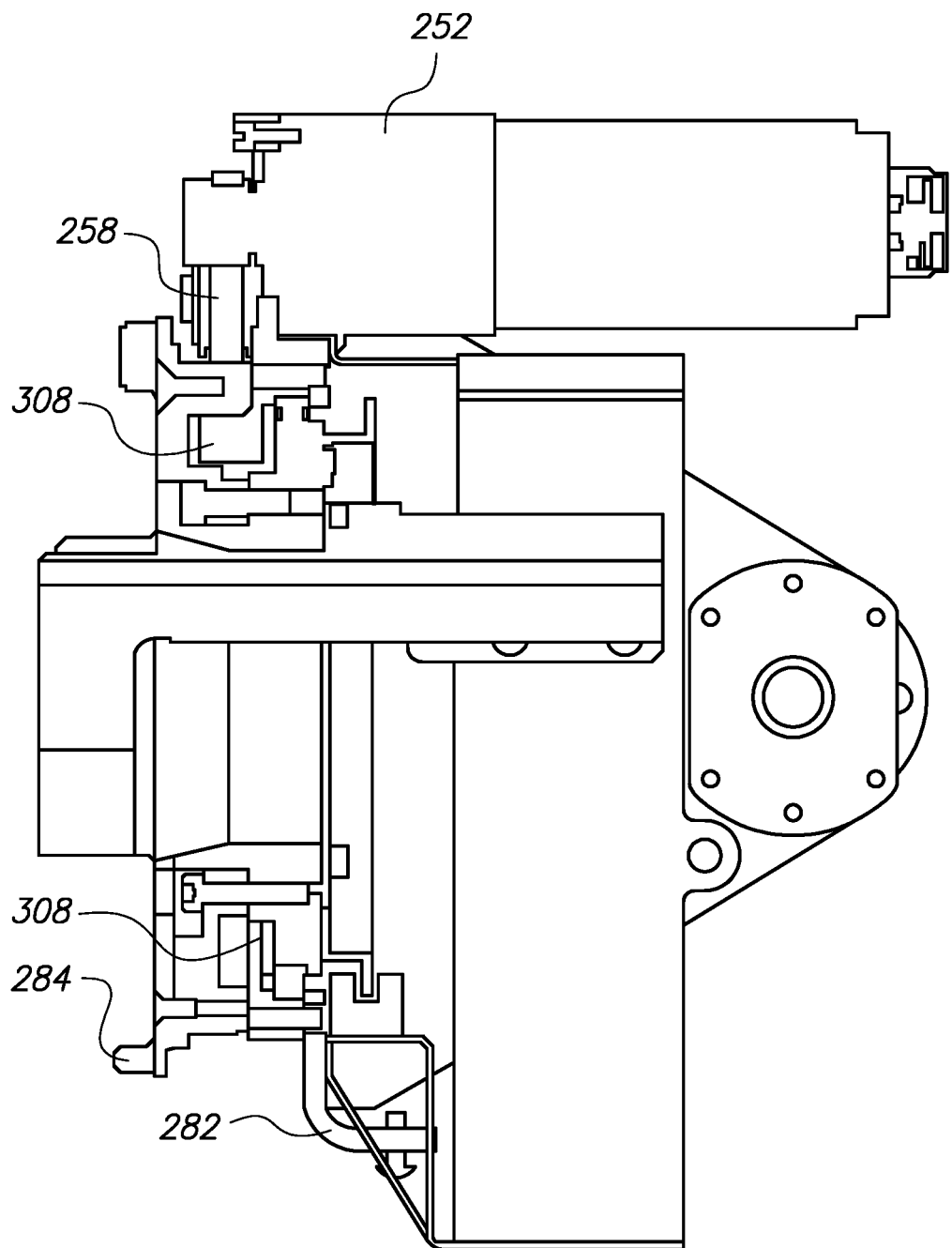

Referring to FIGS. 7A-7Z, aspects of one embodiment of a shoulder assembly interposed between an arm turret assembly and an upper arm assembly are depicted. As shown in FIG. 7A, an upper mounting member (216), top cap member (182), and shoulder interface tab (244) of an arm turret assembly are depicted. Also depicted is an upper arm assembly (14). In between the arm turret and upper arm components is a shoulder assembly comprising a mechanism for facilitating pitch rotation of the upper arm assembly relative to the arm turret assembly, and also roll rotation of the upper arm assembly relative to the arm turret assembly. FIG. 7A shows an upper arm roll motor, gearbox, and encoder assembly (250), as well as a motor control board (252) for this motor that is coupled to a shoulder frame (254). FIG. 7B shows a slightly closer orthogonal view depicting not only the upper arm roll motor, gearbox, and encoder assembly (250), but also an associated motor pulley (256), pair of pinch idlers (258), and upper arm roll actuation belt (260), such as the fiber reinforced timing belts available from Gates Corporation of Denver Colo., routed around the motor pulley (256) and idlers (258) as shown, and around a driven pulley member configured to interface with a proximal portion of the associated upper arm assembly (14) to result in electromechanically operated roll rotation of the upper arm assembly relative to the shoulder assembly. Referring to FIGS. 7C-7E, such upper arm rotation is shown incrementally over time as the upper arm is rotated about its roll axis (264) through this series of three drawings. Further, this set of figures also demonstrates the upper arm pitch axis (262).

FIG. 7F depicts a shoulder assembly (266) coupled to an arm turret assembly (6) without an upper arm assembly coupled to the shoulder assembly (266). FIG. 7G illustrates a closer orthogonal view with some of the outer members made transparent. The aforementioned shoulder pitch motor, gearbox, and encoder assembly (194) drives the depicted motor pulley (280), which drives a belt (274), such as one of aforementioned fiber reinforced timing belts, through a pair of idlers (268) and around a shoulder pitch driven pulley (270). A belt tensioner assembly (276) is depicted coupled the pulley (270). Operation of the motor drives the motor pulley (280) to drive the belt (274) to cause rotation of the pulley (270) and therefore pitch rotation of the shoulder assembly (266) about the pitch rotation axis (262). FIG. 7H depicts a further disassembled assembly, including a coupling member (278) configured to be fixedly coupled to one of the shoulder interface tabs (244) of the arm turret assembly (6), and rotatably coupled to the remainder of the shoulder assembly. Pitch range of motion is restrained with a portion of the coupling member (278) which rides through a groove formed in the driven pulley (270) and ends at each extreme of the groove with an elastomeric member configured to dampen vibrations and decrease maximum impulse loads. FIG. 7I illustrates these elastomeric dampeners (290), as well as a homing sensor configuration comprising a light beam sensor (286) and a ridge (288) formed into the pulley (270) with a discontinuity or discontinuation at a point predetermined to be a "home" position for this shoulder pitch range of motion. In other words, as described below, the control system may be configured to sense a dark (with the intermediate ridge blocking transmitted light) to light (without the intermediate ridge blocking—so light is transmitted to the other side of the sensor) transition and position such joint at a specific range of motion relative to such transition as a "home" position for such joint. Indeed, preferably each joint of the subject robotic system is equipped with such a home position sensing configuration. In one embodiment, when a home position transition up or down is sensed at the pertinent motor controller board, an encoder value is latched at that exact time—so even though the system may only have a millisecond of resolution, it is known, even if 20 encoder ticks are moved during that millisecond, precisely at which encoder tick the home position flag was hit—a valuable precision benefit.

FIG. 7I also illustrates a shoulder frame (282) which couples shoulder pitch activity to upper arm roll activity, as driven by the upper arm roll motor, gearbox, and encoder assembly (250), motor pulley (256), drive belt (260), pair of idler pulleys (258), and driven upper arm interface member pulley (284). FIG. 7J depicts a different orthogonal view of the sensor (286), ridge (288), coupling member (278), and eChain (292) wiring conduit to facilitate communications and power transfer between the arm turret assembly (6) and the shoulder assembly (266). FIG. 7K is a further close up orthogonal view of portions of the assembly featured in FIG. 7J. Referring to FIG. 7L, another shoulder-turret interface member (294) is depicted, which is fixedly coupled to the interface tabs (244) of the turret assembly (6). FIG. 7M depicts the shoulder pitch motor, gearbox, encoder assembly (194), as coupled to the arm turret assembly (6), operably coupled to cause electromechanical shoulder pitch rotation as described above. FIG. 7N depicts a partial orthogonal three dimensional view to illustrate the relative positioning of the shoulder pitch motor, gearbox, encoder assembly (194) relative to various components of the shoulder assembly. A substantially cylindrical shoulder housing (272) provides a structural frame for many elements, in addition to the shoulder frame (282). A partial side orthogonal view is depicted in FIG. 7O, wherein the shoulder pitch driven pulley (270), drive belt (274), belt tensioning assemblies (276), and eChain (292) are shown. A further disassembly is depicted in FIG. 7P, and in a different orthogonal view in FIG. 7Q, showing an upper arm roll eChain (296) configuration placed to allow the transfer of signals between the shoulder and the upper arm. A tunnel volume (298) for a counterbalancing bar, as well as certain wires, is depicted through the shoulder assembly in FIGS. 7Q and 7R. FIG. 7S shows a further disassembled view clearly depicting the upper arm roll motor, gearbox, encoder assembly (250) and associated motor controller board (252); FIG. 7T depicts a wireframe version of a similar partial assembly. FIG. 7U depicts a partial cross sectional view of a shoulder assembly to illustrate the shoulder pitch rotation axis (262) and heavy duty bearing (300, 302) interfaces between the shoulder turret interface member (294) and shoulder frame (282), and between the shoulder frame (282) and coupling member (278). FIGS. 7V-7X further illustrate aforementioned portions of the shoulder assembly pertinent to electromechanically driven upper arm roll rotation. FIG. 7Y illustrates a partial orthogonal close up view of an upper arm coupling interface member (284) having a homing ridge (304) defined thereon, and configured to rotate through a sensor (306), such as a light transmission sensor—to facilitate home positioning with a predetermined dark-light sensed transition, as described above in reference shoulder pitch homing. FIG. 7Z illustrates a partial cross sectional view to show that roll of the upper arm coupling interface member (284) relative to the shoulder frame (282) is facilitated by a heavy duty ring bearing (308) interposed between such structures.

Figure 8A:
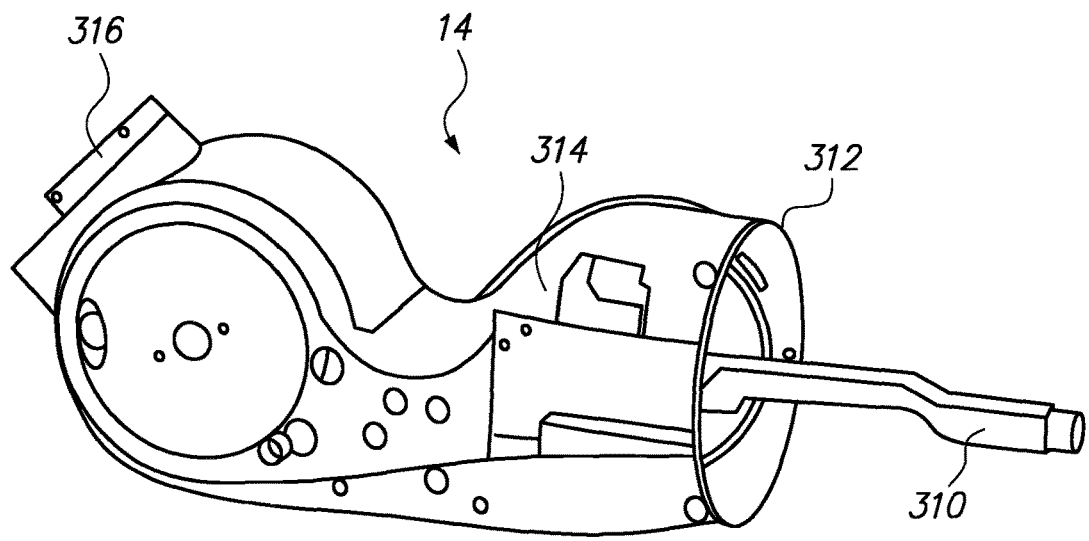
FIGS. 8A-8R illustrate various orthogonal schematic views of various aspects of an electromechanical upper arm assembly for a personal robotics system at various levels of assembly.
Figure 8B:
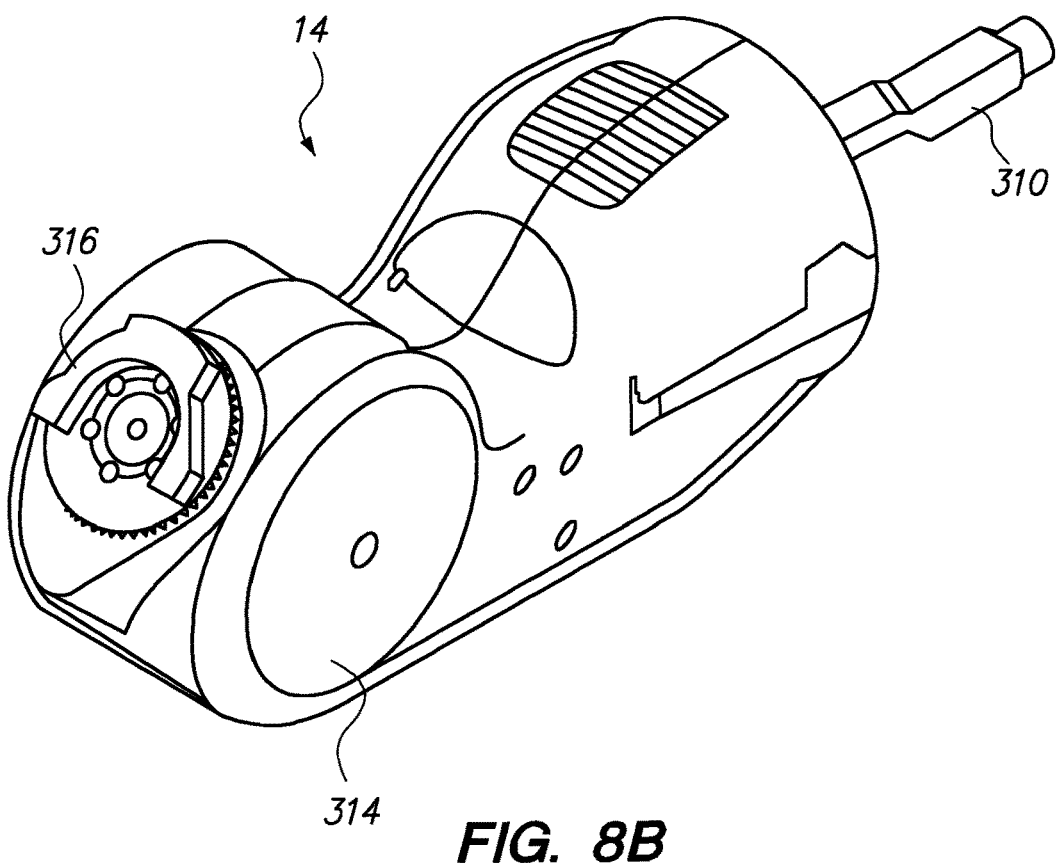
Figure 8C:
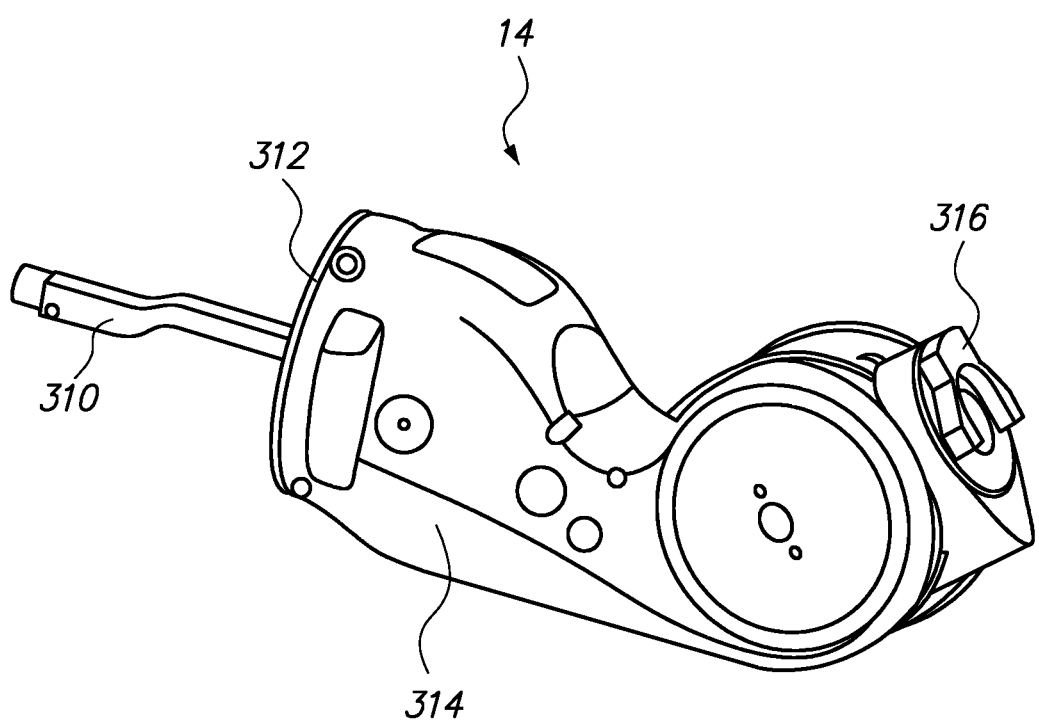
Figure 8D:
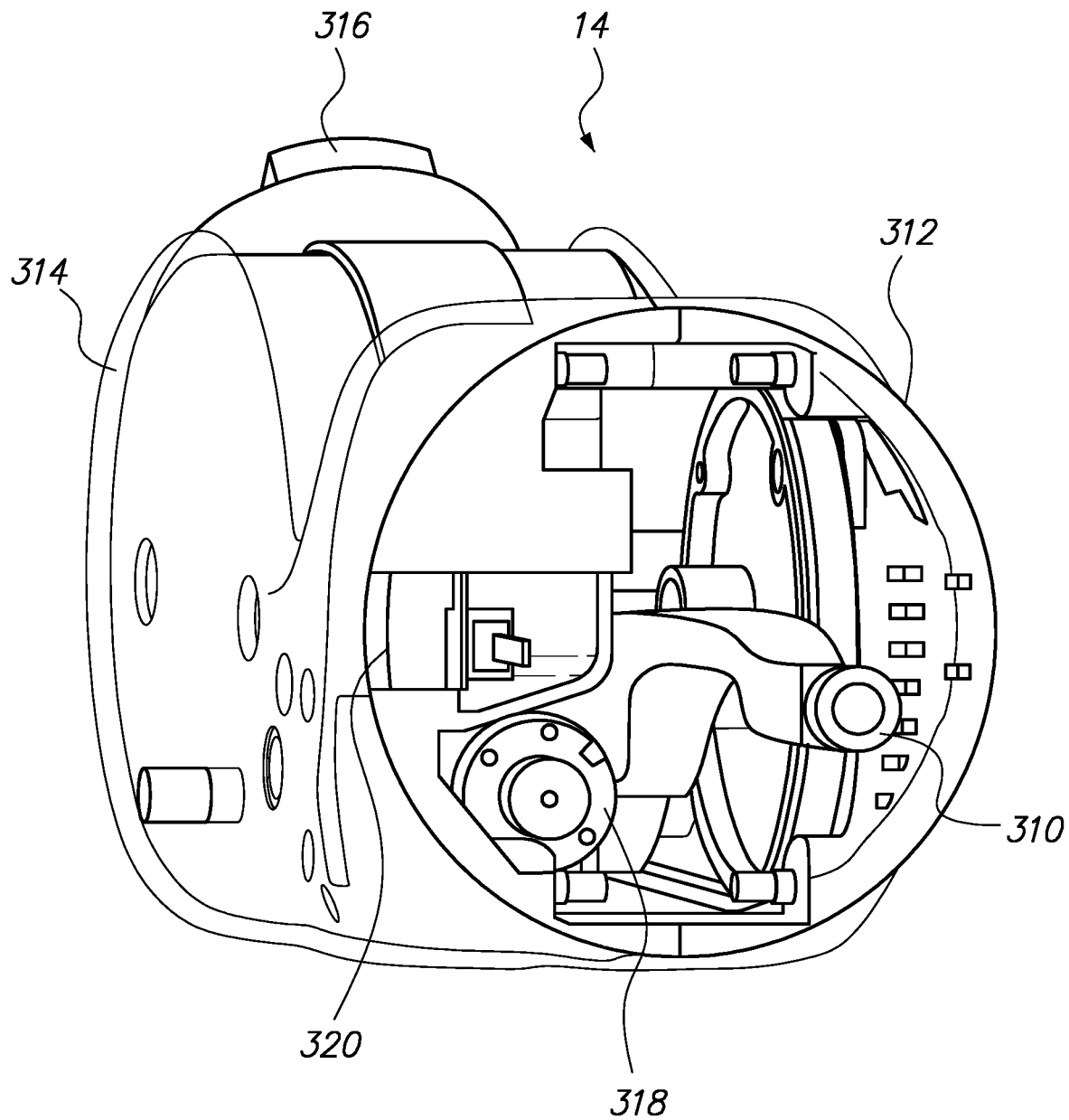
Figure 8E:
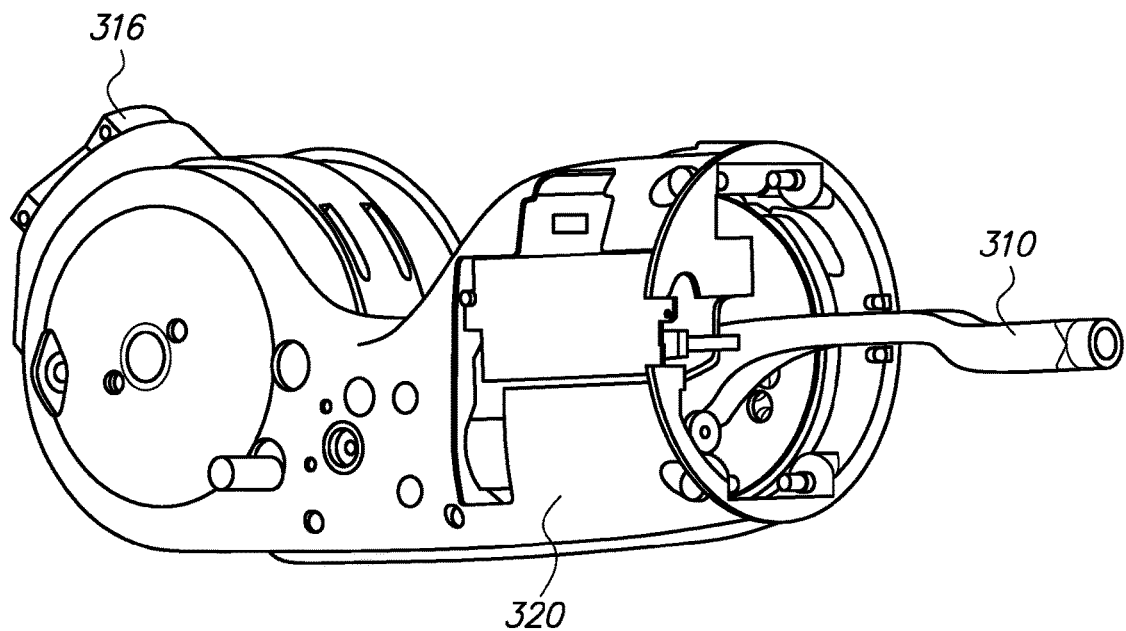
Figure 8F:
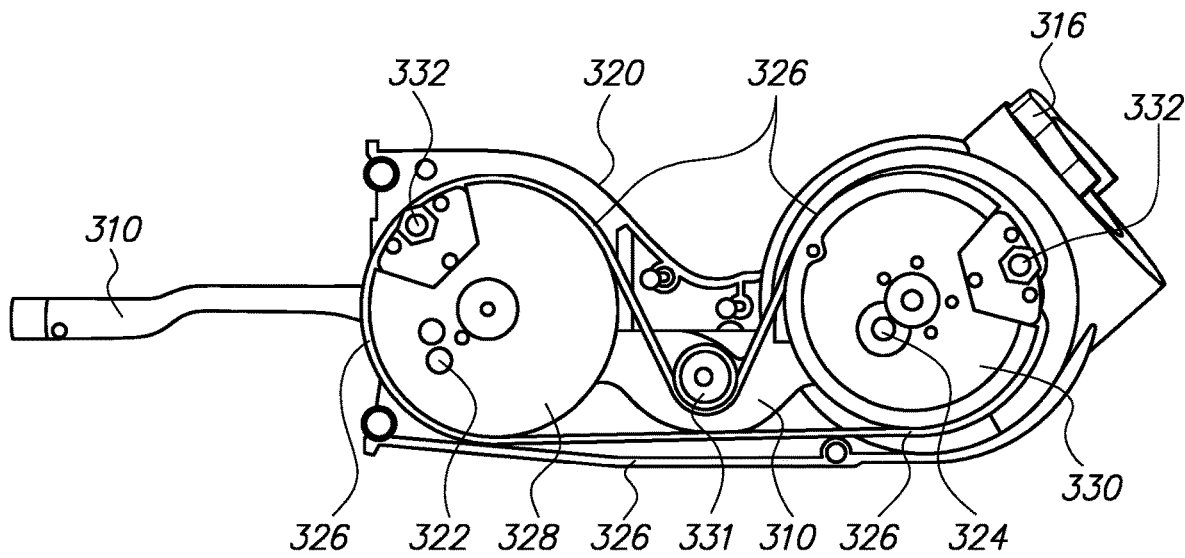
Figure 8G:
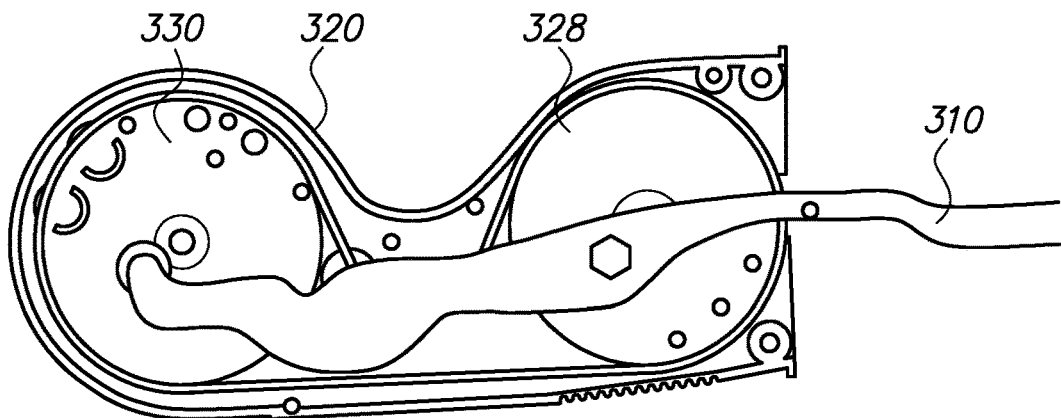
Figure 8H:
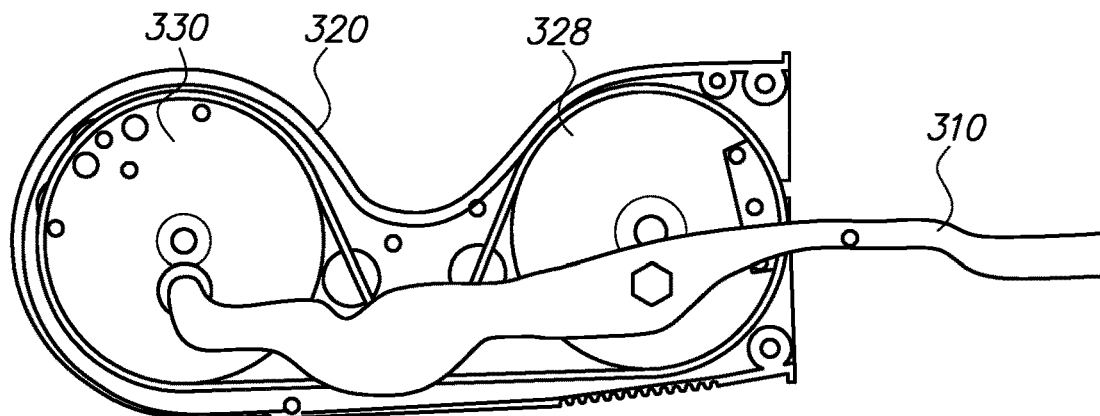
Figure 8I:
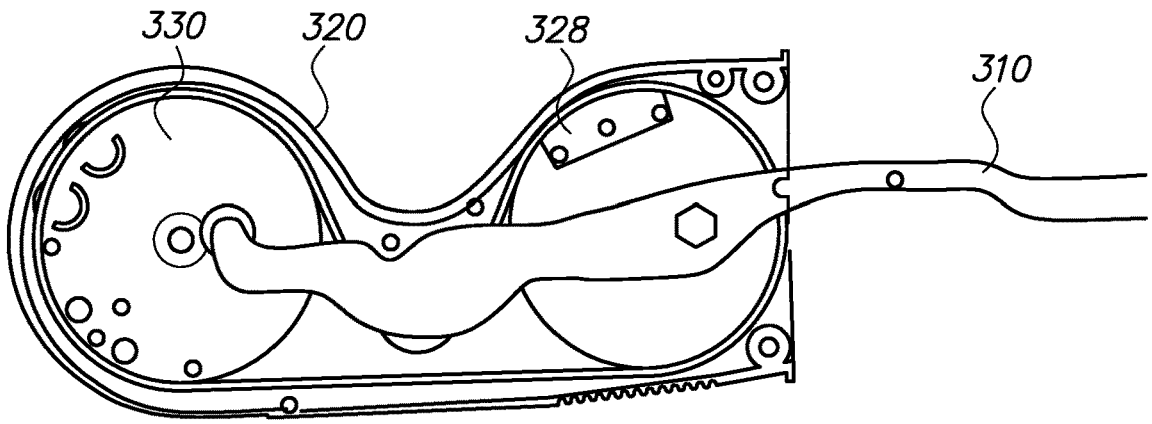
Figure 8J:
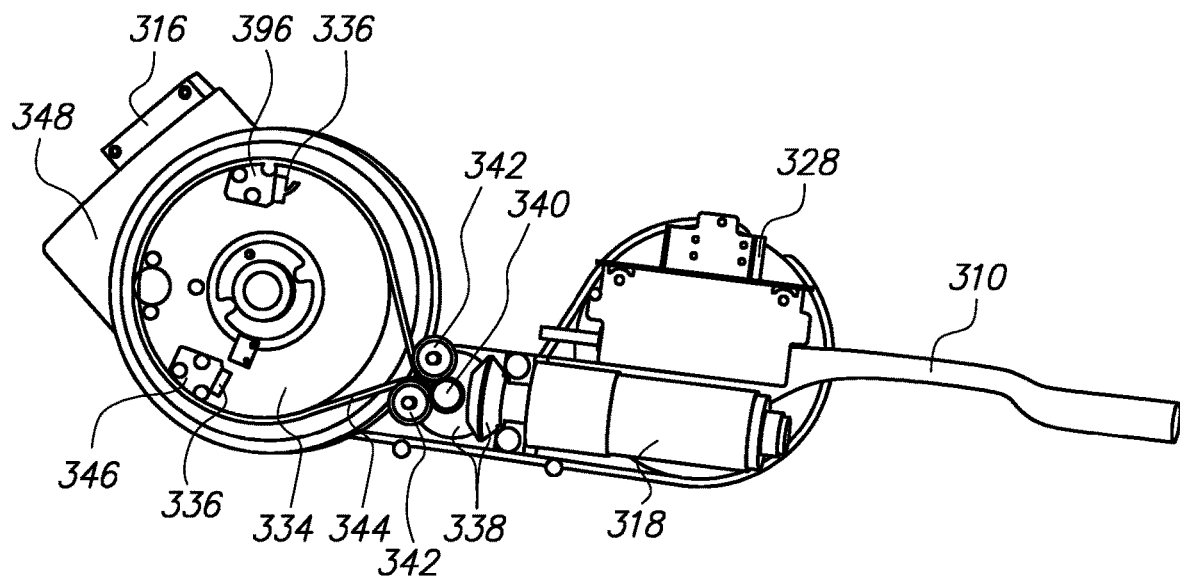
Figure 8K:
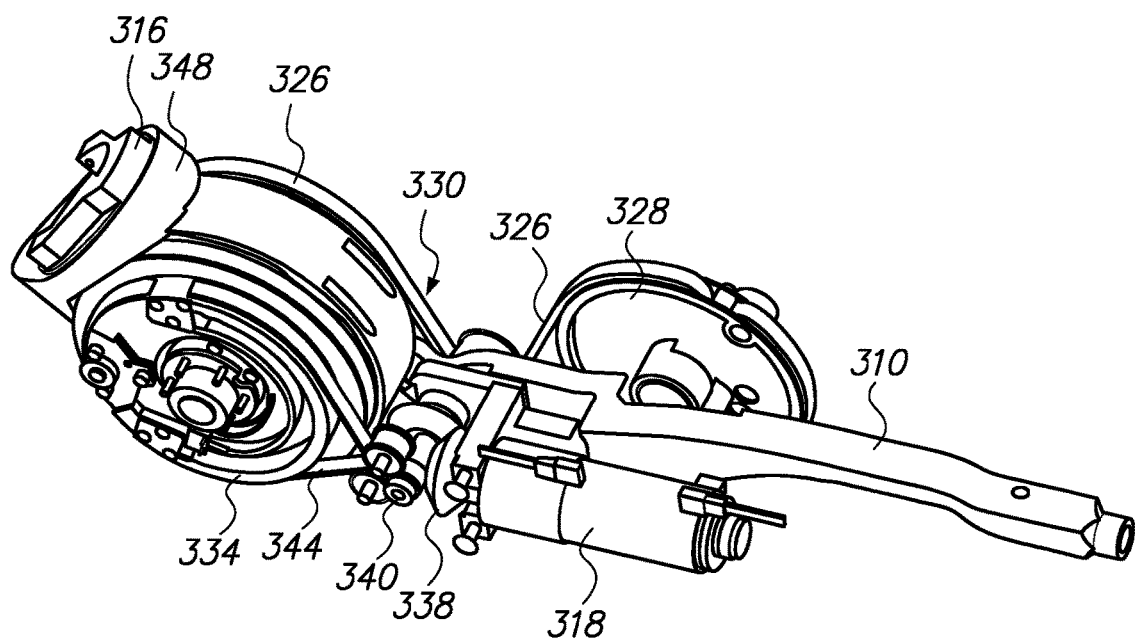
Figure 8L:
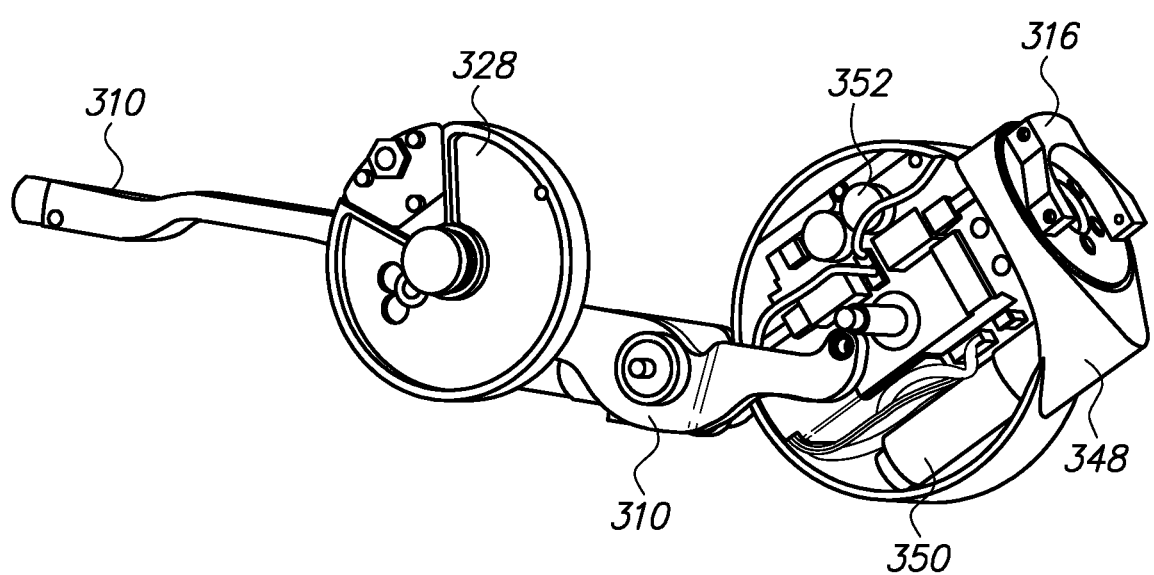
Figure 8M:
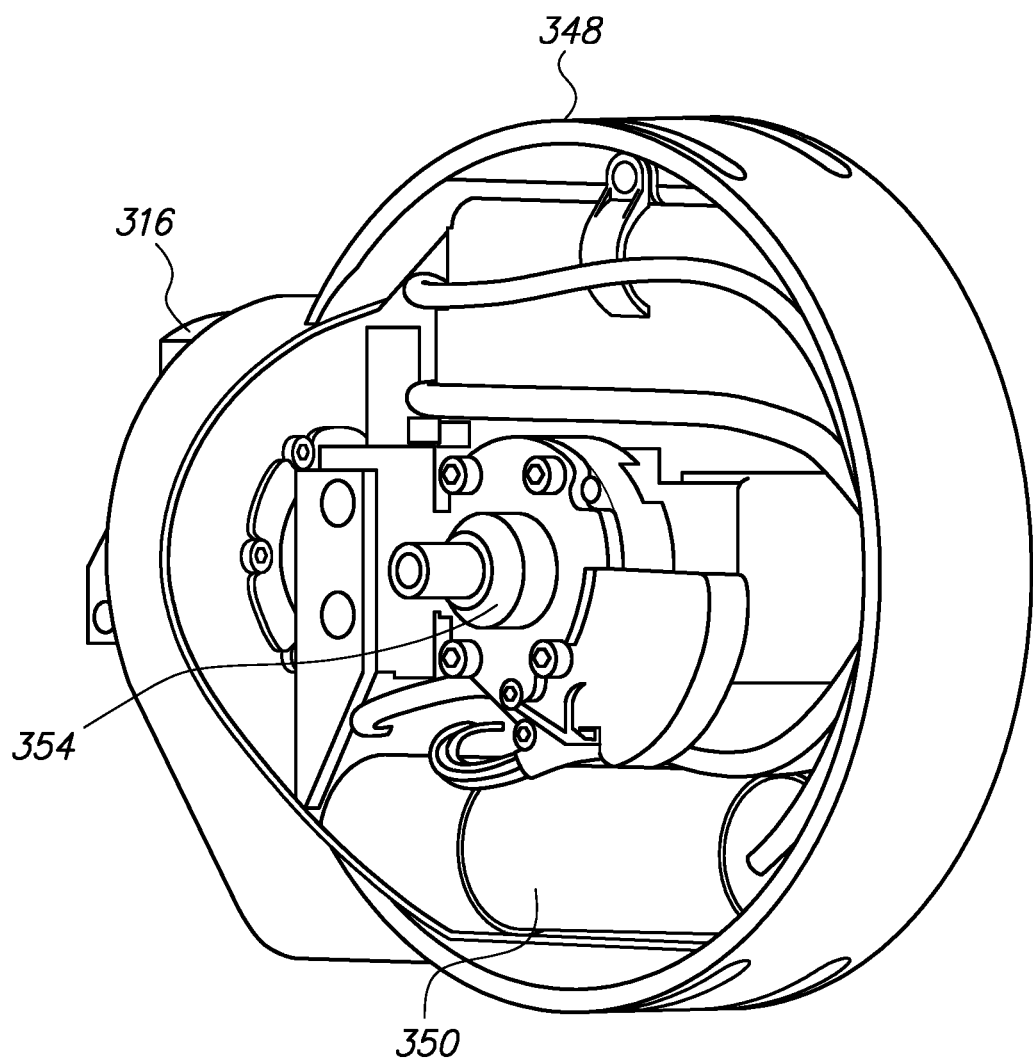
Figure 8N:
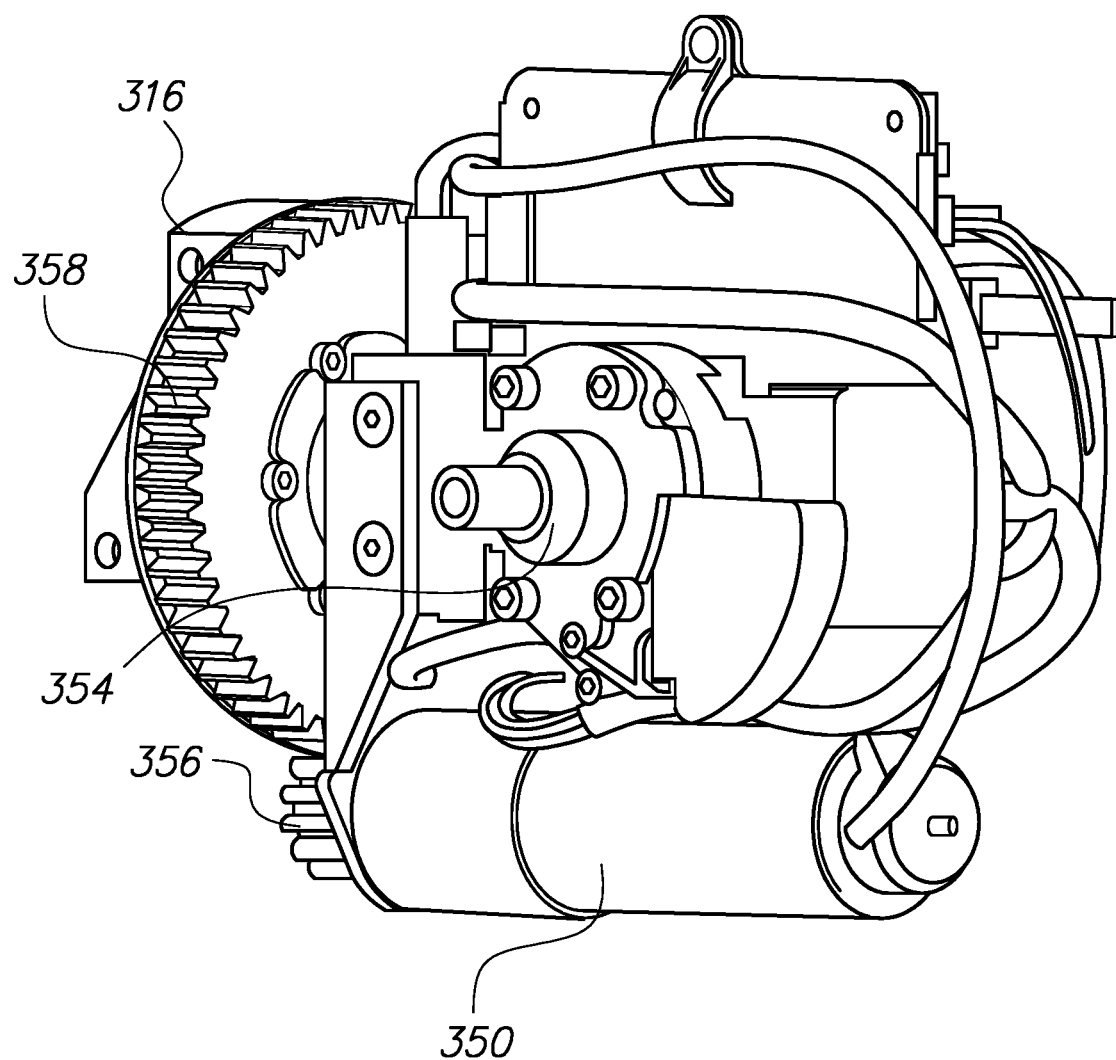
Figure 80:
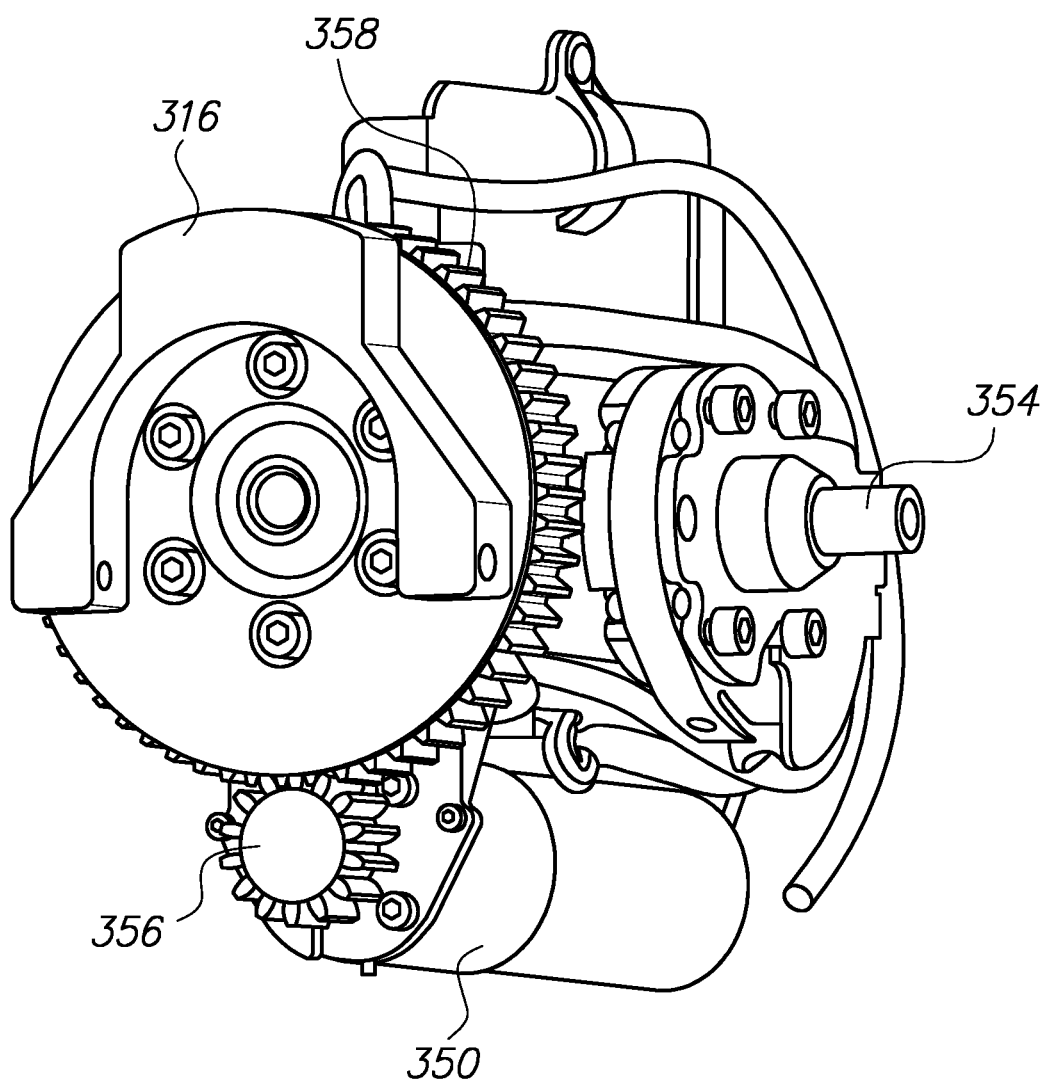
Figure 8P:
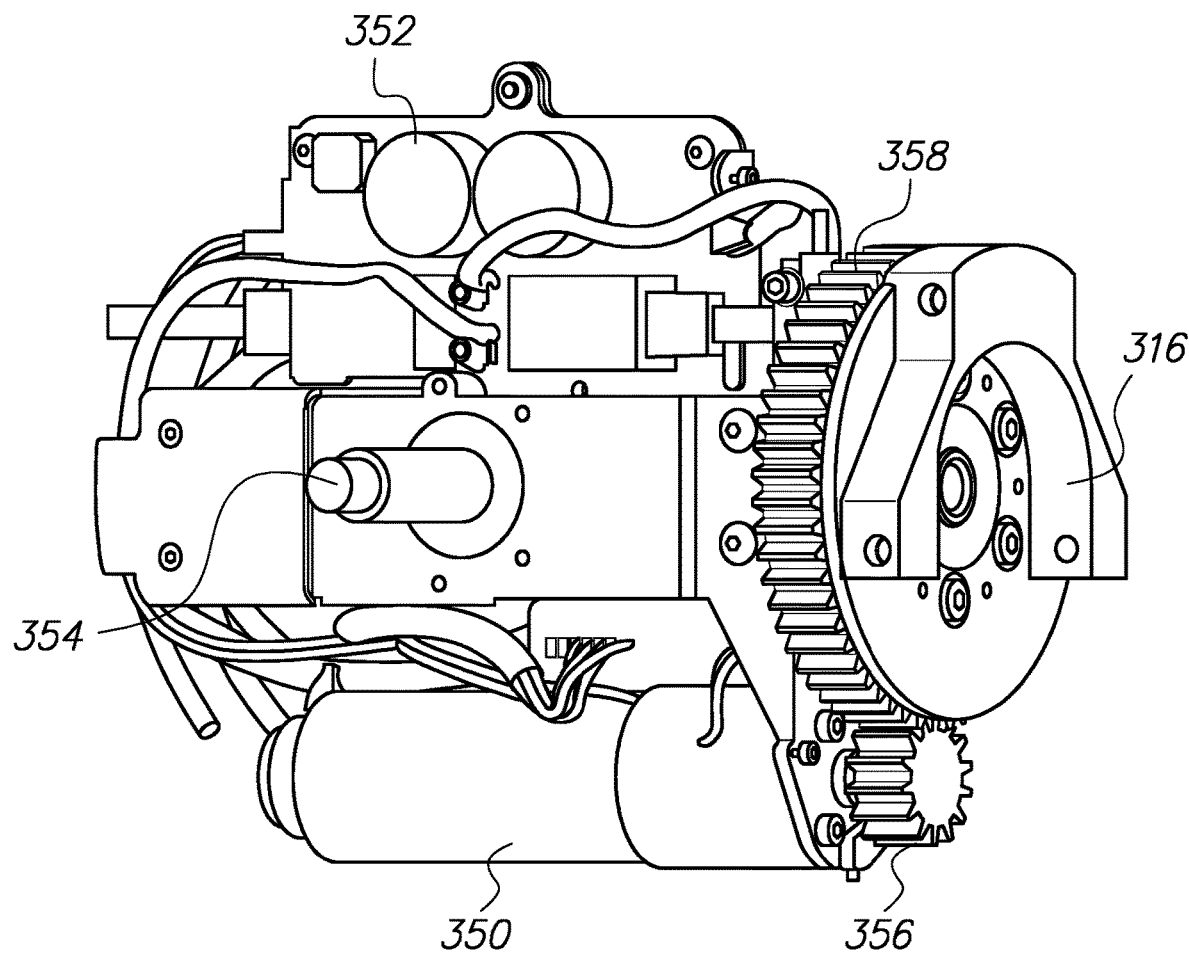
Figure 8Q:
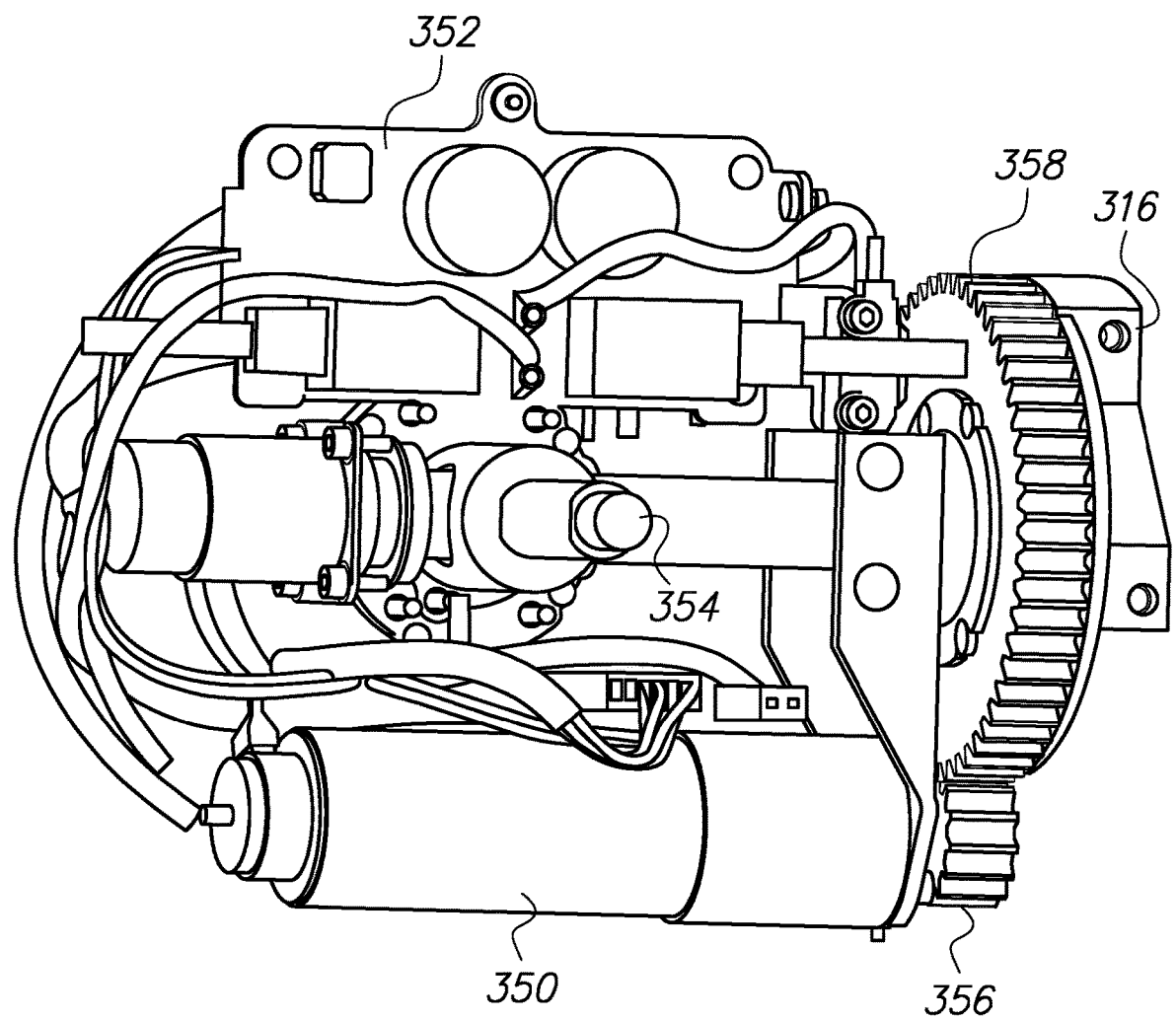
Figure 8R:
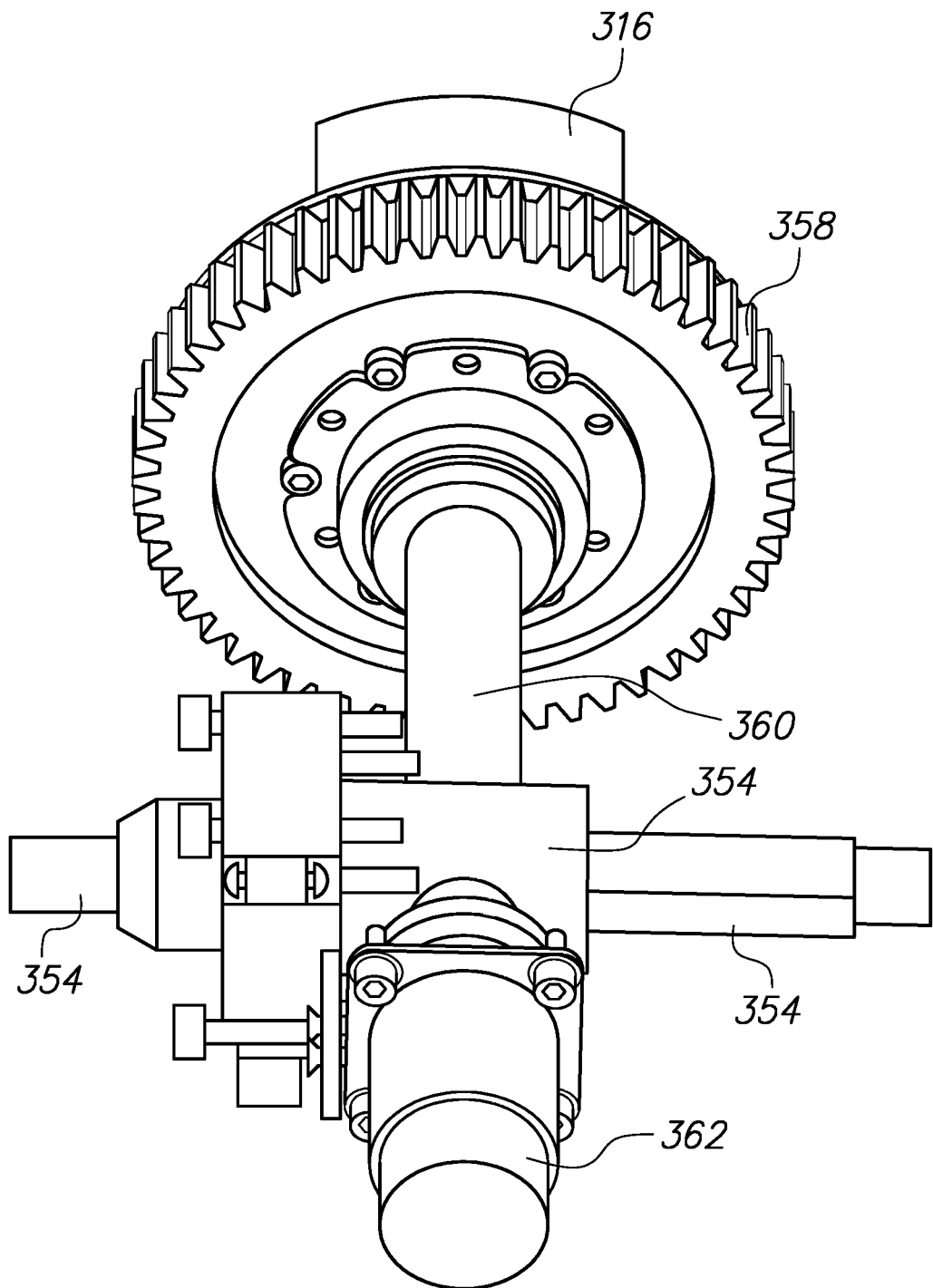

FIGS. 8A-8R depict aspects of one embodiment of an upper arm assembly (14). A complete upper arm subassembly (14) is depicted in orthogonal views in FIGS. 8A, 8B, and 8C having exterior skin structures (314) intact as well as a distal interface member (316) for coupling with the proximal end of a forearm assembly (16), and a proximal interface structure (312) for interfacing with the distal end of a shoulder (266) assembly. The proximal end of a counterbalance member (310) is shown exiting the proximal end of the upper arm assembly (14), with enough length to pass through a shoulder assembly (266) to a coupling with an upper arm counterbalance interface rod (196) extending from the arm turret assembly (6). Referring to FIG. 8D, an orthogonal view into the proximal end of the upper arm assembly (14) reveals more of the counterbalance member (310) as it extends distally. An elbow pitch motor, gearbox, and encoder subassembly (318) is also visible as it is coupled to the main frame element (820) of the upper arm assembly, as shown also in FIG. 8E wherein an upper arm assembly (14) is depicted without the external skin structures. Referring to FIGS. 8F-8L, with portions of the frame structure (320) and other structures removed, the upper arm counterbalance interworkings are shown. Referring to FIG. 8F, the counterbalance member (310) is rotatably coupled to a proximal pulley (328) at a first coupling point (322). The counterbalance member (310) is then rotatably coupled to an intermediate pulley (331), and finally/distally it is rotatably coupled to a distal pivot point (324) on a distal timing pulley (330). A timing belt (326), such as those available in fiber reinforced form from Gates Corporation of Denver, Colo., maintains a geometric/kinematic relationship between the counterbalance member (310) and each of the two pulleys (328, 330), in a manner similar to that described in the aforementioned incorporated by reference application U.S. patent application Ser. No. 12/626,187 (U.S. Publication No. 2010-0243344). A belt tensioner subassembly (332) is shown on each of the pulleys (328, 330). Downward gravity based loads associated with the masses of the upper arm assembly (14) and forearm assembly (16) are counterbalanced with loads imparted to the counterbalance member (310), which is kinematically operated as a four bar linkage, such that every portion of the counterbalance member (310) moves in the same circular pattern. Thus the mechanism has a very clean translator of load from the distal upper arm to the proximal end of the counterbalance bar (310), and the system is configured to apply loads to this proximal end to gravity compensate the forearm assembly (loads applied to the proximal end of the counterbalance bary 310 will torque the distal pulley 330, which urge the forearm assembly up versus gravity); additionally, as discussed above in reference to the arm turret assembly (6), another gravity compensation loading schema is overlaid or "superimposed" onto the counterbalancing for the forearm, to counterbalance the gravity loads upon the upper arm assembly (14). The elbow flexion range of motion at the distal pulley (330) is about 130 degrees in the depicted embodiment, and at the end of this range of motion, there is a singularity wherein but for the timing belt (326), the two pulleys (328, 330) and counterbalance member (310) could become mechanically jammed relative to each other with one pulley rotating in an opposite direction of the other. The timing belt (326) rotates both pulleys together through this singularity and prevents the distal pulley (328) from rotating in the wrong direction. If the kinematics were not rotating through this singularity, the timing belt would not be needed to enforce stability. Thus, with the counterbalance member (310) and associated gimbal/elevator interface provided as part of the proximal arm turret assembly (6), a fully general configuration for balancing two links (upper arm 14 and forearm 16) is presented.

Referring to FIGS. 8G, 8H, and 8I, sequential motion of the counterbalance member (310), and proximal (330) and distal (328) pulleys over time is depicted to depict the associated counterbalancing kinematics as portions of a 4-bar linkage.

FIG. 8J illustrates the opposite side of the mechanism from that depicted in FIGS. 8F-8I. Referring to FIG. 8J, the elbow pitch rotation motor, gearbox, and encoder assembly (318) is driveably interfaced with a set of bevel gears (338) to drive a driven motor pulley (340) and associated timing belt (344), such as the glass reinforced timing belts available from Gates Corporation of Denver, Colo., though a set of idler pulleys (342) and around a relatively large distal driven pulley (334) which is coupled to the distal pulley (330) on the opposite side of the upper arm assembly (14). Thus the elbow pitch rotation motor, gearbox, and encoder assembly (318) actuates rotation of both the proximal (328) and distal (330) pulleys of the aforementioned timing and counterbalancing arrangement. Also shown in FIG. 8J are belt tensioning subassemblies (346) and elastomeric bumpers (336) to enforce the maximum rotational range of motion of the elbow pitch rotation. Referring to FIG. 8K, the kinematic relationships of the driven pulley (334), distal pulley (330), and proximal pulley (328) are shown, along with the timing belt (326). A further deconstructed view in FIG. 8L shows additional aspects of the counterbalance member (310) and its coupling to the various other counterbalancing parts. Also shown in FIG. 8L is the distal housing member (348) and forearm roll mechanism comprising a forearm roll motor, gearbox, and encoder assembly (350), associated motor controller board (352), and distal forearm mounting interface (316). The further deconstructed orthogonal view of FIG. 8M illustrates the distal pulley axle interface member (354) which is configured to couple the driven distal pulley (334) with the distal counterbalancing pulley (330). FIG. 8N depicts a further deconstructed view wherein the forearm roll motor, gearbox, and encoder assembly (350) is coupled to a motor gear (356), which is directly interfaced with a larger forearm roll rotation driven gear (358), which is coupled directly to the distal forearm mounting interface member (316). Additional orthogonal views of such assembly are depicted in FIGS. 8O-8Q. FIG. 8R illustrates a further deconstructed view to show that the forearm roll driven gear (358) is coupled to a forearm roll axle (360) which is rotatably coupled through the central axle junction member (354) to an additional forearm roll encoder (362). The central axle junction member (354) is coupled to a slip ring wiring interface configured to pass electrical signals between the forearm and upper arm, to allow infinite roll rotation in either direction of the forearm assembly (16) relative to the upper arm assembly (14). In one embodiment of the system, there are three infinite rotation slip-ring enabled joints: here between the forearm and upper arm, at the casters, as described above, and between the forearm assembly (16) and gripper assembly (18), as described below.

Figure 9A:
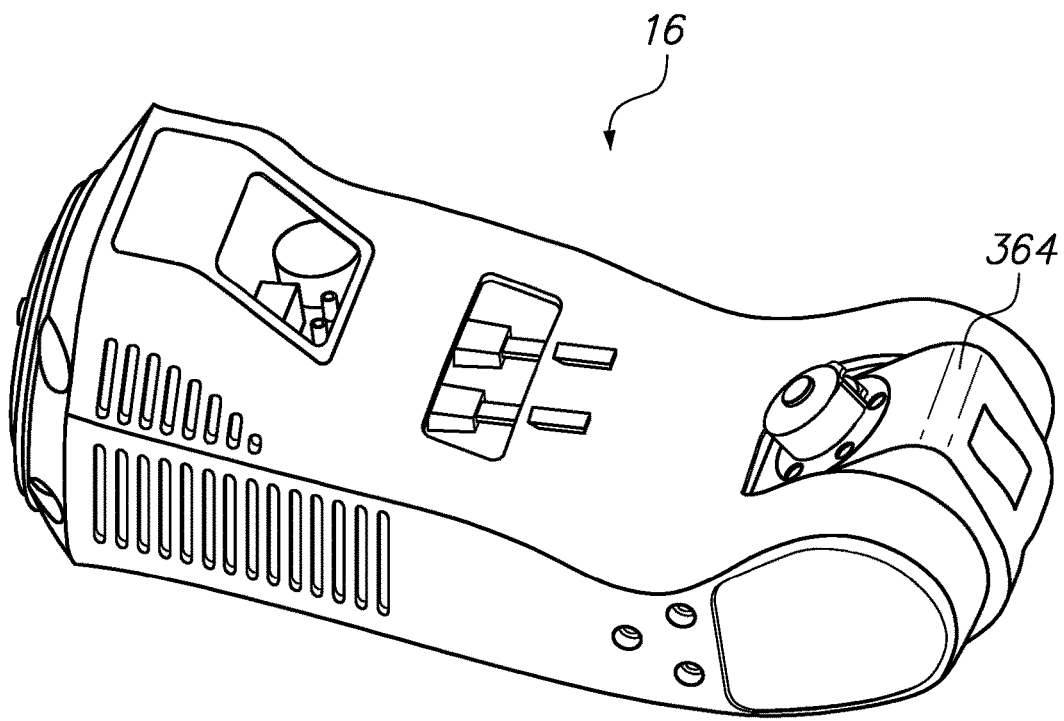
FIGS. 9A-9G illustrate various orthogonal schematic views of various aspects of an electromechanical forearm assembly for a personal robotics system at various levels of assembly.
Figure 9B:
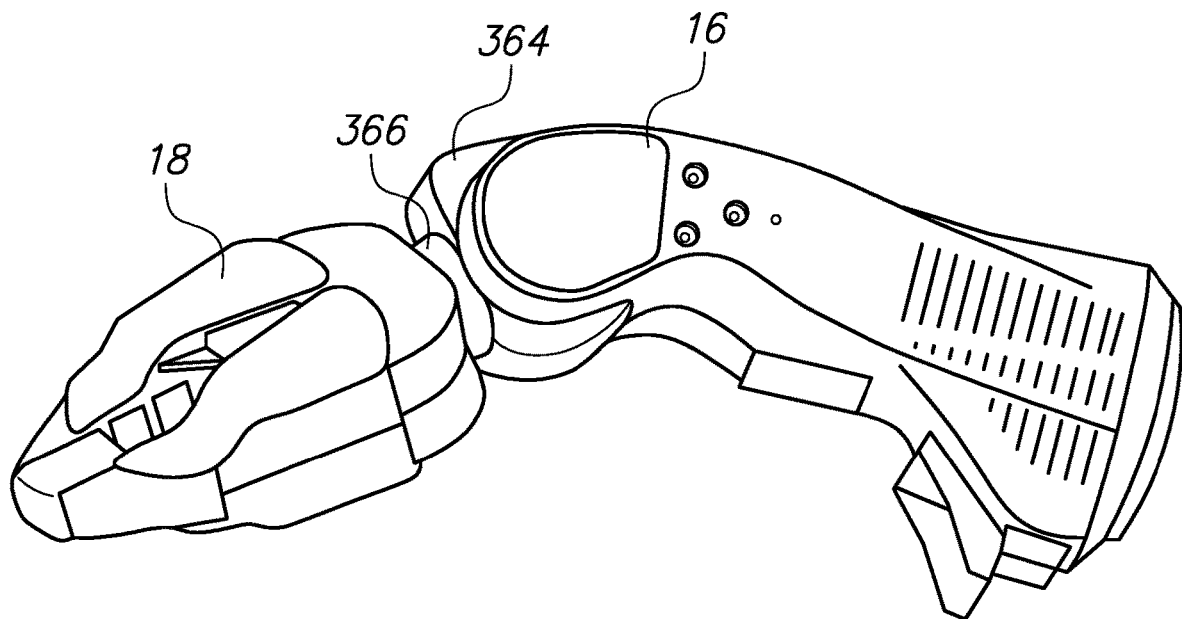
Figure 9C:
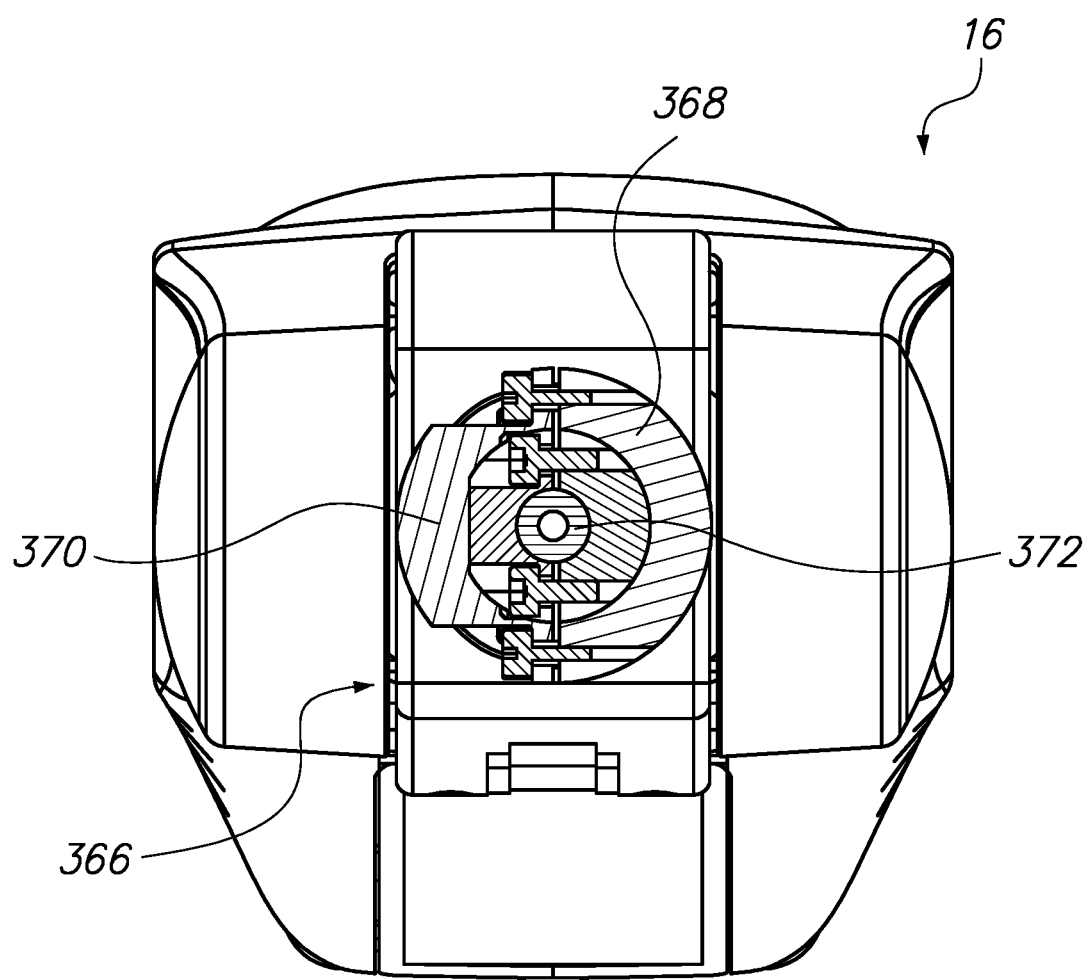
Figure 9D:
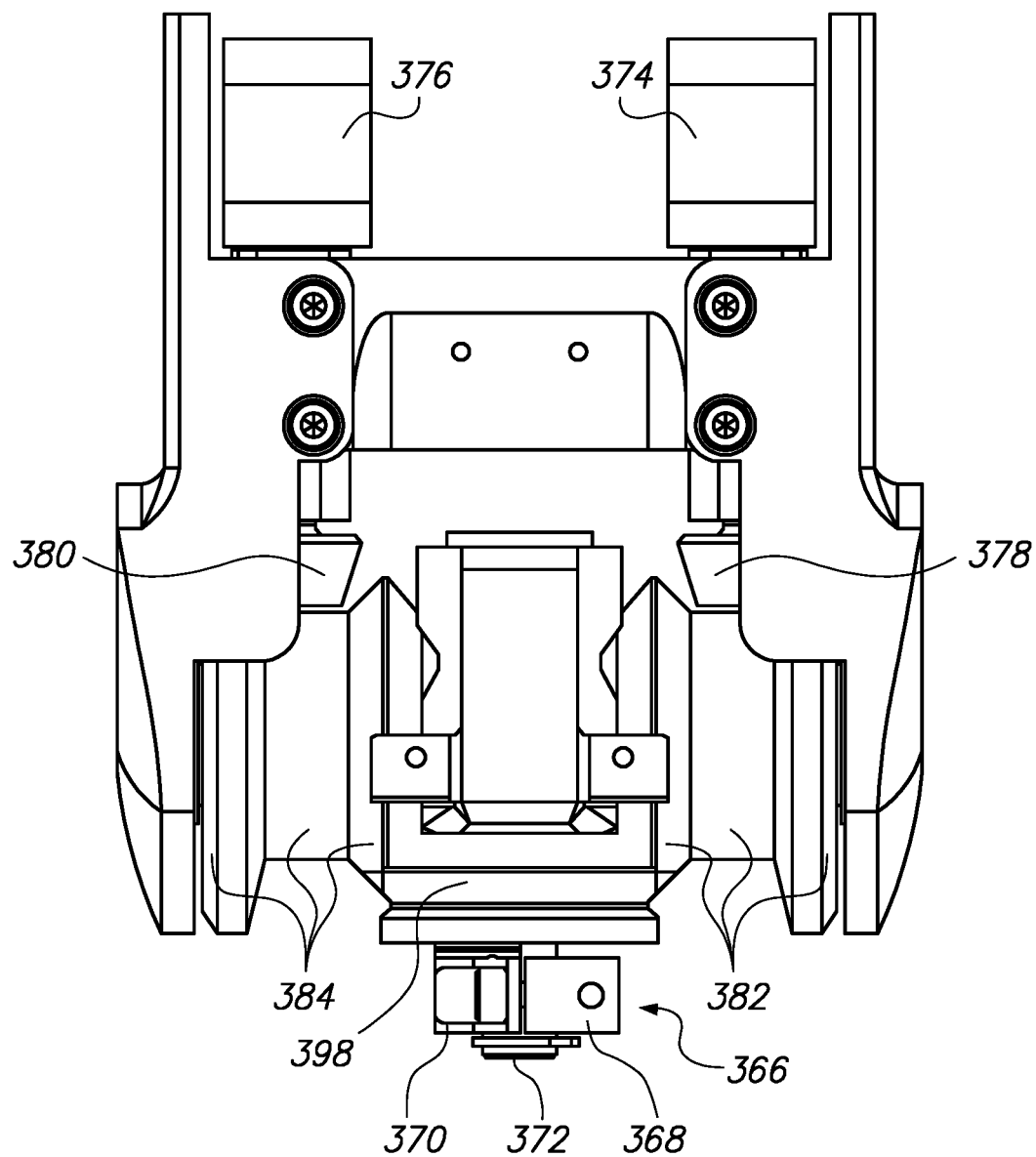
Figure 9E:
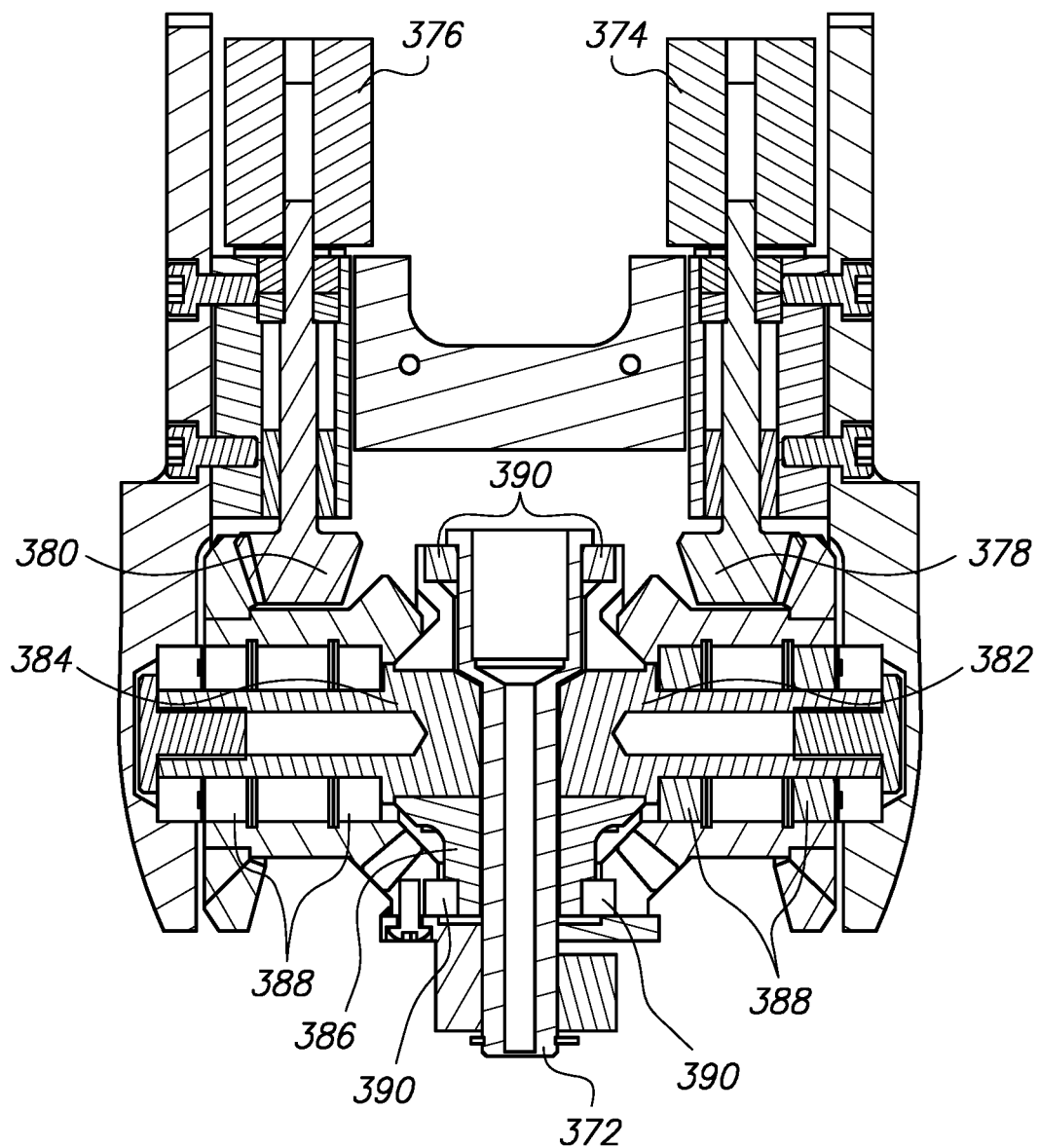
Figure 9F:
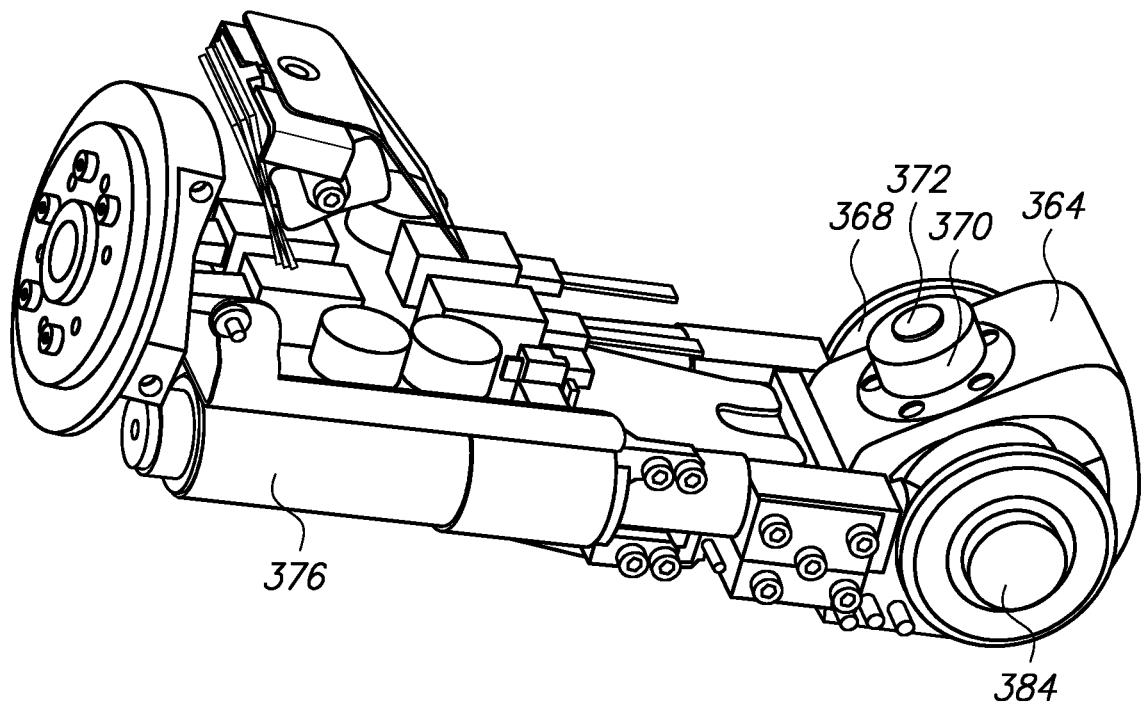
Figure 9G:
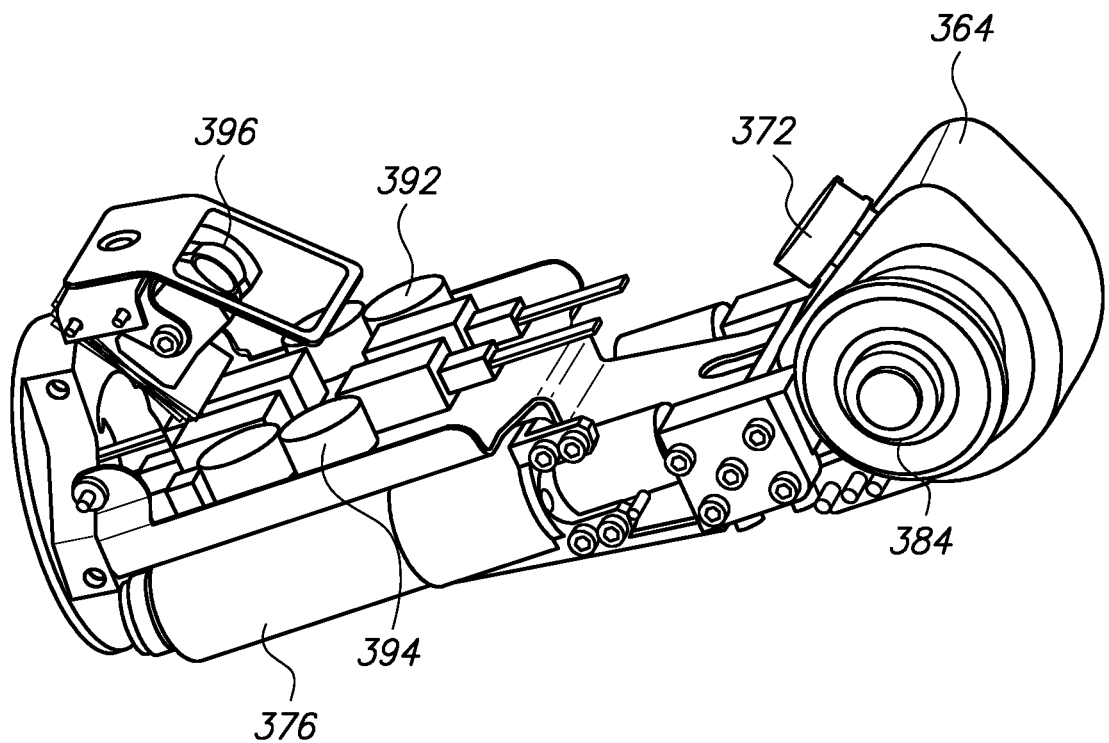

Referring to FIGS. 9A-9G, aspects of one embodiment of a forearm assembly (16) are depicted. Referring to FIG. 9A, an orthogonal view of a forearm assembly (16) is depicted, comprising a distal grasper interface assembly (364) configured to mechanically couple with a grasper assembly (18), as depicted in FIG. 9B, with a grasper interface clamp assembly (366) comprising portions of each associated assembly (16, 18) clamped against each other, as illustrated in FIG. 9C. Referring to the cross sectional view FIG. 9C, the interface assembly (366) comprises portions (368, 370) of each assembly clamped together with bolts and flat-faced fittings configured to not allow for rotational slop at the interface (366). A gripper roll axle (372) is shown fitted though the middle of the interface (366). Referring to FIGS. 9D-9G, the distal forearm comprises a differential drive mechanism configured to pitch and/or roll the distal differential drive member (386) which may be coupled directly to a grasper assembly (18). Referring to FIG. 9D, a first differential drive motor, gearbox, and encoder assembly (374) is coupled to a bevel gear (378), which is interfaced with a driven gear and pulley assembly (382) that is coupled into the distal differential drive member (386) mechanism. Similarly, a second differential drive motor, gearbox, and encoder assembly (376) is coupled to a bevel gear (380), which is interfaced with a driven gear and pulley assembly (384) that is coupled into the distal differential drive member (386) mechanism. FIG. 9E depicts a cross sectional view with heavy duty bearings (388, 390) providing efficient rotational interfaces for portions of the differential drive mechanism, including the gripper roll axle (372). A partial orthogonal view is shown in FIG. 9F to illustrate the positioning of one of the differential drive motor, gearbox, and encoder assemblies (376) relative to the various portions of the differential drive assembly. FIG. 9G illustrates an additional partial orthogonal view to show that a motor controller board (392, 394) is coupled adjacent each of the differential drive motor, gearbox, and encoder assemblies (374, 376). In addition, a camera window (396) is provided for a small digital camera module to be positioned to have a field of view capturing motion of the gripper interface assembly (364) and associated gripper assembly (18).

Figure 10A:
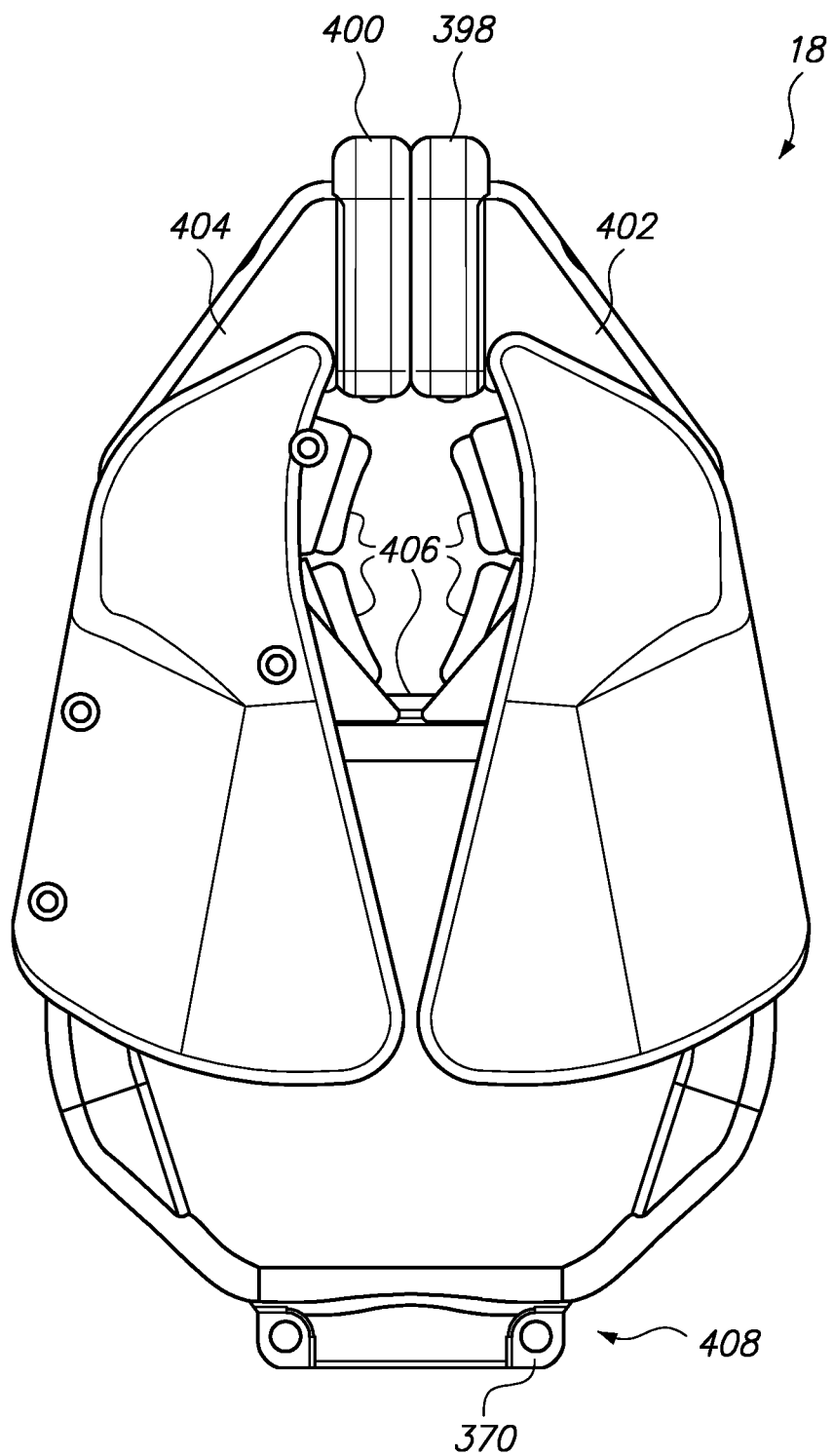
FIGS. 10A-10D illustrate various orthogonal schematic views of various aspects of an electromechanical gripper assembly for a personal robotics system at various levels of assembly.
Figure 10B:
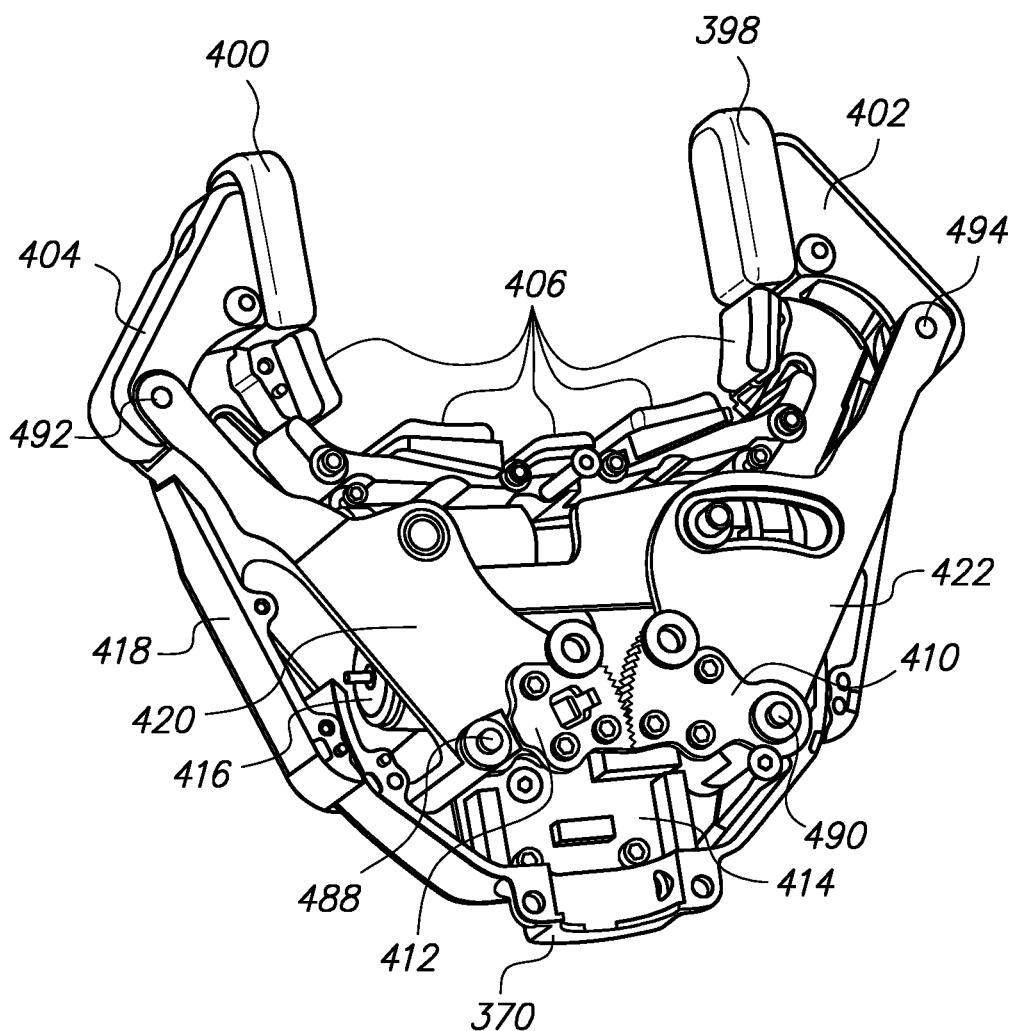
Figure 10C:
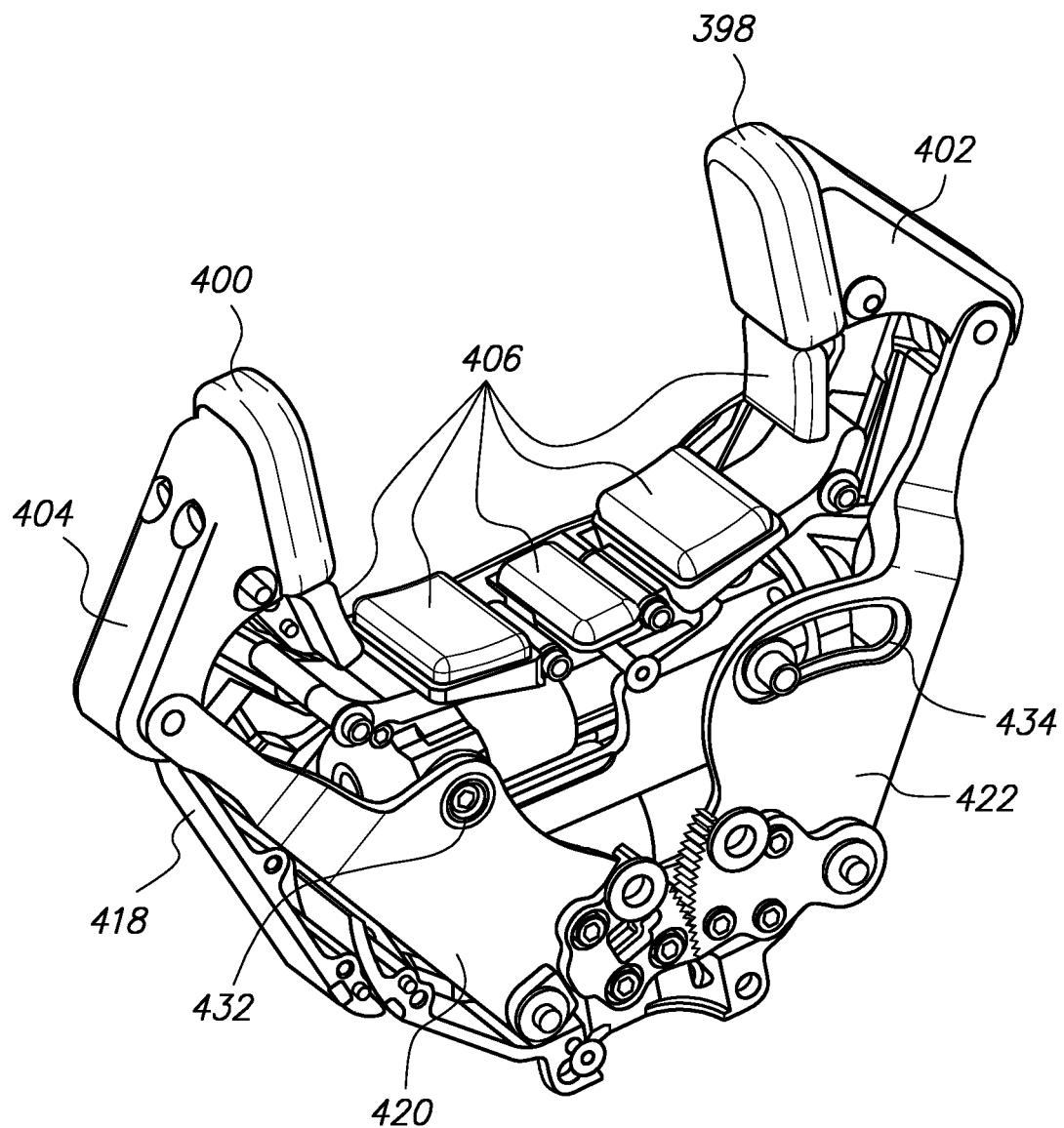
Figure 10D:
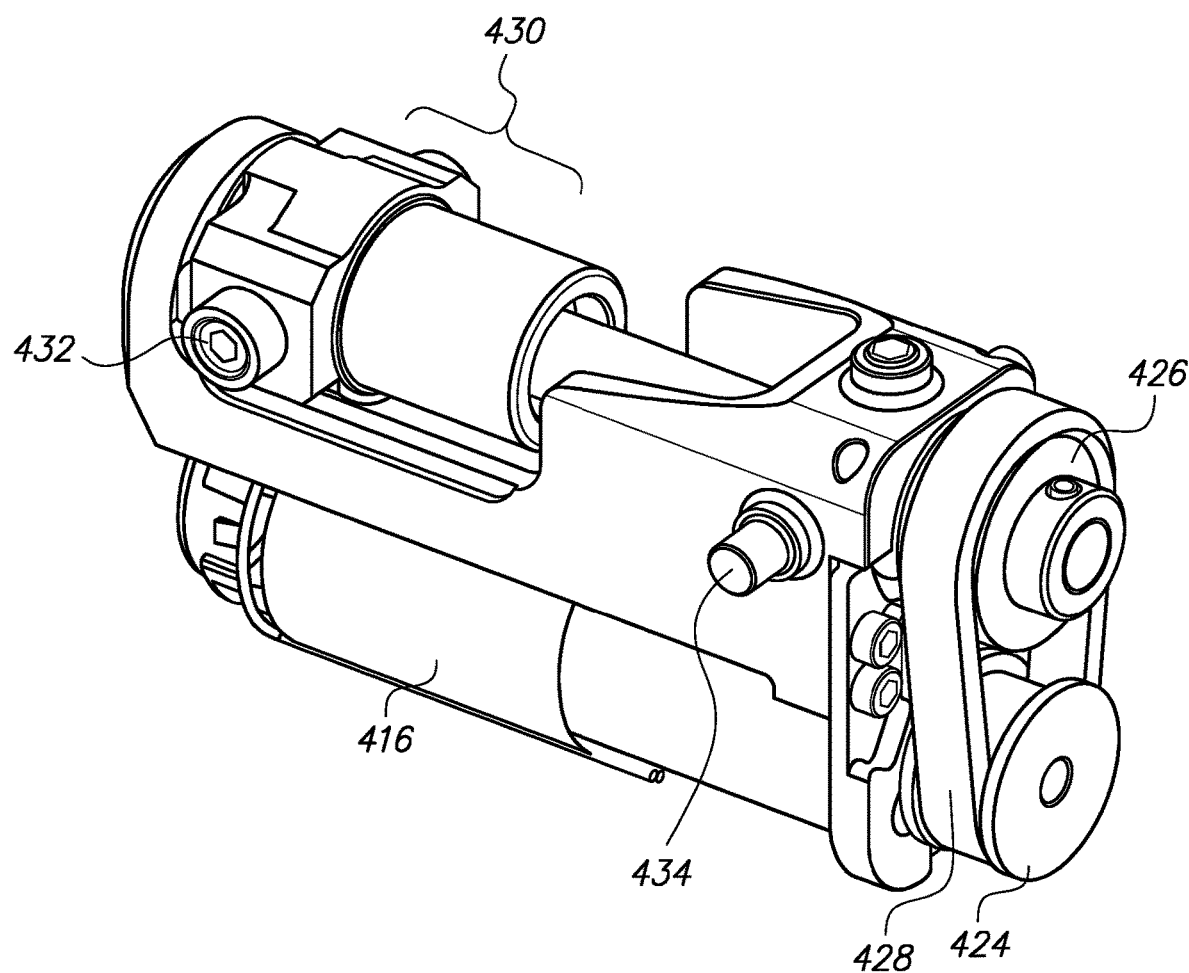

Referring to FIGS. 10A-10D, aspects of one embodiment of a gripper assembly (18) are illustrated. Referring to FIG. 10A, a gripper assembly (18) comprises one portion (370) of the gripper/forearm interface assembly at its proximal forearm interface (408). Coupled to the two distal fingers (404, 402) comprising the grasper are finger pressure sensor arrays (398, 400) comprising 22 or more sensors at each fintertip which not only monitor fingertip interfacial pressures, but also pressures around the sides of the fingertips. Such sensor arrays (398, 400) are available from Pressure Profile Systems, Inc., of Los Angeles, Calif. Five or more palm interface pads (406) are configured to provide palm-like interfacing with objects grasped by the gripper. Referring to FIG. 10B, a partially disassembled gripper assembly is shown with portions of the outer housing assembly (418) hidden away to illustrate the four bar kinematic linkage comprising the grasping mechanism, and its actuation means. Referring to FIG. 10B, each of two connecting members (420, 422) is fixedly coupled to a spur gear (412, 410). The connecting members (420, 422) are also rotatably coupled to the housing (418) at pivot points (488, 490), and rotatably coupled to the finger members (404, 402) at finger pivot points (492, 494). A grasping motor, gearbox, and encoder assembly (416) and nearby motor controller board (414) actuates grasping activity by urging the connecting members (420, 422) toward each other. Referring to FIG. 10C, two sets of connecting member interface pins (432, 434) provide the mechanical interface between the grasping motor, gearbox, and encoder assembly (416) and the connecting members (420, 422). Referring to FIG. 9D, one embodiment of a grasping motor, gearbox, and encoder assembly (416) is shown in greater detail, in addition to other aspects of the grasper linear drive mechanism. Referring to FIG. 10D, actuation of the motor of the grasping motor, gearbox, and encoder assembly (416) causes rotation of a motor pulley (424), which drives a timing belt (428), such as the fiber reinforced timing belts available from Gates Corporation of Denver, Colo., to rotate a driven pulley (426), which causes a ball screw assembly to move one set of connecting member interface pins linearly relative to the other set (434).

Figure 11A:
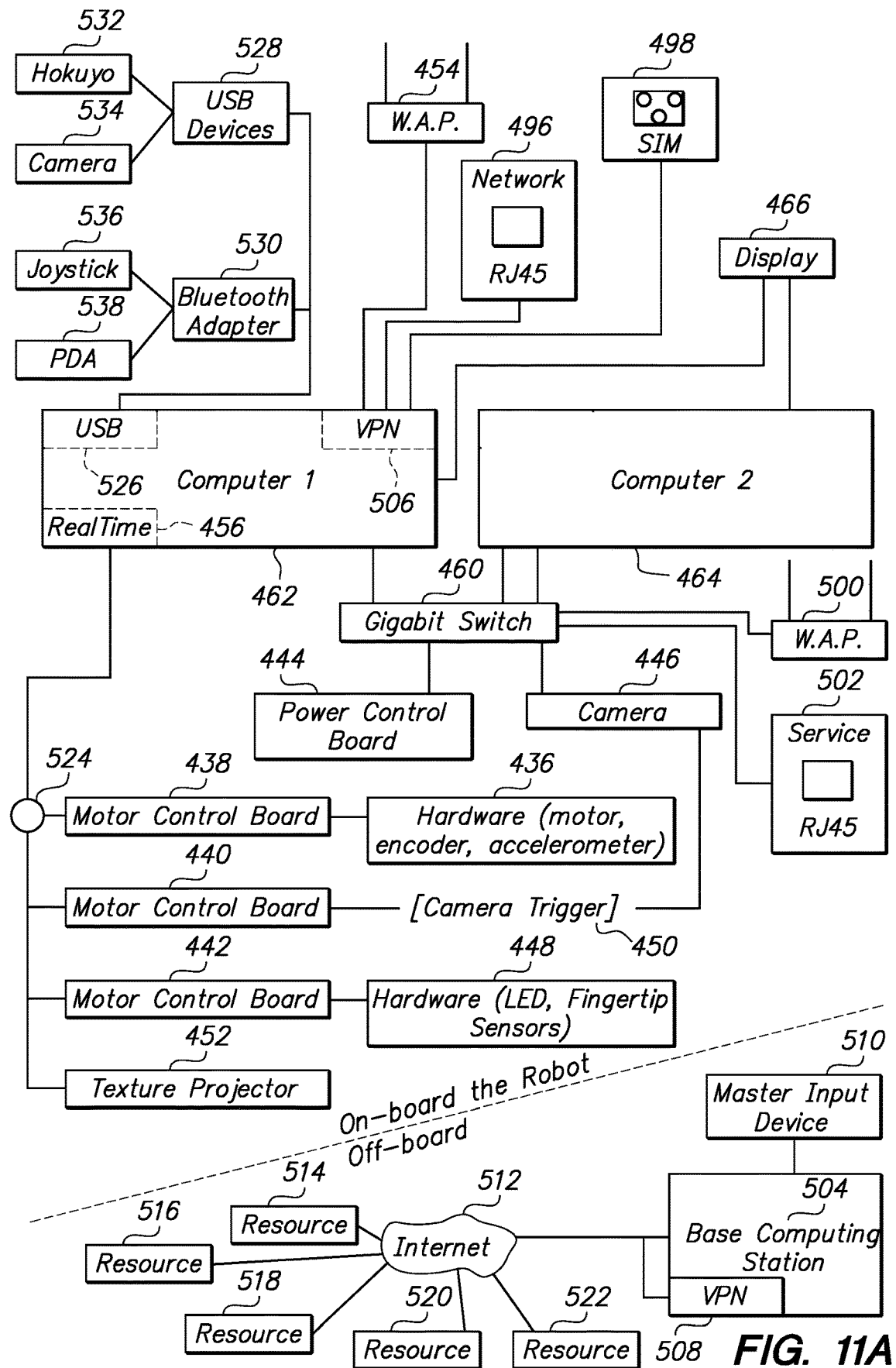
FIGS. 11A-11B illustrate schematics pertinent to one embodiment of a control infrastructure for a personal robotics system.

Referring to FIG. 11A, a controls architecture diagram is depicted to illustrate how the various aspects of one embodiment of a robotic system, such as that depicted in FIG. 1A, may be controlled. At the center of the controls architecture are one or more computers (462, 464) configured to share the processing loads. As discussed in reference to the mobile base above (4), these devices preferably reside near the center of the mobile base unit, adjacent the power supply and cooling infrastructure. In one embodiment, the computers (462, 464) comprise X86 type personal computers running Linux operating systems. In one embodiment, each has two or more multicore processing chips, such as those available from Intel Corporation of Santa Clara, Calif. Each computer system also preferably has a relatively large amount of random access memory and hard drive or flash memory drive capacity. In one embodiment, each computing system also comprises a discrete internal drive configured to store the operating system, as well as a removable 3.5-inch drive configured for rapid movement of large amounts of data on or off board the robotic system. In one embodiment, the first computer (462) is configured to boot Linux from its hard drive, and to trigger the second computer (464) to boot using a "netboot" procedure. A 16 bit gigabit switch (460) functions as a communications backbone of sorts, with connections to both computers. In one embodiment, either of the computers (the second, 464, in the depicted embodiment) may have two or more connections to the switch (460) for load balancing. Also coupled to the switch are one or more Ethernet camera devices (446), the power control board (444), and "service port" communications infrastructure, in the form of a wireless access port (500), and an rj45 connector (502); these may also be referred to as the "WAP service port" and the "wired service port", respectively. As described above, the first computer (462) may be configured to boot from its own 3.5-inch drive and start serving netboot to the second computer (464). As the second computer boots up, it may be configured to go out on the network and available bios to see what is available, see the first computer serving netboot, and boot from the first computer (462). One advantage of such as booting configuration is that only the first computer (462) need be updated (for example, with new software, new users, etc), and this will update the second computer (464) and keep it compatible. In other words, the netboot image that the first computer (462) sends over to the second computer (464) causes the second computer (464) to remote mount the first computer (462) for the root file system—so the two computers end up running not only the same version of Linux, but also the same Linux root file system, with the exception of a few small differences, such as different host configuration and network configuration. A stackable unification software file system such as UnionFS® may be utilized to facilitate the software unification between the two computers. Once the two computers have been started up, they are both running Linux, and configured such that operators of the robotic system will not notice that they are running off of one another. Standard users preferably are configured, and an operator may connect to the system directly as a user, or over various web-based interfaces. In one configuration, the computers are configured to serve a web interface directly from the robot. In other configurations, web interfaces may be served from off-board systems and configured to communicate to the robot using a robotic operating system, such as the ROS operating system available from Willow Garage, Inc. of Menlo Park, Calif., which is a programming framework for robotics that facilitates the handling of issues such as interprocess communication and the build system.

In another embodiment, one computing system may stand alone for central processing requirements, or two could be utilized with the second generally in a power-saving standby mode and being configured to only power up when demands on the first computer pass a certain threshold (redistribution of some of the processing then to the second computer could be handled by running the pertinent processes as virtual machines, so they would be migratable back and forth between computing systems). With each computing system representing a significant robotic system battery draw, such a flexible architecture may be quite desirable.

In one embodiment, many (on the order of 100 or more) processes will be running at once on the one or more computing systems, and these processes will be handling many disparate issues, including the realtime process. In one embodiment, all of the processes may be run with what is known as an "RT-preempth patch" to the Linux kernel, which essentially represents Linux running with changes in a configuration wherein there is nothing that will take an unbounded amount of processing time for the kernel. In other words, in such a configuration, everything is preemptable and a scheduler may be set up to always run the highest priority process. With such a configuration, the one or more computing systems may be set up to run the entire controls schema, as well as other processes in real time. Many processes may be run in "soft real time", as modern computing systems are essentially fast enough, and it is preferable to have them in fault tolerant modes. With the computing system running the various processes, it can be configured to communicate over the aforementioned ROS operating system and run the designated set of realtime controllers. For example, in one embodiment, a controller is configured to compute odometry information to track the robot's movement over time, and publish this information out. Another publishing node may be configured for a Hokoyo laser scanner device which may be plugged into one of the computers (say the first computing system, 462) where the driver for such device may reside. Such a node would may be configured to publish scan information from the laser scanner device. The odometry and scan information may be run into localization and mapping processes to make a map available as a latched topic, for example; subscribing devices will see this data stream always starting with the last item that was sent. This is a means for putting persistent data out on the network so any other device or process can receive it—and without having to send the data out all of the time (i.e., a query will result in whatever information has been requested). Thus such a configuration would be publishing, and in the aggregate, the system would build up a significant amount of interrelated information and componentry.

As discussed above, the switch (460) is at the center of the non-realtime communications network, which generally comprises a straightforward ethernet configuration wherein the WAP service port (500), the wired service port (502), power control board (444), Ethernet camera devices (446) and computers (462, 464) are operably coupled. In the depicted embodiment, the first computer has an additional network segment which may be referred to as the "network port" infrastructure, wherein a network wireless access port (454), a network rj45 connection 496), and a network SIM card interface (498) are operably coupled to the first computer (462) through a virtual private network, or "VPN", interface (506). Whereas the service port infrastructure (500, 502) may be utilized to simply access other devices on the network (i.e., it is configured to be a network node that may be utilized by an outside resource, such as a laptop computer workstation, at any time for debugging, to reprogram one or more of the computers, etc.; the robot essentially serves DHCP to the outside resource, so the resource becomes like part of the robot network), the network port infrastructure is configured to be utilized to provide the robotic system with Ethernet. In other words, the network port infrastructure is configured to connect with an external network, such as a building network in the building where the robot happens to reside or a mobile wireless network nearby using the SIM card interface (498) and appropriate SIM card for the pertinent mobile network (i.e. 3G, LTE, WiMax, etc.), to be able to receive data and access to off-board resources, such as a base computing station (504). In one embodiment, so long as the first computer (462) is able to receive some packets through its VPN (506) from the off-board base station computing system (504) through that system's VPN (508), regardless of the kind of network transfer, then networking connectivity may be established.

Referring again to FIG. 11A, also attached to the first computer (462) through one or more USB interfaces are various devices. In the depicted embodiment, for example, a Hokuyo laser scanner (532) and camera device (534) may be connected as USB devices (528) to the USB interface (526) of the first computer (462). Similarly, a joystick (536), such as those available from Sony Corporation under the tradename PlayStation®, PDA (538), such as those available from Apple Computer, Inc. under the tradenames iPhone® and iPad®, or other Bluetooth-enabled devices may be operably coupled with the USB interface (526) of the first computer (462) using a Bluetooth adaptor (530) configured with software code that is always running that knows to connect to certain Bluetooth devices. Also shown in FIG. 11A, one or more displays (466) may be operably coupled to video outputs of the computing systems (462, 464) to facilitate operation of the computers, display of graphics related thereto, etc.

Referring again to FIG. 11A, separate from the above non-realtime communications Ethernet network is a realtime network operation (456) which runs on 100 megabit Ethernet and is operatively coupled to all of the motor control boards (438, 440, 442), the robot-head-mounted texture projector (452), and any other sensors which may be coupled into the realtime network (456). In one embodiment, an Ethercat "hub" (524) architecture is utilized, as described, for example, by Beckhoff Corporation, the organization that developed Ethercat. An Ethercat hub behaves somewhat differently than a conventional Ethercat passthrough configuration, such as those known as "token ring" configurations.

As described above in reference to the robotic system hardware, motor control boards, such as those shown in FIG. 11A functionally coupled in to the realtime network (456), are positioned all over the robot—to enable precision control of joints and other devices. Several motor control board types may be utilized in the subject robotic system. One main type is configured to connect to various pieces of hardware (436), such as one motor, one encoder, a limit switch (such as the dark to light transition sensing switches described above in reference to movable joints and homing positions), and a trigger output (for example, in the forearm assembly 16, a motor control board that controls the joint movement is also utilized to trigger a camera exposure with millisecond precision). Such configuration preferably comprises a field programmable gate array, or "FPGA", device, an Ethercat communication chip (which may also be implemented as an FPGA core in another embodiment, as opposed to a discrete chip), an H-bridge (an electronic circuit which enables a voltage to be applied across a load in either direction, generally to allow a DC motor to run forward or backward; in one embodiment the H-bridge may be an integrated circuit; in another embodiment it may comprise discrete components), one or more inductors (in one embodiment, to facilitate DC current control, the H-bridge may be filtered out), a current sensor, input voltage sensor, output voltage sensor, and one or more temperature sensors (for example, in one embodiment, a motor controller board has two temperature sensors—one for board ambient, and one for the H-bridge; in another embodiment, a thermocouple input is provided on the motor control board to monitor a thermocouple lead configured to directly monitor motor temperature directly and allow for motor model adjustment accordingly; without such a direct motor temperature measurement configuration, motor temperature may be backed out of calculations based upon resistance/temperature models). The current control loop preferably is controlled by the FPGA, and an operator with the right access can reset gains, change the control loop, or even the entire control scheme (i.e., voltage mode, current mode, variable control directly on the FPGA, etc.), all by remotely programming the FPGAs. Thus this main type of motor controller board configuration is quite capable, and is utilized throughout the above described robotic system.

The motor controller boards for the gripper assemblies (18) are a bit different, in that they also comprise a three axis accelerometer (so all of that data comes back synchronously in the datastream back to the computing systems) and an LED light that is brought from the motor controller board out to the surface of the gripper using a light pipe—to allow for certain movement/timing calibration and/or testing maneuvers. For example, there are a few scenarios wherein it is useful to connect between the realtime and nonrealtime networks. In one embodiment, a motor controller board (440) may be used to trigger (450) a device such as an Ethernet-connected camera (446)—to capture an image and also know exactly when that image was captured. In such a configuration, the camera device (446) itself still resides on the nonrealtime network, and the motion control is happening on the realtime network. In a related embodiment, an LED light or other device (448) exposed on the surface of the gripper may be controllably turned on or off with timing precision by virtue of the realtime network and associated motor controller board (442)—while camera device triggering, as described above, is conducted. With the LED light in the field of view of the triggered camera, such configuration may be utilized for calibration. In one embodiment, for example, camera and LED lighting commands may be mixed (say to have the LED light up on the first 3rd and 5th milliseconds of a given camera exposure, etc, so one can get a higher rate of visual data than that at which the camera is actually capturing, and see a flashing dot/LED as the gripper moves in the captured images, to understand where such dot/LED is in space and use this information for calibration and/or registration). In another embodiment, all cameras may be exposed synchronously, due to the precision timing of the realtime network.

Another variation of a motor controller board resides in the head assembly (12) and is configured to be operatively coupled to one or more texture projector devices (164), for millisecond control over related projections, as well as a 6 degree of freedom inertial measurement unit, or "IMU", which may be coupled to the lower head assembly (128) and configured to synchronously measure rotation speed and acceleration along any of three axes. The IMU may be a MEMS-based unit, such as those available from MicroStrain, Inc. In one embodiment, the projector and motor controller board may be utilized to provide texture projection for stereo camera configuration depth perception or other image analysis, and such projected texture may be projected at precisely the same time as images are captured with the cameras, or intentionally out of sync with certain captured images, so that such images would not be clouded with the texturing. Many useful related timing configurations may be implemented with the realtime control of such devices. For example, it has been shown that humans tend to feel "seasick" if they observe flashing lights at about 30 Hz. One of the things that can be done with the subject system to avoid such issues, is to run the texture projector at 60 Hz or 120 Hz, and do more texture pulses than camera exposures. The camera(s) may be run in sync, out of sync, or partially in sync with the projector(s). In one syncing embodiment, three modes may be utilized: 1) gate the projector and image capture together; 2) gate them oppositely; or 3) alternate between gated together and gated oppositely. The first mode can be desirable, for example, in a scenario wherein one has a camera configured to capture images at 30 Hz, and texture is projected at 15 Hz; in such a case, at 15 Hz, one would capture alternating 3-dimensional image data and texture data without corruption of either. In a scenario with two cameras, each at 30 Hz, captures of each may also be timed around texture projector pulses, and with the high level of timing precision available using the realtime computing configuration, there is enough timing room to move certain projector pulses forward in time (i.e., out of their conventional normal rhythmic cycle position) to avoid the human blurriness or seasickness issues that may be associated with more regular, and less customized, timing patterns. In other embodiments, other similar devices and/or sensors may be precisely controlled utilizing the subject control system, including laser scanners, stereo cameras, mono cameras, and depth cameras that measure depth at every pixel (such as those available under the tradenames "Kinesta", "SwissRanger", and "PDM").

While in one embodiment the subject robotic system may be controlled and operated mainly using forward kinematics at the joints, in another embodiment, vision-based systems and absolute sensing may be utilized to understand where various portions of the robot are in space—for example, where the upper arms, forearms, and/or grippers are. In one embodiment, imaging fiducials may be utilized to facilitate observation of various portions. In another embodiment, shape recognition of the various parts of these assemblies, using a dense three-dimensional textured rigid body model, for example, may be utilized to understand their positions in space. Such techniques may be utilized either to enhance forward kinematic based techniques, or to at least partially replace such infrastructure, providing the opportunity to have less wires and sensors on certain portions of the robot. Further, imaging and scanning systems may be utilized to better understand the environment external to the robot. For example, given the significant amount of runtime envisioned for the subject robot within human environments, such robot is configured to have the opportunity to learn its environment while navigating through various locations. Simultaneous localization and mapping, or "SLAM", techniques may be utilized to further advance such robot's mapping and understanding of its environment while navigating and localizing various objects in real or near real time.

Referring again to FIG. 11A, various master input devices may be utilized to remote control or teleoperate aspects of the subject robotic system. For example, in one embodiment, a Bluetooth-enabled joystick (536) may be operatively coupled to one of the control system computers (462) through a Bluetooth adaptor (530) and USB interface (526) to facilitate the passage of instructions from an operator of such joystick to the control system. Similarly, a user interface of a PDA device, such as the touchscreen of an iPhone® or iPad®, may be utilized to provide instructions to the robotic system via Bluetooth/USB. Alternatively, such WiFi enabled PDA devices may be connected to one or more control system computers (462) using the service wireless access port (500). Many configurations may be utilized, depending upon the latency requirements. For example, in another relatively low latency embodiment, a master input device (510), such as the multi-degree-of-freedom devices available under the tradename "Phantom"® by Sensable Technologies, Inc., may be operatively coupled to a base computing station (508) positioned off-board the robotic system, and such base station (508) may be connected via VPN (508, 506) and a fast network connection which may, for example, be part of a local building infrastructure, to a central computing system (462), preferably through an equally fast interface on the network port infrastructure, such as an rj45 network port (496), or a high-speed network wireless access point (454) (a SIM-card type connection 498 to a mobile network presumably would be slower and have greater latency, but would indeed function). In an embodiment wherein an operator is close to a robot but does not want to, or is unable to, connect to high speed local building infrastructure or the like, one of the easy ways to use an external master input device is through the service port infrastructure (500, 502), as described above in reference to the iPhone® and iPad® devices as master input devices.

Referring again back to FIG. 11A, in one embodiment the controls architecture is all on Ethercat, so it is all time synchronous. A component may simply be operatively coupled with one of the motor control boards which exist all over the subject robotic system infrastructure (for example, in the aforementioned embodiment, a projector is operated by the same motor control board that controls a camera and a motor), and it becomes part of the control network. As described above, on the hardware side, Ethercat looks similar to Ethernet; on the software side, Ethercat is a unique ethertype, with frames being dispatched having addressing information dictating where one wants to read from and write to in a process image; this process image is distributed out to the slave motor controller boards (each of which preferably is configured to have its own address). Packets may be designed to go out on the network and distribute portions to various motor controller boards in a given configuration. For example, packets may be designed to go out, set every device's set points, read data from each, then capture such data on the way back and bring it in as a single packet. And, importantly, all of this may be handled in real time. Indeed, with a fast network and a 1 millisecond frame, data may start being received from such a dispatch before the dispatch has been completed, because the packet may be processed "on the fly" in less than half a millisecond. The remainder of the frame may be used for computation, as well as other tasks, such as "mailbox read", sending and receiving other information, such as temperature information or other data related to the motor model.

Figure 11B:
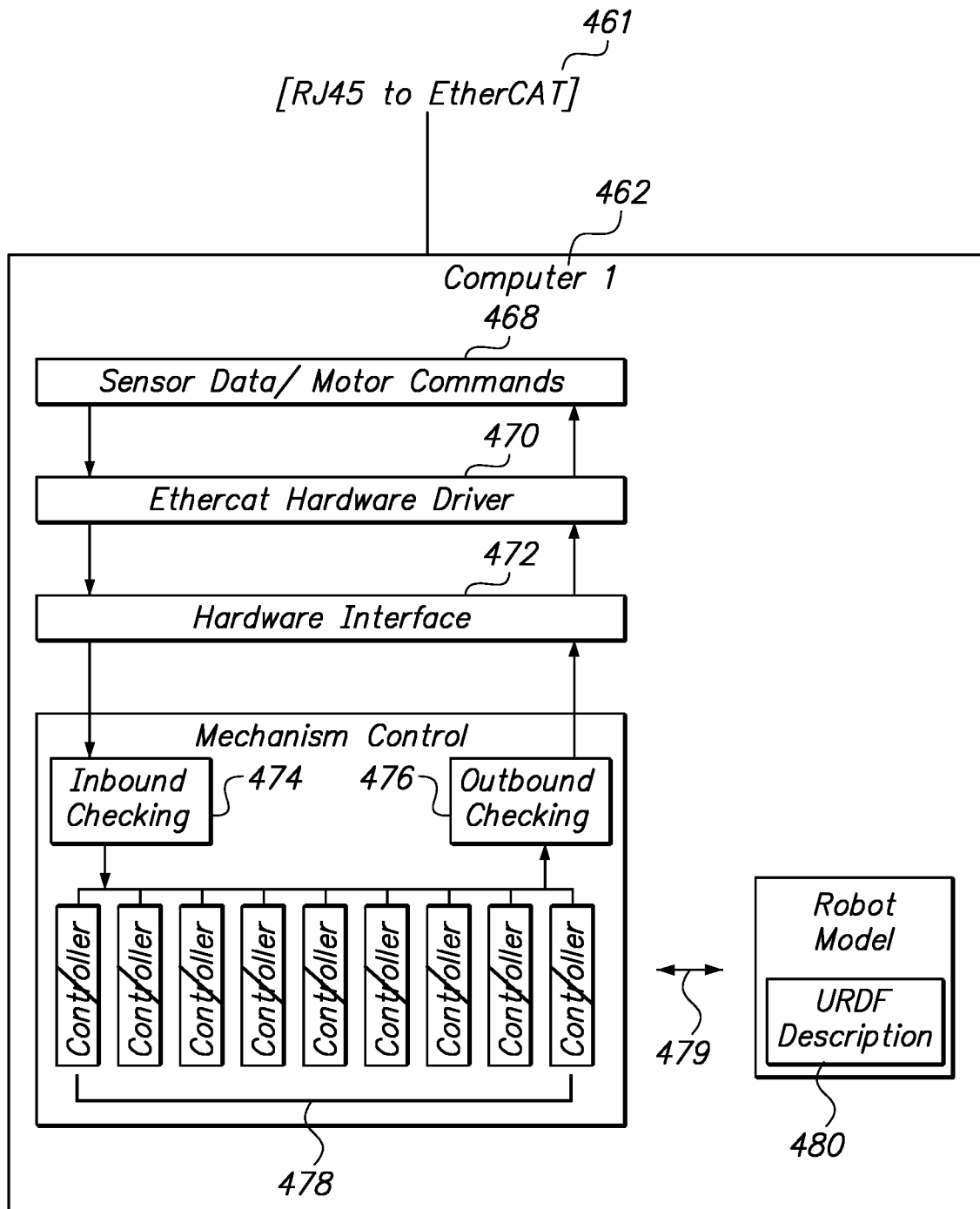

Once packet information from the motor controller boards makes it's way back to a central processing computer (462) by Ethercat (461), a series events occur in the embodiment depicted in FIG. 11B. Inbound sensor data (468) is delivered to an Ethercat hardware driver (470) which is configured to convert electronic wire transmissions into data structures that can be used by the controllers. These data structures are then passed to a hardware interface layer (472) representative of many hardware aspects. Everything beyond this layer on the inbound side is Ethercat independent. The hardware interface (472) has the same level of modularity used in a coding simulator to represent motors, encoders, joint range of motion limit flags, series elastic joints, position sources, torque sources, digital outputs, triggers, projectors, etc—as many different pieces of hardware as need to be communicated with. Multiple Ethercat buses may be configured to feed in this information, or one Ethercat bus may be configured to handle portions of it, while working with a more conventional second bus to handle other portions—a way of unifying to enable the control level to be the same. Indeed, with the subject system architecture, multiple totally disparate control systems may be controlled synchronously together. In the description above of the motor controller boards, on-board storage was described. Preferably in this storage is everything needed to not damage the hardware, along with hardware configuration information. So, the system knows based upon this information, for example, that it is dealing with the left forearm motor, and has the motor electrical parameters, the torque constant, the resistance, the motor model number, etc—all of the information needed to model the motor system, and all of it is stored on the motor controller board. This is valuable, because a new component designed using the same configuration, such as a new robotic arm, may be plugged onto the robotic system and the remainder of the system understands how to run it and not damage the hardware.

Referring back to FIG. 11B, information comes in from the motor controller boards (468), is converted into a useful form by the Ethercat hardware driver (470), is interpreted with the hardware interface layer (472), and is checked for motor model enforcement, among other things. For example, referring (479) to the motor model and an XML description of the entire robotic system (kinematics, dynamics, gear reductions, etc—the entire kinematics of the system) which may be referred to as the "URDF" (480), checking is conducted for back EMF, commanded sweep, input voltage (input voltage multiplied by pulse width modulation duty cycle should be approximately equal to the measured output voltage), commanded/measured current equivalence (they should be approximately equal unless there is a problem), and generally to confirm that the motor model remains intact (in one embodiment, a complex motor model equation may be utilized for such checking). So the hardware interface (472) is configured to do a lot of checking. After all of this checking and confirming, the information exposes, like a more sanitized version of the motor that meets control theory expectations (for example, where a torque is commanded and a position is returned). Beyond this analysis, there is a group of actuators represented in the hardware interface. Subsequent to the hardware interface layer (472) processing, the information is passed to what may be called "mechanism control".

Referring to FIG. 11B, mechanism control also runs its own battery of sanity checking on inbound information to confirm that the data looks reasonable and that aspects of the robot are not powered down. Then it is configured to run through a series of controllers (478), which are representative of almost any kind of pluggable code that one wants run through the realtime control loop. So the system is configured to run through a realtime update loop on each of the controllers, and the controllers are able to refer (479) to the robot model and URDF (480), as described above in reference to the hardware layer, to check things such as, "where is this joint", "how long is this link", etc. In one embodiment, data comes into the controllers (478), an update function is run, and the data runs out. All of this is happening once per millisecond, and once the controllers are loaded in, they are dynamically loaded (from anywhere—so they may be unloaded, recompiled, reloaded, initialized, and restarted at runtime) into the single realtime process. The controllers also are configured to be able to run and startup non-realtime threads, and make ROS or other types of communication layers. They are also configured to publish, subscribe, and do all sorts of non-realtime tasks, in addition to updating the loop. They may be configured to be responsible for their own communication between the realtime and non-realtime processes, which means that they can get access to whatever kind of realtime communication data they need to get. They also are configured to publish data out and receive set points in a variety of different ways. In other words, a custom interface may be defined that is appropriate for whatever task is at hand, and typed information may be published and operated along with the rest of the tasks, even though all are in the same process. For example, in a robotic odometry scenario, a controller may be created that is called the "odometry controller". It has access to the robot model (480) to understand where the casters of the mobile base are located, and it uses all of the data coming in (461) to understand how the casters (and joints and wheels thereof) are moving. With this information, it can be configured to then publish odometry information equivalent to "here is where the robot actually is in the world".

Thus, various controllers get instantiated and message to the rest of the system what kinds of type they want to load, and what kind of configuration data is required (for example, from a parameter server associated with the ROS operating system). The configuration data is acquired, dynamically loaded, initialized, and run. In one configuration there is a plurality of IPC service calls configured to allow a return on a query regarding what controllers are currently running, what types of controllers can be run, how to stop and start various controllers, etc. Preferably there are different controllers configured to implement different control schemes. For example, in one embodiment, joint controllers are included, as are joint trajectory controllers, Cartesian controllers, force controllers, hybrid controllers, and custom controllers for testing and analysis outside of normal operation (such as a realtime testing controller configured to run one or more sinusoidal joint sweeps, followed by analysis, and production of a Fourier transform).

Figure 11C:
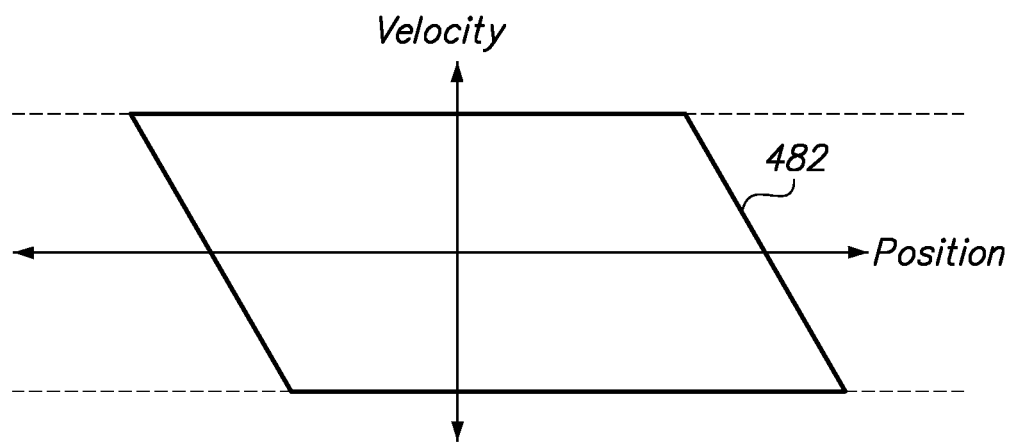
FIG. 11C illustrates a schematic of one embodiment of a velocity versus position controls paradigm.
Figure 11D:
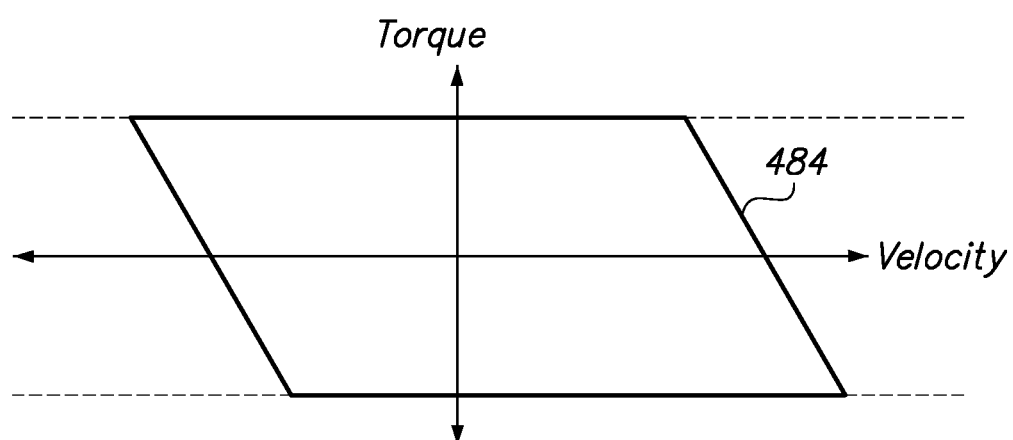
FIG. 11D illustrates a schematic of one embodiment of a torque versus velocity controls paradigm.

Referring to FIGS. 11C and 11D, part of a built in safety architecture in the depicted embodiment is a series of torque, velocity, and position relationships pertinent to every joint in the system (in one embodiment, everything has a torque limit, everything has a velocity limit, and certain things have position limits—while others, such as infinite rotation slip ring roll joints, intentionally do not). Referring again to FIGS. 11C and 11D, in short, an incoming commanded torque is compared against allowable maximum and minimum torques that are part of a predetermined profile (484), and the commanded torque is truncated to be within the profile—but before this is completed, the profile (484) is also analyzed for velocity constraints of the profile (484), and associated with this is a similar predetermined position-velocity profile (482) configured for truncating commands relative thereto.

In greater detail, referring to FIG. 11C, a profile (482) is shown which allows a given joint to run at relatively high velocity (angular or rotational velocity, for example) until close to the ends of a given range of motion (position), wherein allowable velocities are truncated. The same thing is done for torque versus velocity in FIG. 11D. If a joint of the robot is at or near maximum velocity, the torque which may be applied will be scaled down as per the predetermined profile (484). The interworkings of such profiles (482, 484) are safety features which prevent the robot from breaking itself or harming other objects around it. They are also advantageous because the system does not need additional control gains or control gain interactions between regular controllers and safety limits—because in the depicted embodiment, the system is always doing a combination of maxing out and truncating. The configuration has a transition between two controllers, both of which are stable (because at the transition, it is known that they are force continuous since it is a maximum, so a force continuous transition is conducted between two stable controllers, and you end up with position dependent velocity limits and velocity dependent torque, or force, limits). Operating under such paradigm, a joint can be moved all of the way up to the edge of a limit gently and slowly, but is not allowed to smash with a high impulse into the mechanical limits. Thus, the robot is able to have use the entire safe working envelope without damaging itself or other objects. With such active joint limits (i.e., with software slowing the mechanical interfaces before the hit mechanical stops), in one embodiment the software generally should not be pushing past a "soft" joint limit. If a given joint does, the system may be configured, for example, to shut down mobile base assembly (4) movement, or any movement of any joints. In one embodiment, the robotic system may be configured to temporarily push through software-based limits such as those described above—say in a scenario wherein there is a need to temporarily go all the way to the mechanical limits. In such a mode, the robot may be configured to provide feedback to an operator or nearby people that it has used a mechanical stop, such as a beep sound or even a voice expression, such as "ouch". In another mode, the system may be configured to keep the joint limits very well within the mechanical limits—say 50% within the mechanical limits—to allow for plenty of backdriveability in any direction of the joint motion, such as in an extra safe mode wherein collisions with other objects or people are more likely. In another mode, such as in a controlled industrial work environment, the system software may be configured to keep the joint limits within 90% of the mechanical limits—to allow for greater range of motion, while still retaining software limits configured to stop the joint motion short of mechanical limit enforcement. In another embodiment, the robotic system may be configured to fold its arms and essentially go "limp" (the aforementioned mechanical gravity compensation would continue to gently levitate the arms) when a child or other object or being is suspected to be in the near vicinity—significantly limiting the ways in which such child or other object could be injured or damaged through a collision with the robotic system.

In one embodiment, other safety features are built into the system configuration to guarantee that motor actuation will shut down if the current loop has a problem that may cause hardware damage, or if communications with the control computing systems have been interrupted (a "watchdog" type configuration is utilized to send dispatches to all pieces of hardware and wait for responses back). In one embodiment, if a "watchdog" timeout happens at the motor controller board level, the motor controller boards continue to run (i.e., to report all pertinent information), but not to operate associated motors—a flag is triggered when something is disabled, and the system may be configured to disable the entire associated chain, depending upon what associated devices may be safely actuated notwithstanding the given flag. Such a flag may be removed in software (generally a relatively high level software request is required to ensure that it is more than trivial to handle, and certainly intentional). One way to handle this is to have an "enable" bit in the Ethercat hardware, such that when this bit is high, the subsystem is enabled, and when low, it is disabled. If a fault is generated, it must be toggled low, then high again to ensure that no matter how many packets are dropping, or whatever else is the problem, that there has been active acknowledgement from the central processing side that a re-enablement is indeed warranted. Once this has been confirmed, there are other checks going on, such as communication packet check sum errors. In one embodiment, the system is configured to run through a first packet check sum error and treat this first packet as lost, but if there are too many (i.e., past a certain predetermined threshold—using a tally that remains updated), a fault may be determined. Similarly, motor model warnings (for example, due to thermal or undervoltage issues) may be initially reported as warnings, but past a certain threshold a fault may be determined, the motors shut down, and the issue reported out to the rest of the system on a diagnostics reporting interface.

Figure 11E:
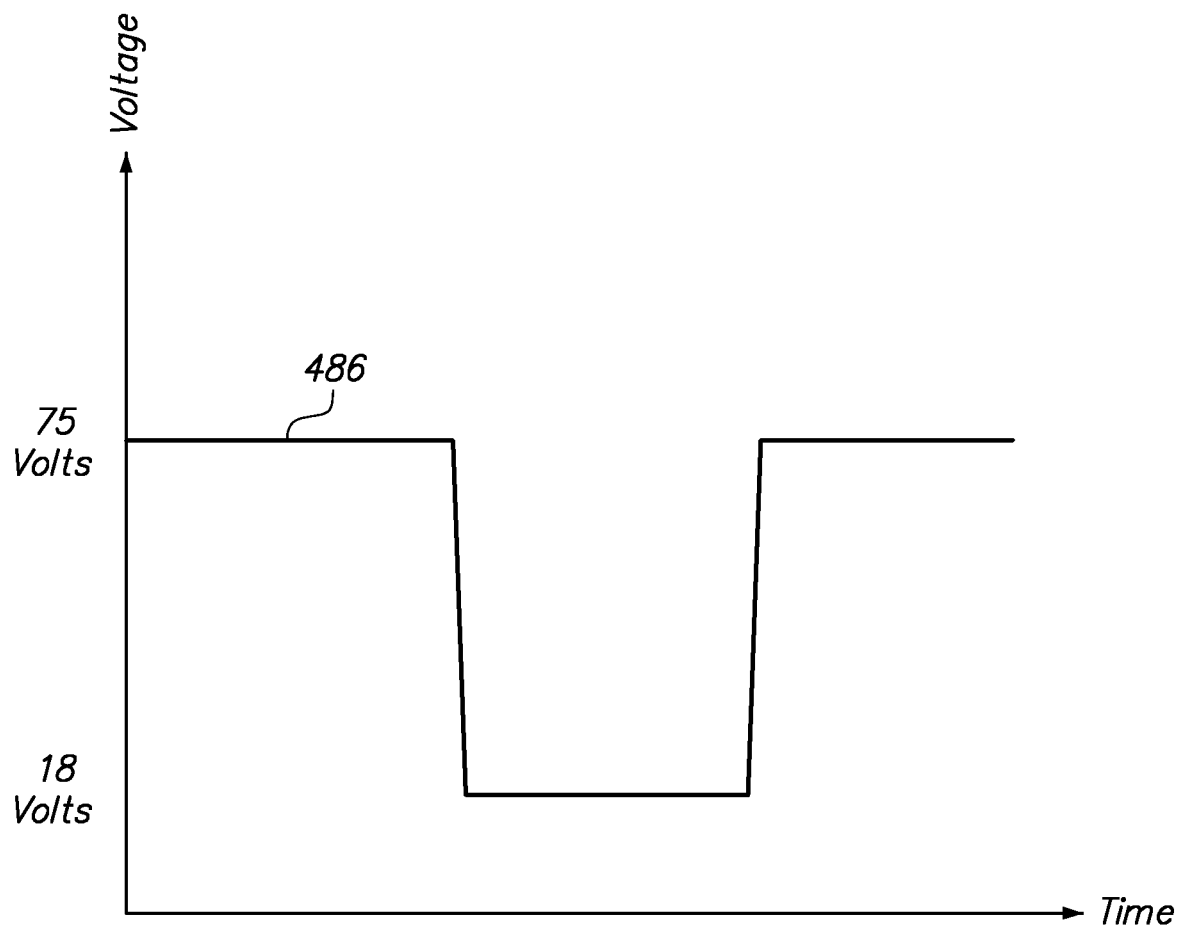
FIG. 11E illustrates a schematic of one embodiment of a voltage versus time plot for illustrating one embodiment of a power control paradigm.

Referring to FIG. 11E, and the above described Estop (24) functionality (either from the Estop button 24 positioned at the back of the body assembly 8, or an Estop button which may be positioned within a wireless remote controller housing and configured to have precisely the same functionality of the body assembly Estop; the system may be configured to execute an Estop if watchdog type functionality doesn't recognize that such wireless Estop is within range and functioning properly) the system preferably is configured to operate using an unregulated battery voltage from the batteries housed within the mobile base assembly (4), the voltage varying from about 44 volts to about 80 volts. In the example of FIG. 11E, if the robotic system is operating at approximately 75 volts and an operator hits an Estop button (24), the system is configured to immediately drop the voltage to approximately 18 volts and continue at that level. This voltage level is configured to represent just enough power to run all of the motor controller boards in a standby mode wherein, based upon the boost circuitry configuration of the motor controller boards, they cannot power the FETs and operate associated motors unless they have more than 18 volts. This is advantageous, because two modes of operation are available without two separate sources of power (i.e., one for communications and one for motor actuation), which would require twice as many wires, more weight, and the introduction of electrical ground loops (in one embodiment, the communication is Ethernet—so this is also decoupled and does not introduce ground loops). Upon commanded reenablement, as shown in the plot (486) of FIG. 11E, voltage is increased back to the previous position (75 volts in this example), and the motor controller boards may be configured to wait for an affirmative signal from the central control system (i.e., a conscious reset bit after the voltage is turned back to high) before full motor actuation enablement.

As described above in reference to the mobile base assembly (4) and body assembly (8), the subject robotic system has a mobile power system comprising a plurality of batteries (44), wiring interfaces, and a main power control board (58). In one embodiment, power to charge the batteries may be brought in through a conventional cable and plug from a standard AC wall outlet to an International Electrotechnical Commission ("IEC") specification 60320 type of plug interface featured at the side of the mobile base (4) in the power switch panel (28) area. In one embodiment, the robot may be configured to plug itself in using the IEC interface, a cable, and a conventional wall outlet. In another embodiment, the robot may be configured to analyze how much power can be drawn without overdrawing and toggling a conventional circuit breaker. In another embodiment, the robot may be configured to draw at a relatively low predetermined level, such as 5 amps, unless otherwise configured. With a cable in place, power comes in through the IEC interface and into AC/DC converters housed within the mobile base assembly (4). As described above, the robot may be configured to operate using unregulated battery voltage for efficiency reasons (conventional devices regulate voltage first, and then use this to run current control with a current regulator—two regulators in series is not as efficient). Charge management boards are operatively coupled between the AC/DC converters and batteries in a configuration not unlike those of laptop computers. Such charge management boards preferably are operatively coupled to the control system computer so that it may monitor charge status, time to charge, whether the system is indeed plugged into a wall outlet that is providing power, etc. In one embodiment, the AC/DC converters also are operatively coupled to the control system computing resources so that they may also be monitored. When one of the Estop buttons, either wired or wireless, is activated, the voltage is pulled down and the motors stopped, as described above. With the above described backdriveable arm assemblies (14, 16, 18), the robot may be configured to produce power regeneratively, when work is being done on the robot. For example, in the case of carrying heavy objects in a factory setting from a first position relatively high above the ground, to a second position relatively close the ground, gravitational forces are doing work on the robot, and this work may be converted to energy through regeneration, akin to the regenerative braking technologies utilized in vehicles such as that marketed under the tradename "Prius"® by Toyota Motor Company of Japan. In one embodiment, the system is configured to be about 90% efficient when work is being done upon it.

Since the robot comprises a relatively sophisticated power supply, it may be used as such by other devices, through the power switch panel (28) and associated plug interfaces. In one embodiment, laptops or other devices may be plugged into the robotic system during power outages or other scenarios wherein a mobile power supply is advantageous. Indeed, in one embodiment, the robotic system may be configured to navigate over and flip a breaker switch to reestablish local building power when such breaker has temporarily terminated local power, in one variation after the robot has conducted certain testing to confirm that the resetting of such breaker seems warranted and safe. The power control and distribution board (58) housed within the body assembly (8) is configured to be available over the non-realtime network to the control computers and therefore may be accessed externally, for example through a laptop computer or remote basestation computer, through means such as the service port infrastructure. In another embodiment, components such as AC/DC converters and charge controllers may be featured off-board the robot to save space and mass, and have less heat generated on the robot.

As described above, the subject robotic system may be teleoperated using one or more master input devices, such as a joystick, wireless PDA interface, or mouse or other device associated, for example, with a computing base station. While literal teleoperation can be very useful, it is also desirable in certain scenarios to work with higher-level commands. For example, as opposed to a simple teleoperation command such as "move forward", a command such as "go and get me the newspaper" or "clean the kitchen" may be desired. Teleoperation can play an important part in certain embodiments of higher-level instruction response or various levels of autonomous operation. For example, it may be useful to bring external teleoperation and decisionmaking resources into a given robotic system challenge to assist with efficient net goal accomplishment. In one embodiment, external human teleoperation resources may be integrated into the operation of a given robotic system to accomplish and instructed task such as "clean up the kitchen." In one embodiment, outside resources such as human teleoperators may be utilized to assist with robotic decisionmaking in a relationship to the robotic system similar to that established for the participants of "mechanical turk" arrangements, such as that operated by Amazon Mechanical Turk (www.mturk.com). For a given cost, a question or issue may be answered by an external, but connected, human resource. Over time, a database may be populated with successful answers to given queries, and certain answers may be delivered from the database without outside human intervention. For example, a human resource may be brought in to assist as a teleoperation resource in a scenario wherein a robotic system has been given a high level assignment, such as "load the dishwasher", and may have difficulty identifying which dish to pick up first, which items are dishes versus drinking glasses, etc. A teleoperator in such a scenario may use the imaging resources and his own brain to identify the dishes and glassware, along with their orientations and positions, and then use this information to assist in operation of the robot—say with a master input device such as a joystick to identify which place to grasp next as the robot is moving through the process of picking up dishes and glassware. Similar teleoperation assistance may be provided when an autonomous or semiautonomous robotic system is trying to figure out how to open a door that has a unique piece of doorknob hardware, or one that is fairly common to the average human, but is difficult for the robot to interpret or operate. For a first plurality of attempts through such a complex task, a mechanical turk marketplace of human intervention may be utilized—and after a database has stored enough information regarding such tasks, it preferably will be configured to utilize the resources of the database first before pursuing other human intervention (for example, after a robot has brought in external human resource to open the doors of a given building 1,000 times, it will "know", by virtue of the database, a lot about opening the doors of that building and will likely be able to handle most scenarios on its own, without additional outside resources, such as that which maybe brought in from a mechanical turk type of configuration). Further, it is desirable for a network of robots to assist each other—by sharing information. For example, if every robot must master the art of opening doors on its own, a lot of resource will be consumed doing so when looking at a group of 10,000 deployed robots. Conversely, in one embodiment, the robots may share information and resources, so that they can learn together how to open entry doors, refrigerator doors, and any other kind of door—and constantly refine their commonly accessible information regarding addressing such challenges in the human environment. In one embodiment, such information available from a commonly accessible database, would be anonymized to address privacy issues. For example, in a scenario wherein the challenge is in opening a door by engaging a doorknob and mechanically swinging a door, there is no need to also provide accessible information regarding the addresses or home layouts of any particular homes. A result of such interaction of robotic system based database building and human integration, such as by mechanical turk types of configurations, is a marketplace of solutions and information pertinent to robotics operation in the human environment. Certain companies or organizations may be set up to build and advance these kinds of databases or address these kinds of human integration opportunities. Tasks may be weighted, in terms of importance to the robot or owner having a given query responded to and the quality of the response. For example, a housecleaning robot operating in a $40M house full of valuable artwork may be configured by its owner to seek outside human intervention or designated very high quality database information any time it has confusion regarding what it has encountered—whether it's a cat, a valuable statue, or a telephone cord stretched across a carpeted walkway. On the contrary, a junkyard organizing robot may be configured to sort metals and plastics, and to generally only seek outside help if something appears to be dangerous to the robot itself. Trustworthiness and quality ratings, akin to those used on eBay or other collaborative business systems, may be utilized in various embodiments to assist an owner or operator in determining what kind of resource is available and how to increase the probabilities of success. For example, a teenager in Bangalore, India with a very sophisticated, multiple degree of freedom, master input device and proven high levels of mechanical acuity maybe rated differently for certain tasks relative to a 75 year old retiree in Canada with an old dusty Atari joystick.

Outside resources also may be utilized controls paradigms pertinent to safety and diagnostics. For example, in one embodiment, a commonly accessible database regarding combinations of messages, such as error messages from motor controller boards, may alert referring systems that something disadvantageous may be coming and can be avoided. For example, if a temperature appears to be going up in a location on a given robotic system wherein the voltage is also changing significantly, this may be correlated, given past experience with other robotic systems, or perhaps the system at issue, with a fire that is about to break out, which can be avoided if the issue is identified early enough. Rules for combining incoming information, such as temperature and voltage, may be developed at the robotic system diagnostics level to provide predictable and changeable responses, and libraries of rules may be made available to disparately located robotic systems, in a manner akin to that used by operations such as www.bigfix.com, wherein users of disparate computer systems are assisted with information technology challenges that have been encountered in the past and successfully addressed. For example, in one embodiment, when a robotic system is unable to operate a "model 15 gripper" when it is also operating a "model 3" texture projector, the robot may query a database to leverage the experience of other robots that had the same problem and successfully addressed it with "Solution X"—and may apply Solution X to its own scenario to try to address the gripper/projector issue. In another embodiment, the outside resource may return a message indicating that some maintenance issue is required that should be addressed, such as a worn slip ring connection.

As described above, a robotic system may comprise various image capture devices and/or projectors. The projectors may be configured to broadcast textures for image capture and spatial analysis, or may be utilized as user interface devices, for example, by projecting an image in two or three dimensions for viewing by a person. For example, in one embodiment, a movie clip or image may be projected against a wall. In another embodiment, the robot may comprise a two or three dimensional display or monitor which may be configured to broadcast images, signals, or the like to persons or other robots around the subject robot. For example, in one embodiment, a robotic system may be configured to broadcast a laser dot onto something that it is about to pick up with a gripper—to let others around it know that it is in the process of going toward that object to pick it up. In another embodiment, a laser dot or arrow may be broadcast onto the floor in front of a moving robot, to indicate to others where that robot is headed. In another embodiment, a restaurant waiter robot configuration may be configured to broadcast a menu image onto a flat table in front of one or more customers—and to allow the customers to point to items they want to order or have further information regarding (such as a list of ingredients, photos, or other information which may then be displayed, verbalized, or otherwise provided by the robot to such customers). In another embodiment, a keypad image may be broadcast upon a table to allow a user to "type" with his fingers on the table to provide an input to the robotic system. In another embodiment, a display, such as a two or three dimensional monitor, comprising part of a robotic system may be utilized to indicate to others the charge status of a robot, whether the robot is mechanically stuck on something, whether the robot is attempting to autonomously solve a problem (i.e., whether it is paused and "thinking" about something), etc. In another embodiment, a robot may, in response to an instruction to "go and get me a beer", mobilize to the refrigerator, open the door, and upon identifying multiple types of beer in such refrigerator (i.e., by optical character recognition, shape recognition, etc.), capture a photo of such scenario. Such photo may be then be broadcast to the requesting person—say on a table, or wall, with the person given a choice as to "which beer". In a related embodiment, the robot may be configured to send the photo to the user's PDA or television, so that the robot can stand in position at the refrigerator and readily grab the correct beer after the user has selected it from the image using his PDA, laptop, television remote control (for example, the robot may be configured to interrupt regular television or video signals and broadcast the captured image of the refrigerator, which may be communicated, for example, to a WiFi-capable television from the robotic system), or other device as a selector or master input device (selections may be made, for example, by positioning with arrow keys or a touchpad interface, or by voice commands such as "up a little more——little more—yes, that one" or "the one with the yellow label"). In another related embodiment, the user may be given the opportunity to change his mind or modify his command (i.e., "get me some crackers also—those ones in the orange box on the top shelf . . . yes, that box"). In another embodiment, projection (such as by the robot, or by a connected camera/projector, such as by an image capture device on a PDA or cellphone which may be connected) and a user's hands or one or more individual fingers of the user may be utilized as a master input device (using, for example, automated image processing to identify the finger or fingernail positions, for example, or utilization of a glove or readily identifiable markers coupled to the pertinent fingers—to enable the robotic system to understand where the pertinent fingers are in space relative to each other) to assist with robot control. For example, in a scenario wherein fine motor control is helpful, in one embodiment, the user may be able to use his thumb and forefinger, along with the image capture device in his cellphone, to delicately simulate a pinching pickup of a single olive from a tray of olives near his robot in another room far out of sight—and the robot may be configured to follow this fine motor control master input device command to pick up such olive for the user. In another embodiment, a two-finger pinching type of activity may be captured using a touchscreen interface, such as on an Apple iPhone®, to send a similar command to the robot; in a related embodiment, an image of the olive tray may be shown in the background of the iPhone as the user is allowed to simulate the selection and pickup of his targeted olive with the touchscreen interface overlaid over the image. In another embodiment, the robot may comprise button pads, or a keyboard, for direct user interface engagement. Any of the buttons, touchscreens, or other user interface features of a PDA, laptop, or other communication device may be utilized to communicate with the robotic system. For example, a person trying to stay quiet, or perhaps a deaf person, may, in one embodiment, prefer to instruct his robot to get him a beer by sending a text message or email to his robot with the same instruction. In another embodiment, the arms of the robot may be utilized as master input devices, and one robot or arm may be utilized as a kinematically similar master input device for another robot or arm. The robotic system may comprise directional microphones, or one or more microphones and a directionality capability, to localize sounds. Thus in one embodiment, when a cat meows near a user, the user may query to his robotic system, "which cat was that" and the robot, with directional sound sensing, may localize the meow sound, capture an image of the subject cat, and communicate that to the user by any of the aforementioned user interface techniques (for example, an image of the cat's face may be sent by Bluetooth to the user's PDA screen, sent by WiFi to the user's television or laptop, broadcast upon a nearby wall, broadcast upon a display coupled to the robot, etc). Similarly, if the user says, "where is he?", the robot may be configured to broadcast a laser pointer spot near the position of the cat, point with the robotic arm in a manner akin to a human pointing with his finger, etc. In another embodiment wherein the cat has a Bluetooth or other network enabled collar, the robot may be able to localize the cat's position using signal triangulation, and directly identify the cat using the collar-based information (i.e., the robot may be configured to audibly say, "it's Fluffy" and/or broadcast a stock photo or captured image to the user). In another embodiment, multispectral sensing hardware and software may comprise portions of the robotic system, and may be configured to resolve objects in somewhat unconventional ways. For example, in one embodiment, an X-ray tube may be coupled to the robotic head or arm assembly and configured to assist a carpenter with identification of non-visible resources positioned within a wall—such as pipes, fuel or electrical lines, pressure vessels, beams or other framing members, etc. In one embodiment, the positions of such resources may be communicated to an nearby user in various ways as described above, such as by utilizing a projector to project an image of the in-wall resources upon the flat surface of the wall, or by using a laser source coupled to a scanner, such as a galvanometric scanner, to produce a high-frequency-recirculating trace of the resources that ends up looking like a laser projection of an image against the wall to the user.

With the capabilities and configurations described herein, the subject robotic system may be used in many other teleoperation, autonomous, or semi-autonomous configurations and embodiments. For example, in one embodiment, the robotic system may be configured to operate as a nanny for children, with the capability to interact safely with kids, answer questions, and provide enhanced monitoring capabilities for one or more parents. In another embodiment, the subject robotic system may be configured as a construction contractor's assistant. In another embodiment, a subject robotic system may be configured as a real estate agent or property manager's assistant. In another embodiment, the subject robotic system may be configured as a cook or cook's assistant. In another embodiment, the subject robotic system may be configured as a nurse or surgeon's assistant. In another embodiment, the subject robotic system may be configured to operate as a searchable physical filing system assistant. In another embodiment, the subject robotic system may be configured to operate as an elder care or handicapped person's assistant. In another embodiment, the subject robotic system may be configured to operate as a manufacturing robot.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

Any of the devices described for carrying out the subject diagnostic or interventional procedures may be provided in packaged combination for use in executing such interventions. These supply "kits" may further include instructions for use and be packaged in sterile trays or containers as commonly employed for such purposes.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. A humanoid robot, comprising:
   a mobile base;
   a torso assembly secured to the base;
   a robotic arm movably secured to the torso assembly;
   a counterbalancing member connected to the robotic arm;
   a first pulley;
   a first spring can that includes a first spring and a first spring can output belt connecting the first spring to an interface member of the first pulley; and
   a final output belt connected to the pulley, the first spring creating a force that acts through the final output belt and the counterbalancing member as a gravity compensation mechanism for the robotic arm;
   a second pulley; and
   a second spring can that includes a second spring that is compressed and a second spring can output belt connecting the second spring to an interface member of the second pulley, the second spring creating a force that acts through the final output belt and the counterbalancing member as a gravity compensation mechanism for the robotic arm.

2. The humanoid robot of claim 1, wherein the final output belt is a toothed timing belt.

3. The humanoid robot of claim 1, wherein the first spring can belt is a toothed timing belt.

4. The humanoid robot of claim 1, wherein the first spring is compressed.

5. The humanoid robot of claim 1, wherein the second spring can belt is a toothed timing belt.

6. The humanoid robot of claim 1, further comprising:
   a connecting belt that connects the second pulley to the first pulley.

7. The humanoid robot of claim 1, wherein the second pulley has a rotation axis and an outer surface that forms a cam geometry about the rotation axis.

8. The humanoid robot of claim 1, wherein the first and second pulleys have different load versus deflection curves.

9. The humanoid robot of claim 1, wherein the counterbalance mechanism includes:
   an upper arm counterbalance interface rod, wherein an adjustment between the upper arm counterbalance interface rod and the counterbalancing member allowing for a setting that causes the robot arm to float to gravity.

10. The humanoid robot of claim 1, further comprising:
    an elevator that is secured to the torso assembly for vertical movement when the robot arm moves relative to the torso, wherein the elevator is secured to the final output belt to move the final output belt.

11. A humanoid robot, comprising:
    a mobile base;
    a torso assembly secured to the base;
    first and second arm assemblies, each arm assembly including:
        a robotic arm movably secured to the torso assembly;

a counterbalancing member connected to the robotic arm;
a first pulley;
a first spring can that includes a first spring and a first spring can output belt connecting the first spring to an interface member of the first pulley; and
a final output belt connected to the pulley, the first spring creating a force that acts through the final output belt and the counterbalancing member as a gravity compensation mechanism for the robotic arm;
a second pulley; and
a second spring can that includes a second spring that is compressed and a second spring can output belt connecting the second spring to an interface member of the second pulley, the second spring creating a force that acts through the final output belt and the counterbalancing member as a gravity compensation mechanism for the robotic arm.

* * * * *